US012484749B2

(12) United States Patent
Conrad

(10) Patent No.: US 12,484,749 B2
(45) Date of Patent: Dec. 2, 2025

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 72 days.

(21) Appl. No.: 18/240,187

(22) Filed: Aug. 30, 2023

(65) Prior Publication Data

US 2024/0057831 A1 Feb. 22, 2024

Related U.S. Application Data

(63) Continuation of application No. 17/237,692, filed on Apr. 22, 2021, now Pat. No. 11,786,095, which is a
(Continued)

(51) Int. Cl.
*A47L 9/16* (2006.01)
*A47L 5/30* (2006.01)
(Continued)

(52) U.S. Cl.
CPC ............... *A47L 9/1608* (2013.01); *A47L 5/30* (2013.01); *A47L 5/32* (2013.01); *A47L 9/1683* (2013.01);
(Continued)

(58) Field of Classification Search
CPC . A47L 9/1608; A47L 5/30; A47L 5/32; A47L 9/1683; A47L 9/2878; A47L 9/325; B25G 1/04
See application file for complete search history.

(56) References Cited

U.S. PATENT DOCUMENTS 4,571,772 A * 2/1986 Dyson ........................ A47L 5/32 15/352
5,267,371 A 12/1993 Soler et al.
(Continued)

FOREIGN PATENT DOCUMENTS

CA 2192883 A1 7/1997
CA 2192906 A1 7/1997
(Continued)

OTHER PUBLICATIONS

English machine translation of DE102005008278B4, published on Mar. 27, 2008.
(Continued)

*Primary Examiner* — David S Posigian
(74) *Attorney, Agent, or Firm* — Philip C. Mendes Da Costa; SMART & BIGGAR LP

(57) ABSTRACT

A surface cleaning apparatus has a cyclone having a primary air inlet and a secondary air inlet. A primary air flow path extends a the floor dirty air inlet of a surface cleaning head to the primary air inlet of the cyclone. An above floor cleaning assembly comprising an above floor cleaning wand and a flexible hose, the above floor cleaning assembly having an auxiliary dirty air inlet. A secondary air flow path extends from the auxiliary dirty air inlet to the secondary air inlet of the cyclone. When the surface cleaning apparatus is useable in a floor cleaning mode in which air enters the surface cleaning apparatus via the primary dirty air inlet of the surface cleaning head and an above floor cleaning mode in which air enters the surface cleaning apparatus via the auxiliary dirty air inlet.

17 Claims, 96 Drawing Sheets

Related U.S. Application Data continuation of application No. 16/011,146, filed on Jun. 18, 2018, now Pat. No. 11,013,383, which is a continuation of application No. 14/829,331, filed on Aug. 18, 2015, now Pat. No. 10,022,027, which is a continuation-in-part of application No. 14/573,549, filed on Dec. 17, 2014, now Pat. No. 9,717,383.

(51) Int. Cl.

| | |
|---|---|
| ***A47L 5/32*** | (2006.01) |
| ***A47L 9/28*** | (2006.01) |
| ***A47L 9/32*** | (2006.01) |
| ***B25G 1/04*** | (2006.01) |

(52) U.S. Cl.

CPC ............. *A47L 9/2878* (2013.01); *A47L 9/325* (2013.01); *B25G 1/04* (2013.01)

(56) References Cited

U.S. PATENT DOCUMENTS 5,358,290 A 10/1994 Fleet et al.
5,500,979 A 3/1996 Peter
5,671,499 A 9/1997 Melito et al.
5,699,586 A 12/1997 Melito et al.
5,765,258 A 6/1998 Melito et al.
5,909,755 A 6/1999 Leal
5,974,625 A 11/1999 Garner
6,012,200 A 1/2000 Murphy et al.
6,098,244 A 8/2000 Conrad et al.
6,099,661 A 8/2000 Conrad
6,101,672 A 8/2000 Conrad et al.
6,123,779 A 9/2000 Conrad et al.
6,129,775 A 10/2000 Conrad et al.
6,135,708 A 10/2000 Conrad et al.
6,168,716 B1 1/2001 Conrad et al.
6,170,119 B1 1/2001 Conrad et al.
6,173,474 B1 1/2001 Conrad
6,174,127 B1 1/2001 Conrad et al.
6,183,641 B1 2/2001 Conrad et al.
6,221,134 B1 4/2001 Conrad et al.
6,224,325 B1 5/2001 Conrad et al.
6,231,645 B1 5/2001 Conrad et al.
6,238,177 B1 5/2001 Conrad et al.
6,243,917 B1 6/2001 Conrad
6,251,296 B1 6/2001 Conrad et al.
6,261,052 B1 7/2001 Conrad et al.
6,261,379 B1 7/2001 Conrad et al.
6,280,143 B1 8/2001 Parker et al.
6,307,358 B1 10/2001 Conrad
6,312,594 B1 11/2001 Conrad et al.
6,317,920 B1 * 11/2001 Brickner .................. A47L 5/34 15/352
6,328,527 B1 12/2001 Conrad et al.
6,334,234 B1 1/2002 Conrad et al.
6,344,064 B1 2/2002 Conrad
6,345,411 B1 2/2002 Kato et al.
6,363,571 B1 * 4/2002 Block ...................... A47L 5/30 15/334
6,440,197 B1 8/2002 Conrad et al.
6,442,792 B1 9/2002 Sudou et al.
6,457,205 B1 10/2002 Conrad
6,533,834 B2 3/2003 Conrad et al.
6,574,831 B2 6/2003 Hunter et al.
6,599,340 B2 7/2003 Conrad et al.
6,782,585 B1 8/2004 Conrad et al.
6,817,059 B2 11/2004 Tsuchiya et al.
D507,387 S 7/2005 Jacobs
7,000,288 B2 2/2006 Nighy
7,013,528 B2 3/2006 Parker et al.
7,222,393 B2 5/2007 Kaffenberger et al.
7,251,854 B2 8/2007 Gerth et al.
7,329,294 B2 2/2008 Conrad
7,740,675 B2 6/2010 Conrad
7,749,293 B2 7/2010 Conrad
7,776,120 B2 8/2010 Conrad
7,803,207 B2 9/2010 Conrad
7,811,345 B2 10/2010 Conrad
7,867,308 B2 1/2011 Conrad
7,887,612 B2 2/2011 Conrad
7,941,895 B2 5/2011 Conrad
7,996,957 B2 8/2011 Kah, Jr.
8,020,251 B2 9/2011 Luebbering et al.
8,100,999 B2 1/2012 Ashbee et al.
8,127,398 B2 3/2012 Conrad
8,146,201 B2 4/2012 Conrad
8,151,407 B2 4/2012 Conrad
8,176,596 B2 5/2012 Conrad
8,192,515 B2 6/2012 Conrad
8,268,029 B2 9/2012 Yoo
8,292,979 B2 10/2012 Conrad
8,296,900 B2 10/2012 Conrad
8,349,428 B2 1/2013 Conrad
8,370,993 B2 2/2013 Conrad
8,375,508 B2 2/2013 Conrad
8,448,291 B2 5/2013 Conrad
8,479,358 B2 7/2013 Conrad
8,486,170 B2 7/2013 Conrad et al.
8,510,907 B2 8/2013 Conrad
8,533,904 B2 9/2013 Conrad
8,561,257 B2 10/2013 Conrad
8,567,005 B2 10/2013 Conrad
8,578,550 B2 11/2013 Conrad
8,578,553 B2 11/2013 Conrad
8,590,102 B2 11/2013 Conrad
8,607,407 B2 12/2013 Conrad
8,621,709 B2 1/2014 Conrad
8,640,304 B2 2/2014 Conrad
8,646,147 B2 2/2014 Conrad
8,659,184 B2 2/2014 Conrad
8,677,554 B2 3/2014 Conrad
8,677,558 B2 3/2014 Conrad
8,713,751 B2 5/2014 Conrad
8,769,767 B2 7/2014 Conrad
8,813,305 B2 8/2014 Conrad
8,834,209 B2 9/2014 Conrad
8,869,344 B2 10/2014 Conrad
8,869,345 B2 10/2014 Conrad
8,869,348 B2 10/2014 Conrad
8,875,340 B2 11/2014 Conrad
8,875,342 B2 11/2014 Conrad
8,943,647 B1 2/2015 Henderson
8,985,127 B2 3/2015 Konandreas et al.
9,027,198 B2 5/2015 Conrad
9,027,203 B2 5/2015 Conrad et al.
9,066,642 B2 6/2015 Conrad
9,119,511 B2 9/2015 Kah, Jr.
9,119,513 B2 9/2015 Conrad
9,161,666 B2 10/2015 Conrad
9,161,669 B2 10/2015 Conrad
9,167,944 B2 10/2015 Conrad
9,204,769 B2 12/2015 Conrad
9,204,773 B2 12/2015 Conrad
9,215,960 B2 12/2015 Conrad
9,226,633 B2 1/2016 Conrad et al.
9,227,151 B2 1/2016 Conrad
9,227,201 B2 1/2016 Conrad
9,232,881 B2 1/2016 Conrad
9,238,235 B2 1/2016 Conrad
9,265,395 B2 2/2016 Conrad
9,295,363 B1 3/2016 Conrad
9,295,995 B2 3/2016 Conrad
9,314,138 B2 4/2016 Conrad
9,314,139 B2 4/2016 Conrad et al.
9,320,401 B2 4/2016 Conrad
9,326,652 B2 5/2016 Conrad
9,364,127 B2 6/2016 Conrad
9,427,122 B2 8/2016 Conrad et al.
9,427,126 B2 8/2016 Conrad
9,433,332 B2 9/2016 Conrad
9,451,852 B2 9/2016 Conrad
9,451,855 B2 9/2016 Conrad
9,456,721 B2 10/2016 Conrad
9,492,045 B2 11/2016 Conrad

(56) References Cited

U.S. PATENT DOCUMENTS

| | | | |
|---|---|---|---|
| 9,526,394 | B2 | 12/2016 | Conrad |
| 9,572,463 | B2 | 2/2017 | Conrad |
| 9,591,952 | B2 | 3/2017 | Conrad |
| 9,591,958 | B2 | 3/2017 | Conrad |
| 9,775,484 | B2 | 10/2017 | Conrad |
| 9,795,264 | B2 | 10/2017 | Thorne et al. |
| 9,801,513 | B2 | 10/2017 | Conrad et al. |
| 9,820,621 | B2 | 11/2017 | Conrad et al. |
| 9,883,781 | B2 | 2/2018 | Thorne et al. |
| 10,076,183 | B2 | 9/2018 | Conrad et al. |
| 10,159,393 | B2 | 12/2018 | Conrad |
| 10,214,349 | B2 | 2/2019 | Conrad |
| 10,251,519 | B2 | 4/2019 | Conrad |
| 10,357,136 | B2 | 7/2019 | Conrad |
| 10,537,216 | B2 | 1/2020 | Conrad |
| 10,537,219 | B2 | 1/2020 | Conrad et al. |
| 10,575,693 | B2 | 3/2020 | Conrad |
| 10,791,896 | B2 | 10/2020 | Conrad |
| 10,888,205 | B2 | 1/2021 | Conrad et al. |
| 10,959,588 | B2 | 3/2021 | Conrad et al. |
| 11,198,085 | B2 | 12/2021 | Conrad et al. |
| 11,478,116 | B2 | 10/2022 | Conrad |
| 11,534,041 | B2 | 12/2022 | Conrad |
| 11,534,043 | B2 | 12/2022 | Conrad |
| 11,571,097 | B2 | 2/2023 | Conrad |
| 11,793,374 | B2 | 10/2023 | Conrad |
| 11,857,142 | B2 | 1/2024 | Conrad |
| 2001/0027587 | A1 | 10/2001 | Conrad et al. |
| 2002/0162188 | A1 | 11/2002 | Harmen |
| 2002/0194700 | A1 | 12/2002 | Shaver et al. |
| 2003/0201754 | A1 | 10/2003 | Conrad |
| 2004/0112022 | A1 | 6/2004 | Vuijk |
| 2004/0134026 | A1 | 7/2004 | Brinkhoff et al. |
| 2004/0216266 | A1 | 11/2004 | Conrad |
| 2005/0115409 | A1 | 6/2005 | Conrad |
| 2005/0273971 | A1 | 12/2005 | Cho et al. |
| 2006/0137304 | A1 | 6/2006 | Jeong et al. |
| 2006/0156509 | A1 | 7/2006 | Luebbering et al. |
| 2006/0196004 | A1 | 9/2006 | Conrad |
| 2006/0288520 | A1 | 12/2006 | Oh |
| 2007/0033765 | A1 | 2/2007 | Walker et al. |
| 2007/0113373 | A1 | 5/2007 | Hato et al. |
| 2007/0271724 | A1 | 11/2007 | Hakan et al. |
| 2008/0172992 | A1 | 7/2008 | Conrad |
| 2008/0178416 | A1 | 7/2008 | Conrad |
| 2008/0178418 | A1 | 7/2008 | Conrad |
| 2008/0178420 | A1 | 7/2008 | Conrad |
| 2008/0179133 | A1 | 7/2008 | Conrad |
| 2008/0196366 | A1 | 8/2008 | Conrad |
| 2008/0216281 | A1 | 9/2008 | Conrad |
| 2008/0256744 | A1 | 10/2008 | Rowntreer et al. |
| 2008/0263813 | A1* | 10/2008 | Han ...................... A47L 9/1691 15/334 |
| 2009/0056060 | A1 | 3/2009 | Han et al. |
| 2009/0300873 | A1 | 12/2009 | Grey |
| 2010/0175217 | A1 | 7/2010 | Conrad |
| 2010/0229322 | A1 | 9/2010 | Conrad |
| 2010/0229323 | A1 | 9/2010 | Conrad |
| 2010/0229324 | A1 | 9/2010 | Conrad |
| 2010/0229325 | A1 | 9/2010 | Conrad |
| 2010/0229326 | A1 | 9/2010 | Conrad |
| 2010/0229334 | A1 | 9/2010 | Conrad |
| 2010/0229335 | A1 | 9/2010 | Conrad |
| 2010/0229337 | A1 | 9/2010 | Conrad |
| 2010/0236014 | A1 | 9/2010 | Fester et al. |
| 2010/0251507 | A1 | 10/2010 | Conrad |
| 2011/0219567 | A1 | 9/2011 | Conrad |
| 2011/0219570 | A1 | 9/2011 | Conrad |
| 2011/0219575 | A1 | 9/2011 | Conrad |
| 2011/0219579 | A1 | 9/2011 | Conrad |
| 2011/0289719 | A1 | 12/2011 | Han et al. |
| 2011/0296648 | A1 | 12/2011 | Kah, Jr. |
| 2012/0216361 | A1 | 8/2012 | Millington et al. |
| 2012/0304417 | A1 | 12/2012 | Riley |
| 2013/0091660 | A1 | 4/2013 | Smith |
| 2013/0091661 | A1 | 4/2013 | Smith |
| 2013/0091812 | A1 | 4/2013 | Smith |
| 2013/0091813 | A1 | 4/2013 | Smith |
| 2013/0291333 | A1 | 11/2013 | Grey |
| 2014/0013537 | A1 | 1/2014 | Kasper |
| 2014/0165313 | A1 | 6/2014 | Hicke |
| 2014/0237753 | A1 | 8/2014 | Conrad |
| 2014/0237757 | A1 | 8/2014 | Conrad |
| 2014/0237768 | A1 | 8/2014 | Conrad |
| 2014/0245564 | A1 | 9/2014 | Conrad |
| 2015/0135474 | A1 | 5/2015 | Gidwell |
| 2015/0230677 | A1 | 8/2015 | Andrikanish |
| 2016/0037987 | A1 | 2/2016 | Caro et al. |
| 2022/0151446 | A1 | 5/2022 | Conrad et al. |
| 2024/0138634 | A1 | 5/2024 | Conrad |

FOREIGN PATENT DOCUMENTS

| | | | |
|---|---|---|---|
| CA | 2192909 | A1 | 7/1997 |
| CA | 2275675 | A1 | 12/1999 |
| CA | 2276796 | A1 | 1/2000 |
| CA | 2288544 | A1 | 5/2000 |
| CA | 2258416 | A1 | 7/2000 |
| CA | 2258419 | A1 | 7/2000 |
| CA | 2258421 | A1 | 7/2000 |
| CA | 2258422 | A1 | 7/2000 |
| CA | 2258423 | A1 | 7/2000 |
| CA | 2258426 | A1 | 7/2000 |
| CA | 2330801 | A1 | 7/2001 |
| CA | 2374961 | A1 | 11/2001 |
| CA | 2338193 | A1 | 7/2002 |
| CA | 2339514 | A1 | 9/2002 |
| CA | 2342673 | A1 | 9/2002 |
| CA | 2342993 | A1 | 9/2002 |
| CA | 2391177 | A1 | 12/2002 |
| CA | 2391180 | A1 | 12/2002 |
| CA | 2603508 | A1 | 10/2006 |
| CA | 2706562 | A1 | 5/2009 |
| CA | 2658014 | A1 | 9/2010 |
| CA | 2658022 | A1 | 9/2010 |
| CA | 2658160 | A1 | 9/2010 |
| CA | 2658366 | A1 | 9/2010 |
| CA | 2658397 | A1 | 9/2010 |
| CA | 2658497 | A1 | 9/2010 |
| CA | 2658643 | A1 | 9/2010 |
| CA | 2658644 | A1 | 9/2010 |
| CA | 2806339 | A1 | 2/2012 |
| CA | 2821234 | A1 | 6/2012 |
| CN | 101061932 | A | 10/2007 |
| CN | 101288572 | A | 10/2008 |
| CN | 102188208 | A | 9/2011 |
| CN | 202739907 | U | 2/2013 |
| CN | 103040412 | A | 4/2013 |
| CN | 103040413 | A | 4/2013 |
| CN | 204363891 | U | 6/2015 |
| CN | 105816104 | A | 8/2016 |
| CN | 205671986 | U | 11/2016 |
| DE | 69110424 | T2 | 7/1995 |
| DE | 69309275 | T3 | 4/1997 |
| DE | 69907201 | T2 | 5/2003 |
| DE | 10110581 | C2 | 11/2003 |
| DE | 60105004 | T2 | 9/2004 |
| DE | 60201666 | T2 | 11/2004 |
| DE | 10360002 | A1 | 12/2004 |
| DE | 60211663 | T2 | 6/2006 |
| DE | 102004028678 | B4 | 9/2007 |
| DE | 102007011457 | A1 | 10/2007 |
| DE | 102004055192 | B4 | 11/2007 |
| DE | 102004028677 | B4 | 1/2008 |
| DE | 102005008278 | B4 | 3/2008 |
| DE | 112006003479 | T5 | 12/2008 |
| DE | 112007001314 | T5 | 4/2009 |
| DE | 602006000726 | T2 | 4/2009 |
| DE | 112010001135 | T5 | 8/2012 |
| DE | 112011104642 | T5 | 10/2013 |
| DE | 112012000251 | T5 | 10/2013 |
| GB | 2440111 | A | 1/2008 |
| GB | 2465781 | B | 10/2012 |
| JP | 2002085297 | A | 3/2002 |

(56) References Cited

FOREIGN PATENT DOCUMENTS

| | | | |
|---|---|---|---|
| JP | 2005040246 | A | 2/2005 |
| JP | 2006102034 | A | 4/2006 |
| JP | 2008206613 | A | 9/2008 |
| JP | 2009261501 | A | 11/2009 |
| JP | 2013086228 | A | 5/2013 |
| KR | 1020050091829 | A | 9/2005 |
| KR | 1020050091830 | A | 9/2005 |
| KR | 1020050091833 | A | 9/2005 |
| KR | 1020050091834 | A | 9/2005 |
| KR | 1020050091835 | A | 9/2005 |
| KR | 1020050091836 | A | 9/2005 |
| KR | 1020050091837 | A | 9/2005 |
| KR | 1020050091838 | A | 9/2005 |
| KR | 1020050103343 | A | 10/2005 |
| KR | 1020050108623 | A | 11/2005 |
| KR | 1020060008365 | A | 1/2006 |
| KR | 1020060081229 | A | 7/2006 |
| KR | 1020060112420 | A | 11/2006 |
| KR | 1020060125952 | A | 12/2006 |
| KR | 1020060125954 | A | 12/2006 |
| KR | 100717441 | B1 | 5/2007 |
| KR | 1020100084127 | A | 7/2010 |
| WO | 0010718 | A1 | 3/2000 |
| WO | 2006076363 | A2 | 7/2006 |
| WO | 2008070973 | A1 | 6/2008 |
| WO | 2008135708 | A1 | 11/2008 |
| WO | 2010147247 | A1 | 12/2010 |
| WO | 2015129387 | A1 | 9/2015 |
| WO | 2017046557 | A1 | 3/2017 |
| WO | 2017046559 | A1 | 3/2017 |
| WO | 2017046560 | A1 | 3/2017 |

OTHER PUBLICATIONS

English machine translation of DE102004055192B4, published on Nov. 15, 2007.
English machine translation of DE102004028678B4, published on Sep. 6, 2007.
English machine translation of DE102004028677B4, published on Jan. 10, 2008.
English machine translation of CN205671986U, published on Nov. 9, 2016.
English machine translation of CN202739907U, published on Feb. 20, 2013.
English machine translation of CN105816104A, published on Aug. 3, 2016.
English machine translation of CN103040413A, published on Apr. 17, 2013.
English machine translation of CN103040412A, published on Apr. 17, 2013.
English machine translation of CN102188208A , published on Sep. 21, 2011.
English machine translation of CN101288572A, published on Oct. 22, 2008.
English machine translation of CN101061932A, published on Oct. 31, 2007.
English machine translation of DE10110581C2, published on Nov. 13, 2003.
U.S. Appl. No. 09/343,479, filed Jun. 30, 1999.
English machine translation of KR1020100084127A, published on Jul. 23, 2010.
English machine translation of KR1020060125954A, published on Dec. 7, 2006.
English machine translation of KR1020060125952A, published on Dec. 7, 2006.
English machine translation of KR1020060112420A, published on Nov. 1, 2006.
English machine translation of KR1020060081229A, published on Jul. 12, 2006.
English machine translation of KR1020060008365A, published on Jan. 26, 2006.
English machine translation of KR1020050108623A, published on Nov. 17, 2005.
English machine translation of KR1020050103343A, published on Oct. 31, 2005.
English machine translation of KR1020050091838A, published on Sep. 15, 2005.
English machine translation of KR1020050091837A, published on Sep. 15, 2005.
English machine translation of KR1020050091836A, published on Sep. 15, 2005.
English machine translation of KR1020050091835A, published on Sep. 15, 2005.
English machine translation of KR1020050091833A, published on Sep. 15, 2005.
English machine translation of KR1020050091830A, published on Sep. 15, 2005.
English machine translation of KR1020050091829A, published on Sep. 15, 2005.
English machine translation of DE60200600072T2, published on Apr. 16, 2009.
English machine translation of DE112012000251T5, published on Oct. 17, 2013.
English machine translation of DE112011104642T5 , published on Oct. 2, 2013.
English machine translation of DE112010001135T5, published on Aug. 2, 2012.
English machine translation of DE112007001314T5, published on Apr. 23, 2009.
English machine translation of DE112006003479T5, published on Dec. 18, 2012.
English machine translation of DE102007011457A1, published on Oct. 25, 2007.
English machine translation of JP2013086228A , published on May 13, 2013.
English machine translation of JP2009261501A, published on Nov. 12, 2012.
English machine translation of JP2008206613A, published on Sep. 11, 2008.
English machine translation of JP2006102034A, published on Apr. 20, 2006.
English machine translation of JP2005040246A, published on Feb. 17, 2005.
English machine translation of JP2002085297A , published on Mar. 26, 2002.
English machine translation of KR100717441B1, published on May 4, 2007.
English machine translation of DE69907201T2, published on May 28, 2003.
English machine translation of DE69309275T3, published on Apr. 30, 1997.
English machine translation of DE69110424T2, published on Jul. 20, 1995.
English machine translation of DE60211663T2, published on Jun. 29, 2006.
English machine translation of DE60201666T2, published on Nov. 25, 2004.
English machine translation of DE60105004T2, published on Sep. 23, 2004.
English machine translation of DE10360002A1, published on Dec. 16, 2004.
English machine translation of CN204363891U, published on Jun. 3, 2015.
International search report and written opinion, International application No. PCT/CA2015/051331, mailed on Mar. 3, 2016.

* cited by examiner

SURFACE CLEANING APPARATUS

CROSS-REFERENCE TO RELATED APPLICATIONS

This application is a continuation of U.S. patent application Ser. No. 17/237,692, filed on Apr. 22, 2021, currently allowed, which is a continuation of U.S. patent application Ser. No. 16/011,146, filed on Jun. 18, 2018, which issued as U.S. Pat. No. 11,013,383 on May 25, 2021, which is a continuation of U.S. patent application Ser. No. 14/829,331, filed on Aug. 18, 2015, which issued as U.S. Pat. No. 10,022,027 on Jul. 17, 2018, which itself is a continuation-in-part of co-pending U.S. patent application Ser. No. 14/573,549, filed on Dec. 17, 2014, which itself issued to U.S. Pat. No. 9,717,383 on Aug. 1, 2017, all above-named applications being incorporated herein by reference.

FIELD

The present subject matter of the teachings described herein relates generally to surface cleaning apparatus with an air treatment member, such as a cyclone bin assembly, removable from a floor engaging body.

BACKGROUND

Various types of surface cleaning apparatus are known. These include upright surface cleaning apparatus, canister surface cleaning apparatus, stick surface cleaning apparatus and central vacuum systems. Typically, a surface cleaning apparatus has a surface cleaning head with an inlet. For example, an upright surface cleaning apparatus typically comprises an upright section containing at least an air treatment member that is pivotally mounted to a surface cleaning head. A canister surface cleaning apparatus typically comprises a canister body containing at least an air treatment member and a suction motor that is connected to a surface cleaning head by a flexible hose and a handle. Such designs are advantageous as they permit some of the operating components, and optionally all of the operating components (i.e., the suction motor and the air treatment members) to be placed at a location other than the surface cleaning head. This enables the surface cleaning head to be lighter and smaller. Reducing the weight of the surface cleaning head may increase its maneuverability. Also, reducing the height of the surface cleaning head enables the surface cleaning head to clean under furniture having a lower ground clearance.

Another type of surface cleaning apparatus is the all in the head surface cleaning apparatus. An all in the head surface cleaning apparatus typically has the suction motor and the air treatment members (e.g., one or more cyclones) to be positioned in the surface cleaning head. However, for various reasons, the all in the head vacuum cleaner has not been widely accepted by consumers.

U.S. Pat. Nos. 5,699,586; 6,012,200; 6,442,792; 7,013,528; US 2004/0134026; US 2006/0156509; and, US 2009/0056060 disclose an all in the head vacuum cleaner wherein the surface cleaning head is wedge shaped (i.e., the height of the surface cleaning head increases from the front end to the rear end). Accordingly, the height at the rear end limits the extent to which the surface cleaning head may travel under furniture. If the height is too tall, then only the front portion of the surface cleaning head may be able to be placed under furniture, thereby limiting the ability of the surface cleaning apparatus to clean under furniture.

U.S. Pat. No. 5,909,755 discloses an all in the head vacuum cleaner. However, this design has limited filtration ability. As set out in the abstract, the design uses a suction motor to draw in air having entrained particulate matter through a filter to thereby treat the air. Accordingly, while the design is not wedge shaped, it relies upon a filter to treat the air.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with another aspect of this disclosure, an all in the head surface cleaning apparatus is provided which incorporates cyclonic air treatment in a compact format. The surface cleaning head may have a height which permits the entire surface cleaning head to extend under furniture. For example, the maximum height of the surface cleaning head may be less than 8 inches, less than 6 inches, less than 5 inches or less than 4.5 inches. At the same time, the surface cleaning head may employ cyclonic air treatment technology and achieve a degree of air treatment comparable to that of leading upright cyclonic vacuum cleaners. Further, the surface cleaning head may have a dirt storage capacity that enables the surface cleaning apparatus to be used to clean an entire residence without a dirt collection chamber having to be emptied. For example, the dirt collection chamber may have a dirt storage capacity of 20, 40, 60 or 80 $in^2$.

The all in the head surface cleaning apparatus may also have an above floor cleaning mode. Accordingly, the all in the head surface cleaning apparatus may be useable in the same modes as an upright vacuum cleaner and may replace an upright vacuum cleaner.

The all in the head surface cleaning apparatus may have a drive handle that comprises an above floor cleaning wand and a flexible hose. Therefore, the entire upper section may be the above floor cleaning conduit. Optionally, a suction motor and/or a filter may be provided on the drive handle.

In accordance with this aspect, there is provided a surface cleaning apparatus comprising:

(a) a surface cleaning head comprising:
   (i) a front end, a rear end, first and second laterally opposed sidewalls and a lower surface having a primary dirty air inlet;
   (ii) a brush drive member drivingly connected to a moveable brushing member; and,
   (iii) a cyclone comprising a cyclone chamber, the cyclone chamber having a longitudinal cyclone axis;
(b) a suction motor;
(c) a drive handle drivingly connected to the surface cleaning head; and,
(d) an above floor cleaning wand, a flexible hose and an auxiliary dirty air inlet, wherein the surface cleaning apparatus is useable in a floor cleaning mode in which the drive handle is drivingly connected to the surface cleaning head and air enters the surface cleaning apparatus via the primary dirty air inlet of the surface cleaning head and an above floor cleaning mode wherein the above floor cleaning wand is connected in air flow communication with the suction motor and air enters the surface cleaning apparatus via the auxiliary dirty air inlet.

In some embodiments, the above floor cleaning wand may have an upper end and a lower end and in the stored position, the lower end may be moveably mounted to the surface cleaning head whereby the drive handle is moveable between a storage position and an inclined floor cleaning position.

In some embodiments, the upper end of the drive handle may have a hand grip.

In some embodiments, the upper end of the drive handle may have the auxiliary dirty air inlet.

In some embodiments, the above floor cleaning wand may be slidably receivable in the flexible hose.

In some embodiments, the suction motor may be provided in the surface cleaning head.

In some embodiments, the brush drive member may comprise a brush motor. Alternately, an air turbine may be used.

In some embodiments, the suction motor may be located downstream of the cyclone and the apparatus further may comprise at least one valve operable to alternately connect the dirty air inlet of the surface cleaning head and the auxiliary dirty air inlet in air flow communication with the suction motor.

In some embodiments, the cyclone may have a first air inlet connectable in air flow communication with the dirty air inlet of the surface cleaning head and a second air inlet connectable in air flow communication with the auxiliary dirty air inlet.

In some embodiments, the suction motor may be located downstream of the cyclone and the apparatus may further comprise at least one valve operable to alternately connect the primary dirty air inlet and the auxiliary dirty air inlet in air flow communication with the cyclone.

In some embodiments, the at least one valve may comprise a drive handle valve provided on the drive handle and a surface cleaning head valve provided between the primary dirty air inlet and as cyclone inlet.

In some embodiments, the drive handle may be positioned proximate the auxiliary dirty air inlet.

In some embodiments, the cyclone may be positionable in a first position in which the cyclone is in flow communication with the dirty air inlet of the surface cleaning head and a second position in which the cyclone is in flow communication with the auxiliary dirty air inlet.

In some embodiments, the cyclone may be rotatable between the first and second positions.

In some embodiments, the cyclone bin assembly may be rotatable between the first and second positions.

In some embodiments, the cyclone bin assembly comprises a cyclone inlet manifold and the cyclone inlet manifold is rotatable between the first and second positions.

In some embodiments, the cyclone may be translatable between the first and second positions.

In some embodiments, the cyclone bin assembly may be translatable between the first and second positions.

In some embodiments, the cyclone bin assembly may further comprise a manifold having a first manifold inlet connectable in flow communication with the primary dirty air inlet and a second manifold inlet connectable in flow communication with the auxiliary dirt inlet.

In some embodiments, the apparatus may further comprise a single valve positioned in the manifold.

DRAWINGS

The drawings included herewith are for illustrating various examples of articles, methods, and apparatuses of the teaching of the present specification and are not intended to limit the scope of what is taught in any way.

Figure 46:
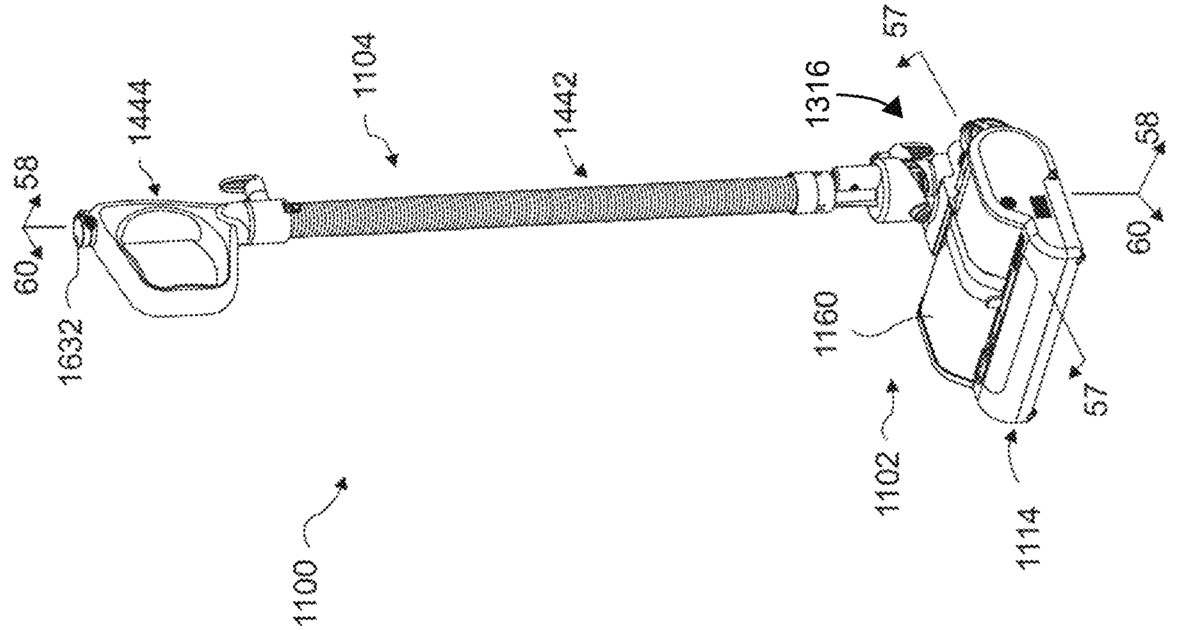
FIG. 46 is a front perspective view of another example of an all in the head type surface cleaning apparatus.
Figure 53:
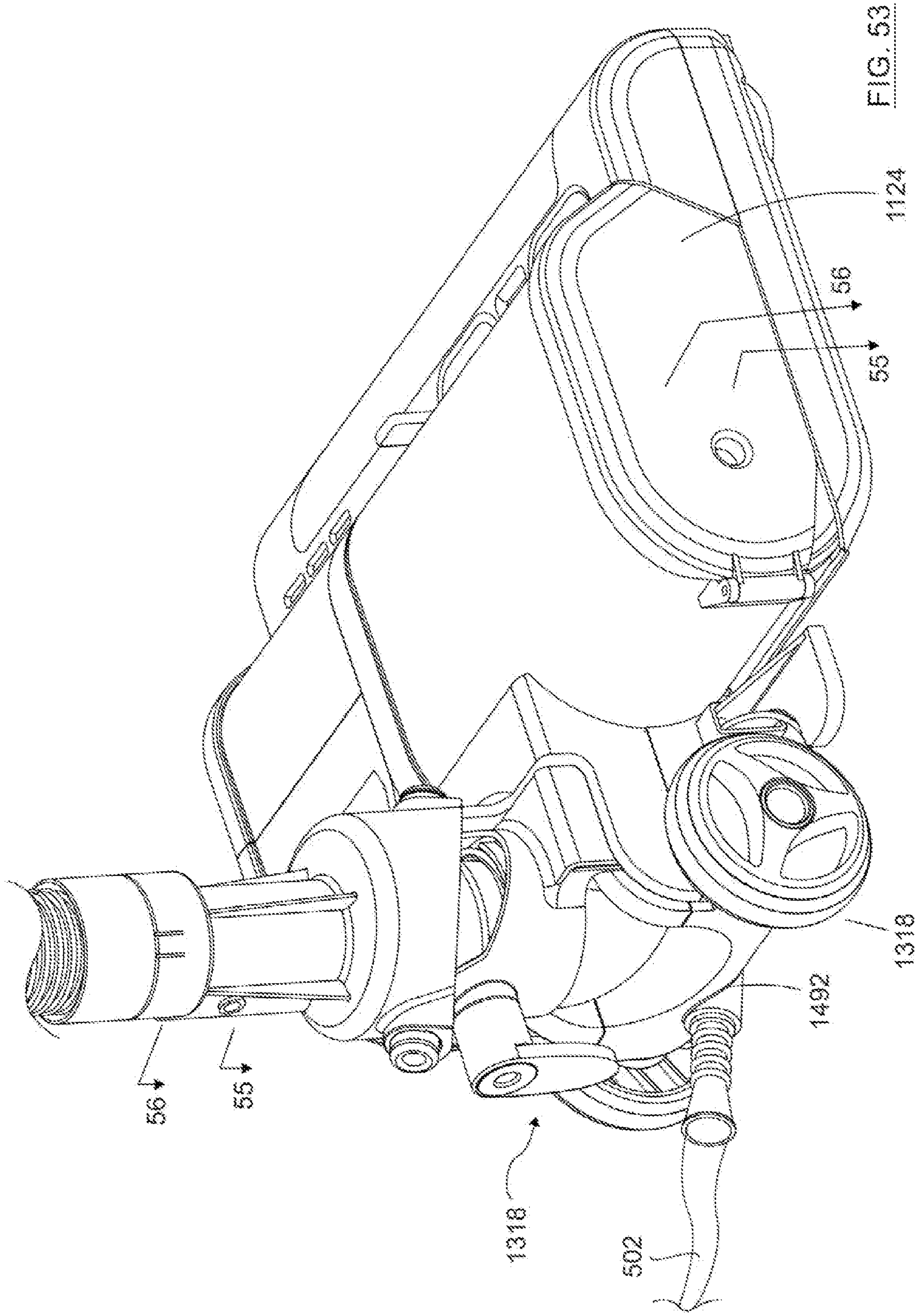
FIG. 53 is a side perspective view of the surface cleaning head of FIG. 46.
Figure 54A:
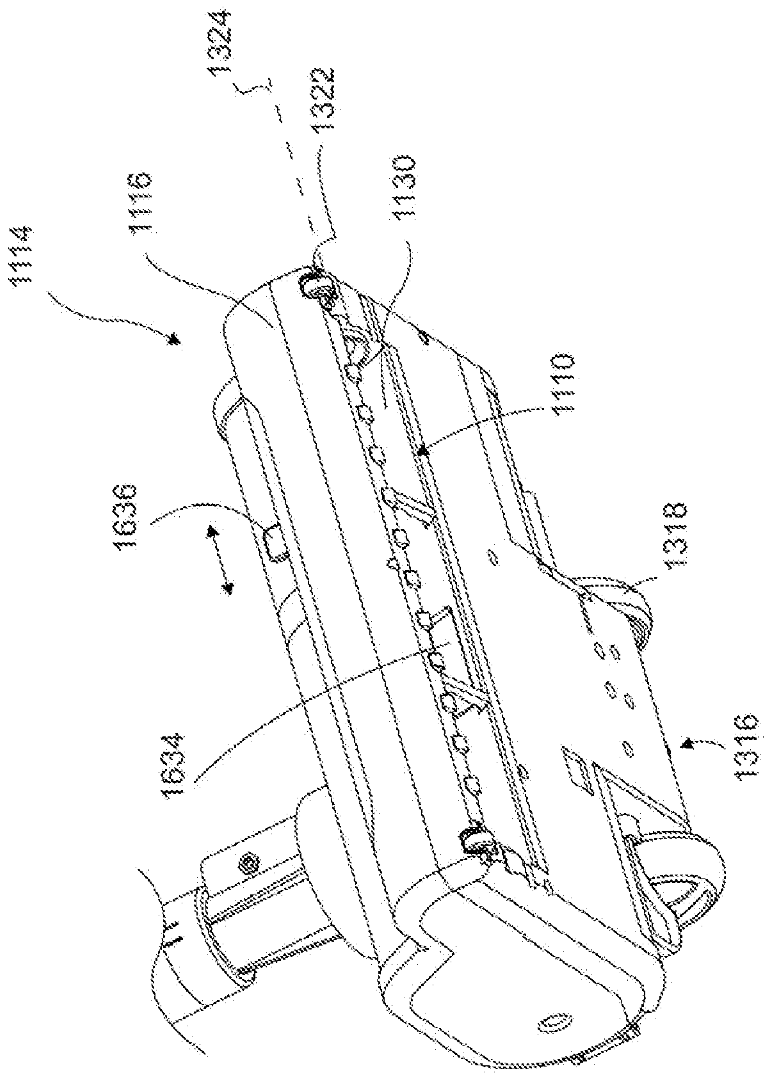
FIG. 54A is a bottom perspective view of the surface cleaning head of FIG. 46 with a blocker in a deployed position.
Figure 54B:
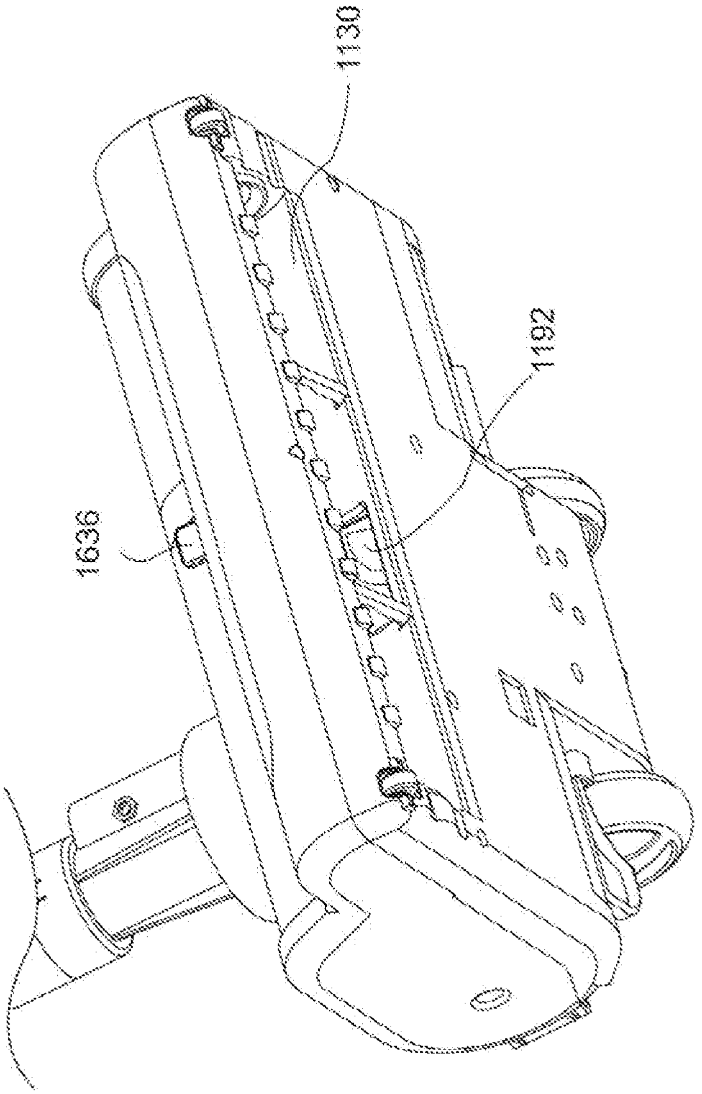
Figure 55:
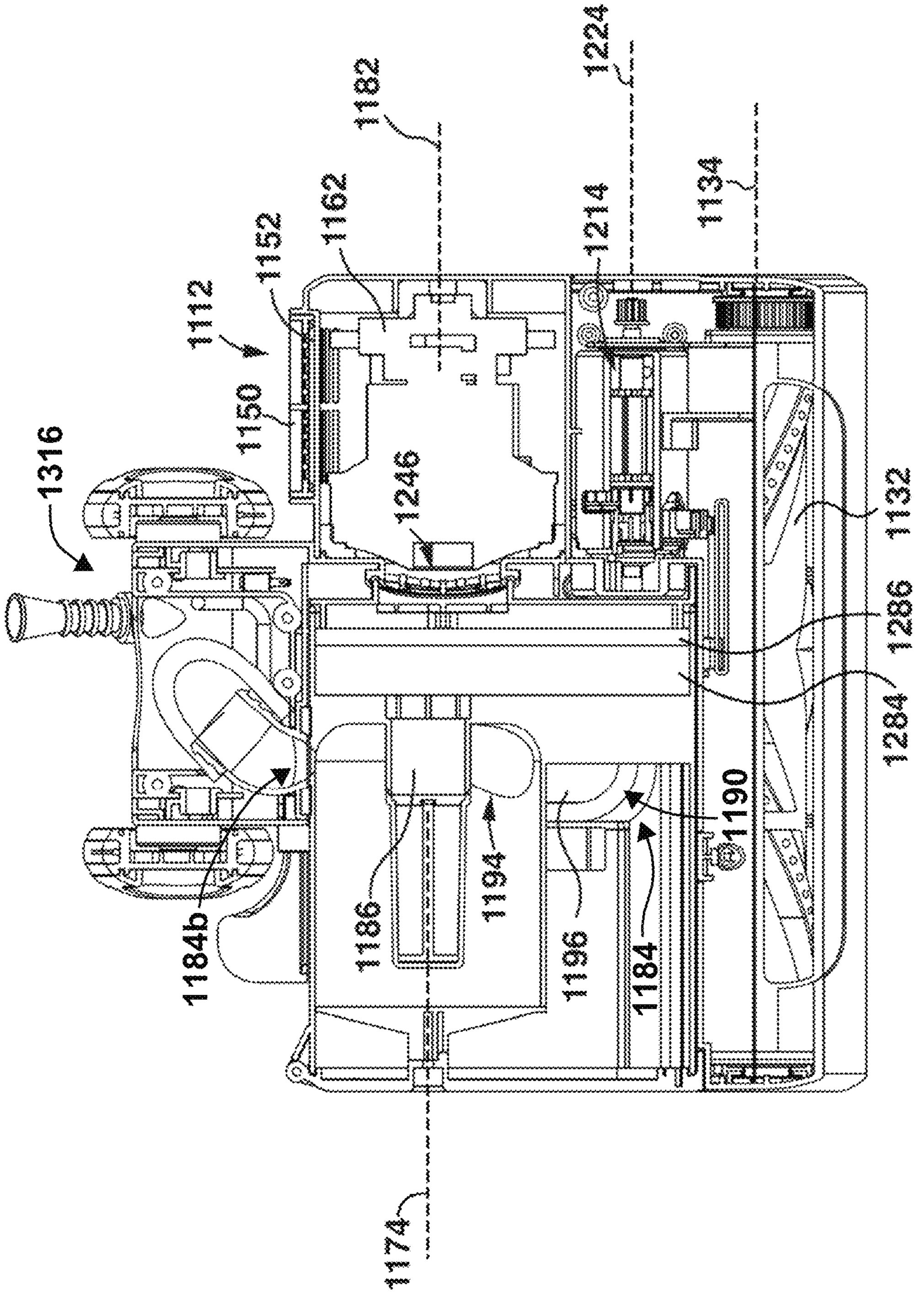
Figure 56:
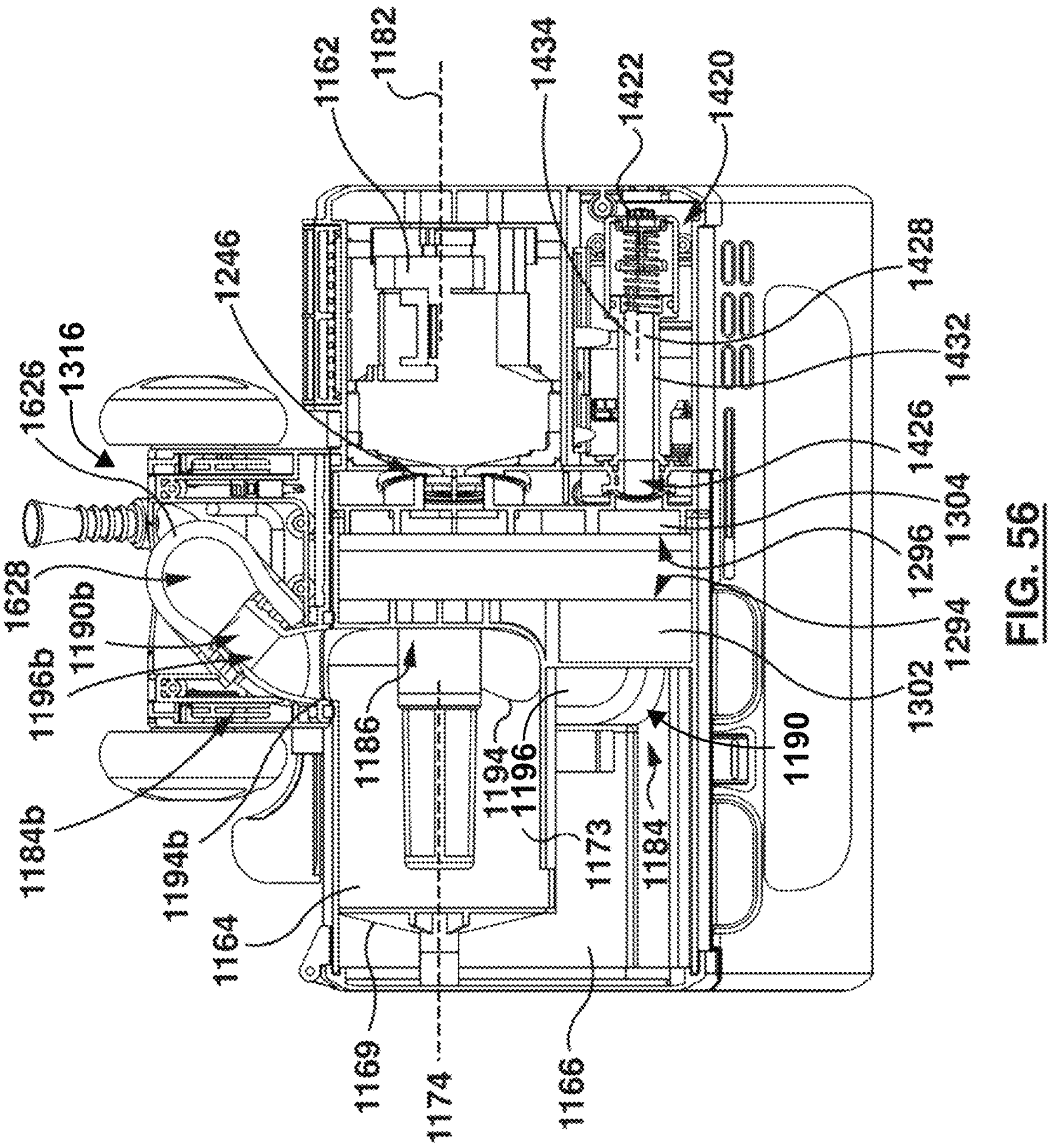
Figure 57:
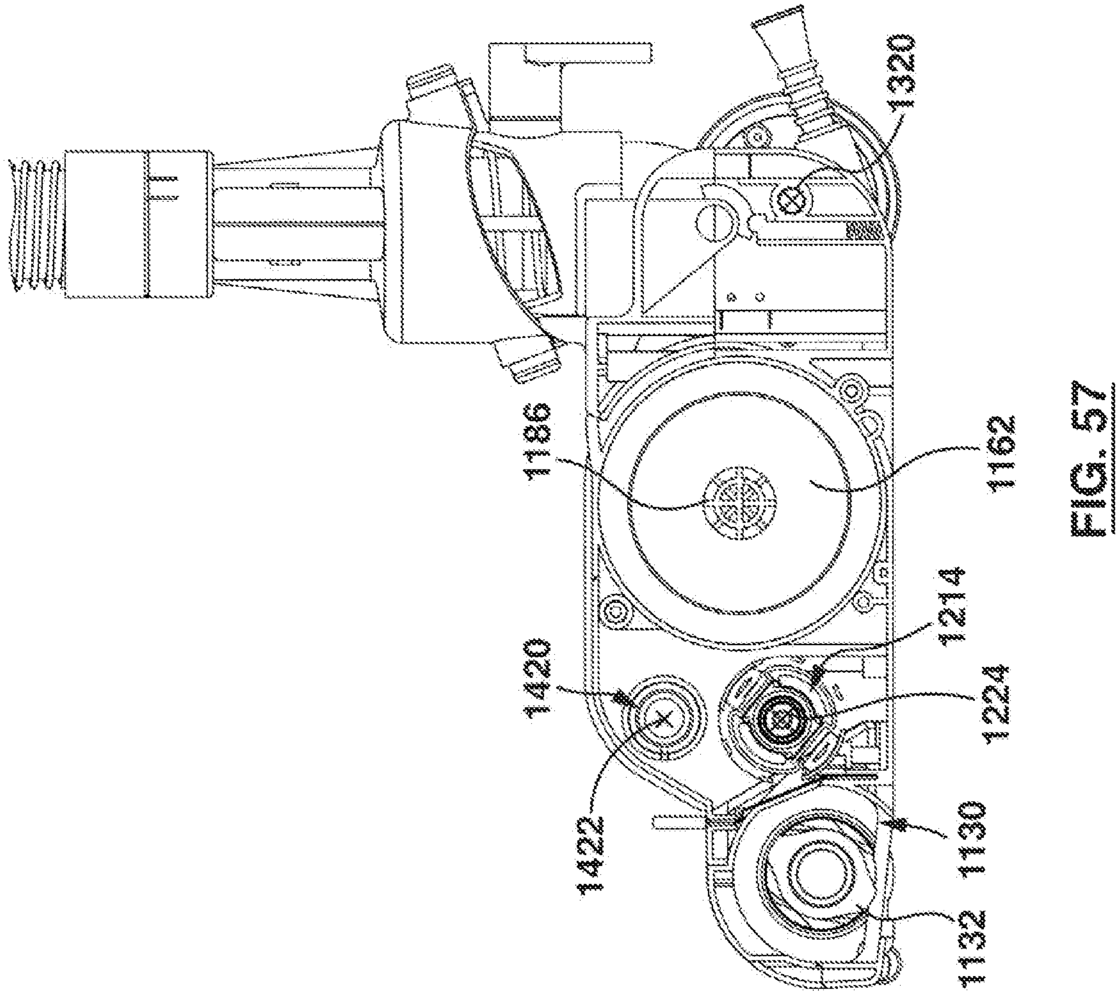
Figure 58:
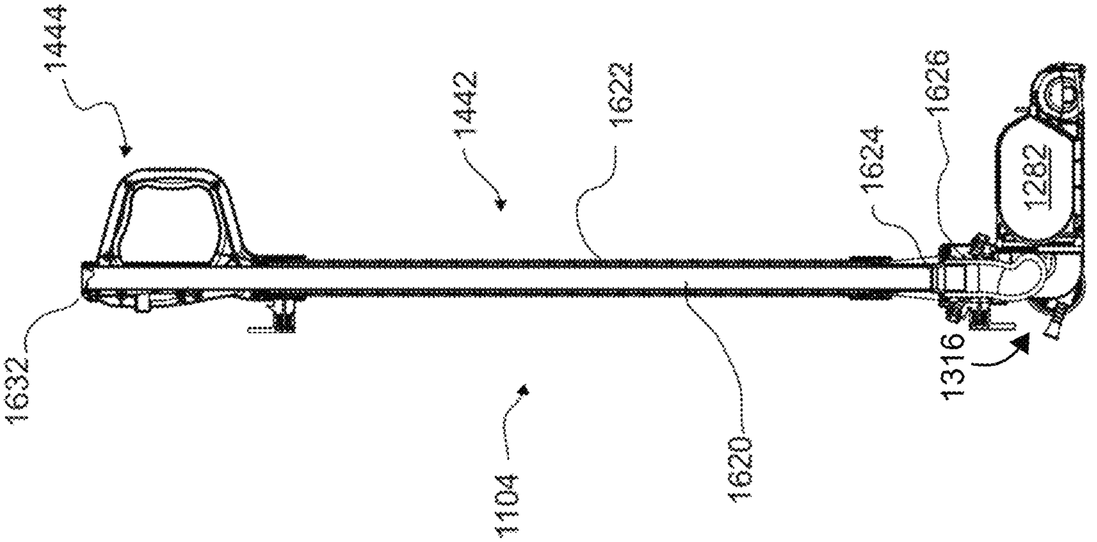
Figure 59:
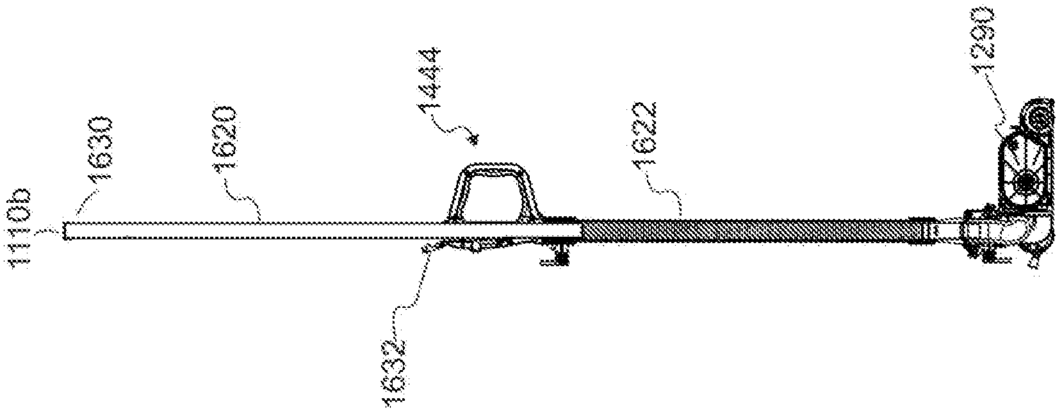
Figure 60:
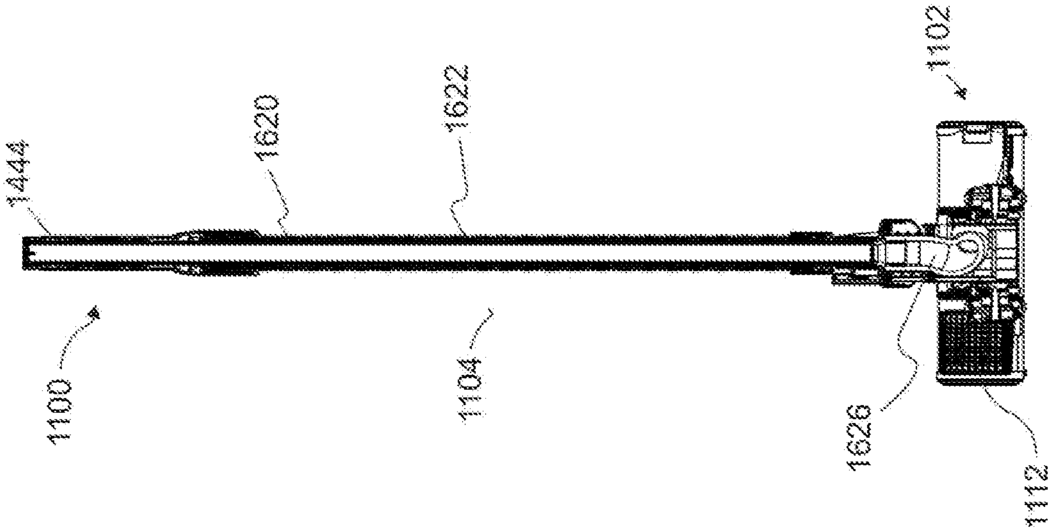
Figure 61:
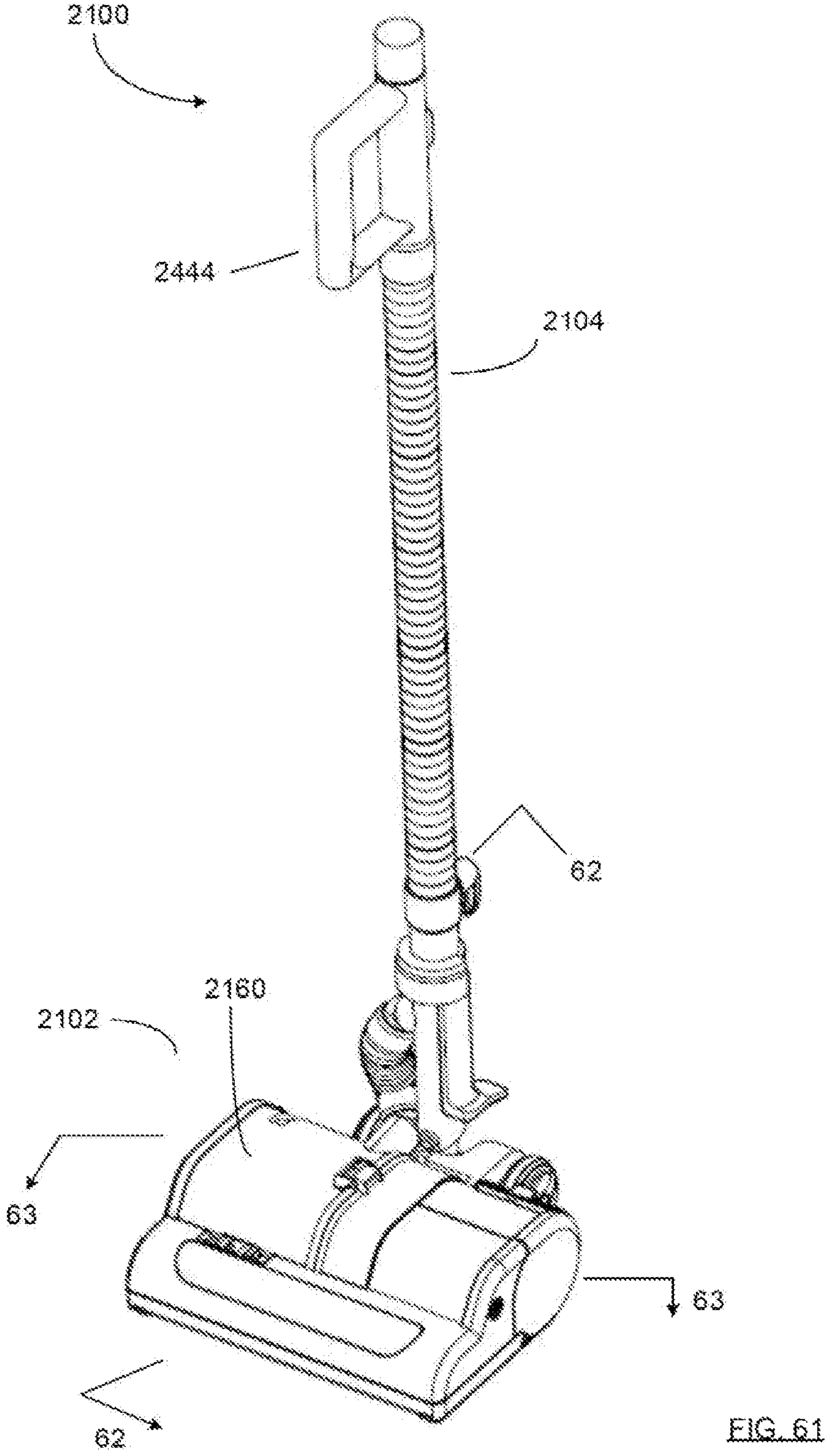
Figure 62:
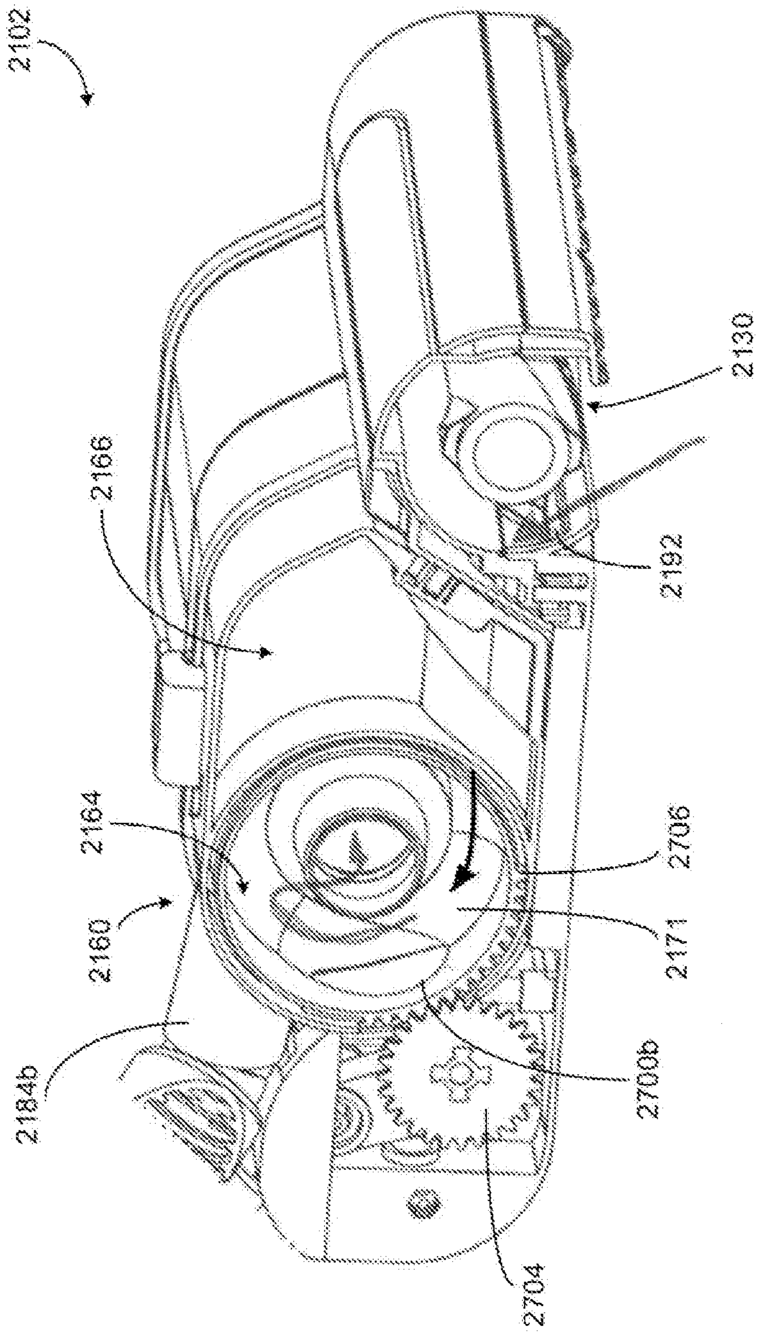
Figure 63:
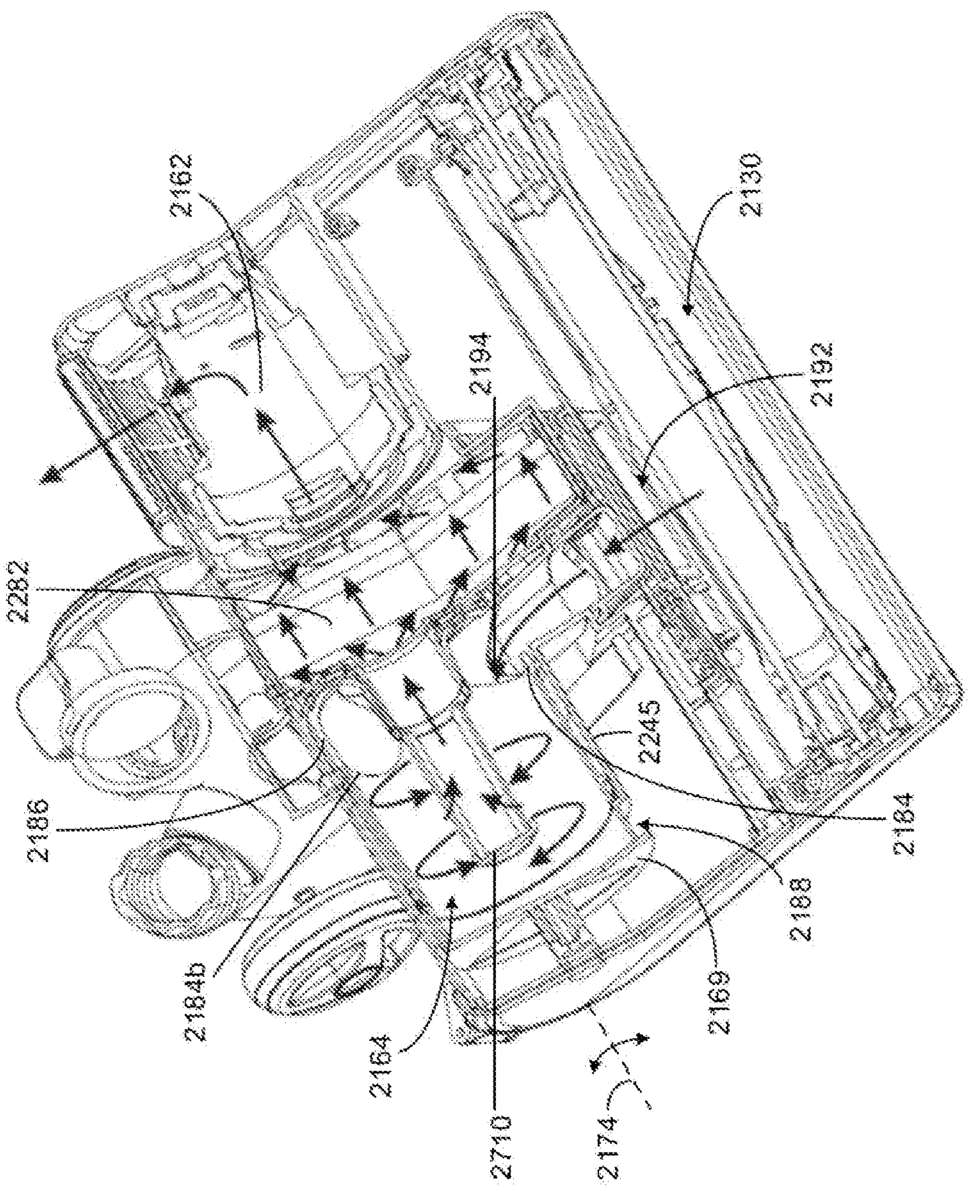
Figure 64:
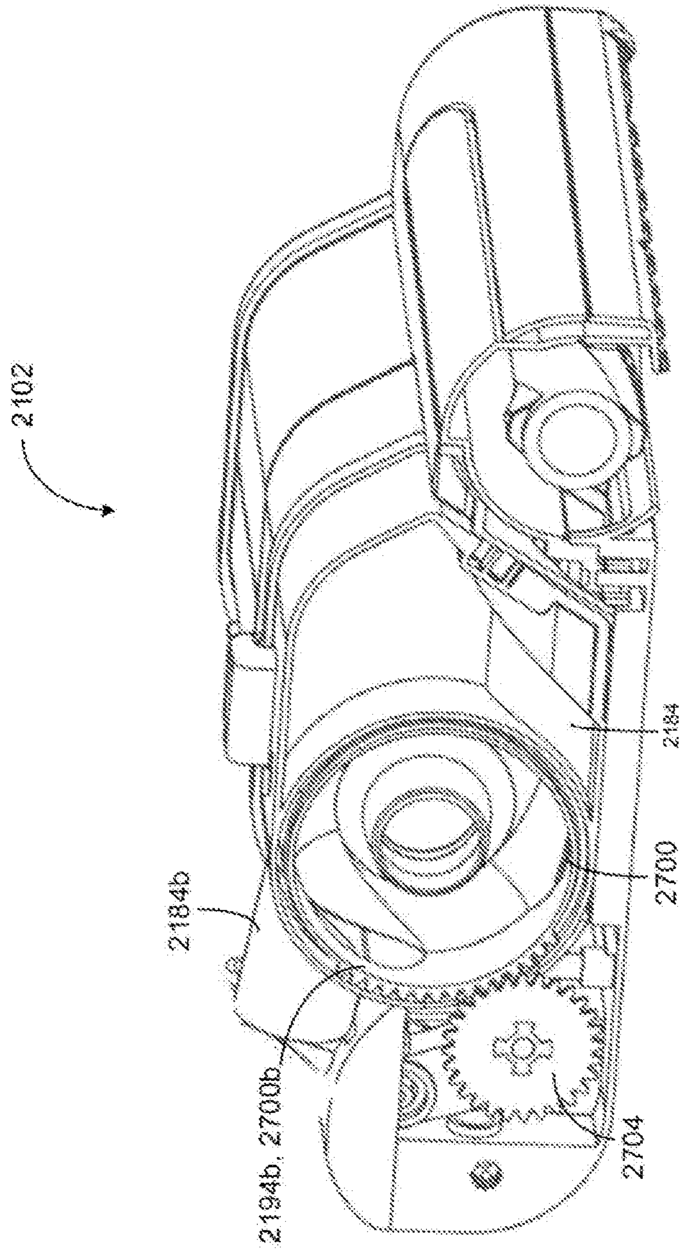
Figure 65:
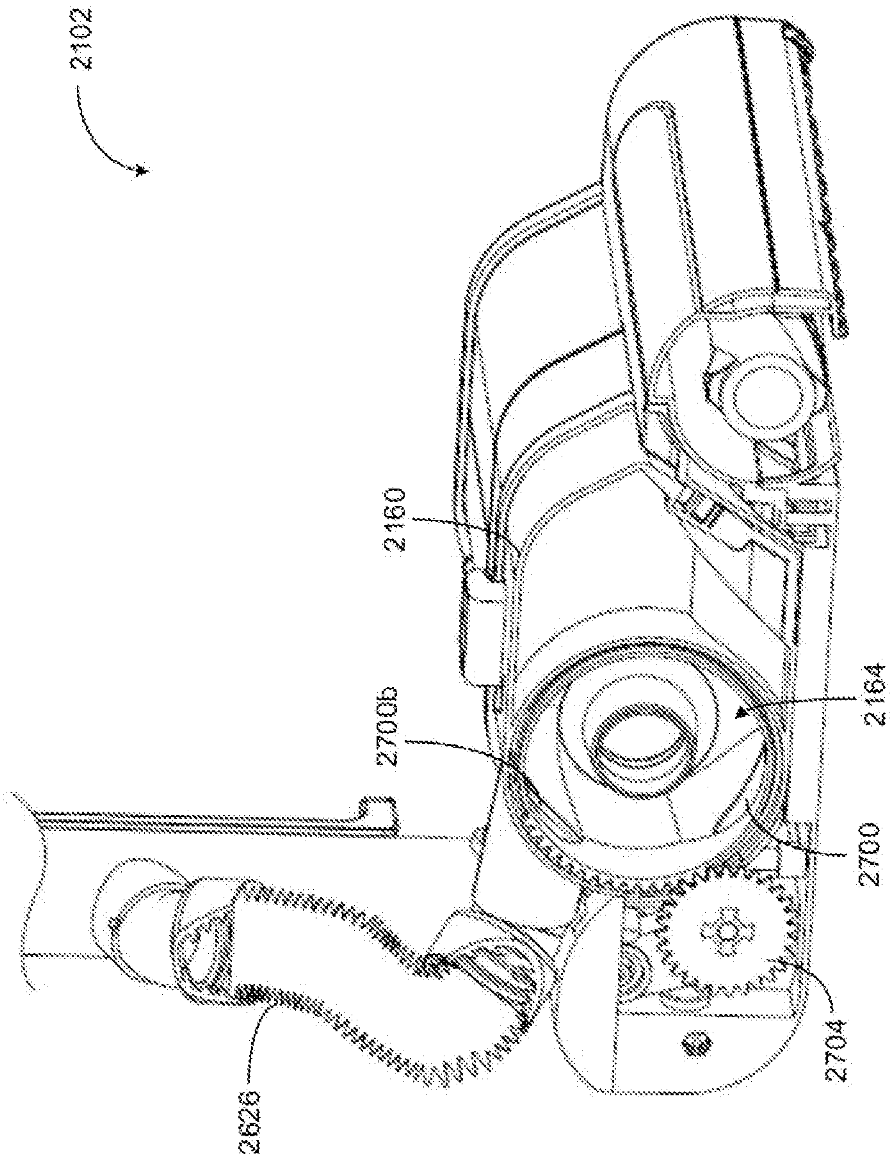
Figure 66:
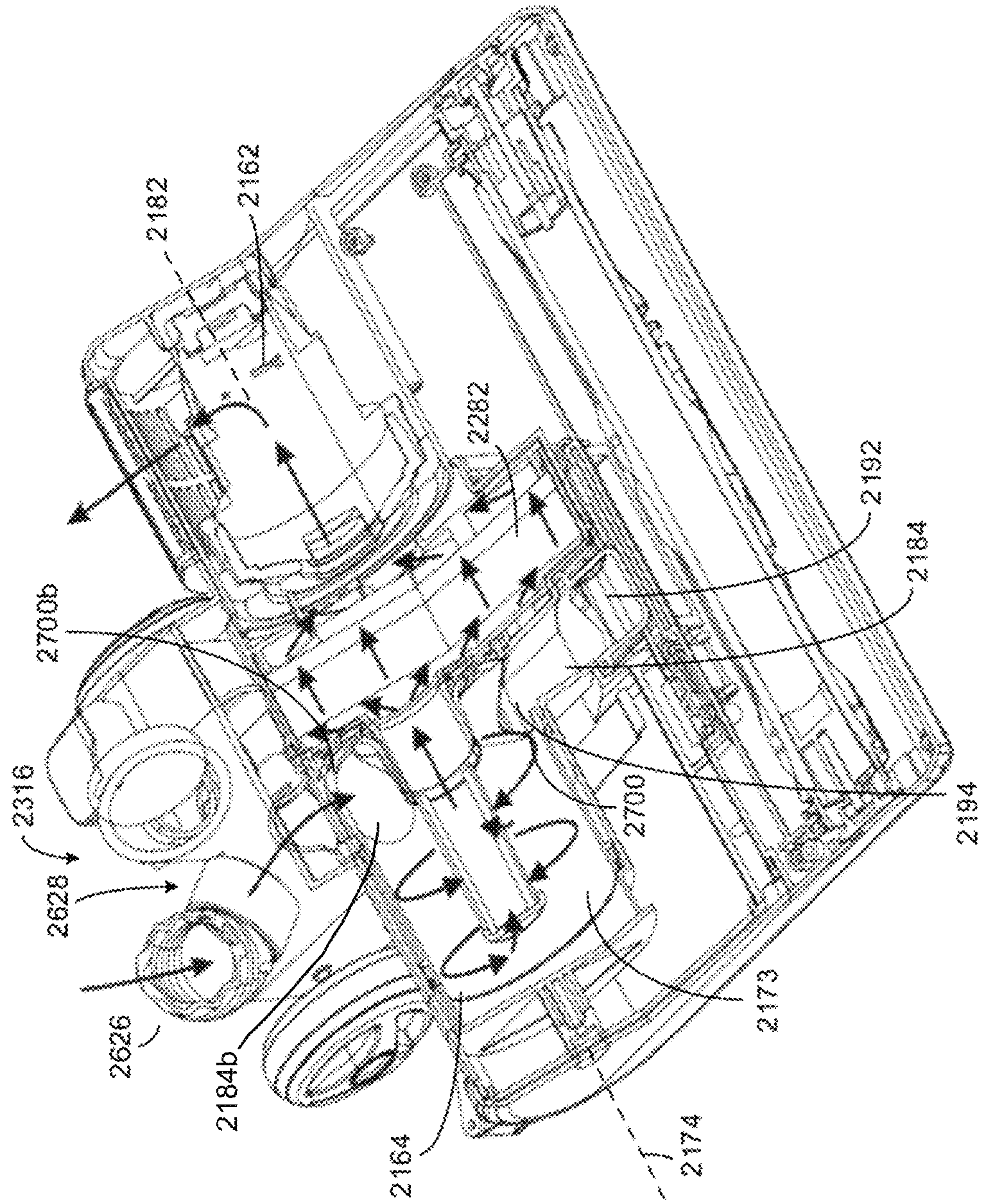
Figure 67:
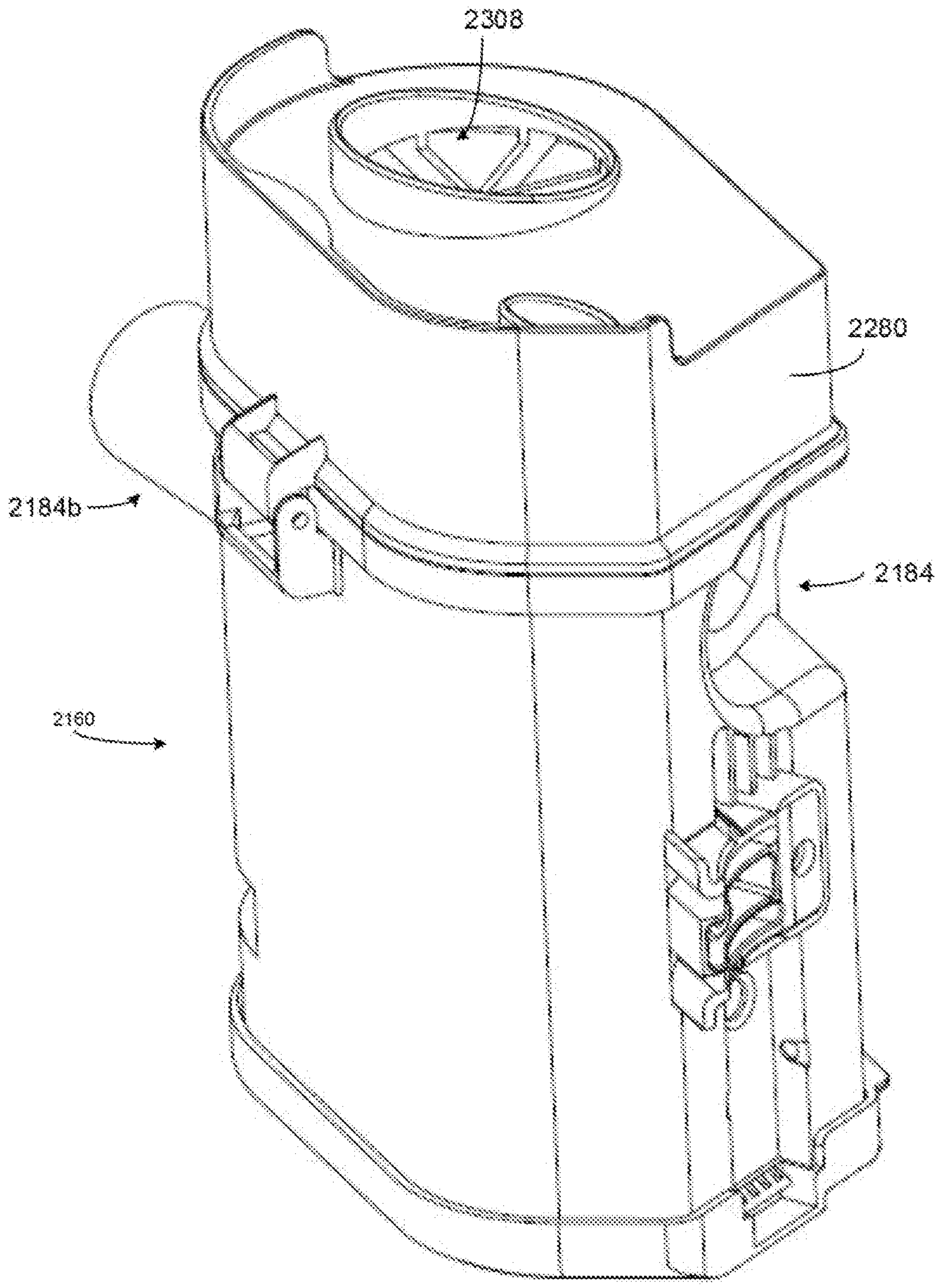
Figure 68:
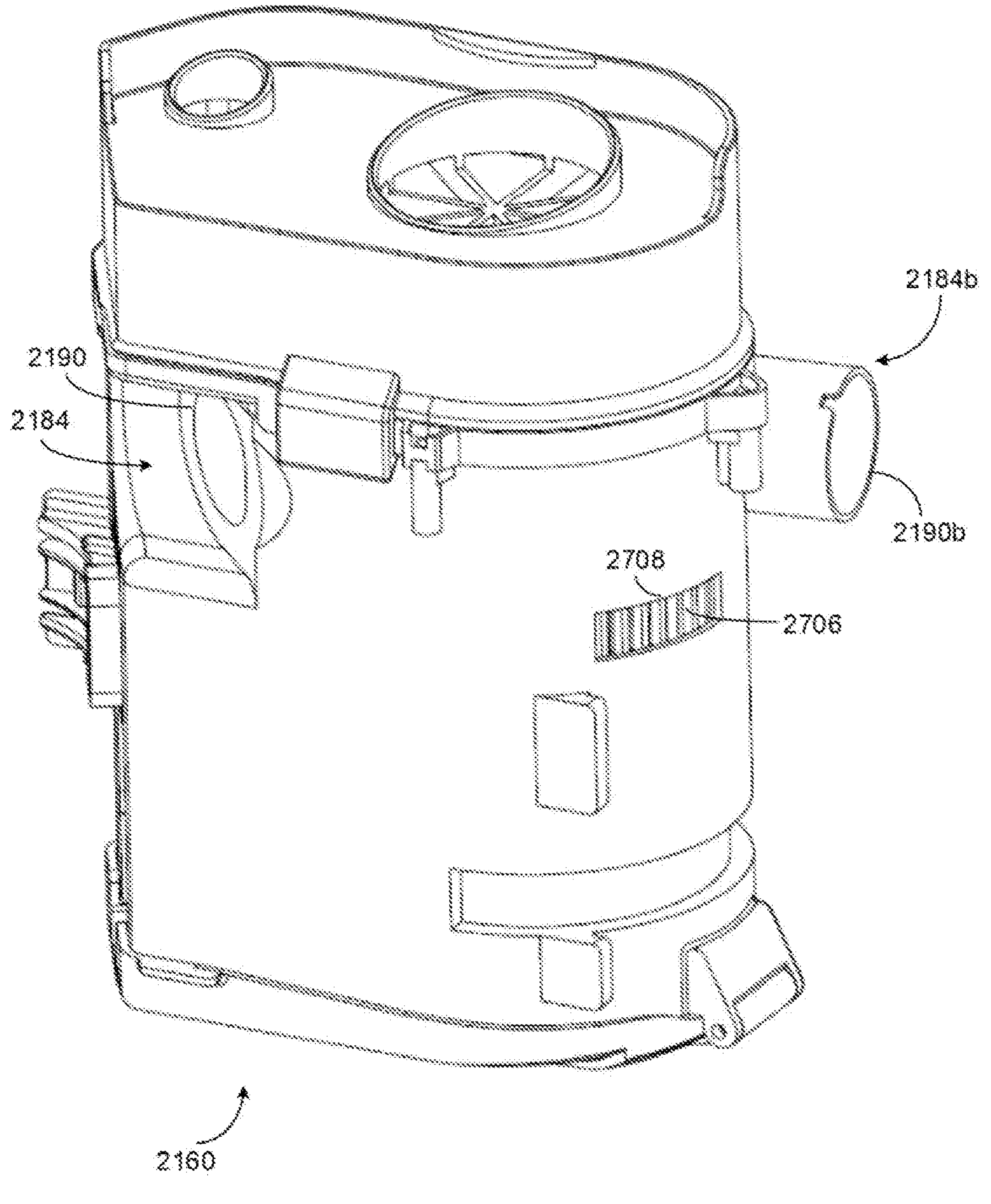
Figure 69:
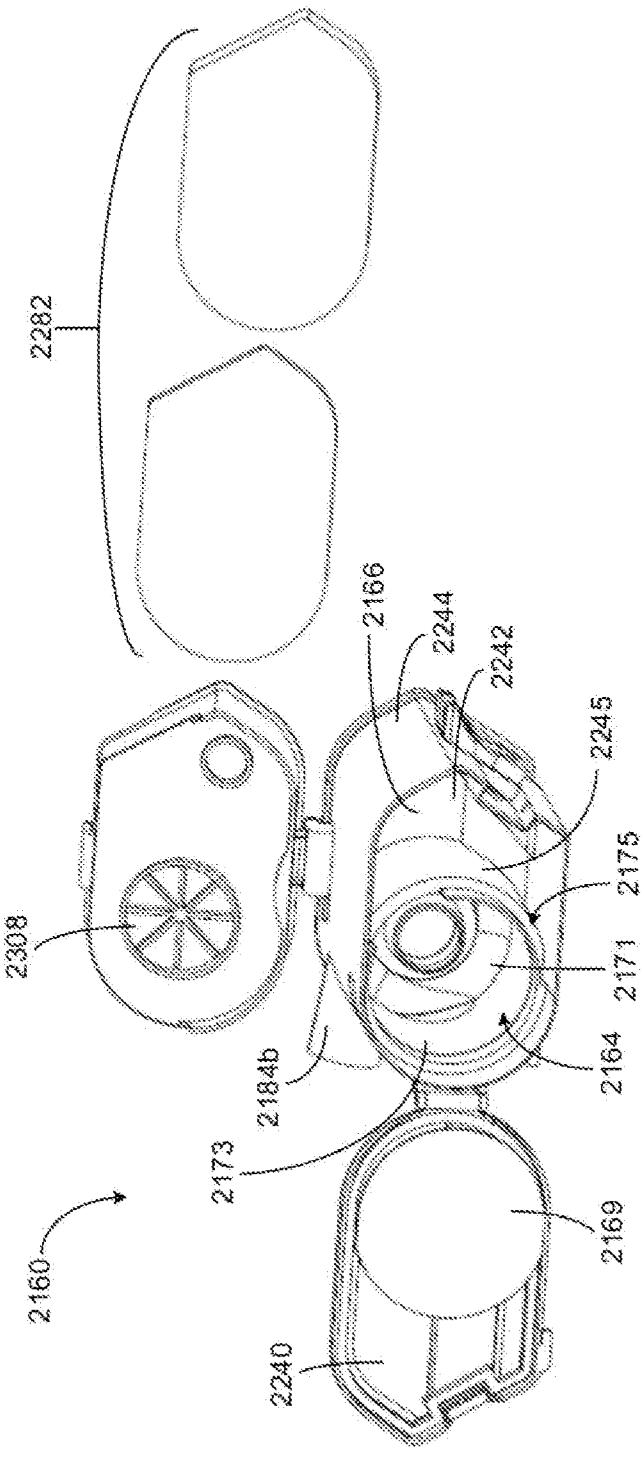
Figure 70:
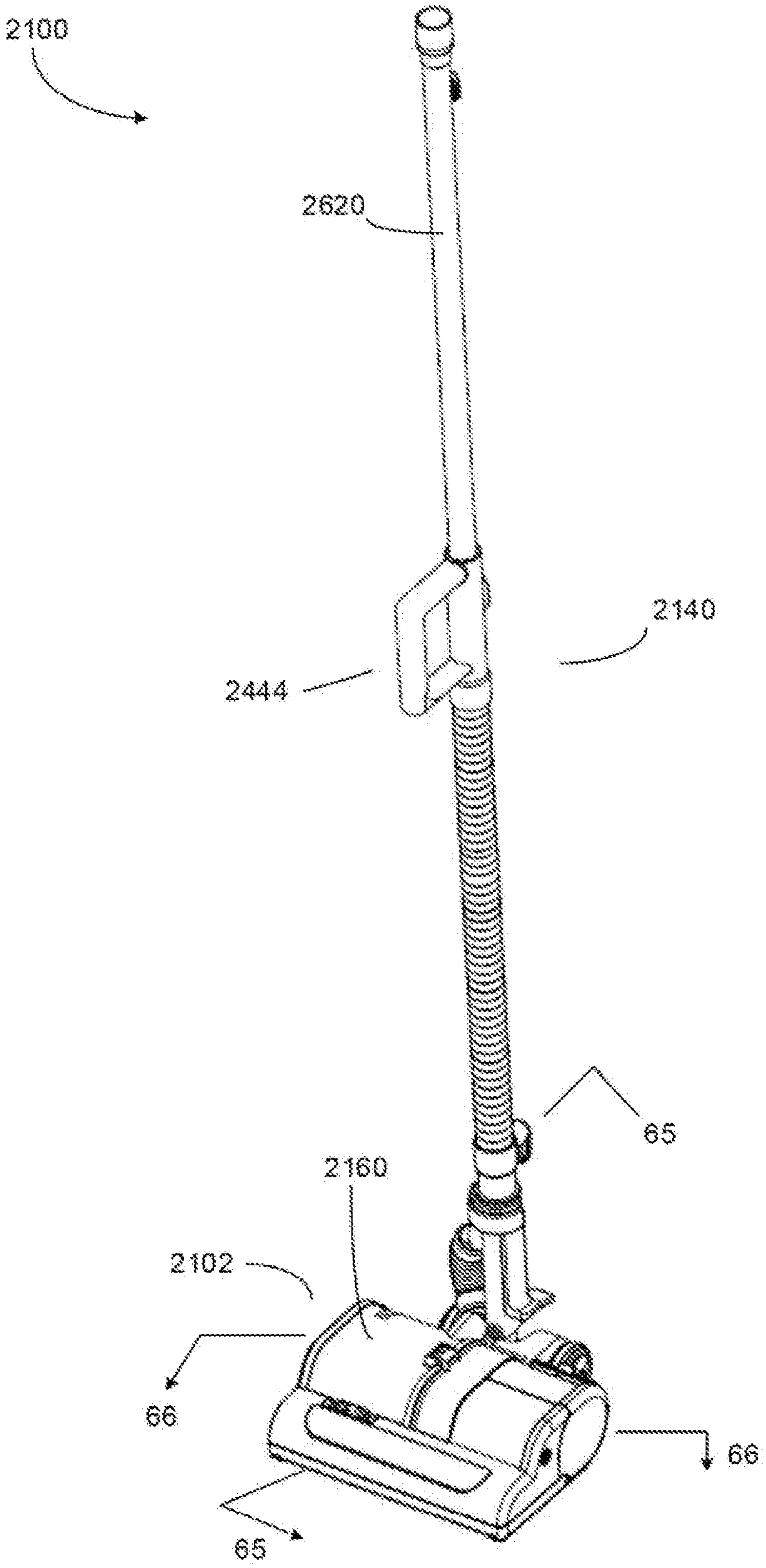
Figure 71B:
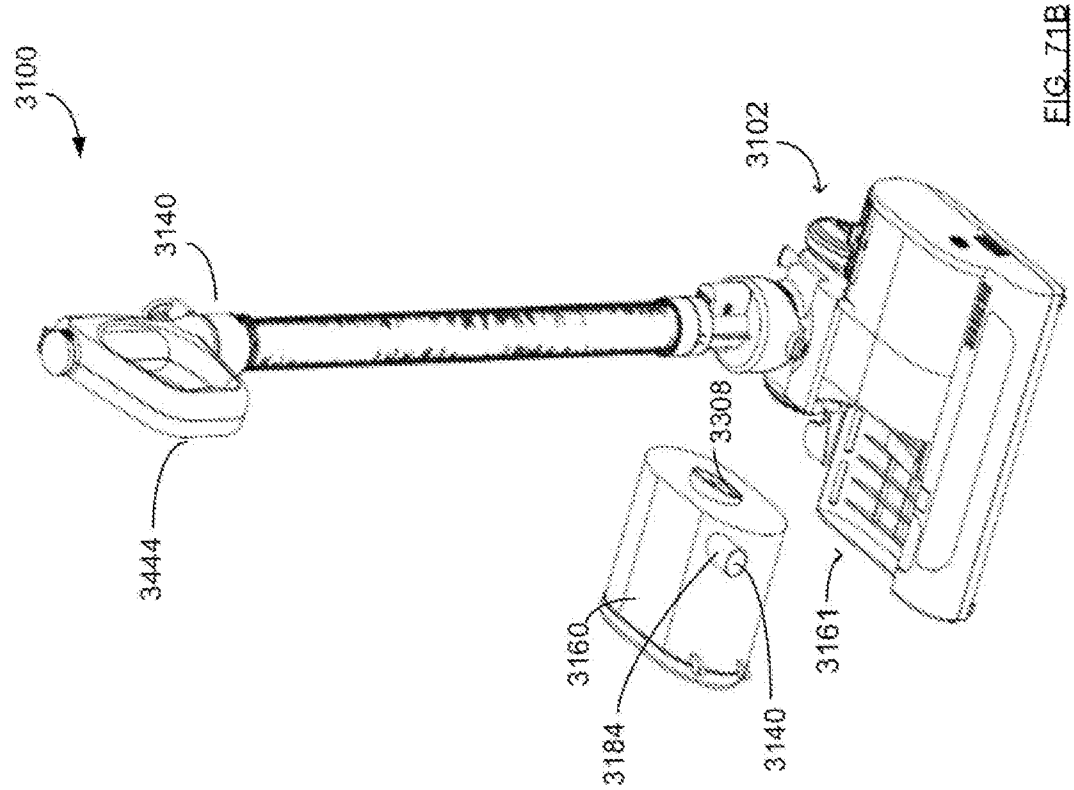
Figure 71A:
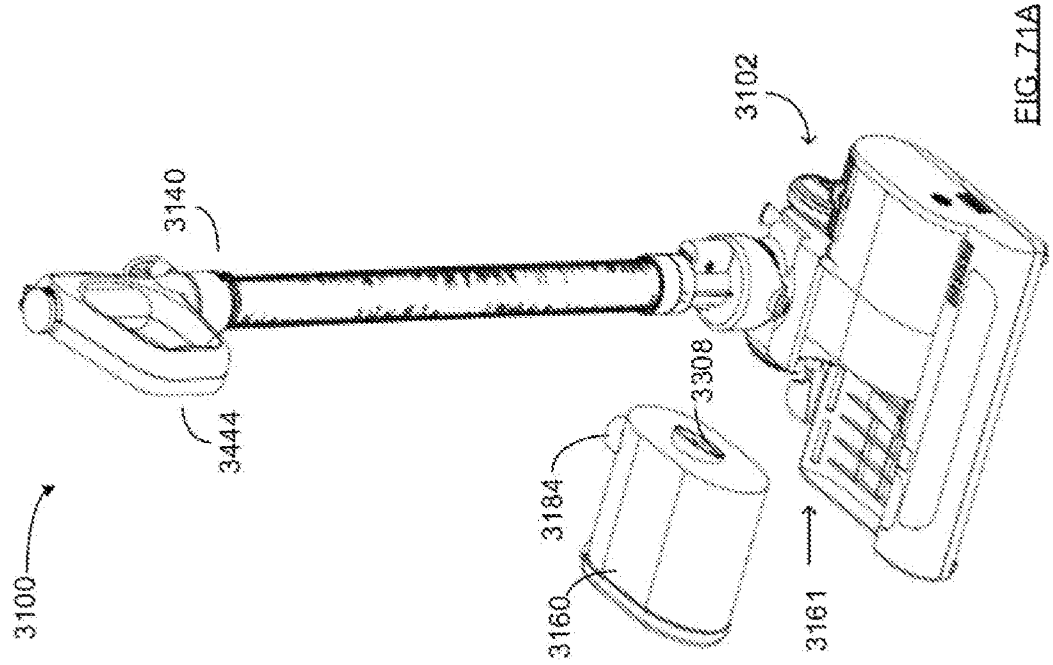
Figure 71C:
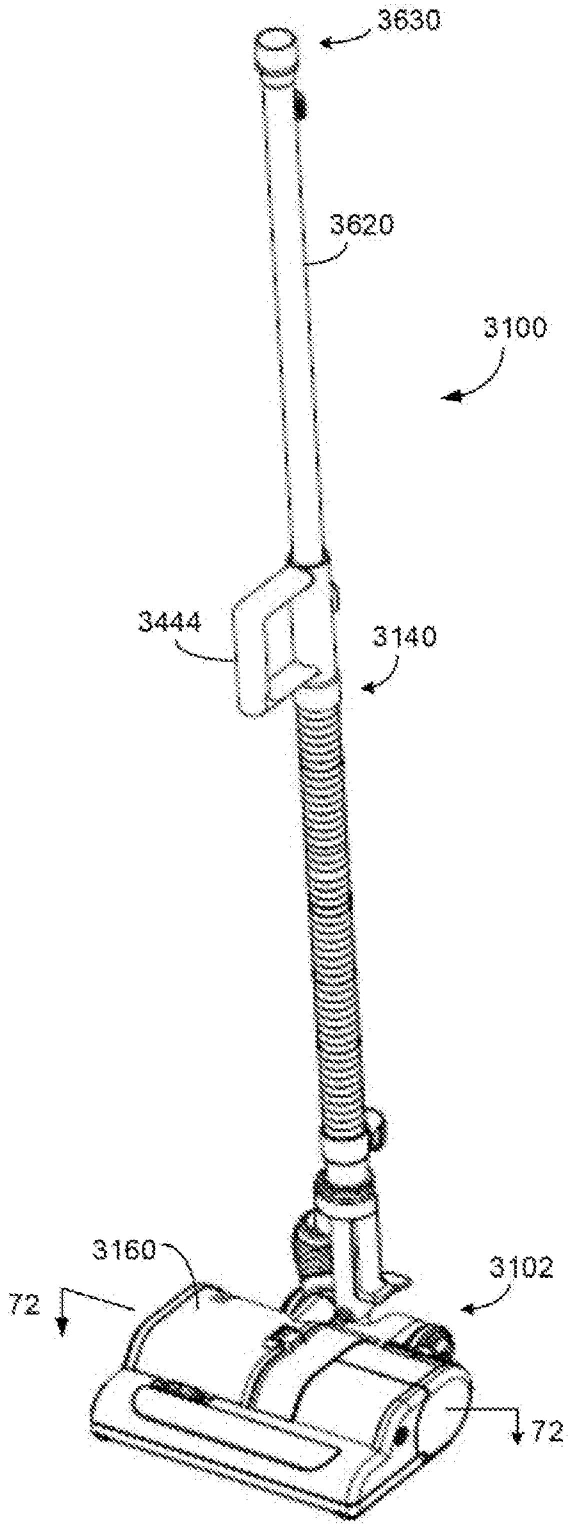
Figure 72A:
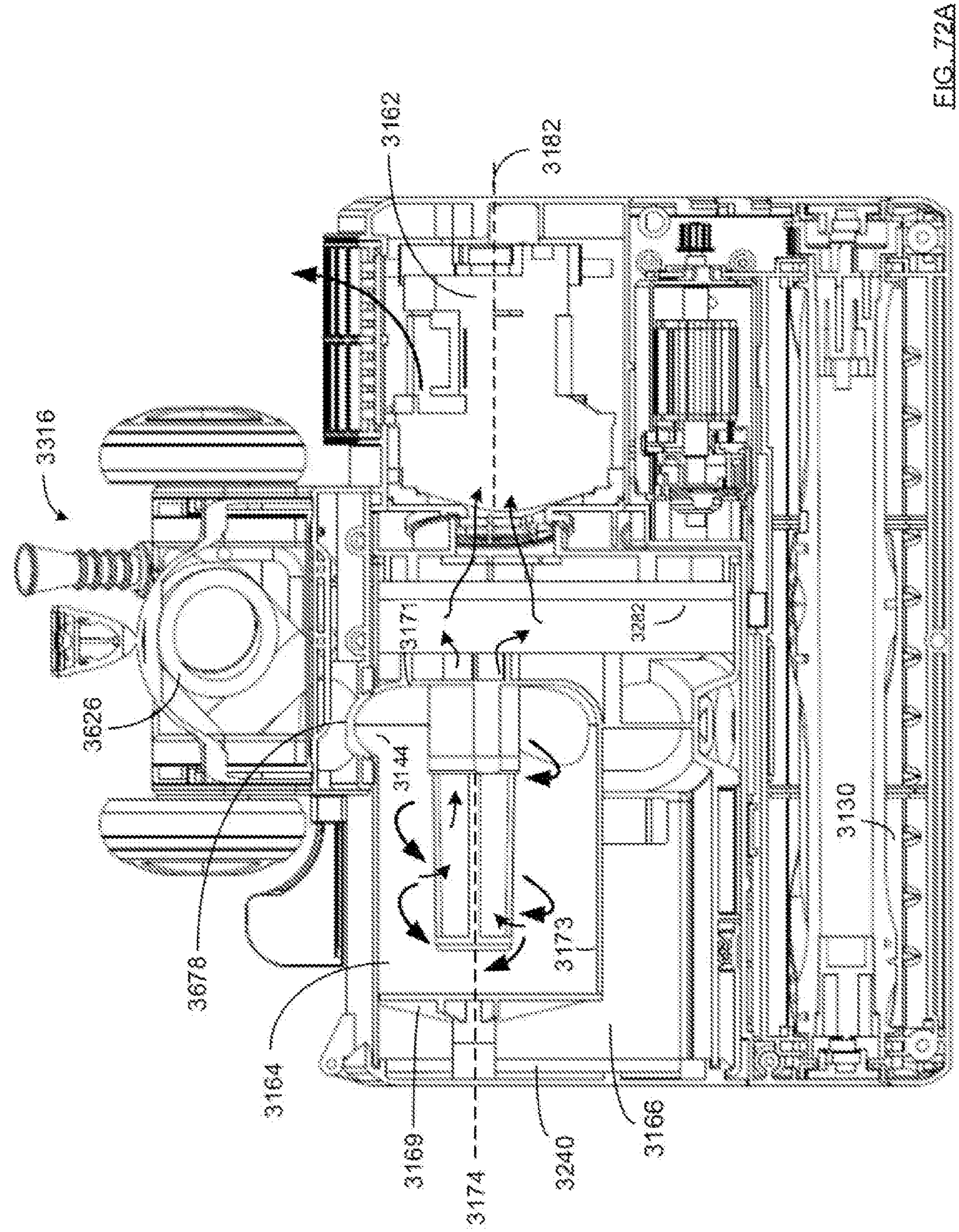
Figure 72B:
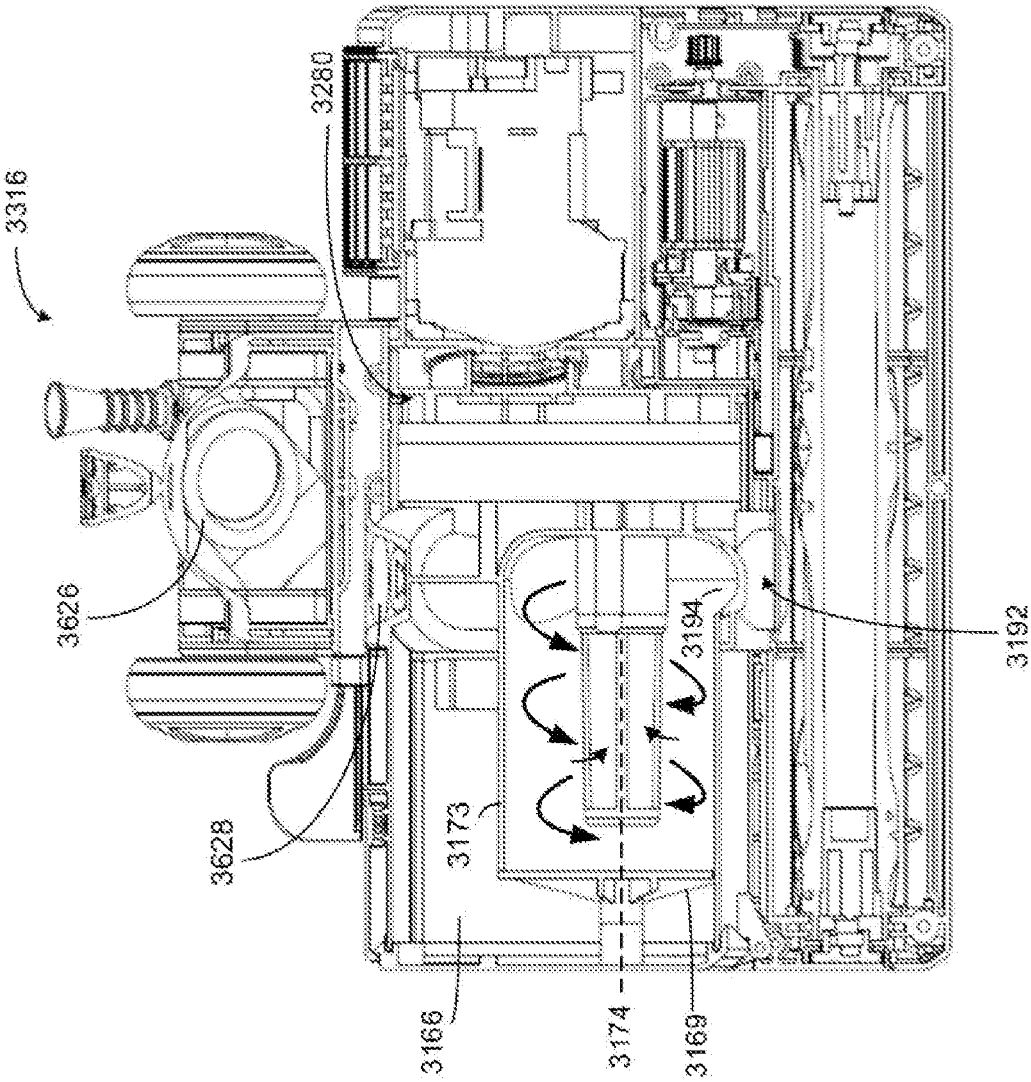
Figure 73A:
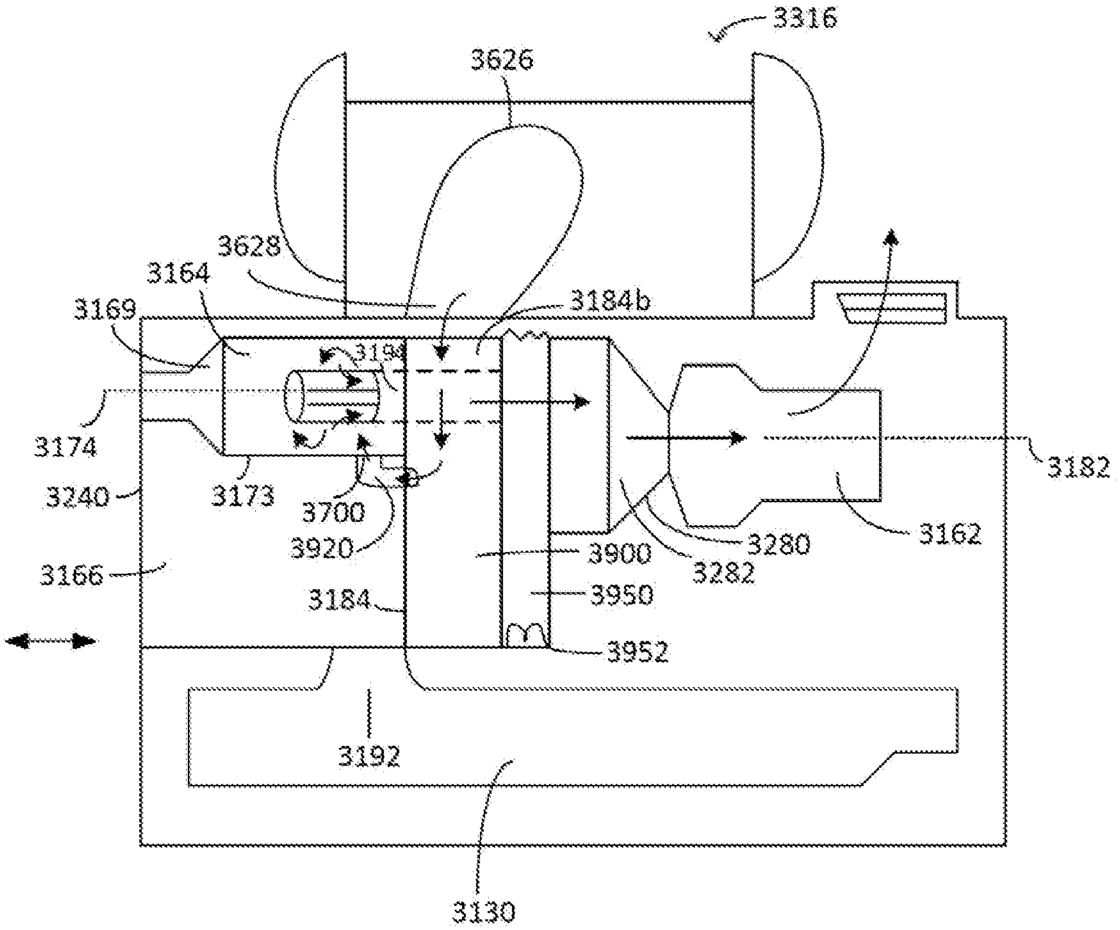
Figure 73B:
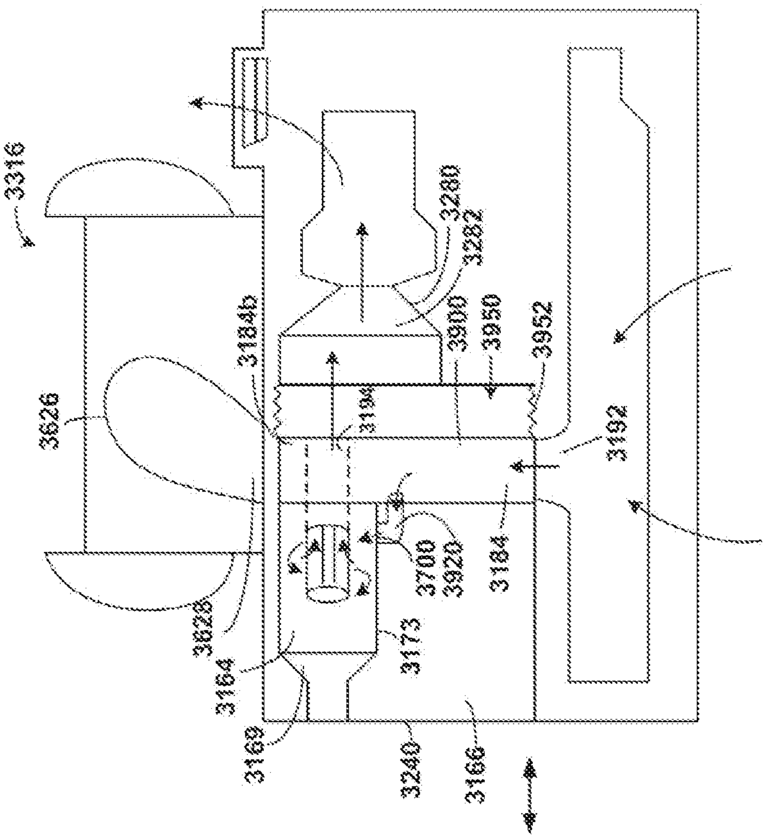
Figure 74:
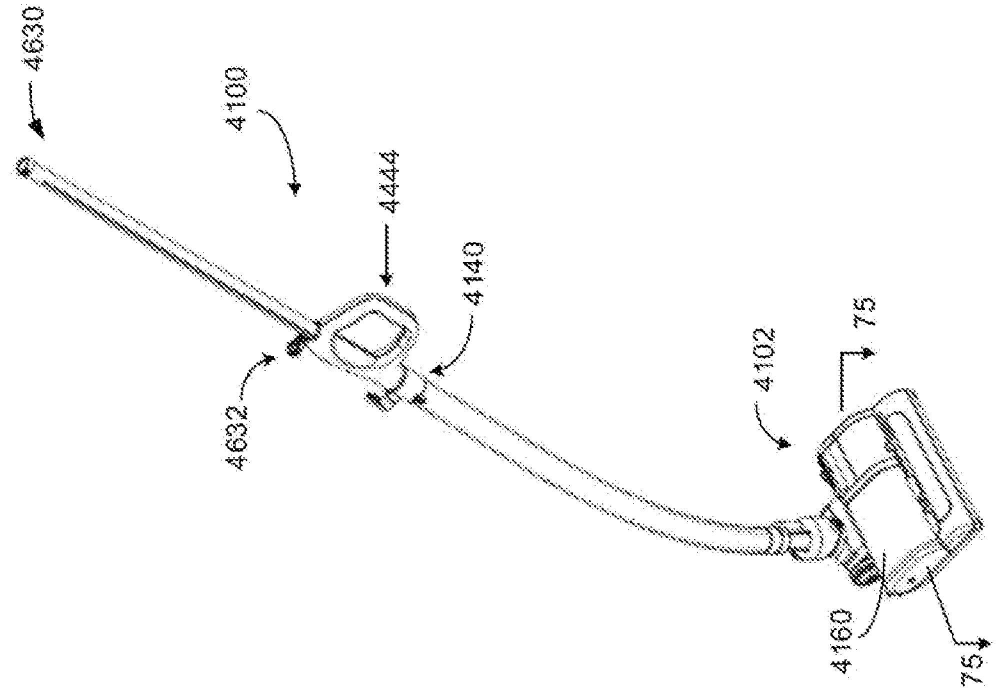
Figure 75A:
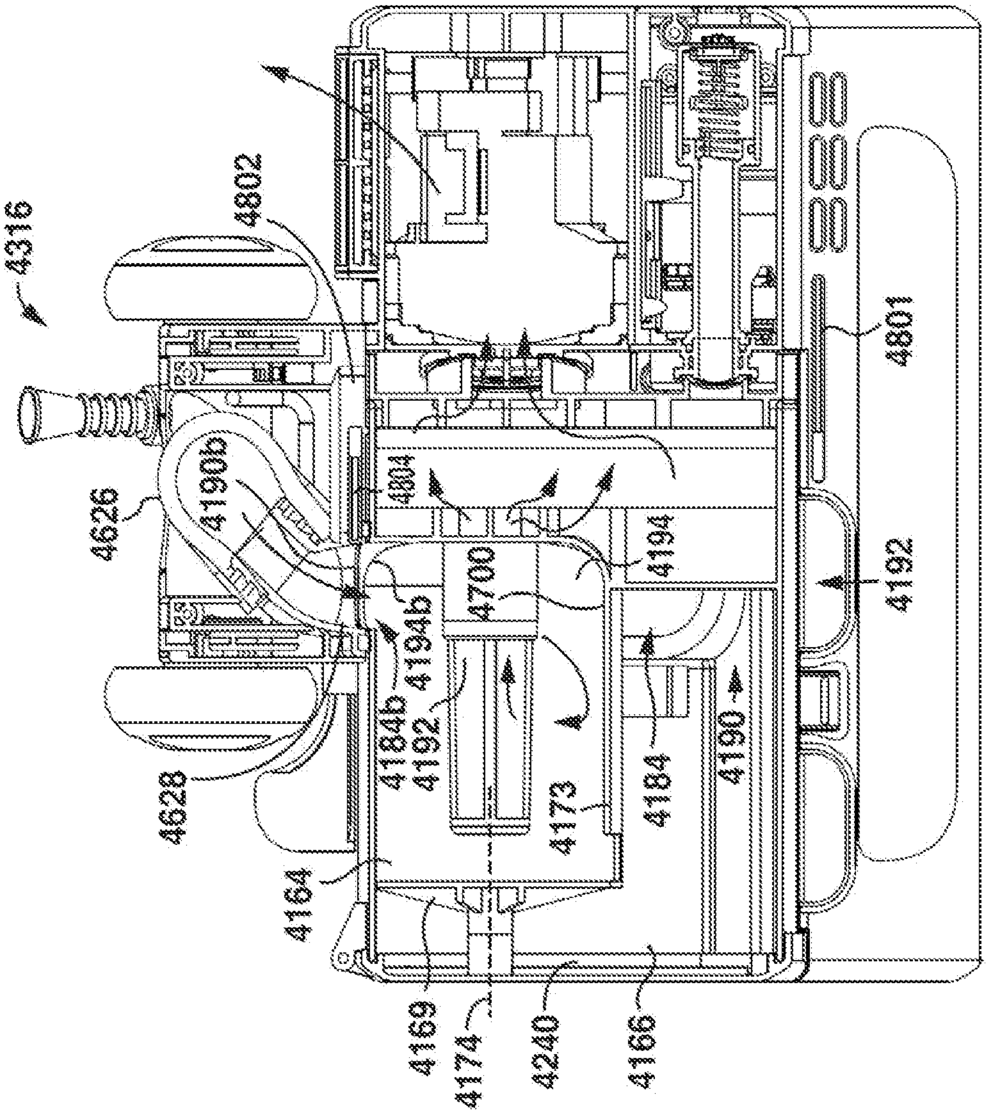
Figure 75B:
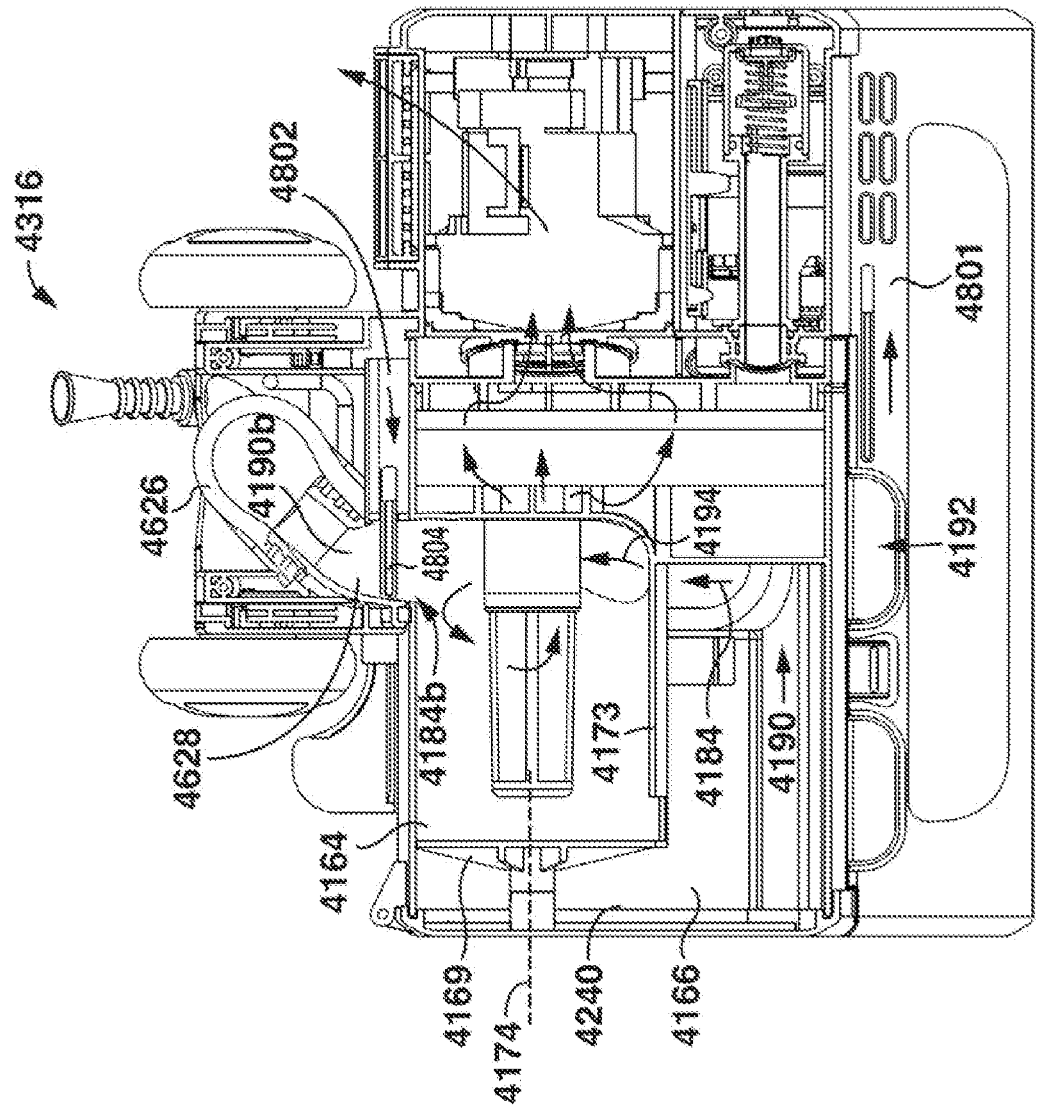
Figure 76A:
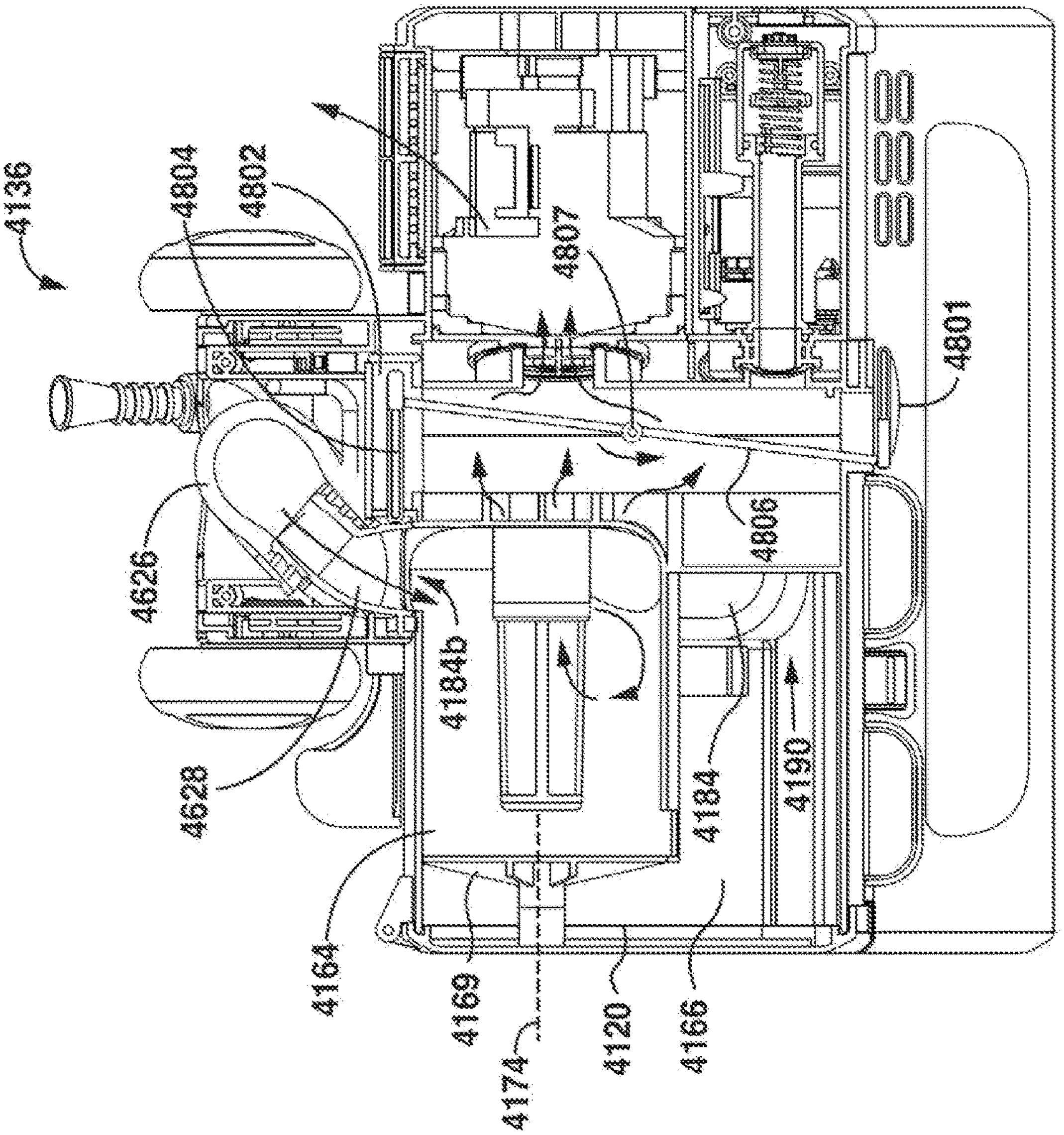
Figure 76B:
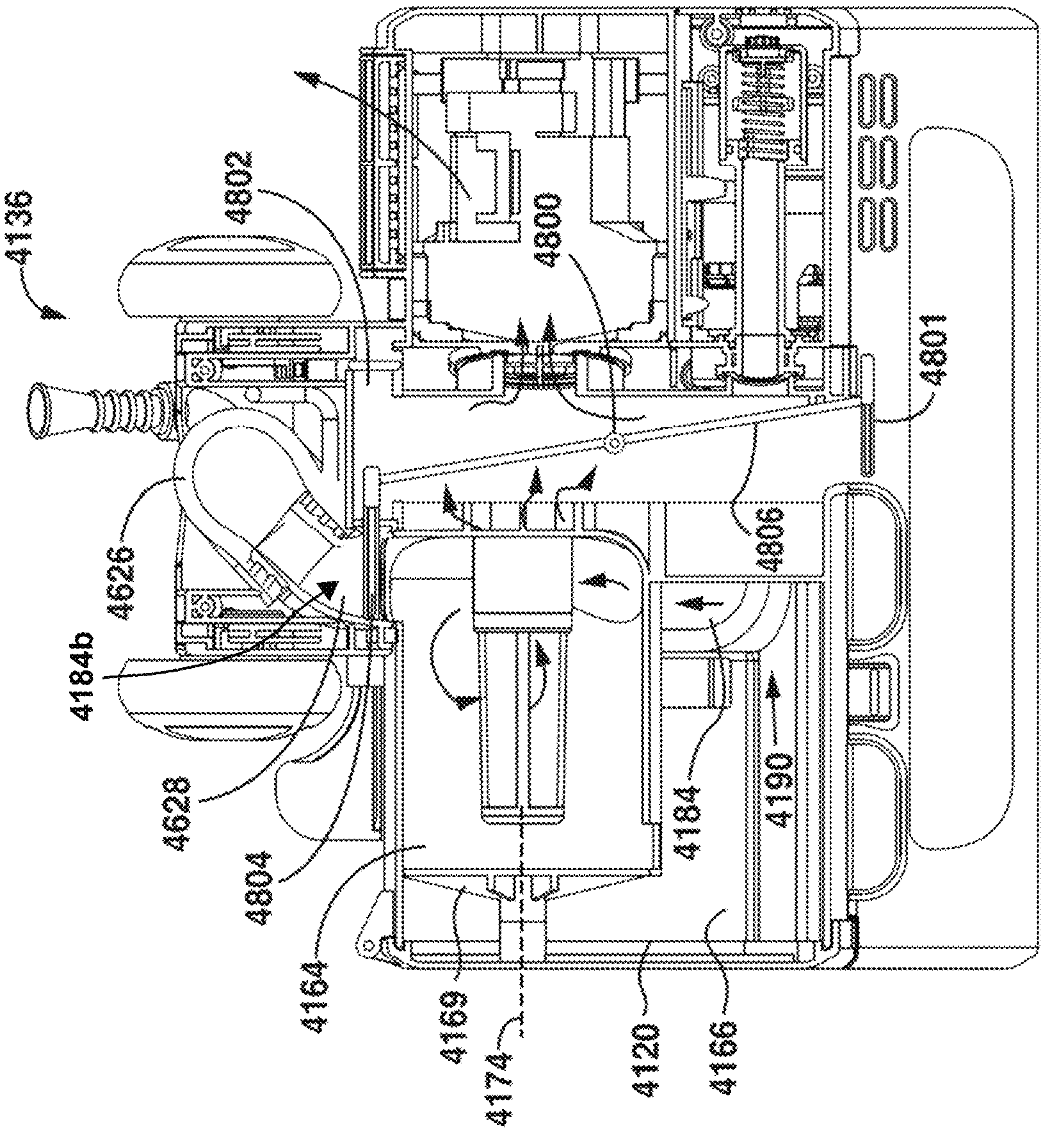
Figure 77A:
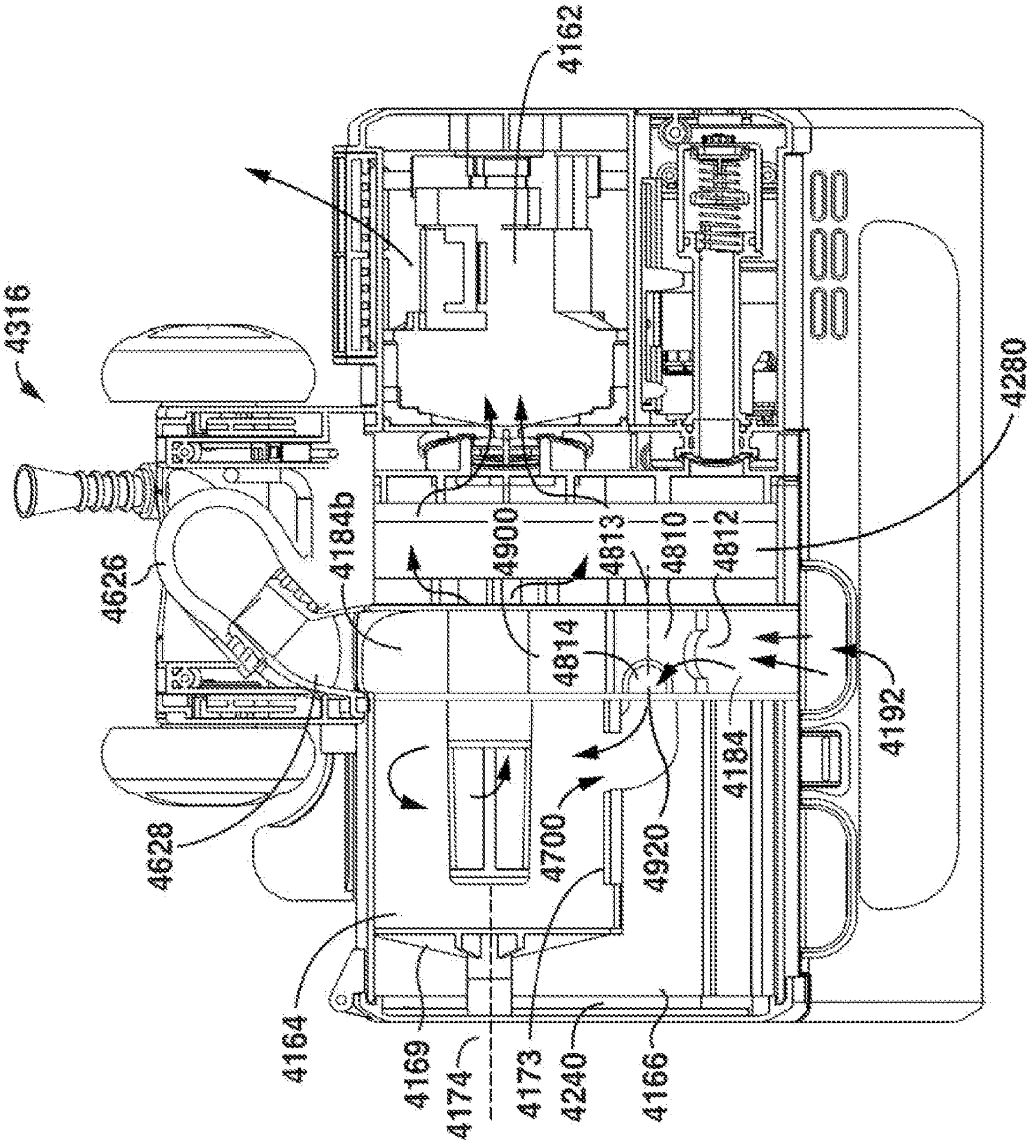
Figure 77B:
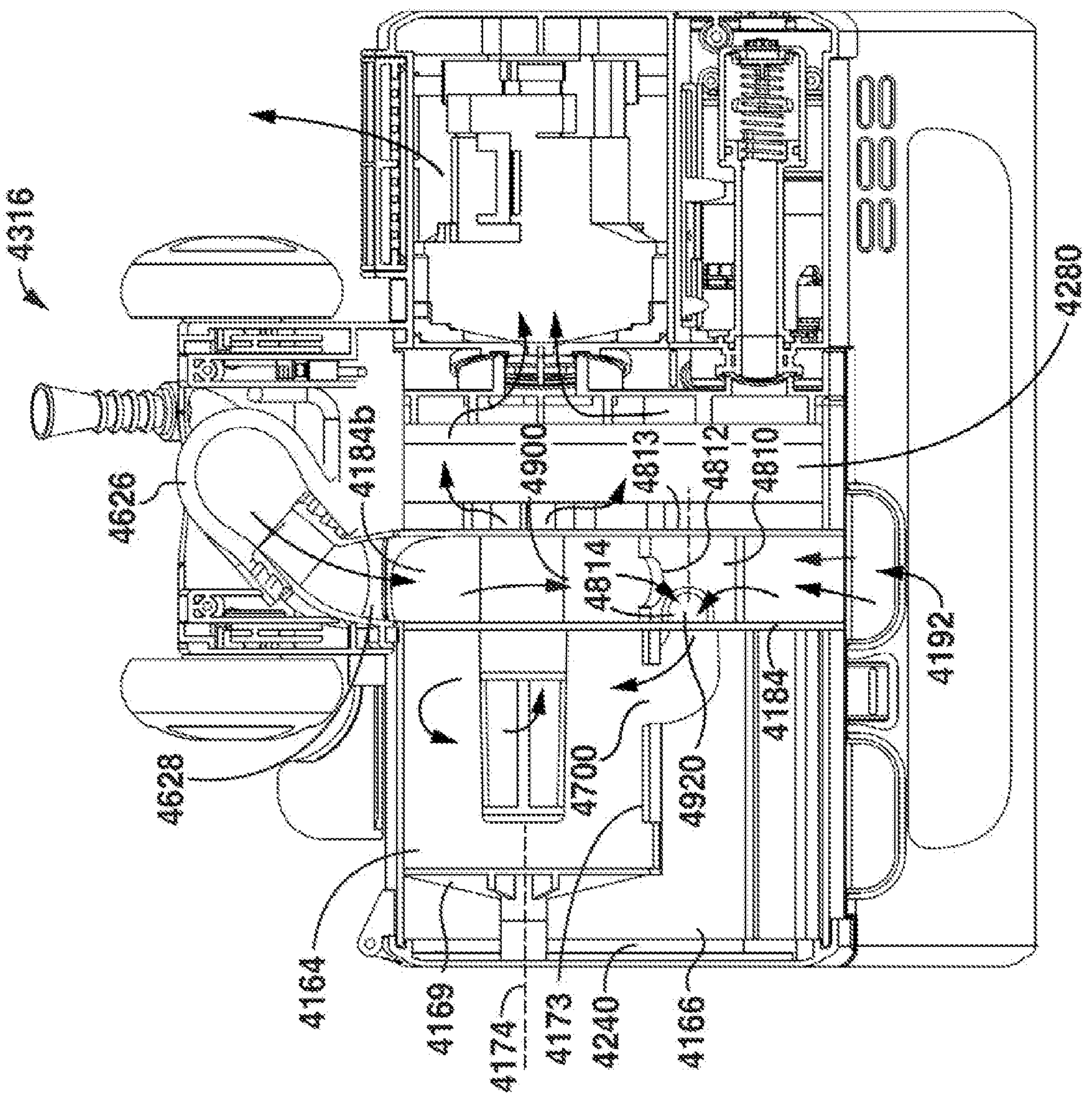
Figure 78A:
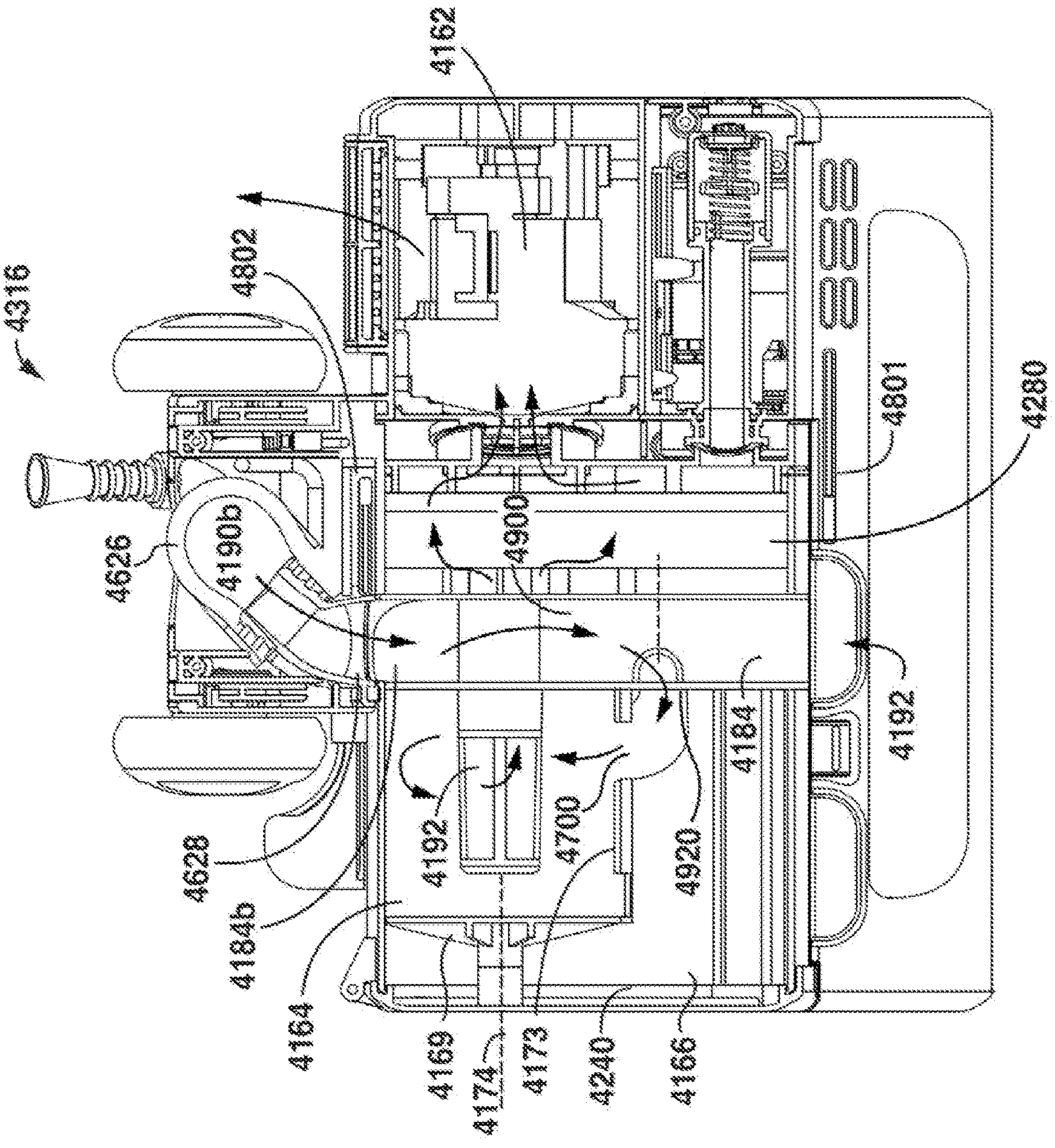
Figure 78B:
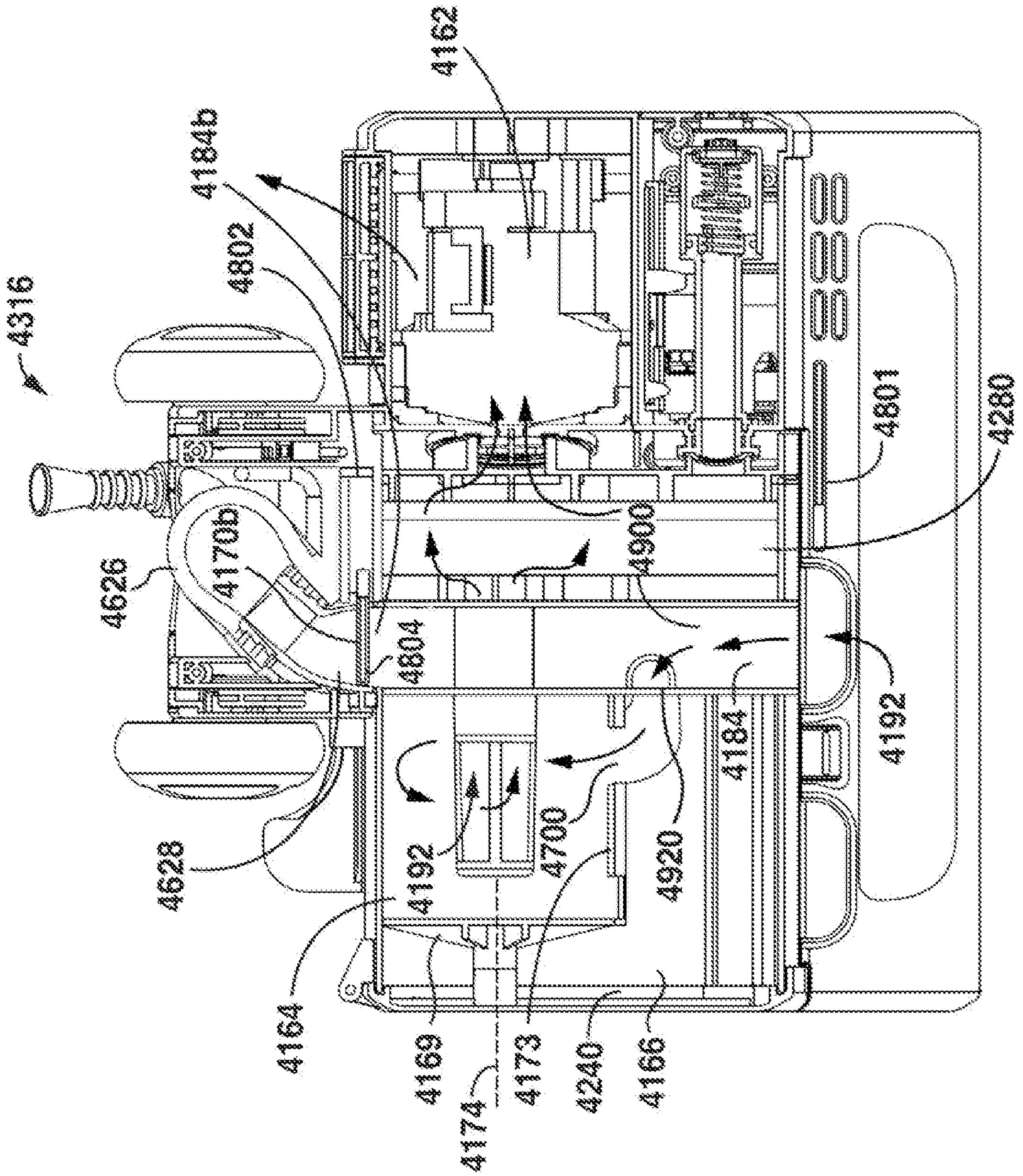
Figure 79A:
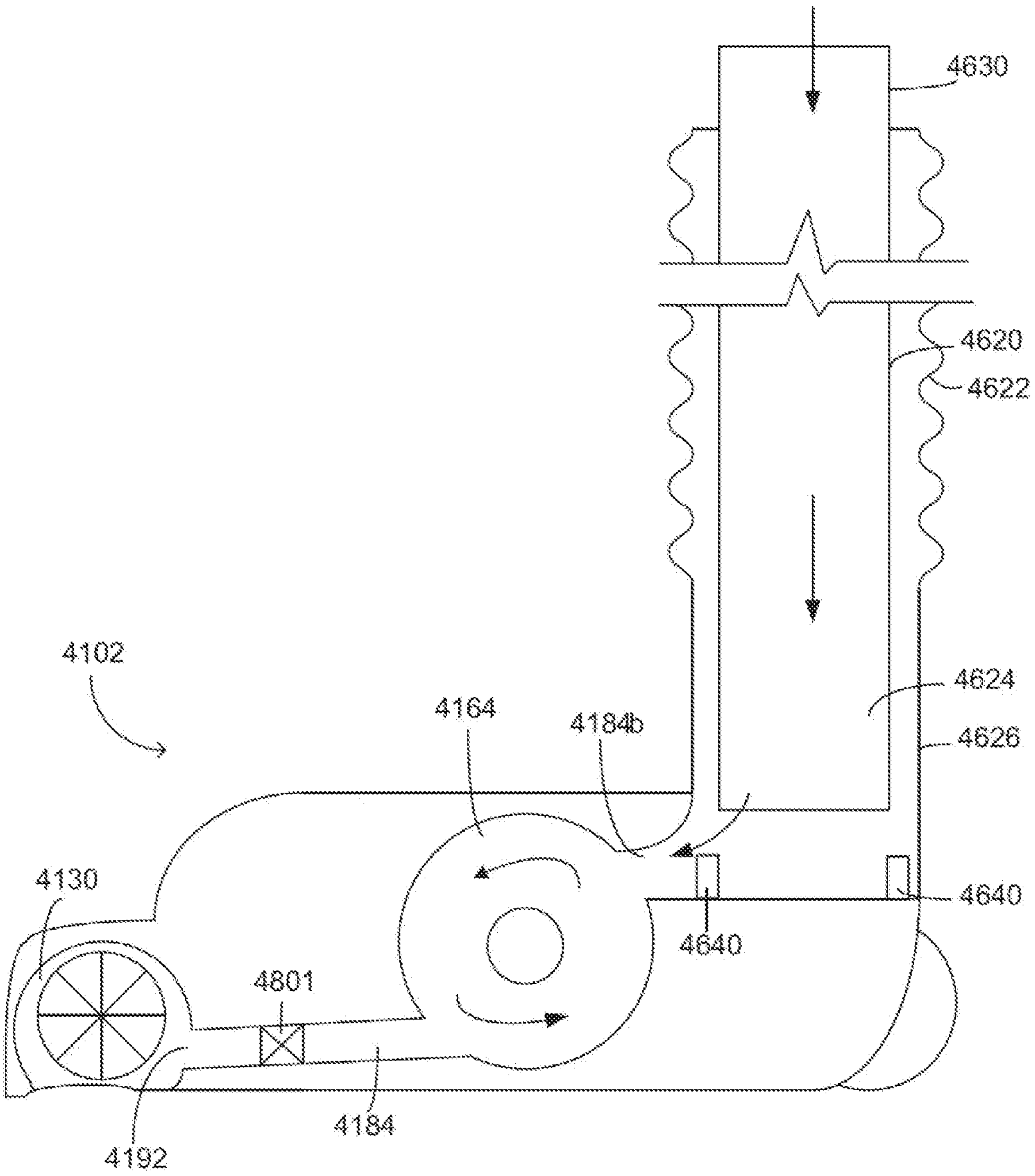
Figure 79B:
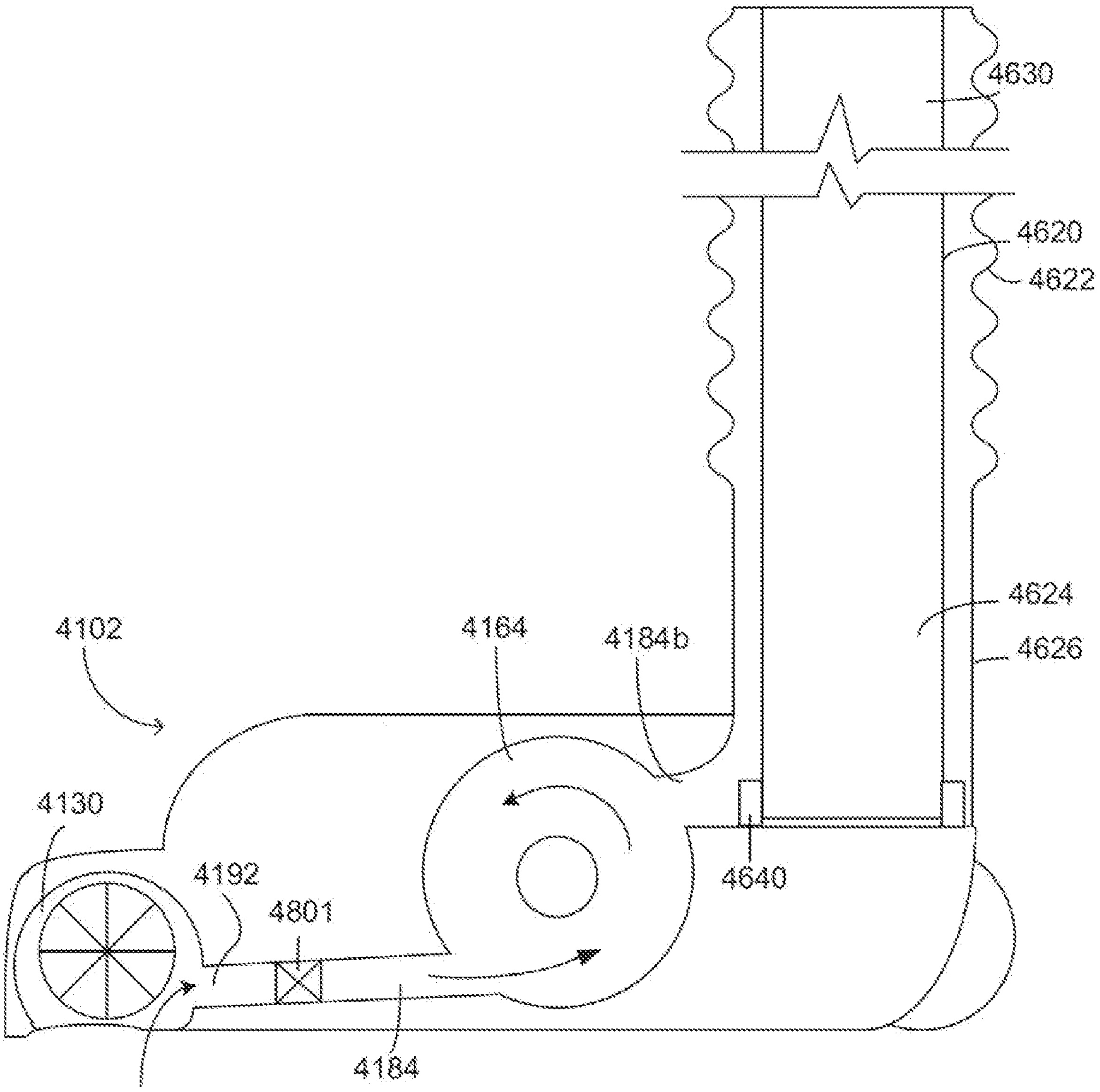
Figure 81:
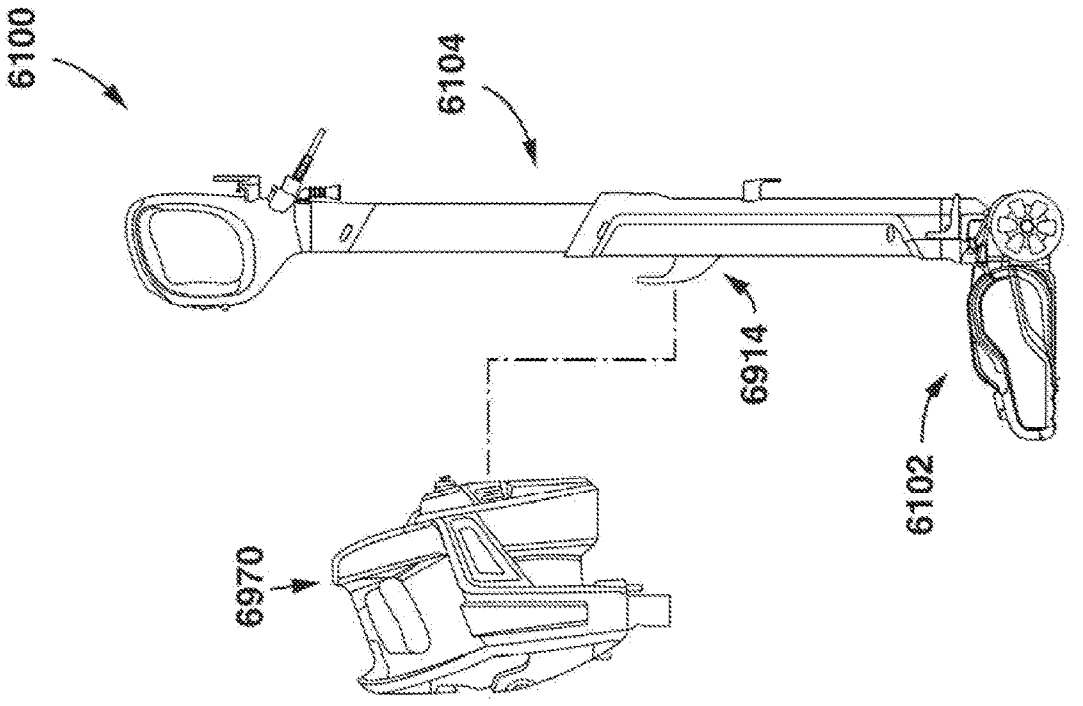
Figure 80:
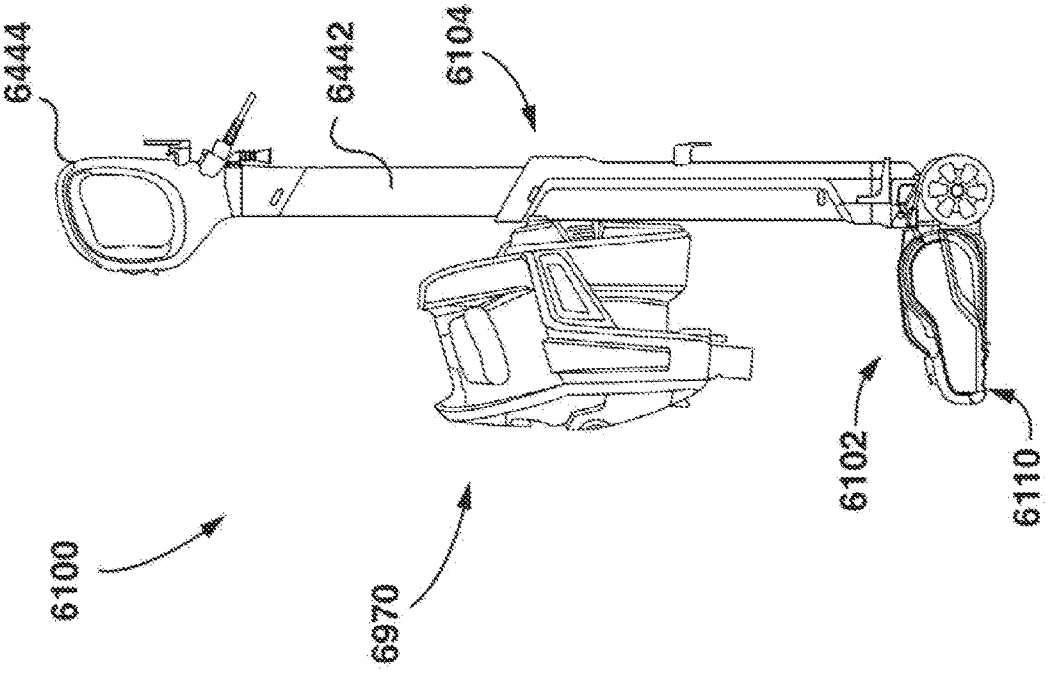
Figure 82:
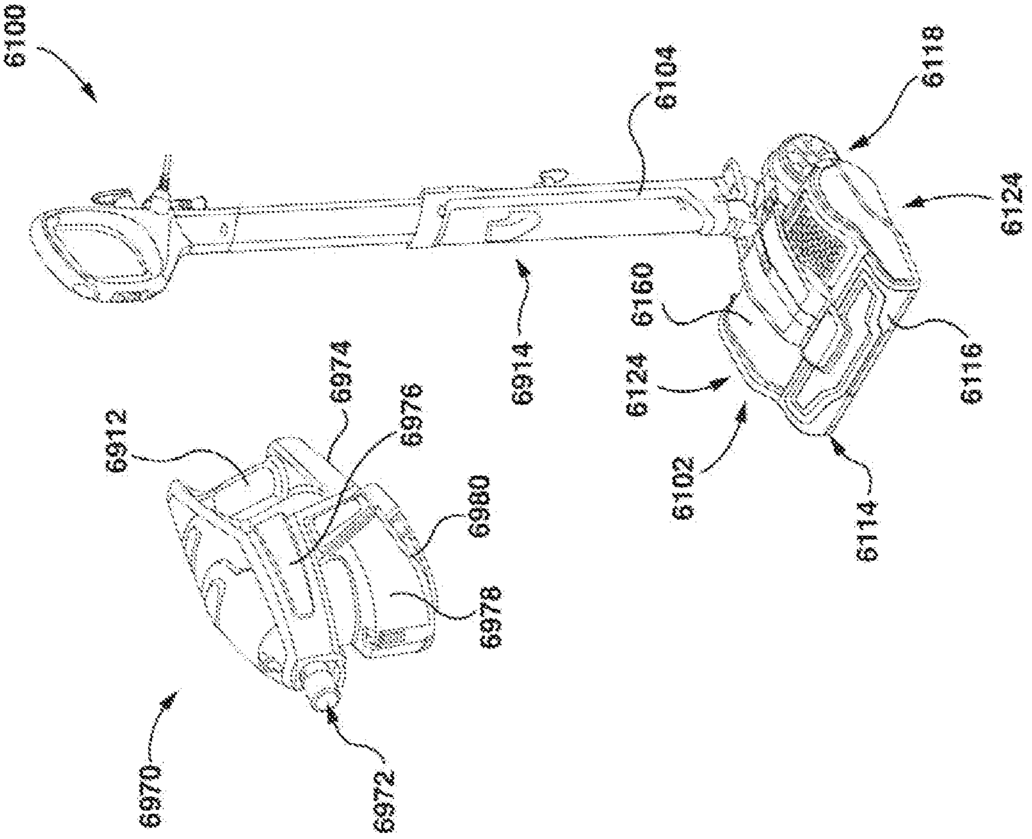
Figure 84:
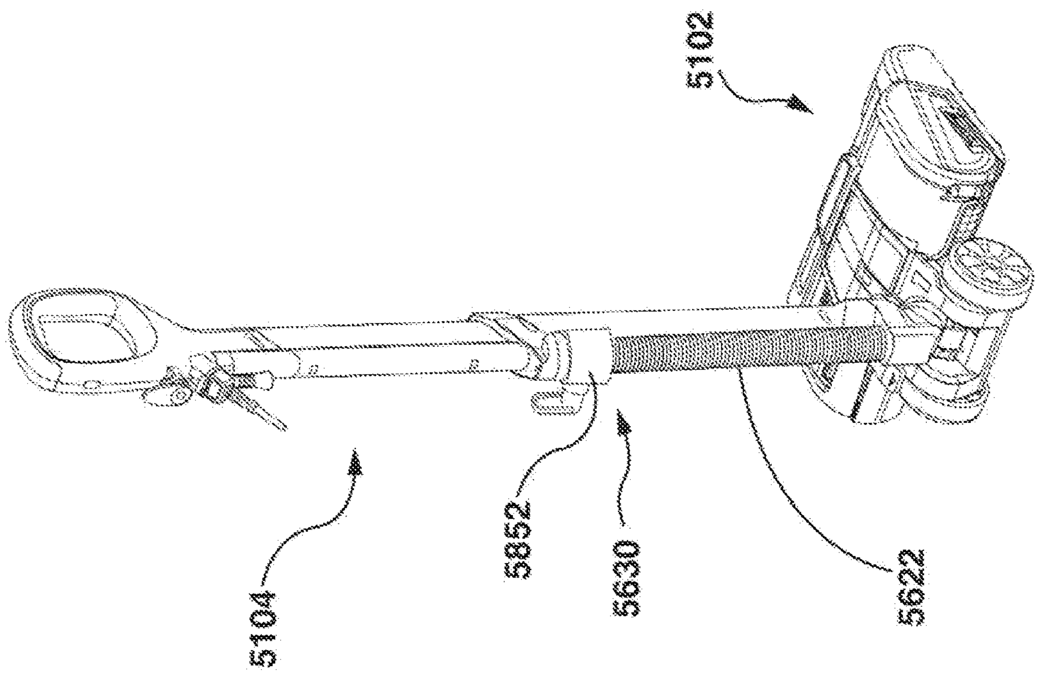
Figure 83:
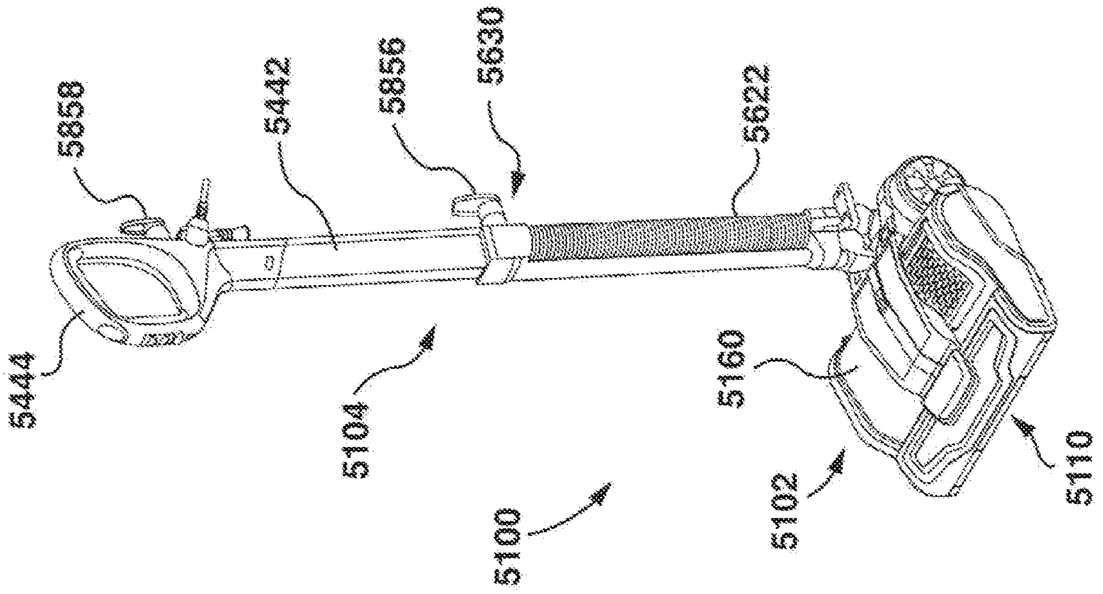
Figure 85:
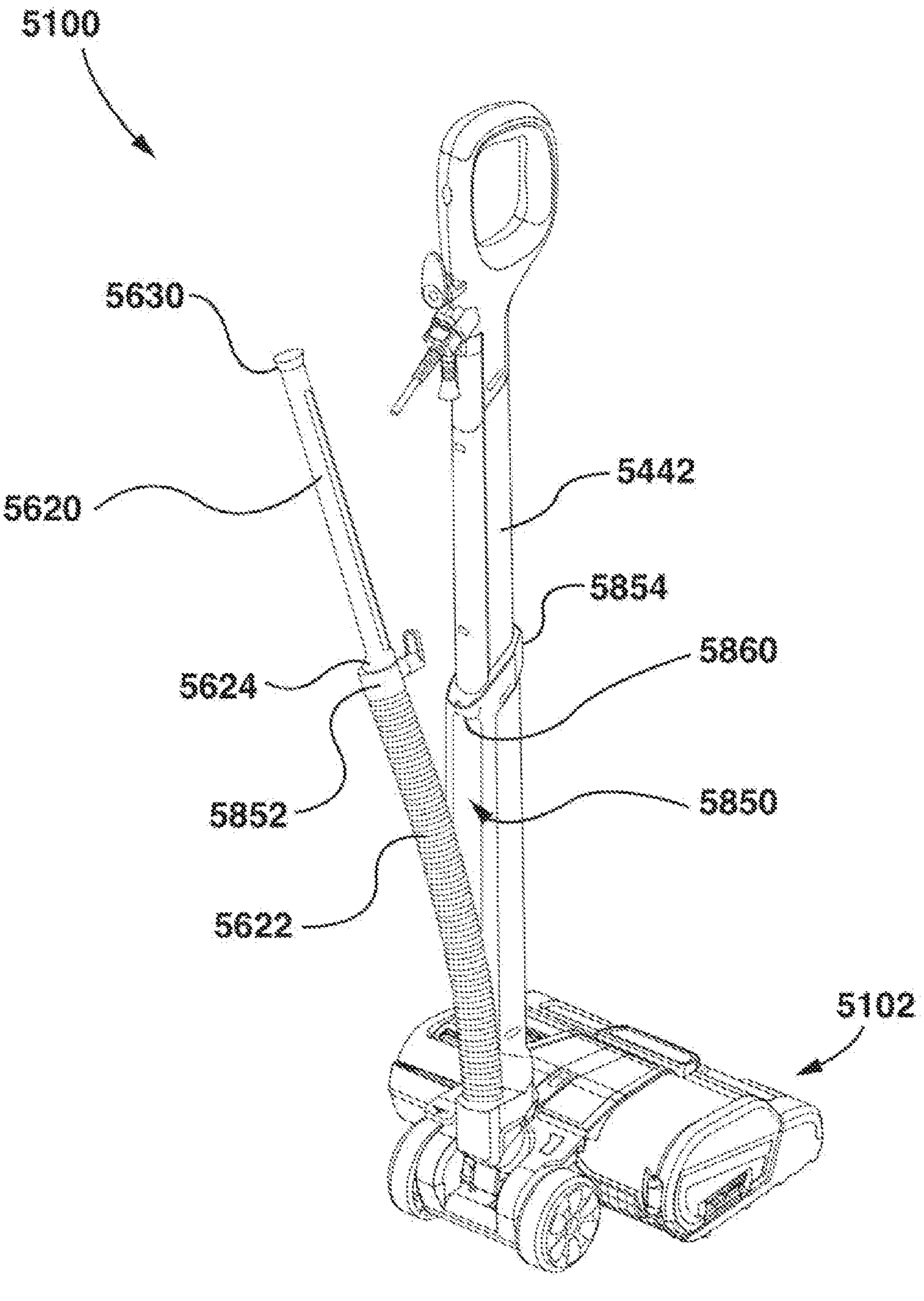
Figure 87:
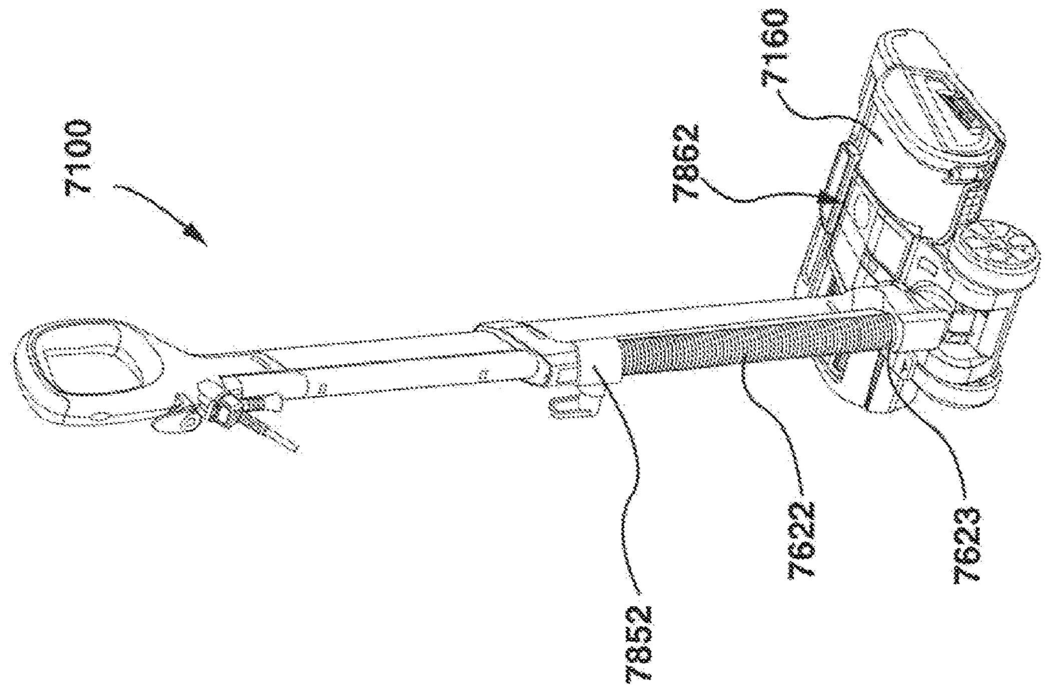
Figure 86:
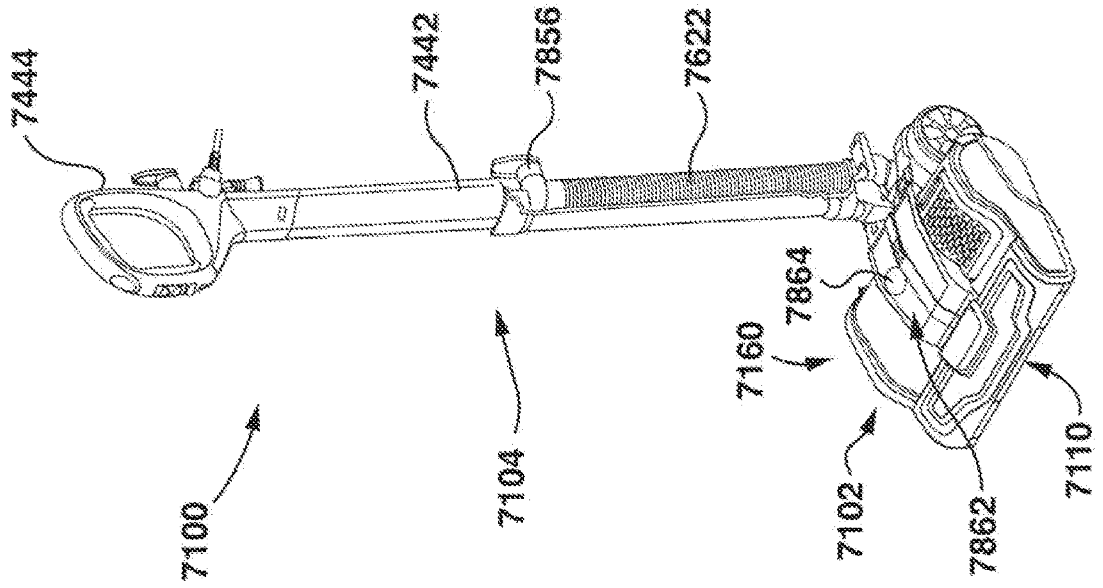
Figure 88:
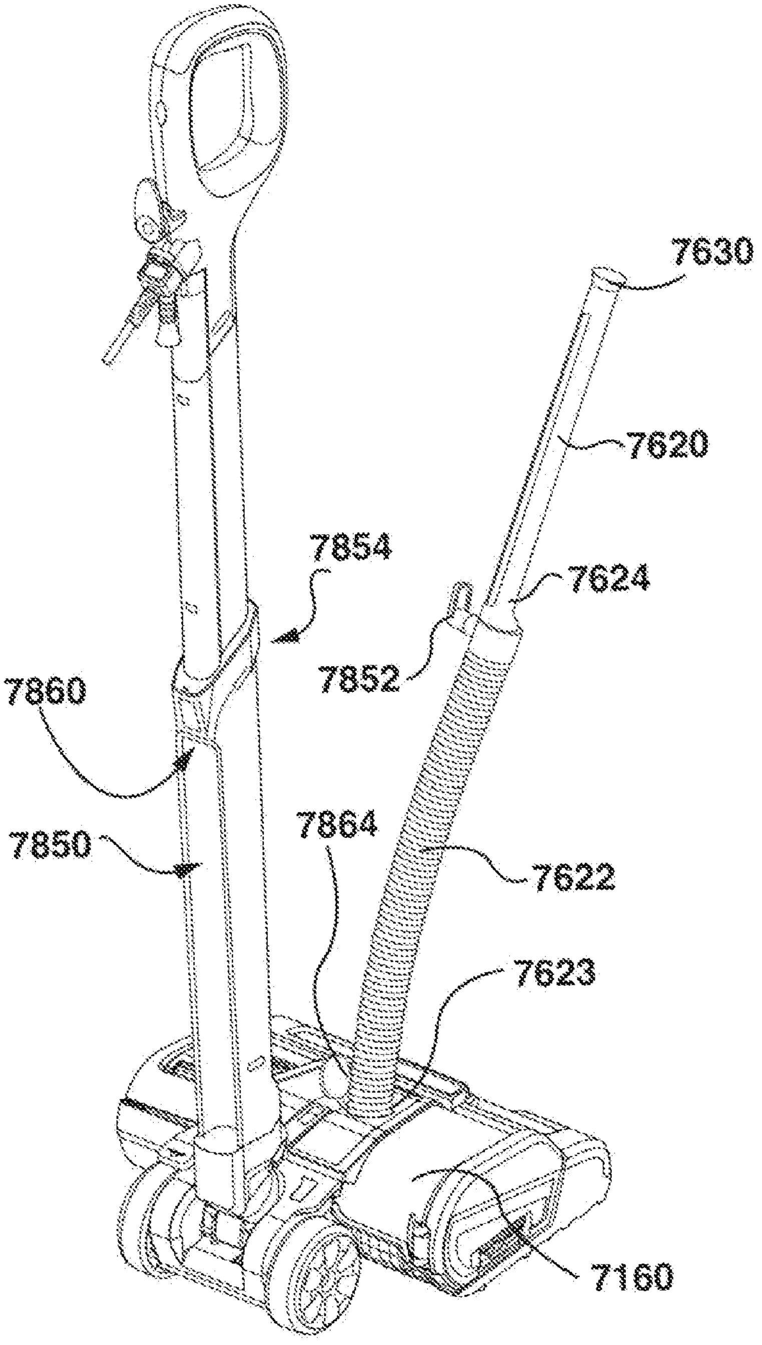
Figure 89:
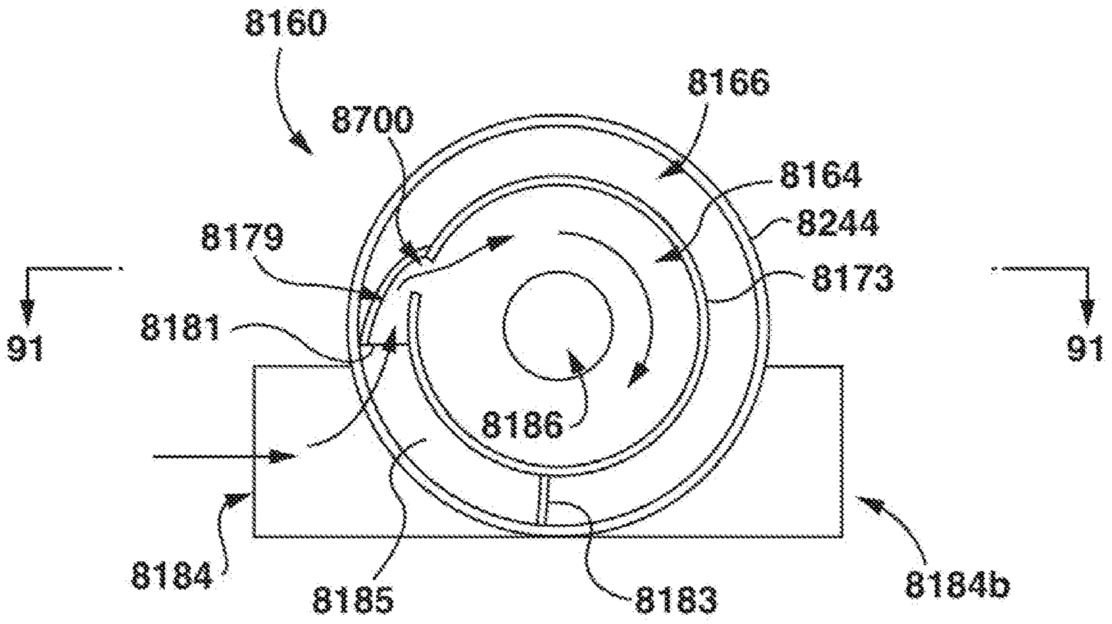
Figure 90:
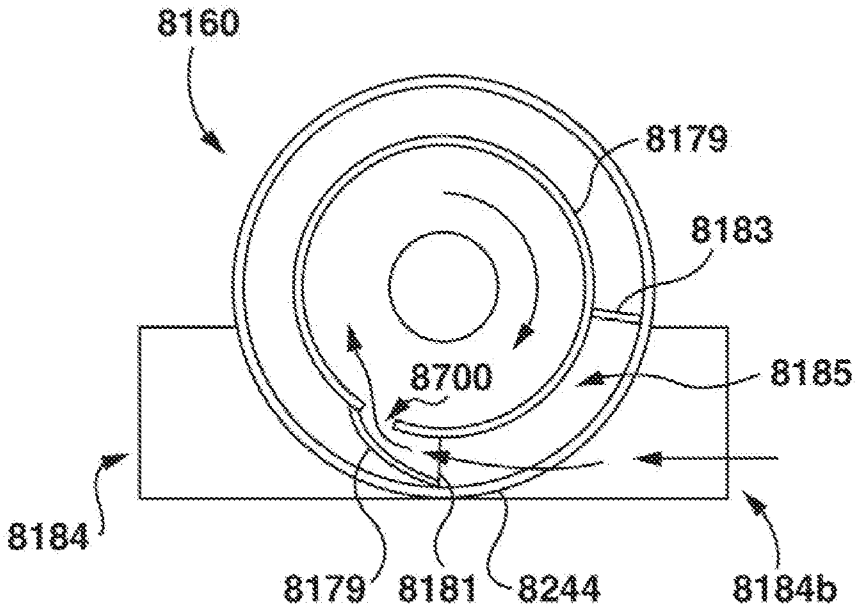
Figure 91:
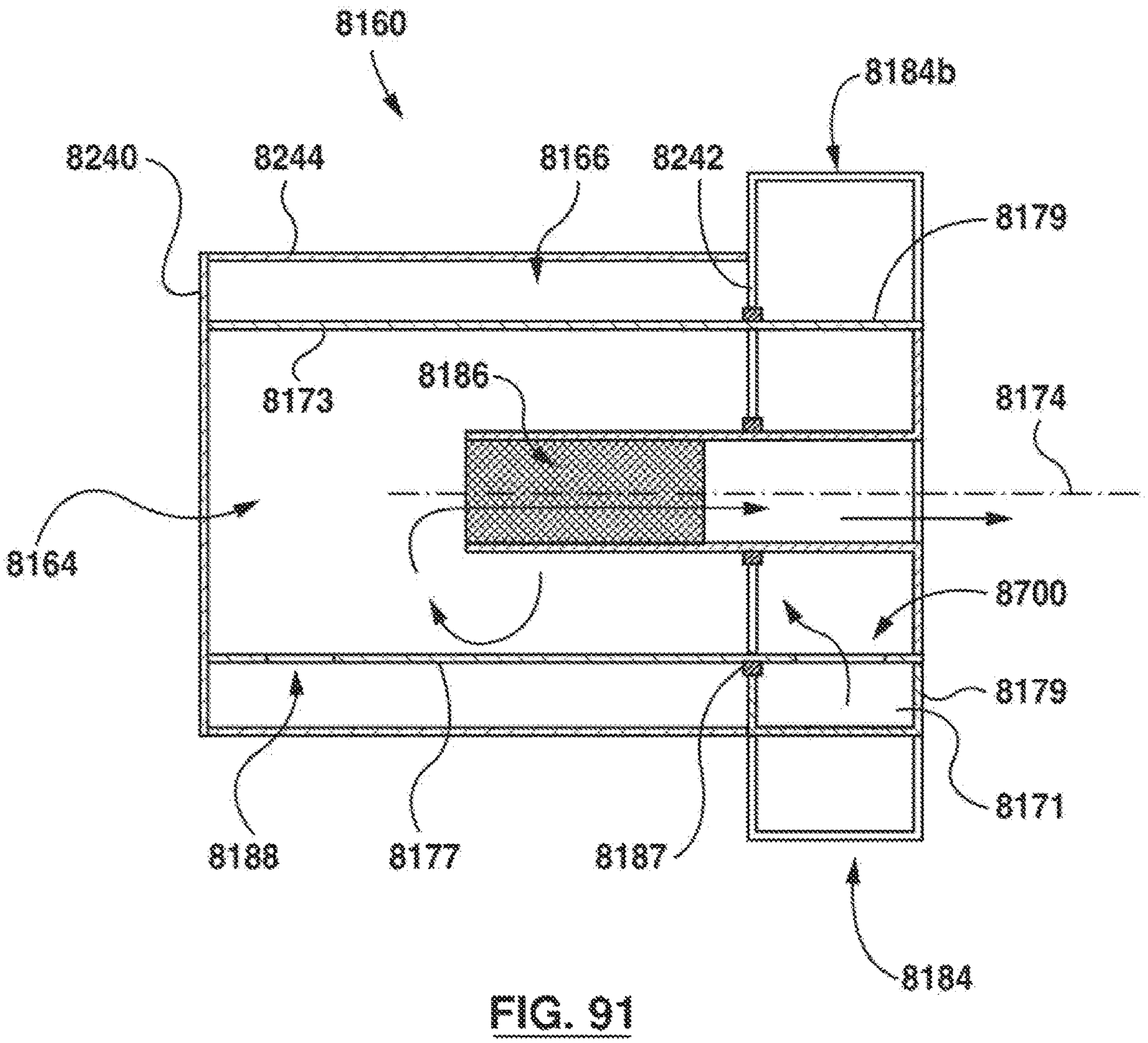

FIG. 54B the a bottom perspective view of the surface cleaning head of FIG. 54A with the blocker in a retracted position FIG. 55 is a cross-sectional view of the surface cleaning head of FIG. 46, taken along line 55-55, which is shown in FIG. 53;

FIG. 56 is a cross-sectional view of the surface cleaning head of FIG. 46, taken along line 56-56, which is shown in FIG. 53;

FIG. 57 is a cross-sectional view of the surface cleaning head of FIG. 46, taken along line 57-57, which is shown in FIG. 46;

FIG. 58 is a cross-sectional view of the surface cleaning apparatus of FIG. 46, taken along line 58-58, which is shown in FIG. 46;

FIG. 59 is the cross-sectional view of the surface cleaning apparatus of FIG. 58, with a wand extended and a pre-motor filter removed;

FIG. 60 is a cross-sectional view of the surface cleaning apparatus of FIG. 46, taken along line 60-60, which is shown in FIG. 46;

FIG. 61 is a front perspective view of another example of an all in the head type surface cleaning apparatus;

FIG. 62 is a cross-sectional view of the surface cleaning head of FIG. 61, taken along line 62-62, which is shown in FIG. 61, with a cyclone chamber in a first orientation relative to the surface cleaning head;

FIG. 63 is a cross-sectional view of the surface cleaning head of FIG. 61, taken along line 63-63, which is shown in FIG. 61, with the cyclone chamber in the orientation shown in FIG. 62;

FIG. 64 is a cross-sectional view of the surface cleaning head of FIG. 61, taken along line 62-62, which is shown in FIG. 61, with a cyclone chamber in a second orientation relative to the surface cleaning head;

FIG. 65 is a cross-sectional view of the surface cleaning head of FIG. 61, taken along line 62-62, which is shown in FIG. 61, with a cyclone chamber in a third orientation relative to the surface cleaning head;

FIG. 66 is a cross-sectional view of the surface cleaning head of FIG. 61, taken along line 63-63, which is shown in FIG. 61, with the cyclone chamber in the orientation shown in FIG. 65;

FIG. 67 is a front perspective view of an example of a cyclone bin assembly usable with the surface cleaning apparatus of FIG. 61;

FIG. 68 is a rear perspective view of the cyclone bin assembly of FIG. 67;

FIG. 69 is a top perspective view of the cyclone bin assembly of FIG. 67, with a filter chamber opened and with the cyclone chamber in an open position;

FIG. 70 is a front perspective view of the all in the head type surface cleaning apparatus of FIG. 61, with a cleaning wand partially extended;

FIG. 71A is a front perspective view of another example of an all in the head type surface cleaning apparatus, with a cyclone bin assembly positioned for installation in a first orientation;

FIG. 71B is a front perspective view of the all in the head type surface cleaning apparatus of FIG. 71A, with the cyclone bin assembly positioned for installation in a second orientation;

FIG. 71C is a front perspective view of the all in the head type surface cleaning apparatus of FIG. 71A, with a cleaning wand partially extended;

FIG. 72A is a cross-sectional view of the surface cleaning head of FIGS. 71A-C, taken along line 72-72, which is shown in FIG. 71C, with the cyclone bin assembly installed in the orientation shown in FIG. 71A;

FIG. 72B is a cross-sectional view of the surface cleaning head of FIGS. 71A-C, taken along line 72-72, which is shown in FIG. 71C, with the cyclone bin assembly installed in the orientation shown in FIG. 71B;

FIG. 73A is a schematic cross-sectional view of an example surface cleaning head, with the cyclone bin assembly mounted in a first position;

FIG. 73B is a schematic cross-sectional view of the example surface cleaning head of FIG. 73A, with the cyclone bin assembly mounted in a second position;

FIG. 74 is a front perspective view of another example of an all in the head type surface cleaning apparatus, with a cleaning wand partially extended;

FIG. 75A is a cross-sectional view of the surface cleaning head of FIG. 74, taken along line 75-75, which is shown in FIG. 74, with a first airflow valve in an open configuration, and a second airflow valve in a closed configuration;

FIG. 75B is a cross-sectional view of the surface cleaning head of FIG. 74, taken along line 75-75, which is shown in FIG. 74, with a first airflow valve in a closed configuration, and a second airflow valve in an open configuration;

FIG. 76A is a cross-sectional view of another example surface cleaning head, with a pair of linked airflow valves in a first position;

FIG. 76B is a cross-sectional view of the example surface cleaning head of FIG. 76A, with the linked airflow valves in a second position;

FIG. 77A is a cross-sectional view of another example surface cleaning head, with a rotary airflow valve in a first orientation;

FIG. 77B is a cross-sectional view of the example surface cleaning head of FIG. 77A, with the rotary airflow valve in a second orientation;

FIG. 78A is a cross-sectional view of another example surface cleaning head, with a first airflow valve in an open configuration, and a second airflow valve in a closed configuration;

FIG. 78B is a cross-sectional view of the example surface cleaning head of FIG. 78A, with a first airflow valve in a closed configuration, and a second airflow valve in an open configuration;

FIG. 79A is a schematic cross-sectional view of an example surface cleaning head, with a first airflow valve in an open configuration, and with a surface cleaning wand unseated to allow airflow therethrough;

FIG. 79B is a schematic cross-sectional view of the example surface cleaning head of FIG. 79A, with a first airflow valve in a closed configuration, and with the surface cleaning wand seated to prevent airflow therethrough;

FIG. 80 is a side view of another example of an all in the head type surface cleaning apparatus with a portable cleaning unit attached to the drive handle;

FIG. 81 is the side view of FIG. 80 with the portable cleaning unit detached from the drive handle;

FIG. 82 is a front perspective view of the cleaning apparatus of FIG. 80 with the portable cleaning unit detached from the drive handle;

FIG. 83 is a front perspective view of another example of an all in the head type surface cleaning apparatus with a flexible hose and cleaning wand in a stored position;

FIG. 84 is a rear perspective view of the surface cleaning apparatus of FIG. 83 with the flexible hose and cleaning wand in the stored position;

FIG. 85 is a rear perspective view of the surface cleaning apparatus of FIG. 83 with the flexible hose and cleaning wand in a deployed position;

FIG. 86 is a front perspective view of another example of an all in the head type surface cleaning apparatus with a flexible hose and cleaning wand in a stored position;

FIG. 87 is a rear perspective view of the surface cleaning apparatus of FIG. 86 with the flexible hose and cleaning wand in the stored position;

FIG. 88 is a rear perspective view of the surface cleaning apparatus of FIG. 86 with the flexible hose and cleaning wand in a deployed position FIG. 89 is an end view of a schematic representation of another example of a cyclone bin assembly, with a rotatable portion in a first position;

FIG. 90 is an end view of a schematic representation of the cyclone bin assembly of FIG. 89 with a rotatable portion in a second position; and, FIG. 91 is a cross-sectional view of the cyclone bin assembly of FIG. 89, taken along line 91-91.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

As exemplified herein, the surface cleaning apparatus is an all in the head vacuum cleaner. It will be appreciated that, in some embodiments, aspects disclosed herein may be used in other surface cleaning apparatus such as extractors or in surface cleaning heads of other vacuum cleaners, such as an upright vacuum cleaner or a canister vacuum cleaner.

General Description of an all in the Head Vacuum Cleaner

Referring to FIGS. 1-8, an embodiment of a surface cleaning apparatus is shown. The surface cleaning apparatus includes a surface cleaning head 102 and an upper portion 104 that is movably and drivingly connected to the surface cleaning head 102. The surface cleaning head 102 may be supported by any suitable support members, such as, for example wheels and/or rollers, to allow the surface cleaning head to be moved across the floor or other surface being cleaned. The support members (e.g., wheels) may be of any suitable configuration, and may be attached to any suitable part of the surface cleaning apparatus, including, for example, the surface cleaning head and upper portion.

The surface cleaning apparatus 100 preferably includes a dirty air inlet 110 (see FIG. 8), a clean air outlet 112 (see FIG. 7) and an air flow path or passage extending therebetween. Preferably, at least one suction motor and at least one air treatment member are provided in the air flow path. The air treatment member may be any suitable air treatment member, including, for example, one or more cyclones (arranged in series or in parallel with each other), filters, bags and other dirt separation devices. Preferably, the at least one air treatment member is provided upstream from the suction motor, but alternatively may be provided downstream from the suction motor or both upstream and downstream from the suction motor. In addition to the at least one air treatment member, the surface cleaning apparatus may also include one or more pre-motor filters (preferably positioned in the air flow path between the air treatment member and the suction motor) and/or one or more post-motor filters (positioned in the air flow path between the suction motor and the clean air outlet).

Upper portion 104 may be of any design known in the art that is drivingly connected to surface cleaning head 102 so as to permit a user to move surface cleaning head 102 across a surface to be cleaned (such as a floor). Upper portion 104 may be moveably (e.g., pivotally) connected to surface cleaning head for movement between an upright storage position as exemplified in FIG. 1 and an inclined in use position as exemplified in FIG. 3. If upper portion 104 is moveably connected to surface cleaning head 102 abut only one axis or rotation (e.g., a horizontal axis), then upper portion 104 may be used to move surface cleaning head 102 in a generally forward/backward direction of travel, indicated by arrow 106. A direction generally orthogonal to the direction of travel, indicated by arrow 108 defines a lateral or transverse direction. In some embodiments, upper portion 104 may be rotatable connected to surface cleaning head 102, such as by a swivel connection, so as to enable a user to steer the surface cleaning head using the upper section.

Upper section may comprise a hand grip portion 444 and a handle or drive shaft 442. Drive shaft 442 may be telescopic and/or it may be useable as an above floor cleaning wand and/or it may provide electrical cord storage and/or auxiliary cleaning tool storage and/or it may be used to hang the surface cleaning apparatus on a wall when not in use In the embodiment illustrated, the surface cleaning apparatus 100 is an all in the head type vacuum cleaner in which the functional or operational components for the transport and treatment of fluid (e.g., air) entering the dirty air inlet of the vacuum cleaner (such as, for example, the suction motor, air treatment member, filters, motors, etc.) are all contained within the surface cleaning head 102 portion of surface cleaning apparatus 100. Providing the functional air flow components within the surface cleaning head may help reduce the size and/or weight of the upper portion. Providing the functional components within the surface cleaning head may also help lower the centre of gravity of the surface cleaning apparatus. Accordingly, the hand weight experienced by a user operating surface cleaning apparatus 100 is reduced.

In some embodiments, the surface cleaning head may also be configured to accommodate functional components that do not form part of the air flow path, such as, for example, brush motors, brushes, on board energy storage systems, controllers and other components.

Alternatively, while being free from air flow components, the upper section may include some components, such as, for example, height adjustment mechanisms, electrical cord connections, electrical cord storage members, handle, actuators, steering components and other functional, on board energy storage systems, but non-airflow related components of the surface cleaning apparatus.

Figure 8:
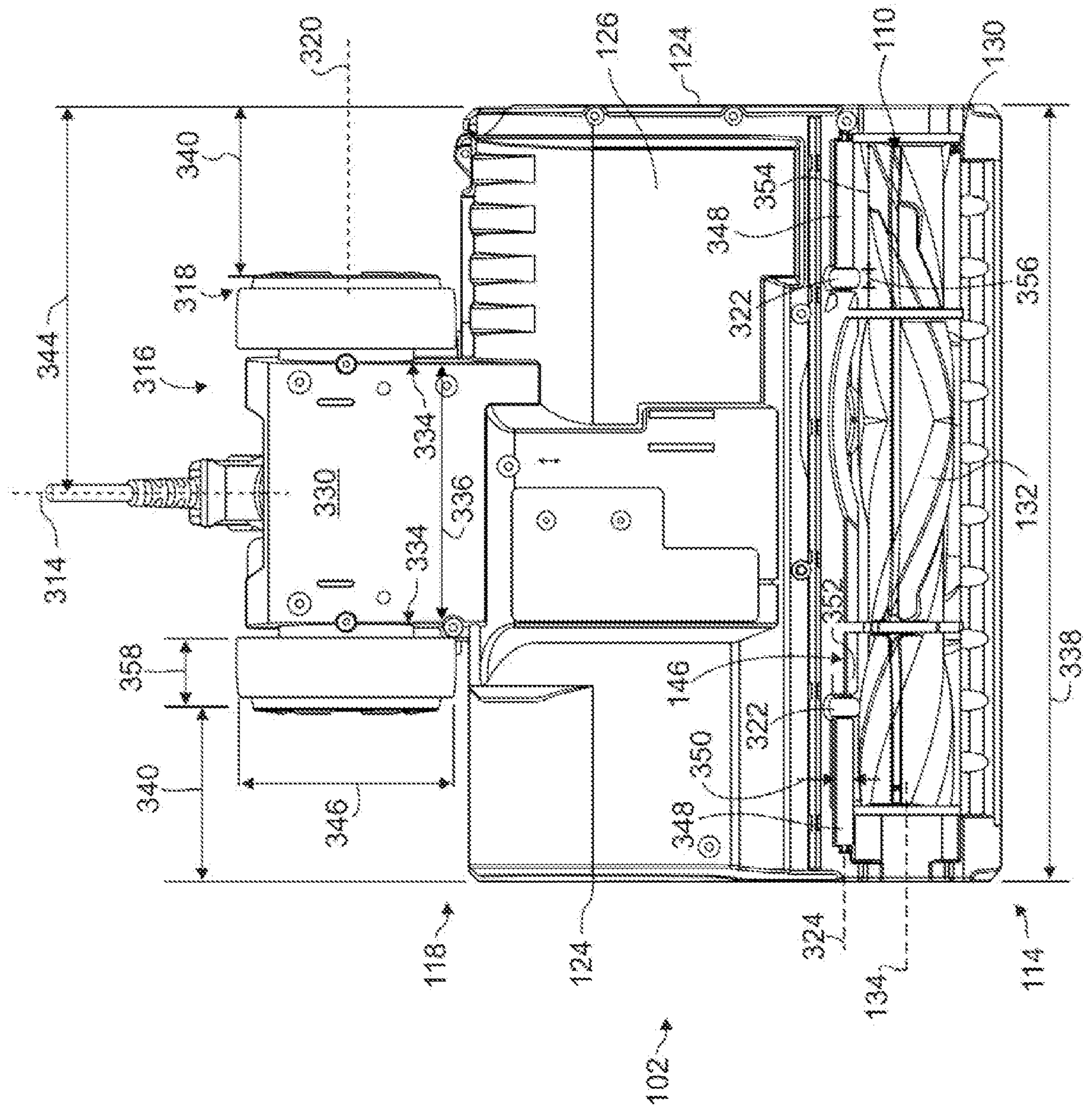
FIG. 8 is bottom view of the surface cleaning apparatus of FIG. 1.
Figure 9:
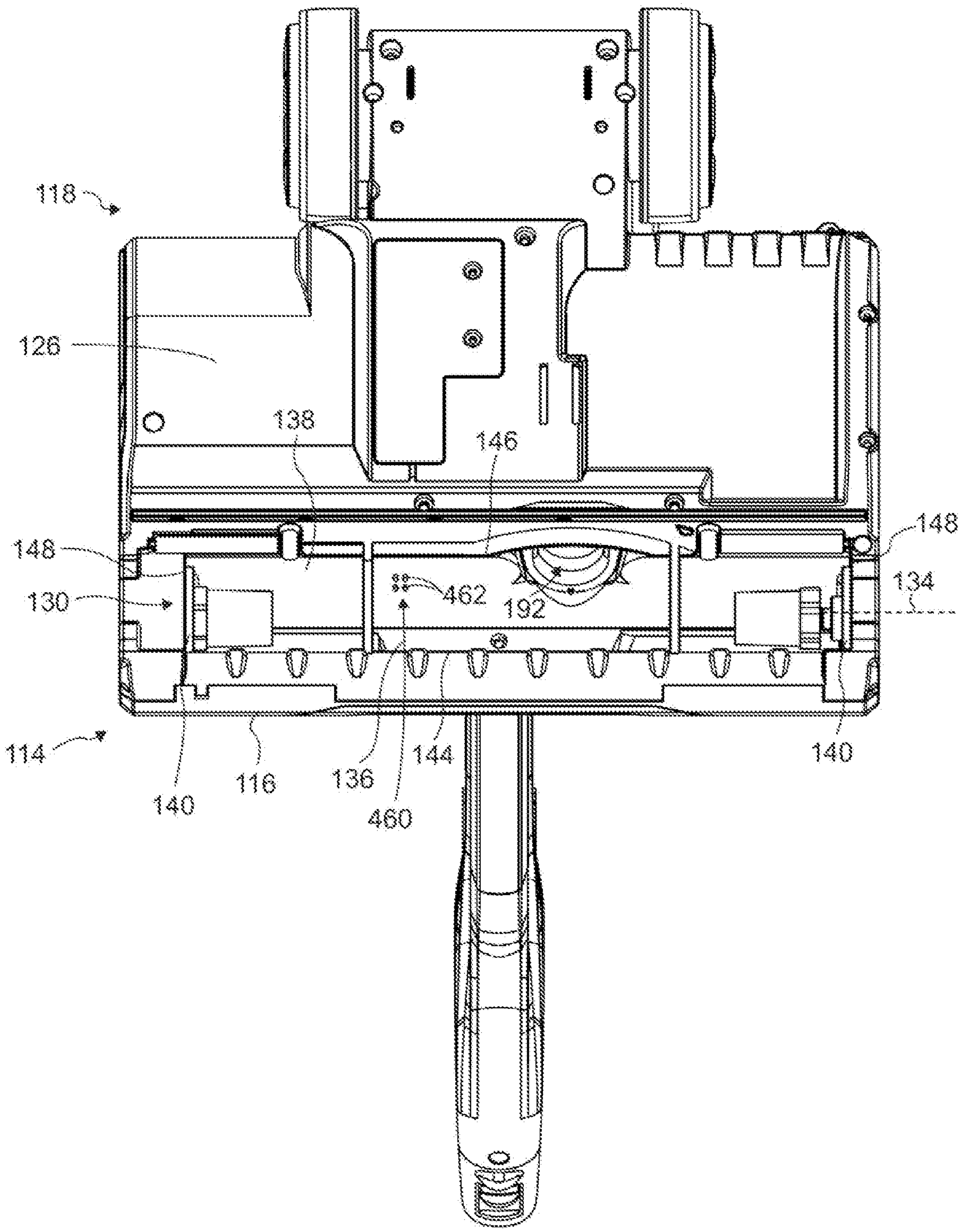
FIG. 9 is bottom view of the surface cleaning apparatus of FIG. 1 with a rotating brush removed.
Figure 10:
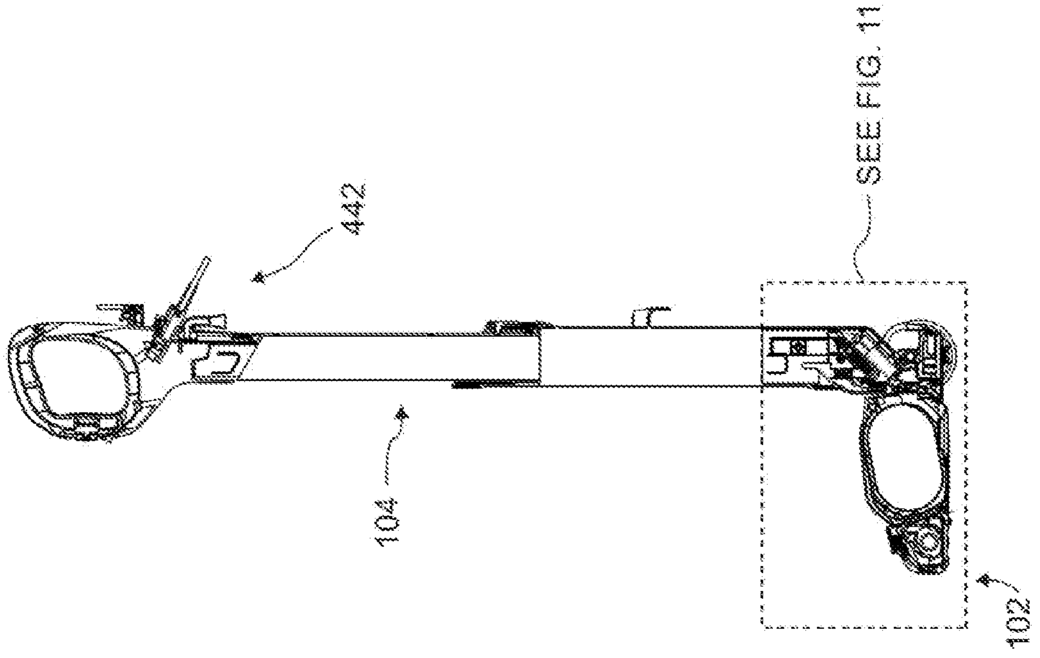
FIG. 10 is cross-sectional view of the surface cleaning apparatus of FIG. 1, taken along line 10-10.
Figure 13:
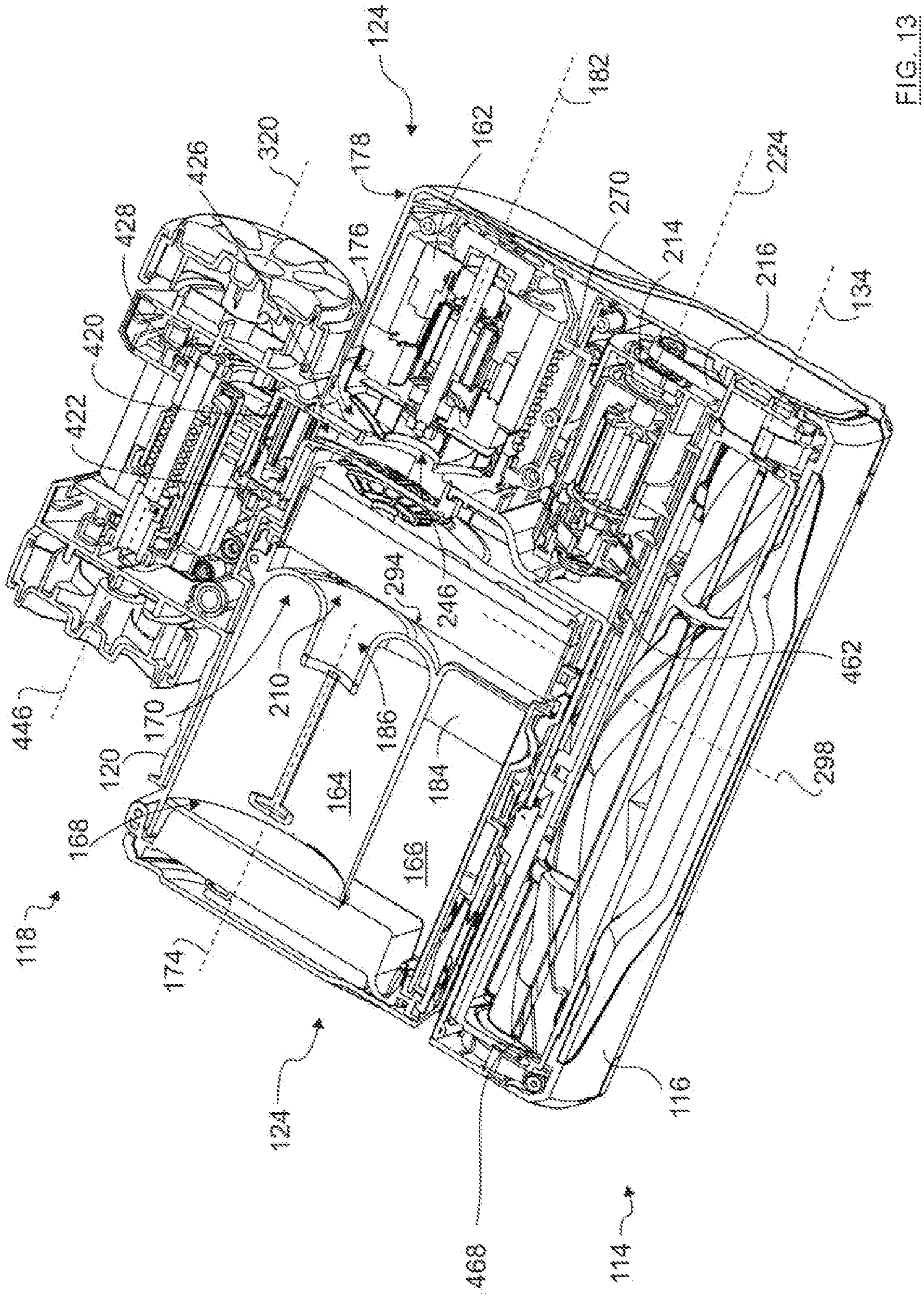
FIG. 13 is cross-sectional view of the surface cleaning apparatus of FIG. 1, taken along line 13-13, which is shown in FIG. 4.

Referring to FIG. 13, in the illustrated example, the surface cleaning head includes a front end 114 having a front face 116, a rear end 118 spaced rearwardly from the front end and having a rear face 120 and a pair of side faces 124 that are laterally spaced apart from each other and extend from the front face 116 to the rear face 120. Referring to FIGS. 8 and 9, the surface cleaning head 102 also has a bottom face 126 that is extends between the front end 114, rear end 118 and side faces 124. The bottom face 126 is positioned to face the surface being cleaned when the surface cleaning apparatus 100 is in use.

Figure 7:
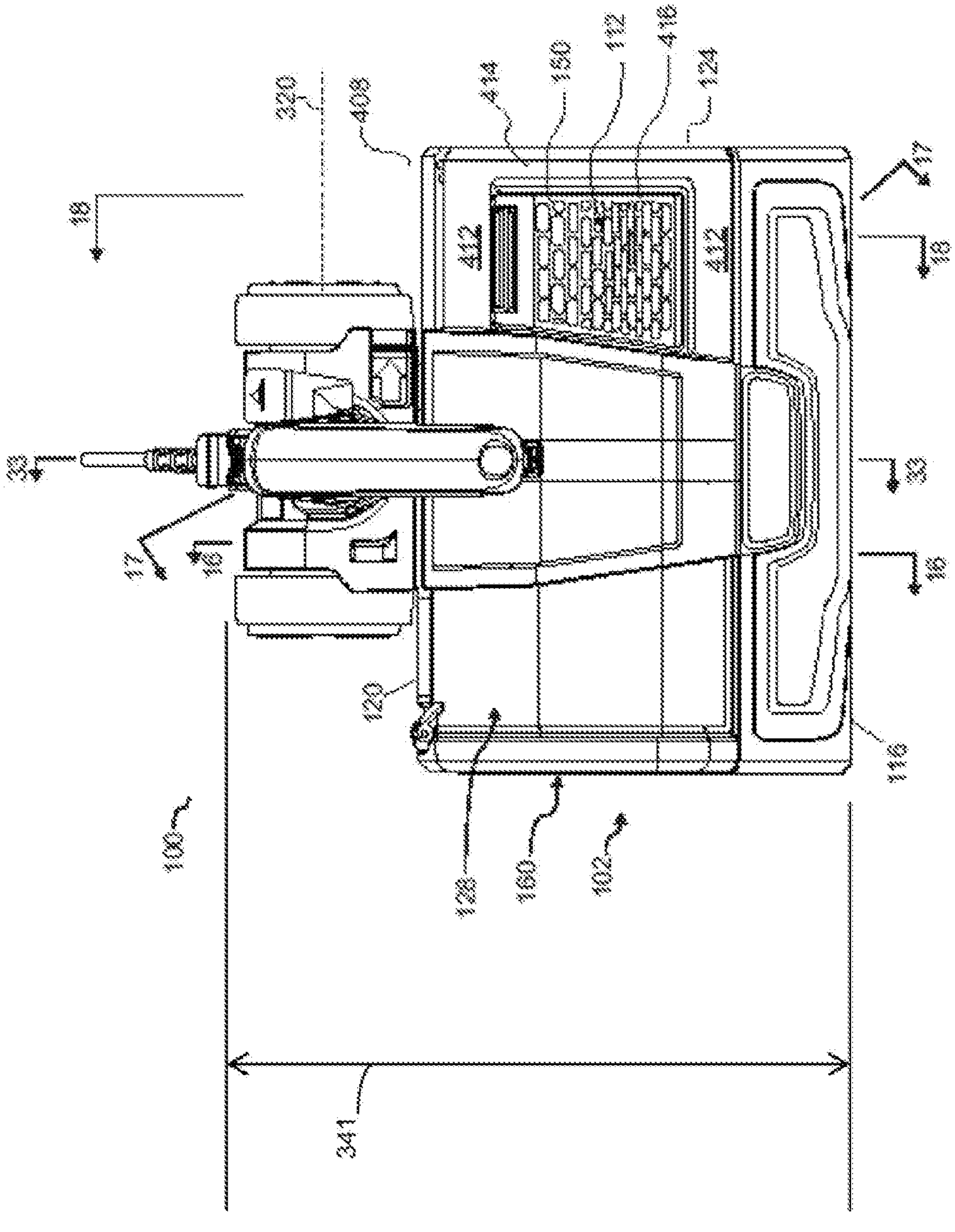
FIG. 7 is a top view of the surface cleaning apparatus of FIG. 1.

Referring to FIG. 7, a top face 128 generally is spaced apart from and overlies the bottom face 126 (FIG. 8). Together, the front face 116, rear face 120, side faces 124, bottom face 126 and top face 128 co-operate to bound an interior of the surface cleaning head 102, which, in the illustrated example, is configured to house the functional components of the air flow path of the surface cleaning apparatus. Preferably, in an all in the head type vacuum cleaner, the surface cleaning head includes the dirty air inlet 110 and the clean air outlet 112. The surface cleaning apparatus 100 has an overall depth 341, measured in the forward/backward direction. The overall depth 341 may be any suitable depth that is sufficient to accommodate the components of the surface cleaning apparatus, and may be less than about 20 inches, less than about 15 inches, less than about 10 inches, less than about 9 inches, less than about 8.5 inches, and optionally less than about 8 inches.

In the exemplified embodiment, surface cleaning head 102 has a generally rectangular footprint when viewed from above. It will be appreciated that front, rear and sides faces need not extend linearly and that surface cleaning head may be of various shapes.

As exemplified in FIGS. 8 and 9, the surface cleaning head 102 may include a brush chamber 130 that is configured to house a rotatable agitator brush 132. The brush 132 is shown within the brush chamber 130 in FIG. 8, and the brush chamber 130 is illustrated with the brush 132 removed in FIG. 9. The rotatable brush 132 may be rotatable about a brush axis 134 that may be generally orthogonal to the direction of travel 106 of the surface cleaning head 102. Alternately, or in addition, it will be appreciated that any other agitation or cleaning member known in the art may be used in place of, or in addition to, rotatable brush 132. Further, rotatable brush 132 may be any rotatable brush known in the art and may be driven by any drive means known in the art, such as a fan belt, direct drive, providing the brush motor internal of rotatable brush 132, an air driven turbine or the like.

Figure 17:
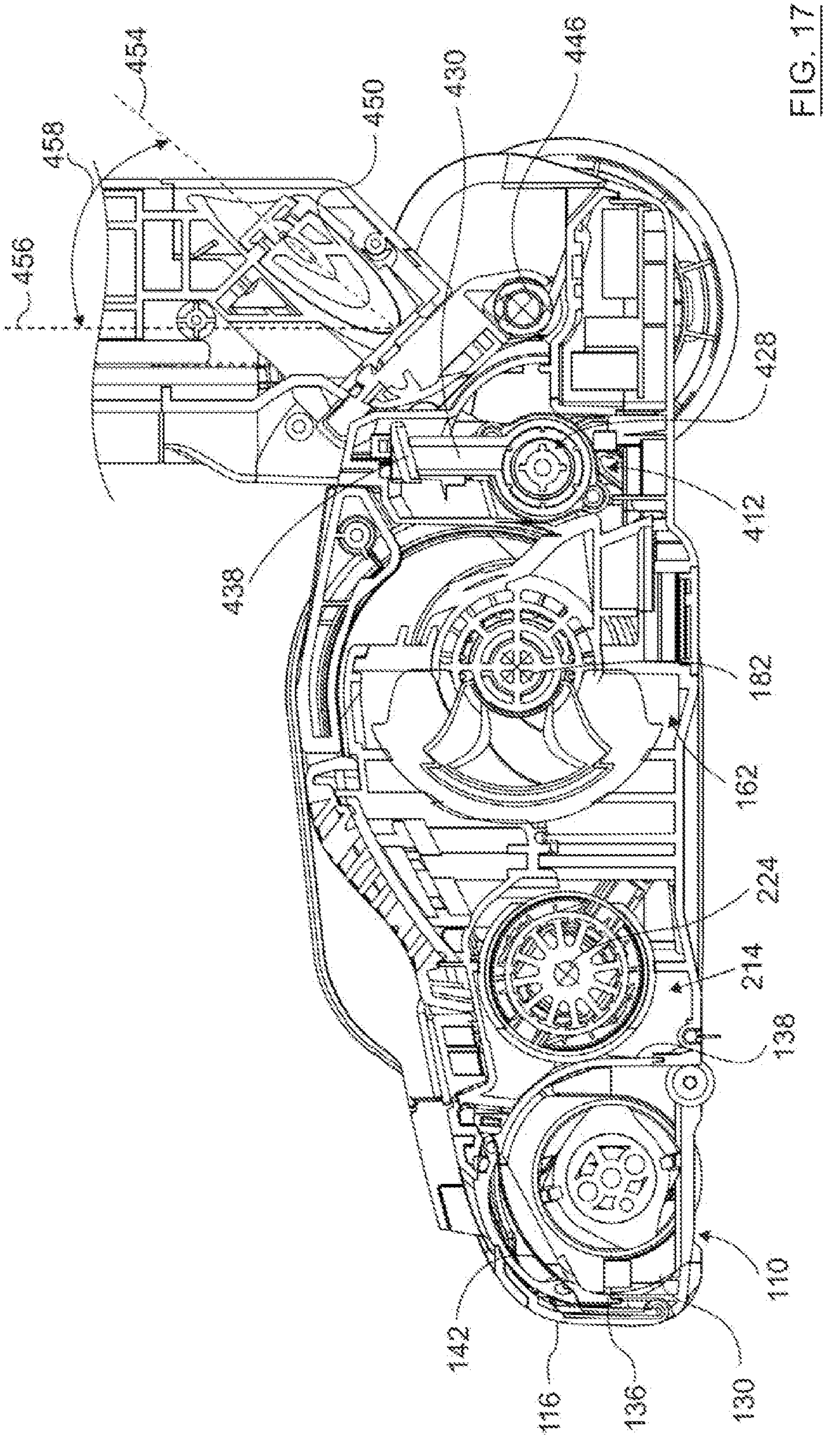
FIG. 17 is cross-sectional view of the surface cleaning apparatus of FIG. 1, taken along line 17-17, which is shown in FIG. 7.

As exemplified in the cross-sectional view of FIG. 17, the brush chamber 130 may include a front wall 136, a rear wall 138, two sidewalls 140 (FIG. 9) and a top wall 142. The brush chamber 130 may be located at the front 114 of the surface cleaning head 102, and, as in the illustrated embodiment, an outer surface of the front wall 136 of the brush chamber 130 may form at least a portion of the front face 116 of the surface cleaning head 102.

As exemplified, the bottom side of the brush chamber 130 is at least partially open and forms the dirty air inlet 110 of the surface cleaning apparatus 102. The open, bottom side of the brush chamber 130 is, in the example illustrated, bounded by a front edge 144, a rear edge 146 spaced behind the front edge 144, and a pair of side edges 148 extending therebetween. In the illustrated example the open bottom side of the brush chamber 130 is generally rectangular in shape, but alternatively could be configured in other shapes.

As exemplified, the brush chamber 130 may extend from the bottom face 126 to the top face 128 of the surface cleaning head 102, so that an outer surface of the top wall 142 of the brush chamber 130 forms part of the top face 128 of the surface cleaning head 102, and the open, bottom side of the brush chamber 130 forms part of the bottom face 126 of the surface cleaning head 102.

Figure 19:
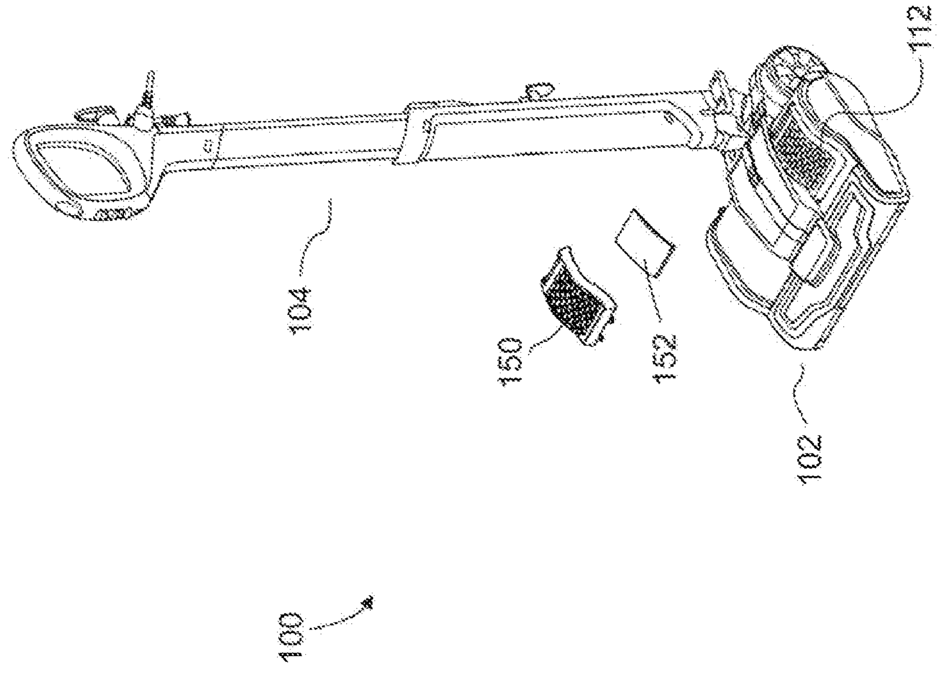
FIG. 19 is a partially exploded view of the surface cleaning apparatus of FIG. 1.

As exemplified in FIG. 7, the clean air outlet 112 may be provided on the upward facing, top face 128 of the surface cleaning head 102 and may be covered by a grill 150. Preferably, the grill 150 is removable (as shown in FIG. 19) to allow access to the clean air outlet 112. An advantage of this design is that treated air is directed away from the surface to be cleaned and away from a user (who is standing behind upper portion 104). Alternately clean air outlet 112 may direct treated air rearwardly.

Optionally a post-motor filter 152 may be provided upstream of the suction motor, such as at the clear air outlet 112, to filter air that has passed through the air treatment member and suction motor. As exemplified in FIG. 19, the filter 152 may be provided as a generally planar post-motor filter 152 made from foam and/or felt that is positioned beneath the grill 150. Removing the grill 150 provides access to the post-motor filter 152 for inspection and/or replacement. Optionally, instead of, or in addition to the felt filter 152, the post-motor filter may include one or more other filters or filtering media, including, for example, a HEPA filter, an electrostatic filter, a cyclonic post-motor filter or other suitable filter.

It will be appreciated that the forgoing is a general description of an all in the head vacuum cleaner. It will be appreciated that the actual size and shape of the surface cleaning head may depend upon which of the following aspects are included in the product design.

Removable Dirt Collection Chamber

The following is a description of a removable dirt collection chamber that may be used by itself in any surface cleaning apparatus or in any combination or sub-combination with any other feature or features disclosed herein. Optionally, the dirt collection chamber is removable as a sealed unit for emptying. An advantage of this design is that collected dirt will be contained within the dirt collection chamber as the dirt collection chamber is transported to a location, such as a garbage can, for emptying. Optionally, the dirt collection chamber may be part of a cyclone bin assembly and the cyclone bin assembly may be removable, preferably as a sealed unit.

Figure 12:
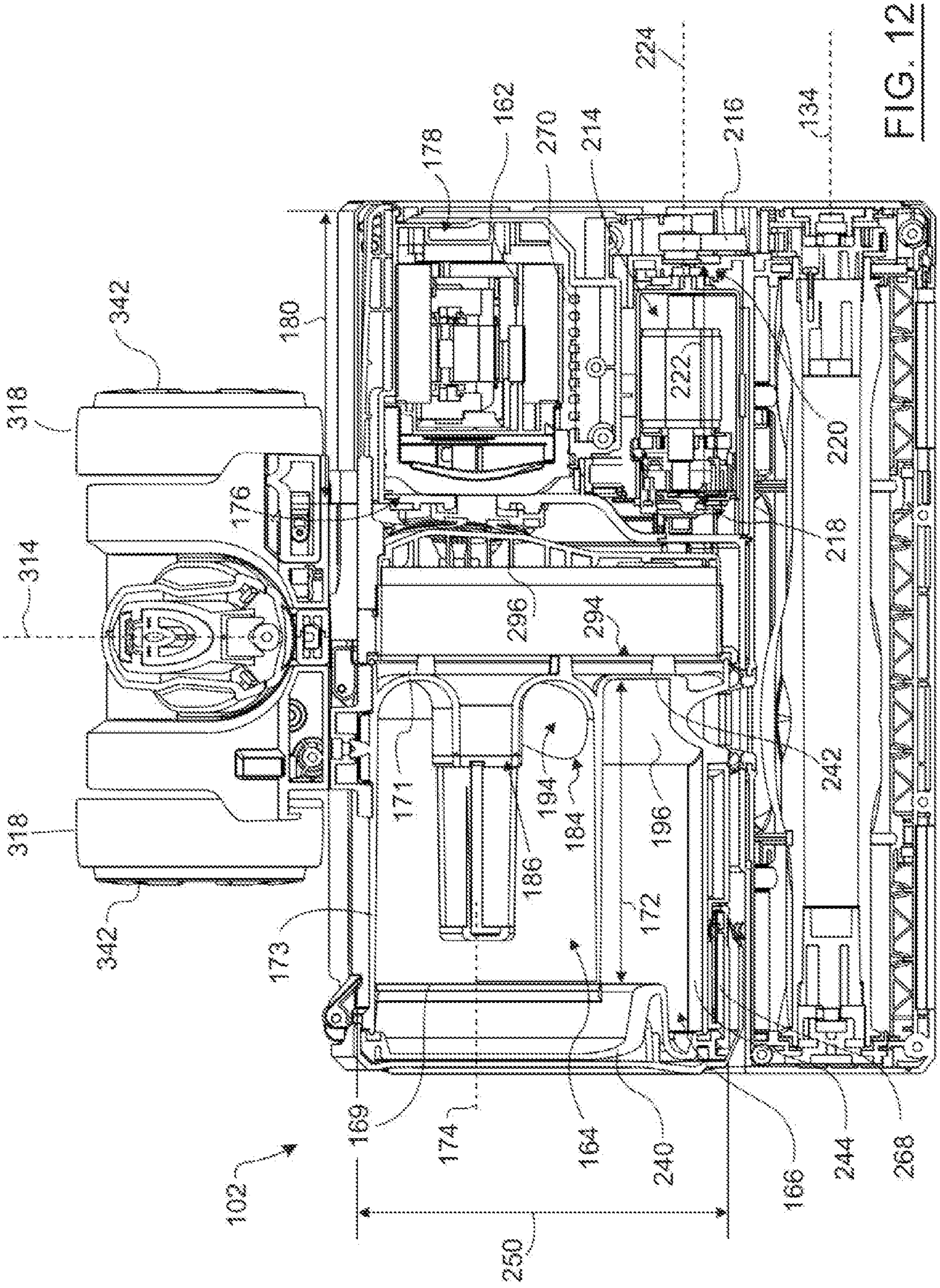
FIG. 12 is cross-sectional view of the surface cleaning apparatus of FIG. 1, taken along line 12-12, which is shown in FIG. 4.
Figure 20:
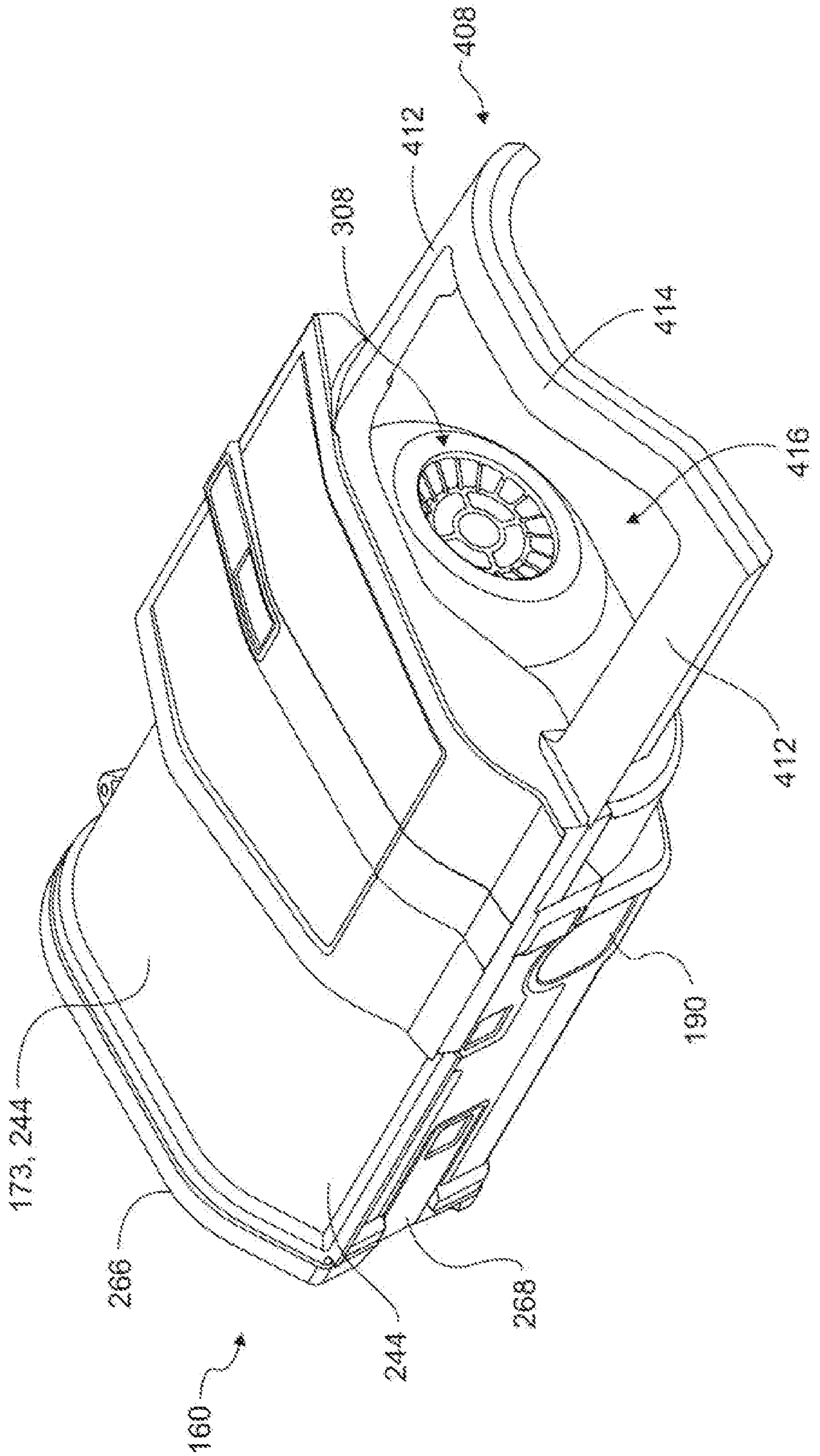
FIG. 20 is a perspective view of an example of a cyclone bin assembly useable with the surface cleaning apparatus of FIG. 1.
Figure 27:
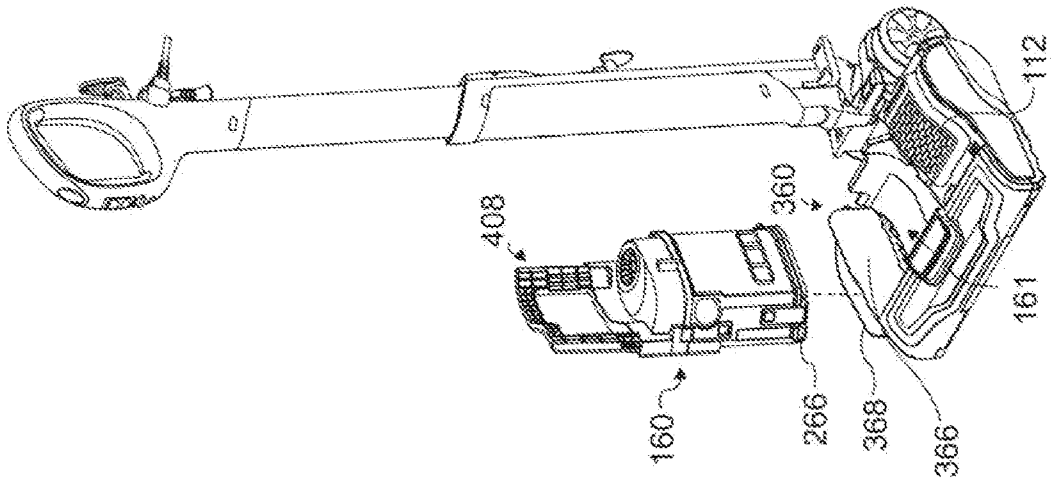
FIG. 27 is a front perspective view of the surface cleaning apparatus of FIG. 1 with the cyclone bin assembly detached.

Referring to FIGS. 12 and 13, which are cross-sectional views of the surface cleaning head 102, the surface cleaning head 102 includes an air treatment member in the form of a cyclone bin assembly 160 (see also FIGS. 1 and 20) positioned in the air flow path downstream from the dirty air inlet 110 and the brush chamber 130, and a suction motor 162 positioned downstream from the cyclone bin assembly 160. Preferably, the cyclone bin assembly 160 is detachable from the surface cleaning head 102. Referring to FIG. 20, the cyclone bin assembly 160 is illustrated in isolation, removed from the surface cleaning head 102. Referring to FIG. 27, the surface cleaning apparatus 100 is illustrated with the cyclone bin assembly 160 detached from the surface cleaning head 102. Providing a detachable cyclone bin assembly 160 may allow a user to carry the cyclone bin assembly 160 to a garbage can for emptying, without needing to carry or move the rest of the surface cleaning apparatus 100.

In the illustrated example, the surface cleaning head 102 includes a cavity 161 for releasably receiving the cyclone bin assembly 160. The cavity 161 is sized to receive at least a portion of the cyclone bin assembly 160 and, in the example illustrated, has a generally open top. This can allow portions of the cyclone bin assembly 160 to remain visible when the cyclone bin assembly 160 is mounted in the cavity 161. This can also allow a user to access the cyclone bin assembly 160 without having to open or remove a separate cover panel or lid. The absence of a cover panel may help reduce the overall weight of the surface cleaning apparatus 100, and may simplify the cyclone bin assembly 160 removal process. Optional cavity 161 designs and cyclone bin assembly removal processes are described in greater detail separately herein.

As exemplified in FIG. 7, when the cyclone bin assembly 160 is mounted to the surface cleaning head 102 a portion of the cyclone sidewall may form an upper surface of the cyclone bin assembly. Accordingly, the upper surface of the cyclone bin assembly remains exposed when attached to the surface cleaning head (there is no separate cover member, etc.) and the profile and curvature of the cyclone bin assembly defines the profile of a portion of the top face of the surface cleaning head. This profile may be selected so that it generally conforms to the shape of the suction motor housing, sidewalls and/or other portions of the surface cleaning head.

Figure 29:
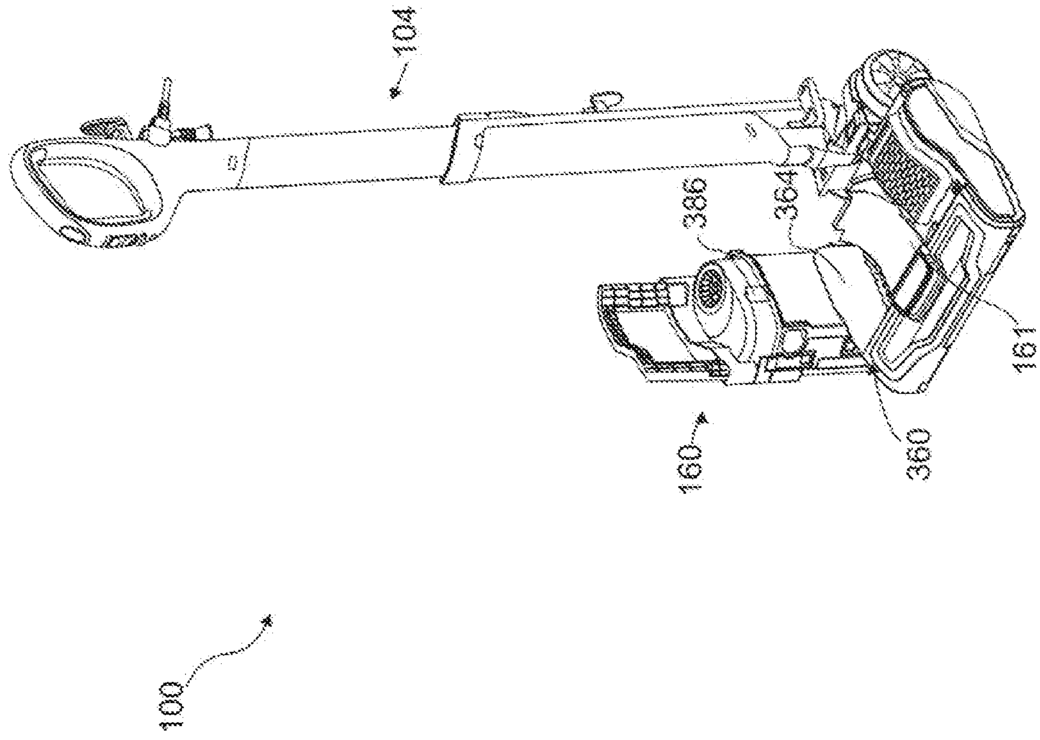
FIG. 29 is a front perspective view of the surface cleaning apparatus of FIG. 1 with the cyclone bin assembly in a removal position.
Figure 47:
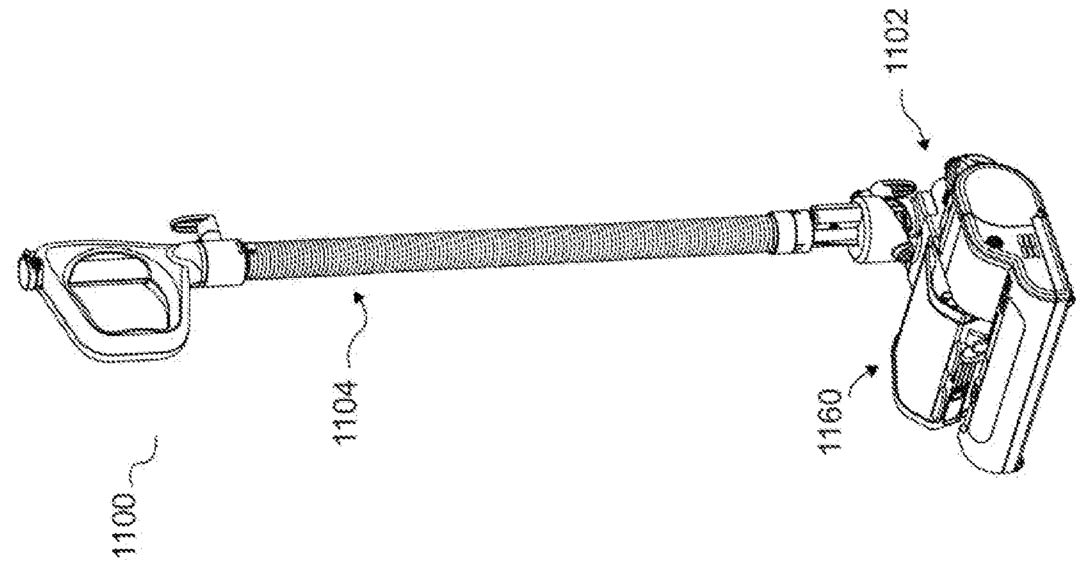
FIG. 47 is a front perspective view of the surface cleaning apparatus of FIG. 46, with the cyclone bin assembly in a removal position.
Figure 48:
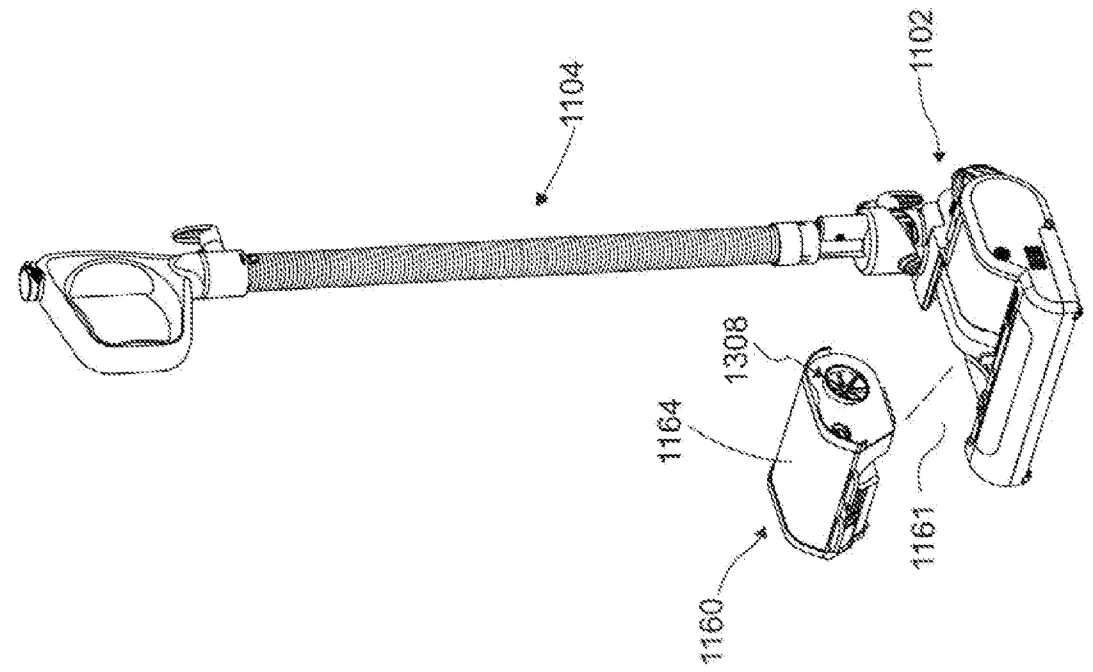
FIG. 48 is a front perspective view of the surface cleaning apparatus of FIG. 46, with the cyclone bin assembly removed.

The handle or handles that are used to carry the dirt collection chamber (e.g., the cyclone bin assembly handle) preferably does not extend beyond an outer wall of the surface cleaning head. Accordingly, the top surface of the surface cleaning head defines a maximum height of the surface cleaning head. If the handle were to extend upwardly, it could limit the extent to which the surface cleaning head could extend under furniture. As exemplified in FIGS. 1 and 46, the handle or handles for the cyclone bin assembly are received in a recess in the upper surface of the surface cleaning head such that the handles are mounted flush with the upper surface. It will be appreciated that the handles could be recessed inwardly when the cyclone bin assembly is in an in use position. Accordingly, the handle or handles may be useable once the cyclone bin assembly has been moved to a cyclone assembly removal position as exemplified in FIGS. 29 and 47.

It will be appreciated that some of the embodiments disclosed herein may not use any of the features of the dirt collection chamber disclosed herein and that, in those embodiments, the dirt collection chamber may be of various constructions and that in those embodiments any dirt collection chamber known in the art may be used.

Cyclone Bin Assembly

The following is a description of a cyclone bin assembly having various features, any or all of which may be used (individually or in any combination or sub-combination) in any surface cleaning apparatus or in any combination or sub-combination with any other feature or features disclosed herein.

Figure 25:
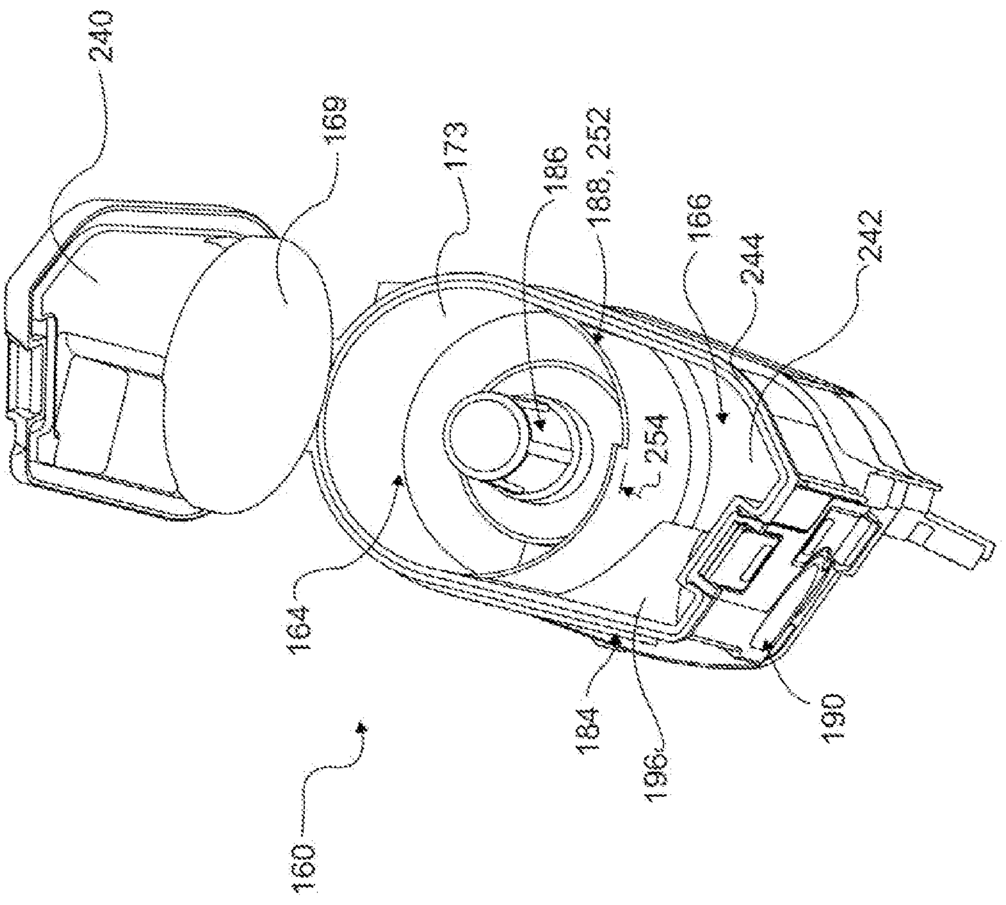
FIG. 25 is another perspective view of the cyclone bin assembly of FIG. 20 oriented with the cyclone chamber at the upper end, with the cyclone chamber door open.

Referring also to FIG. 25, in the illustrated example, the cyclone bin assembly 160 includes a cyclone chamber 164 and a dirt collection chamber 166. In the illustrated example, the dirt collection chamber 166 is external the cyclone chamber 164. In accordance with one feature of the cyclone bin assembly, dirt collection chamber 166 may be positioned forward and/or rearward of the cyclone chamber 164 and not on top of or below cyclone chamber 164. An advantage of this design is that by not positioning the dirt collection chamber above or below the cyclone chamber (or by reducing the height of the portion of the dirt collection chamber above or below the cyclone chamber) the height of the surface cleaning head 102 may be reduced without reducing the diameter of cyclone chamber 164 and/or the diameter of the cyclone chamber may be increased (thereby increasing the air flow rate through the vacuum cleaner) without increasing the height of the surface cleaning head.

Figure 14:
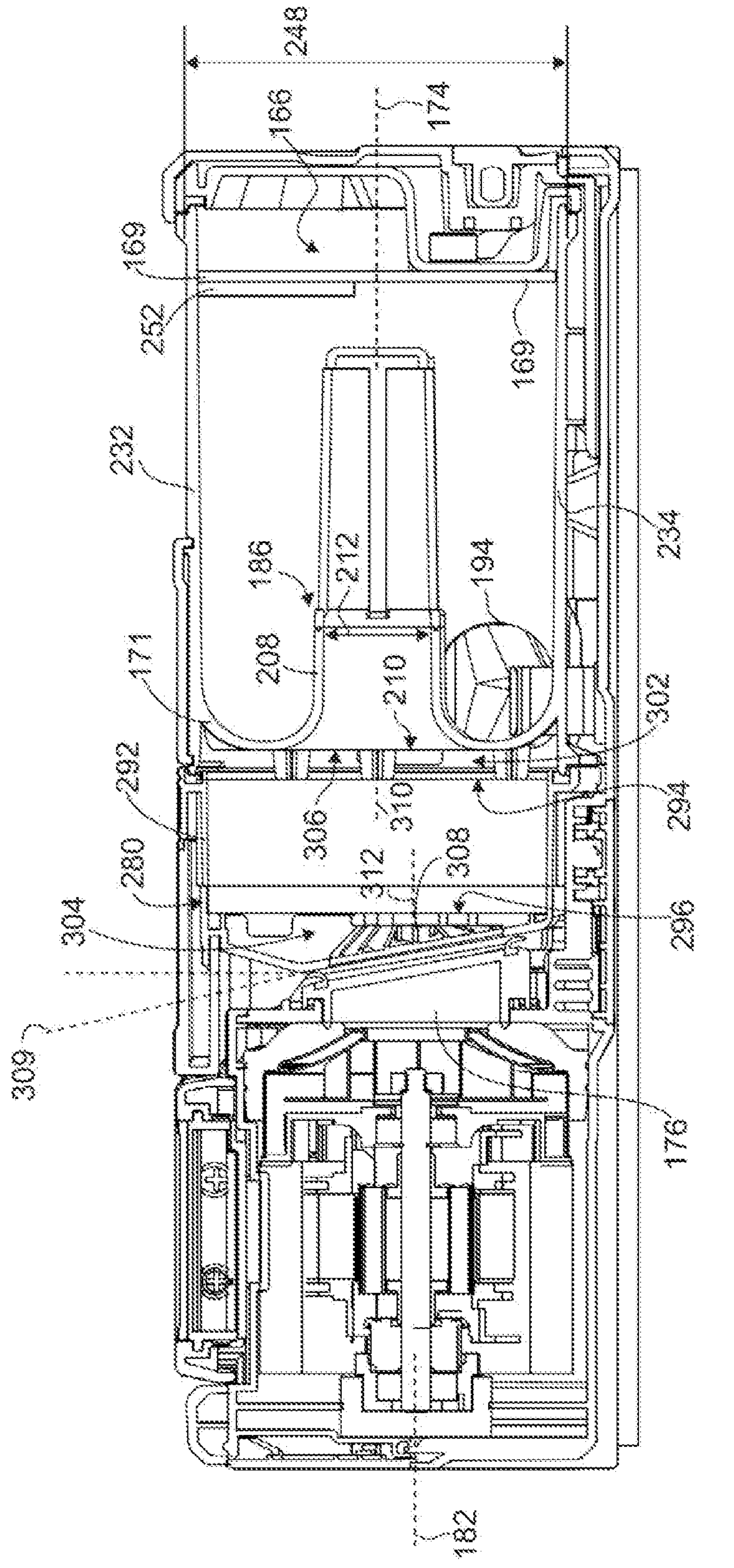
FIG. 14 is cross-sectional view of the surface cleaning apparatus of FIG. 1, taken along line 14-14, which is shown in FIG. 4.

In the illustrated example, the cyclone chamber 164 has a first cyclone end 168, with a first end wall 169, and a second cyclone end 170, with a second end wall 171. A generally cylindrical cyclone sidewall 173 extends between the first end wall 169 and the second end wall 171, spaced apart from each other by cyclone length 172 (FIG. 12) along a cyclone axis 174, about which air circulates. Referring also to FIG. 14, the cyclone chamber 164 also includes a cyclone air inlet 184, a cyclone air outlet 186 and a dirt outlet 188.

In accordance with another feature of the cyclone bin assembly, the air flow path from the brush chamber to the cyclone chamber may be constructed without any 90 degree bends. Reducing the number and degree of bends reduces the back pressure through the vacuum cleaner and thereby reduces the size of the suction motor (all other factors remaining the same) or increases the air flow rate through the vacuum cleaner if the size of the suction motor remains constant (all other factors remaining the same). For example, as exemplified in FIG. 16, the cyclone air inlet 184 may include an upstream or inlet end 190 that is connectable to a brush chamber air outlet 192 that may be provided in the rear wall 138 of the brush chamber 130. The cyclone air inlet 184 may also include a downstream end 194 that includes an opening formed in the cyclone sidewall 173, and a connecting portion 196 extending through the dirt collection chamber 166 between the upstream and downstream ends 190 and 194. The air flow connection between the brush chamber outlet 192 and the cyclone chamber 164 may form a first air flow path, which is a portion of the overall air flow path connecting the dirty air inlet 110 to the clean air outlet 112. Optionally, as exemplified, the first air flow path may be configured so that it is free from sharp corners and bends, so that the largest change of direction in the flow direction of the air flowing through the first air flow path is less than 90 degrees, and optionally may be less than about 70 degrees, less than about 60 degrees, less than about 45 degrees, less than 30 degrees and may be less than 15 degrees. In some embodiments, the largest change of direction in the flow direction of the air flowing through the first air flow path may be less than 5 degrees, and optionally, the first air flow path may be essentially linear.

Figure 16:
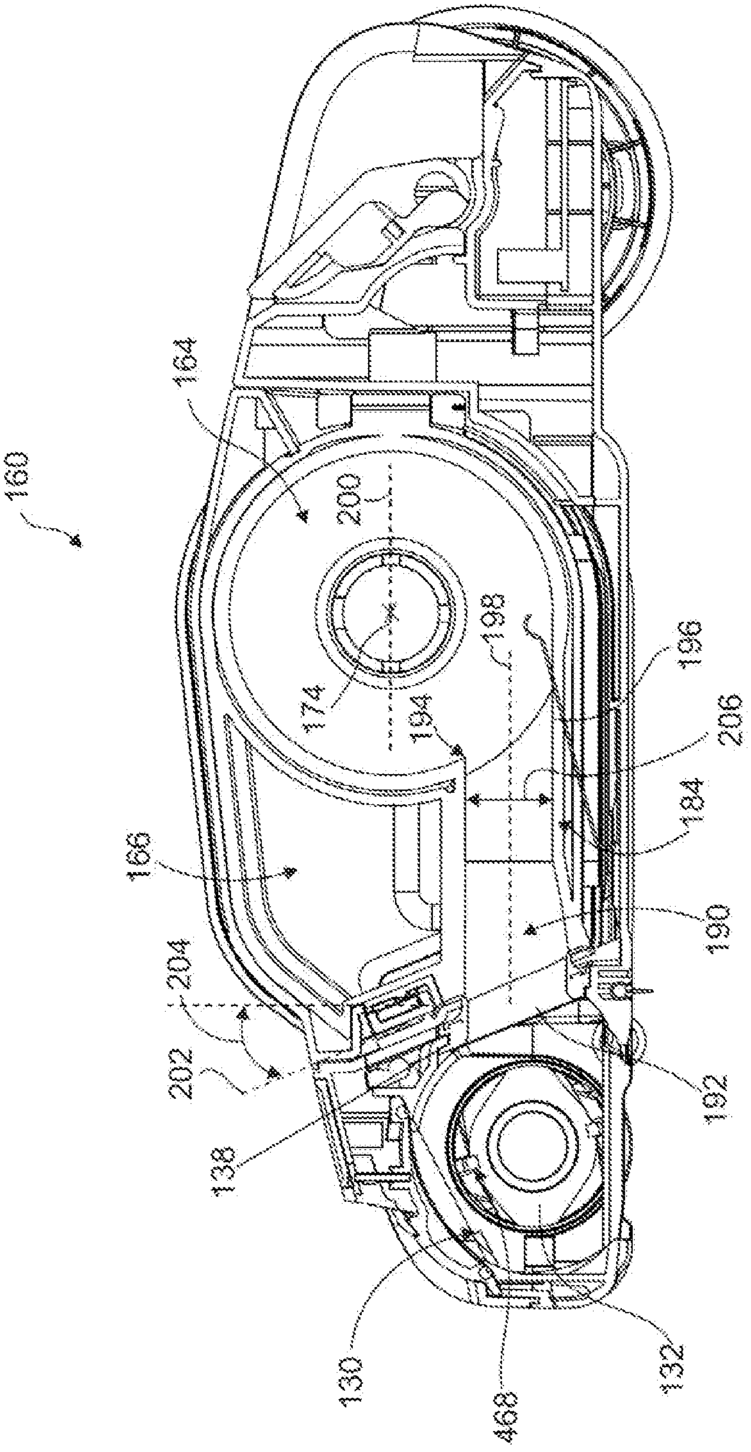
FIG. 16 is cross-sectional view of the surface cleaning apparatus of FIG. 1, taken along line 16-16, which is shown in FIG. 7.

Referring to FIG. 16, in the illustrated example, the connecting portion 196 extends along an inlet axis 198 which, in the example illustrated, is generally linear and extends generally in the forward/backward direction. In the illustrated example the first flow path is generally free from bends/corners and is essentially linear along its entire length (with the exception of minor variations in the wall diameter), from the opening 192 in the brush chamber rear wall 138 to the tangentially oriented opening 194 in the cyclone chamber sidewall 173. Providing a linear first air flow path may help reduce air flow losses as air flows through the first flow path. In addition, the first flow path is relatively short and provides a generally direct air flow path from the brush chamber 130 to the cyclone chamber 164. Providing a relatively short, direct air flow path may help reduce the likelihood of the air flow path becoming clogged by debris or otherwise blocked.

The cyclone air inlet 184 may be provided at any desired location on the cyclone chamber 164, and in the illustrated example is provided toward a bottom side of the cyclone chamber 164, below a horizontal plane 200 containing the cyclone axis 174. In this configuration, the inlet axis 198 intersects the cyclone chamber 164, the brush chamber 130 and the rotating brush 132.

In the illustrated example, the inlet end 190 of the cyclone air inlet 184 is integrally formed with the cyclone bin assembly 160. In this configuration, the inlet end 190 of the cyclone air inlet can be disconnected from the air outlet 192 of the brush chamber 130 and removed from the surface cleaning head with the cyclone bin assembly 160.

In accordance with another feature of the cyclone bin assembly, the inlet end 190 of the cyclone air inlet 184 and the air outlet 192 of the brush chamber 130 may be configured to meet each other in sealing plane 202 that is at an angle to the vertical. It will be appreciated that the surface cleaning apparatus 100 can be configured so that the sealing plane is vertical, horizontal or is at an angle relative to a vertical plane. In the illustrated example, the sealing plane 202 between the inlet end 190 of the cyclone air inlet 184 and the air outlet 192 of the brush chamber 130 is inclined forwardly and is aligned at an angle 204 relative to the vertical direction. This may help facilitate alignment and mating of the inlet end 190 of the cyclone air inlet 184 and the air outlet 192 of the brush chamber 130 when the cyclone bin assembly 160 is placed onto the surface cleaning head 102. It will be appreciated that one or both of the inlet end 190 and the air outlet 192 may be provided with a gasket, O-ring or the like.

A cross-sectional area of the air inlet 184 taken in a plane orthogonal to the inlet axis 198 can be referred to as the cross-sectional area or flow area of the air inlet 184. The cross-sectional shape of the air inlet 184 can be any suitable shape. In the illustrated example the air inlet 184 has a generally round or circular cross-sectional shape with a diameter 206. Optionally, the diameter 206 may be between about 0.25 inches and about 5 inches or more, preferably between about 1 inch and about 5 inches, more preferably is between about 0.75 and 2 inches or between about 1.5 inches and about 3 inches, and most preferably is about 2 to 2.5 inches or between about 1 to 1.5 inches. Alternatively, instead of being circular, the cross-sectional shape of the air inlet may be another shape, including, for example, oval, square and rectangle.

Referring to FIGS. 13 and 14, in the illustrated example, the cyclone air outlet 186 includes a vortex finder portion 208 in communication with an aperture 210 (see also FIG. 23) that is generally centrally located on the second end wall 172 of the cyclone chamber 164. A cross-sectional area of the aperture 210 taken in a plane orthogonal to the cyclone axis 174 can be referred to as a cross-sectional area or flow area of the cyclone air outlet 186. The perimeter of vortex finder portion 208 defines a cross-sectional shape of the air outlet. The cross-sectional shape of the air outlet can be any suitable shape. In the illustrated example the air outlet has a generally round or circular cross-sectional shape with a diameter 212. Optionally, the diameter 212 may be between about 0.25 inches and about 5 inches or more, preferably between about 1 inch and about 5 inches, more preferably is between about 0.75 and 2 inches or between about 1.5 inches and about 3 inches, and most preferably is about 2 to 2.5 inches or between about 1 to 1.5 inches. Alternatively, instead of being circular, the cross-sectional shape of the air inlet may be another shape, including, for example, oval, square and rectangle.

In accordance with another feature of the cyclone bin assembly, the cross sectional area of the cyclone air inlet 184 and the cyclone air outlet 186 may be selected to reduce back pressure through the vacuum cleaner. Accordingly, the cross-sectional or flow area of the cyclone air outlet 186 may be between about 50% and about 150% and between about 60%-120% and about 90%-110% of the cross-sectional area of the cyclone air inlet 184, and preferably is generally equal to the area of cyclone air inlet 184. In this configuration, the air outlet diameter 212 may be about the same as the air inlet diameter 206 (FIG. 16).

The dirt collection chamber may be of any suitable configuration. Preferably, as exemplified in FIG. 12, the dirt collection chamber 166 is exterior to cyclone chamber 164, and preferably includes a first end wall 240, a second end wall 242 and the sidewall 244 extending therebetween. Referring also to FIG. 25, in the illustrated example, the sidewall 244 partially laterally surrounds the cyclone chamber 164. At least partially positioning the dirt collection chamber 166 forward or rearward of the cyclone chamber 164 may help reduce the overall height of the surface cleaning head. As illustrated in the present example, the cyclone chamber sidewall 173 may be coincident with the sidewall 244 at one or more locations around its perimeter. Optionally, portions of the dirt chamber sidewall 244 can form portions of the outer or exposed surface of the surface cleaning apparatus 100 when the cyclone bin assembly 160 is mounted in the cavity 161.

In the illustrated example, a majority of the dirt collection chamber 166 is located in front of (i.e. forward of) the cyclone chamber 164 in the direction of travel of the surface cleaning head 102, between the cyclone chamber 164 and the brush chamber 130. In some configurations, the rear portions of the cyclone sidewall 173 and dirt collection chamber sidewall 244 may be coincident, and the front portion of the cyclone sidewall 173 may be spaced apart from the front portion of the dirt collection chamber sidewall 244. Locating the cyclone chamber 164 toward the back of the cyclone bin assembly 160 may help align the cyclone air outlet 186 with the air inlet 246 (FIGS. 13 and 30) of the suction motor 162. Locating the dirt collection chamber 166 forward of the cyclone chamber 164 may help make the dirt collection chamber 166 more easily viewable by a user (particularly if some or all of the dirt collection chamber sidewall 244 is transparent and there is no lid or the lid is transparent), which may allow a user to inspect the condition of the dirt collection chamber 166 without having to remove the cyclone bin assembly 160 from the cavity 161.

In the illustrated example, the dirt collection chamber 166 is located solely in front of the cyclone chamber 164 and does not extend above or below the cyclone chamber (as viewed when the cyclone bin assembly is mounted to the surface cleaning head in FIG. 16). It will be appreciated that small portions of the dirt collection chamber may be positioned above or below the cyclone chamber without significantly deviating from the advantage of this feature. In this configuration, the overall height 248 of the cyclone bin assembly 160 (measured in a vertical direction when the cyclone bin assembly is mounted to the surface cleaning head) is generally equal to the outer diameter of the cyclone chamber 164 (i.e. including the wall thicknesses), while the overall width 250 (FIG. 12) of the cyclone bin assembly 160 (measured in the front/back direction when the cyclone bin assembly is mounted to the surface cleaning head) is greater than the cyclone diameter. Providing the dirt collection chamber 166 only in front of the cyclone chamber 164 may help reduce the overall height 248 of the cyclone bin assembly 160 while still providing a dirt collection chamber 166 with a practical internal storage volume. Reducing the overall height 248 of the cyclone bin assembly 160 may help reduce the overall height 339 (FIG. 6) of the surface cleaning head 102 when the cyclone bin assembly 160 is in the cavity 161. Preferably, the overall height 339 of the surface cleaning head 102 is less than about 15 inches, and may be less than about 10 inches, less than about 8 inches, less than about 6 inches, less than about 5 inches, less than about 4.5 inches and optionally less than 4 inches. In the illustrated example, the overall height 339 is about 4.5 inches.

Alternatively, the cyclone bin assembly may be configured so that the dirt collection chamber is located entirely behind the cyclone chamber (i.e. between the cyclone chamber and the rear face of the surface cleaning head), or is located partially in front of and partially behind the cyclone chamber and so that the dirt collection chamber extends partially or entirely above and/or below the cyclone chamber.

Cyclone chamber 164 may be in communication with a dirt collection chamber 166 by any suitable cyclone dirt outlet known in the art. Preferably the cyclone chamber includes at least one dirt outlet in communication with the dirt chamber that is external the cyclone chamber. Referring to FIGS. 14 and 25, in accordance with another feature of the cyclone bin assembly, the cyclone dirt outlet 188 may be in the form of a slot 252 bounded by the cyclone side wall 173 and the cyclone end wall 169, and is located toward the first end 168 of the cyclone chamber 164. Alternatively, in other embodiments, the dirt outlet may be of any other suitable configuration, and may be provided at another location in the cyclone chamber, including, for example as an annular gap between the sidewall and an end wall of the cyclone chamber or an arrestor plate or other suitable member.

Figure 26:
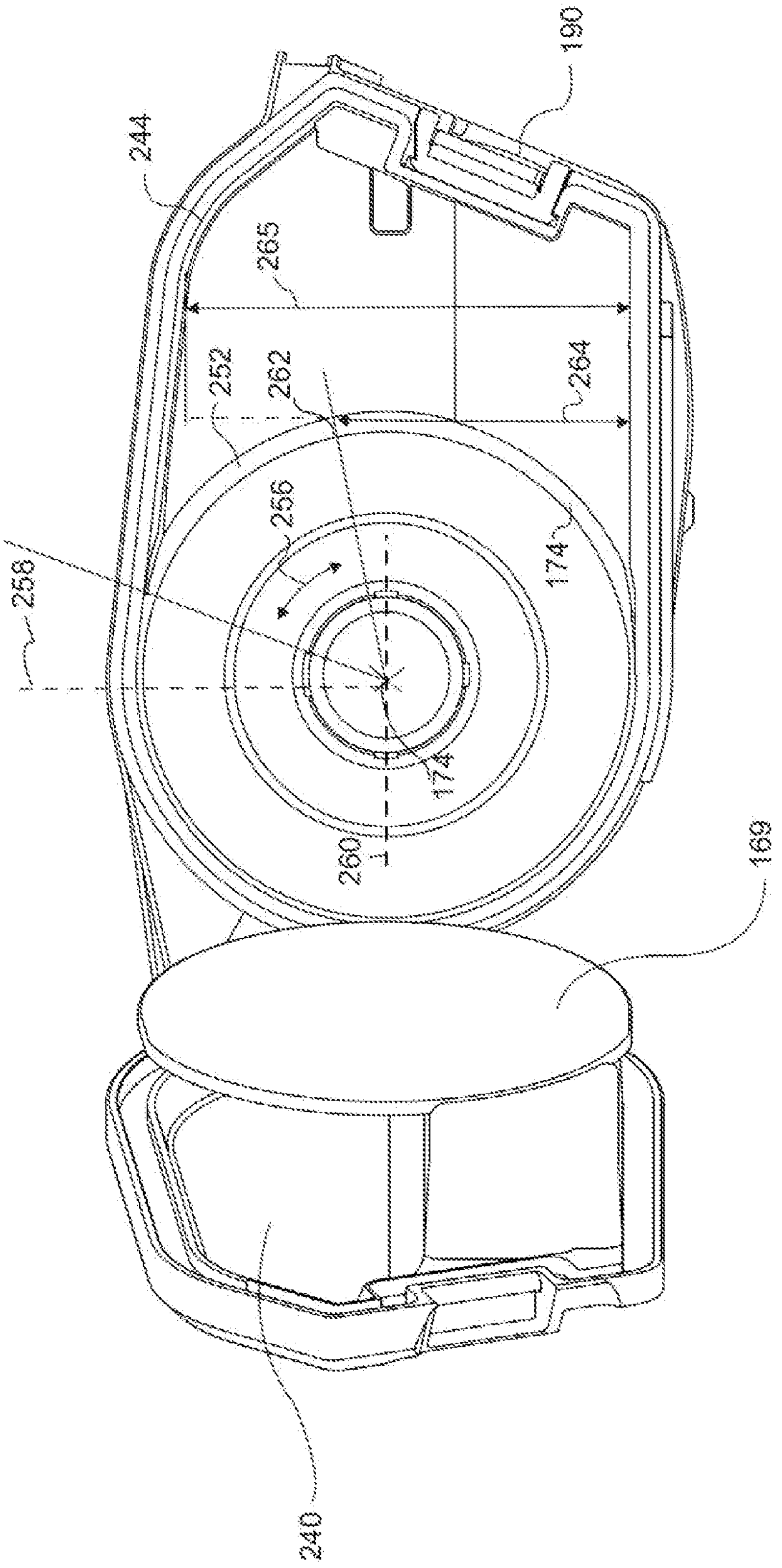
FIG. 26 is an end view of the cyclone bin assembly of FIG. 20 in the configuration of FIG. 25.

Referring to FIG. 25, the slot 252 may be of any suitable height 254 (measured in the direction of the cyclone axis) and may have any suitable angular extent 256 (FIG. 26). In the illustrated example, the height 254 may remain generally constant along the extent of the slot 252, and may be between about 0.25 cm and about 15 cm, and preferably is between about 0.75 cm and about 5 cm, and more preferably is about 1 cm. The cyclone chamber height 174 may be any suitable height, including between about 5 cm and about 20 cm, preferably between about 7 cm and about 15 cm and in the illustrated example is about 9 cm. Optionally, the height of the slot 252 may be selected so that it is between about 5% and about 20% of the cyclone height 174, and preferably is between about 7% and about 12% of the cyclone height.

Referring to FIG. 26, in the illustrated example, the slot 252 subtends an angle 256 of approximately 60 degrees, which is about 20% of the perimeter of the cyclone chamber sidewall 173. Alternatively, in other embodiments the slot may extend between about 10 degrees and about 350 degrees, and may occupy between about 2.75% and about 97.5% of the perimeter of the cyclone chamber.

The slot 252 may be provided at any desired location around the perimeter of the cyclone chamber 164. Referring to FIG. 26, in the illustrated example the slot 252 is provided toward the front of the cyclone chamber 164 (i.e. forward of a vertical plane 258 containing a centrally located cyclone axis 174) in a location that is in communication with the forward-located dirt chamber 166. The slot 252 is also positioned so that it is in the upper half of the cyclone chamber 164 (i.e. above a horizontal plane 260 that contains the centrally located cyclone axis 174—when the cyclone bin assembly is mounted to the surface cleaning head). In this configuration, the lower end 262 of the slot 252 is at least partially upward facing and is spaced apart from the underlying portion of the dirt chamber sidewall by an outlet height 264. In the illustrated example, the slot height is about 60% of the dirt collection chamber height 265 taken at the same location, and in other embodiments may be between about 35% and about 80% of the dirt collection chamber height 265. Spacing the lower end 262 of the slot 252 a suitable distance above the bottom of the dirt collection chamber 166 (when the cyclone bin assembly is in use) may help prevent the slot 252 from becoming blocked as debris accumulates within the dirt collection chamber 166.

Optionally, in accordance with another feature of the cyclone bin assembly, to help facilitate emptying the dirt collection chamber, at least one of or both of the end walls may be openable. Similarly, one or both of the cyclone chamber end walls and may be openable to allow a user to empty debris from the cyclone chamber.

Figure 21:
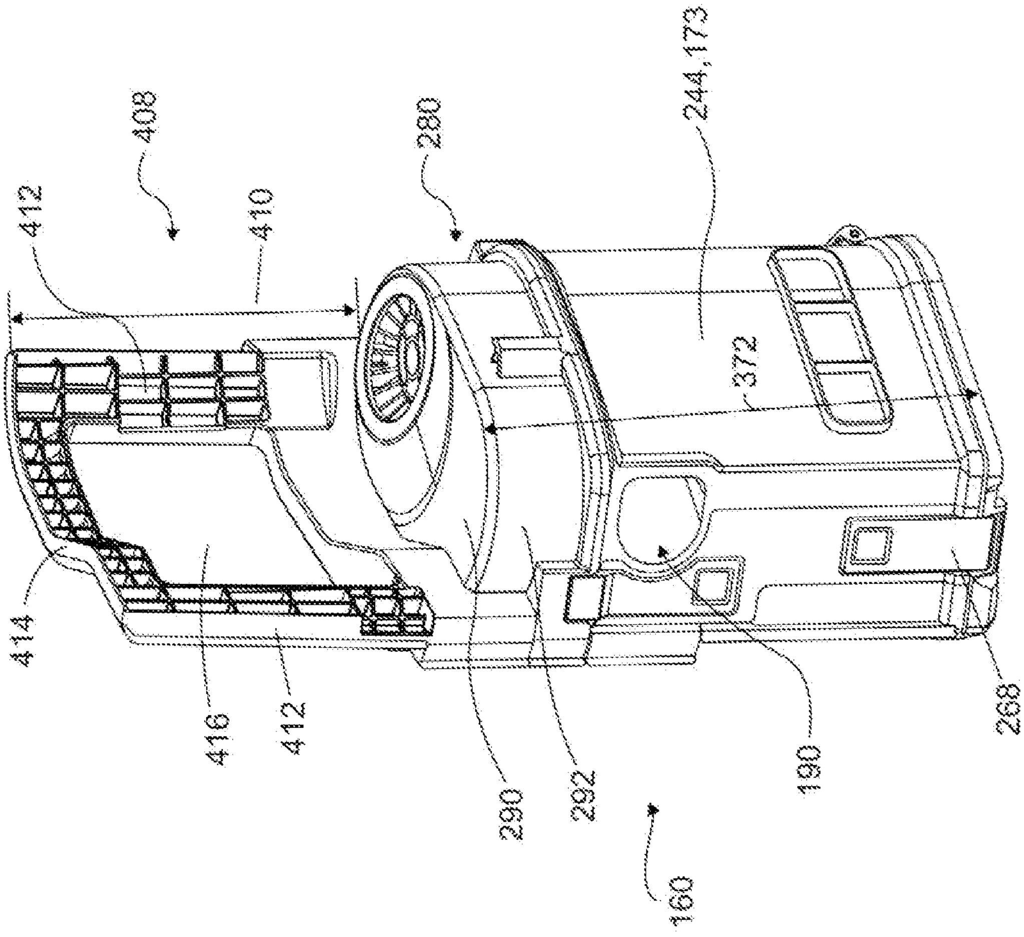
FIG. 21 is another perspective view of the cyclone bin assembly of FIG. 20 oriented with the filter chamber at the upper end.
Figure 22:
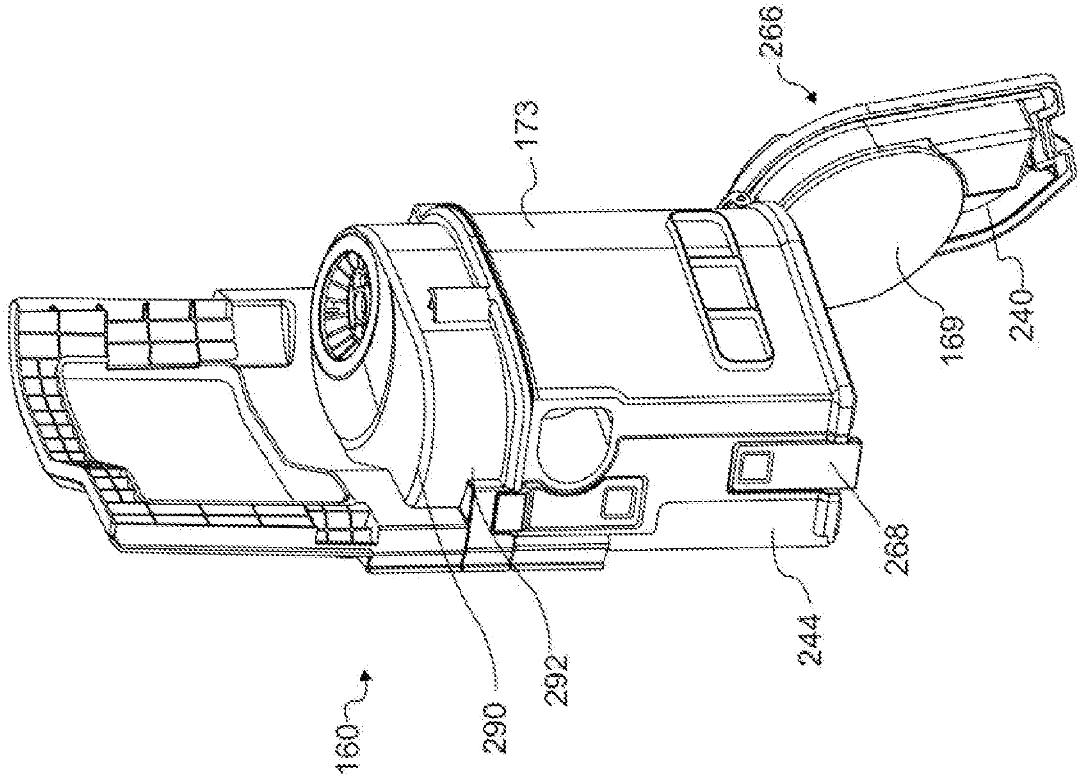
FIG. 22 is a perspective view of the cyclone bin assembly of FIG. 21 with a cyclone chamber door open.

Referring to FIG. 22, in the illustrated example, the dirt chamber end wall 240 is openable to empty the dirt collection chamber 166. The first cyclone end wall 169 is mounted to, and openable with, the cyclone chamber end wall 240 and together both form part of the openable door 266 of the cyclone bin assembly 160. The door 266 is moveable between a closed position (FIG. 21) and an open position (FIG. 22). When the door 266 is open, both the cyclone chamber 164 and the dirt collection chamber 166 can be emptied concurrently. Alternatively, the end walls of the dirt collection chamber and the cyclone chamber need not be connected with each other, and the dirt collection chamber may be openable independently of the cyclone chamber.

Preferably, the openable door 266 can be can be secured in its closed position until opened by a user. The door 266 may be held closed using any suitable latch or fastening mechanism, such as latch 268. Optionally, the latch can be provided in a location that is inaccessible when the cyclone bin assembly is mounted to the surface cleaning head. This may help prevent the door from being opened inadvertently. In the illustrated example, when the cyclone bin assembly 160 is mounted in the cavity 161 the latch 268 is disposed between the dirt chamber sidewall 244 and the brush chamber 230 (see FIG. 12) and is inaccessible to the user.

In the illustrated example, portions of the cyclone chamber sidewall 173 coincide with portions of the dirt chamber sidewall 244 and form portions of the outer, exposed surface of the cyclone bin assembly 160. Further, when the cyclone bin assembly 160 is attached to the surface cleaning head 102, portions of the outer surface of the cyclone bin assembly 160 provides portions of the top face 128 of the surface cleaning head 102.

It will be appreciated that some of the embodiments disclosed herein may not use any of the features of the cyclone bin assembly disclosed herein and that, in those embodiments, the cyclone bin assembly may be of various constructions and that in those embodiments any cyclone bin assembly known in the art may be used.

Accessing the Pre-Motor Filter Chamber

The following is a description of methods of accessing a pre-motor filter chamber that may be used by itself in any surface cleaning apparatus or in any combination or sub-combination with any other feature or features disclosed herein.

Figure 24:
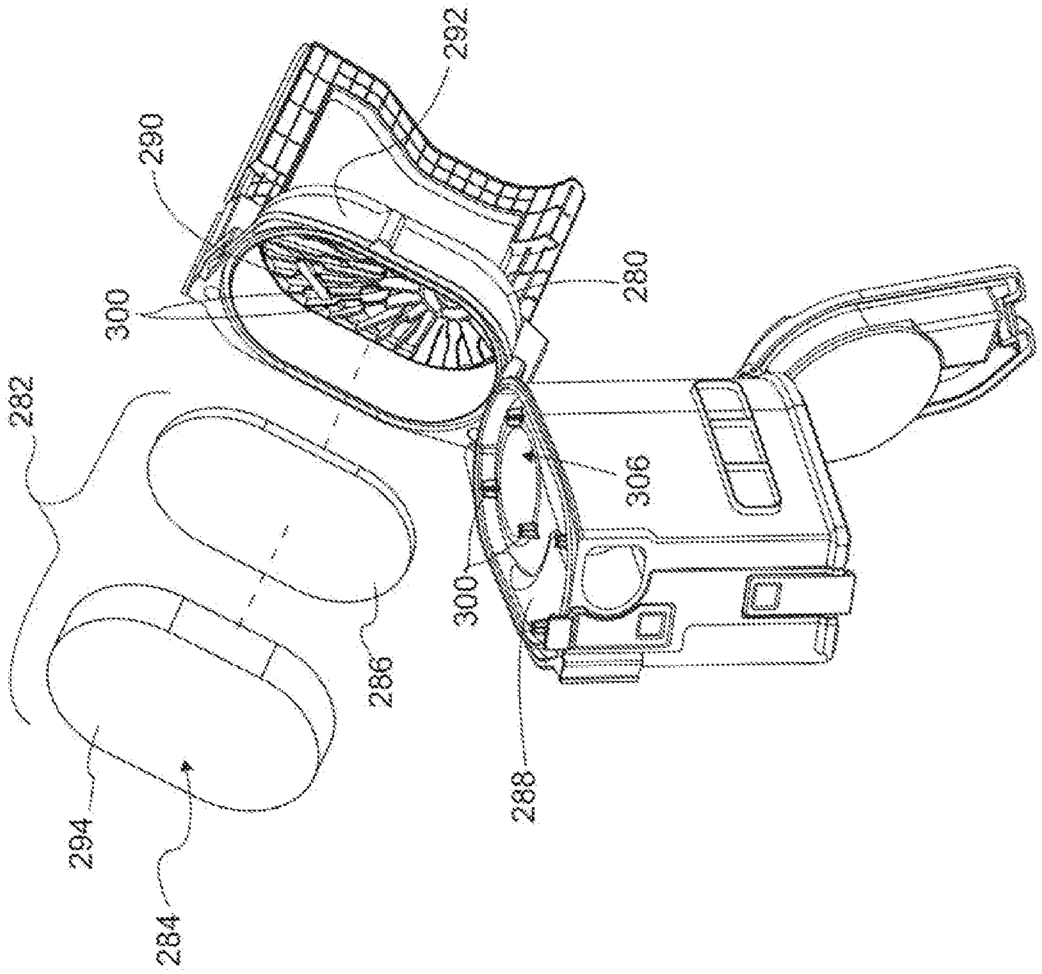
FIG. 24 is a partially exploded view of the cyclone bin assembly of FIG. 23.

In accordance with one method, the cyclone bin assembly 160 may also include a pre-motor filter chamber 280 that houses a pre-motor filter 282 (See FIGS. 14, 21 and 24). An advantage of this design is that the pre-motor filter chamber is removable with the cyclone bin assembly. Accordingly, when a user removes the cyclone bin assembly to empty the dirt collection chamber, the user may also check the condition of the pre-motor filter (e.g., by looking at the pre-motor filter if part or all of the pre-motor filter chamber is transparent) or by opening the pre-motor filter chamber and inspecting the pre-motor filter.

In an alternate constriction, the pre-motor filter chamber need not be part of the cyclone bin assembly. In such a case, the pre-motor filter chamber may be positioned so as to be visible when the cyclone bin assembly is removed. Accordingly, when a user removes the cyclone bin assembly to empty the dirt collection chamber, the user may also check the condition of the pre-motor filter (e.g., by looking at the pre-motor filter if part or all of the pre-motor filter chamber is transparent) or by opening the pre-motor filter chamber and inspecting the pre-motor filter.

In a further alternate embodiment, the pre-motor filter chamber may be opened when the cyclone bin assembly is removed. For example, the cyclone bin assembly may form part of the pre-motor filter chamber (e.g., an upstream wall of the pre-motor filter chamber).

It will be appreciated that some of the embodiments disclosed herein may not use any of the methods of accessing the pre-motor filter chamber disclosed herein and that, in those embodiments, the method of accessing the pre-motor filter chamber may be any of those known in the art.

Pre-Motor Filter Chamber

The following is a description of a pre-motor filter chamber, and a pre-motor filter suitable for positioning within the chamber, having various features, any or all of which may be used (individually or in any combination or sub-combination), that may be used by itself in any surface cleaning apparatus or in any combination or sub-combination with any other feature or features disclosed herein.

In accordance with one feature, the pre-motor filter chamber 280 may be positioned between the cyclone chamber air outlet and the suction motor air inlet. For example, the suction motor air inlet end may face the cyclone chamber air outlet end. In such an embodiment, the air exiting the cyclone chamber may travel in a generally linear direction to the suction motor while still passing through the pre-motor filter.

In accordance with a further feature, the pre-motor filter chamber may comprise the air flow part between the cyclone chamber and the suction motor. Accordingly, no additional air flow conduit may be required or, alternately, the length of any such additional air flow conduit may be reduced.

For example, as exemplified in FIG. 14, the pre-motor filter chamber 280 may be positioned adjacent the air outlet 186 of the cyclone chamber 164, such that when the cyclone bin assembly 160 is mounted on the surface cleaning head 102, the pre-motor filter chamber 280 is positioned, preferably transversely, between the cyclone chamber 164 and the suction motor 162.

The air flow path connecting the cyclone air outlet 186 to the suction motor air inlet 246 may define a second air flow path that forms a portion of the overall air flow path between the dirty air inlet 110 and the clean air outlet 112. The second air flow path may be separate from the first air flow path that connects the brush chamber 130 to the cyclone chamber 164. The second air flow path may include the cyclone air outlet 186 and the suction motor air inlet 246, as well as intervening structures, such as, for example, a pre-motor filter chamber 230.

Like the first air flow path, the second air flow path can optionally be configured so that it is free from sharp corners and bends, so that the largest change of direction in the flow direction of the air flowing through the first air flow path is less than 90 degrees, and optionally may be less than about 70 degrees, less than about 60 degrees, less than about 45 degrees, less than 30 degrees and may be less than 15 degrees. In some embodiments, the largest change of direction in the flow direction of the air flowing through the first air flow path may be less than 5 degrees, and optionally, the first air flow path may be essentially linear.

Referring to FIGS. 13 and 14, in the illustrated example the second air flow path is generally free from bends/corners and, while the pre-motor filter 282 has a relatively larger cross-sectional area than the cyclone air outlet 186 or motor air inlet 246, the second flow path is essentially linear along its entire length, from the cyclone air outlet 186 to the motor air inlet 246. In this configuration, the second air flow path extends in the transverse direction, and the direction of air flowing through the second air flow path is generally orthogonally to the direction of air flowing through the first air flow path. Providing a linear second air flow path may help reduce air flow losses as air flows through the second flow path.

Referring also to FIG. 24, in the illustrated example, the pre-motor filter chamber 280 includes a first end wall 288, a second end wall 290 axially spaced apart from the first end wall 288, and a sidewall 292 extending between the end walls 288 and 290, defines an interior that is configured to hold the pre-motor filter 282. In the illustrated example, the filter chamber end wall 288 is integrally formed with, and substantially coincident with, the cyclone chamber second end wall 171 and the dirt collection chamber end wall 242 (e.g., end walls 171 and 242 may be integrally formed with each other). This may help reduce the amount of plastic required to form the cyclone bin assembly 160, which may help reduce the overall volume and/or weight of the cyclone bin assembly. Alternatively, the pre-motor filter chamber, cyclone chamber and dirt collection chamber can be provided as separate members.

In accordance with a further feature, the pre-motor filter chamber 280 may be oriented such that the upstream face of the pre-motor filter is positioned generally orthogonal to the direction of air exiting the cyclone chamber and/or the cyclone bin assembly. Accordingly, for example, the pre-motor filter may overlie part or all of the cyclone chamber and the dirt collection chamber and may extend generally rearwardly from the brush chamber to the rear end of the surface cleaning head. An advantage of this design is that the upstream surface area of the pre-motor filter may be increased thereby extending the operating time of the surface cleaning apparatus prior to the pre-motor filter requiring cleaning. For example, having a large cross-sectional area in a direction orthogonal to the flow direction may help increase the interval of time that the surface cleaning apparatus 100 can be operated without having to clean the pre-motor filter and/or reduce air flow back pressure.

In the illustrated example, the pre-motor filter chamber 280 is sized so that the first and second end walls 288 and 290 cover substantially the entire cross-sectional area of the cyclone bin assembly 160. The pre-motor filter 282 is sized to fill substantially the entire cross-sectional area of the pre-motor filter chamber 280 (i.e. is a press fit/interference fit within the chamber sidewall 292) and, in the example illustrated, also covers substantially the entire cross-sectional area of the cyclone bin assembly 160. In this configuration, the pre-motor filter 282, and pre-motor filter chamber 280, each extend in the forward/backward direction and may extend from a front portion adjacent the brush chamber 130 and rotating brush 132, to a rear portion adjacent the rear end 118 of the surface cleaning head 102 (see FIG. 13). While the pre-motor filter need not extend all the way between the front and rear portions, the longer to upstream side of the filter, the longer the time may be between cleaning/replacing the filter.

In the illustrated example, the pre-motor filter 282 is generally planar and is arranged perpendicular to the cyclone axis 174. When the pre-motor filter 282 is positioned within the pre-motor filter chamber 280, an upstream face 294 of the filter 282 faces, and overlies, the end walls 171 and 242 of the cyclone chamber 164 the dirt collection chamber 166 respectively (FIG. 12). In this configuration, an opposed, downstream face 296 of the pre-motor filter 282 faces and overlies the suction motor 162. In this configuration, the cyclone axis 174 and the suction motor axis 182 each intersect the pre-motor filter chamber 280, and the pre-motor filter 282, when the cyclone bin assembly 160 is mounted to the surface cleaning head 102.

Referring to FIG. 13, in the illustrated example, a pre-motor filter axis 298 extends generally parallel to the upstream face 294, and it the example illustrated is parallel to the downstream face 296 as well. The pre-motor filter axis 298 is, in the example illustrated, parallel with forward direction of travel of the surface cleaning apparatus 102.

In the illustrated example, the pre-motor filter chamber sidewall 292 and end wall 290 are configured such that they form part of the outer surface of the cyclone bin assembly 160, and when the cyclone bin assembly 160 is mounted to the surface cleaning head 102 the sidewall 292 forms part of the exposed outer surface of the surface cleaning head 102.

In accordance with a further feature, the pre-motor filter chamber may be openable while attached to the cyclone bin assembly to allow a user to access the pre-motor filter 282. Further, the cyclone and dirt collection chambers may be openable, and preferably concurrently openable, while the pre-motor filter chamber is attached to the cyclone bin assembly. As exemplified, the pre-motor filter chamber is provided at one end of the cyclone bin assembly and the opposed end of the cyclone bin assembly may have a door which concurrently opens the cyclone chamber and the dirt collection chamber. Alternately or in addition, the pre-motor chamber end of the cyclone bin assembly may be openable—e.g., by removing the pre-motor filter chamber and/or by having the wall defining the upstream end of the pre-motor filter chamber open.

Figure 23:
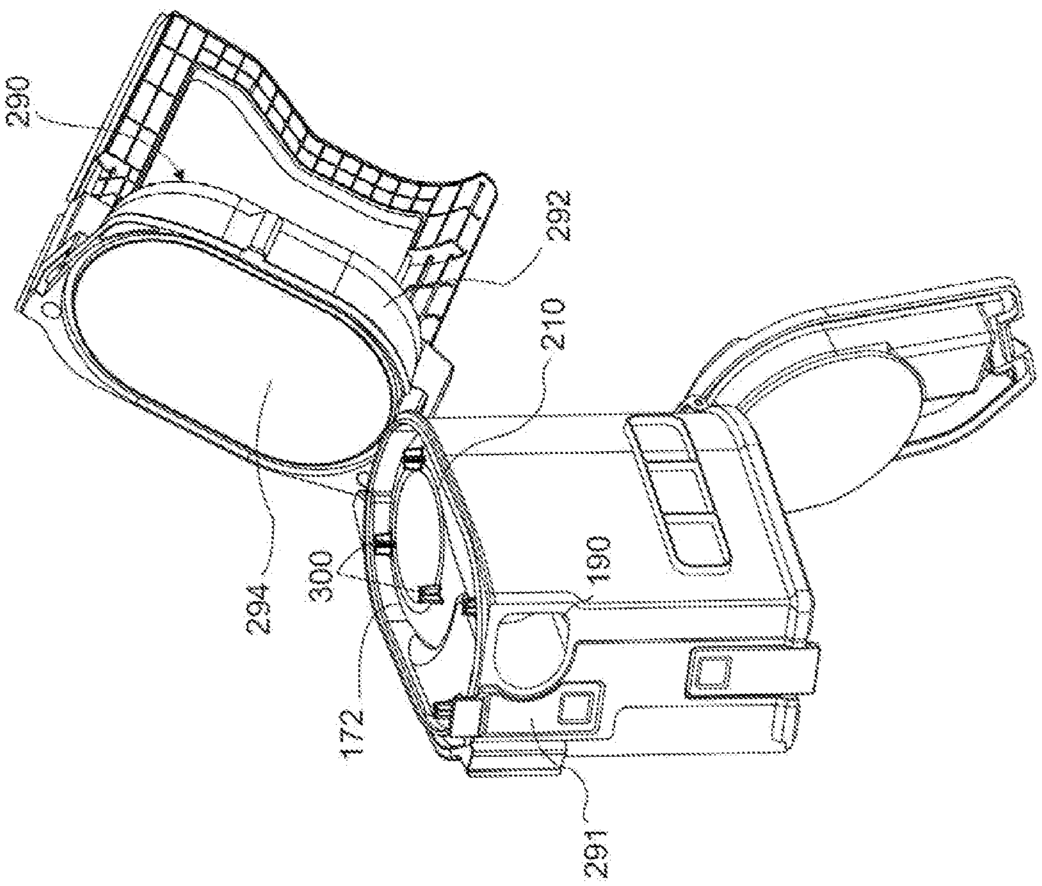
FIG. 23 is a perspective view of the cyclone bin assembly of FIG. 21 oriented with the filter chamber at the upper end, with a cyclone chamber door and a filter chamber open.

As exemplified in FIGS. 22 and 23, the sidewall 292 may be pivotally connected to the pre-motor filter chamber inner end wall 288 so that the end wall 290 and sidewall 292 can pivot together to open the pre-motor filter chamber 280. In this configuration, the sidewall 292 and end wall 290 may be sized to receive and retain the pre-motor filter 282 so that the pre-motor filter 282 is carried with the sidewall 292 and end wall 290 when the pre-motor filter chamber 280 is opened. Pivoting the pre-motor filter 282 in this manner can expose the upstream side 294 of the pre-motor filter to the user when the chamber 280 is opened. This may allow a user to inspect the upstream side 294 of the pre-motor filter 282 without having to touch or remove the pre-motor filter 282 from its housing 280. Alternatively, at least a portion of the sidewall 292 may fixedly connected to the end wall 288, and the end wall 290 may be movably connected to the sidewall 292. In this configuration, the end wall 290 can be opened to access the interior of the pre-motor filter chamber 280 while the sidewall 292 and pre-motor filter 282 can remain stationary. The pre-motor filter chamber 280 is retained in the closed position by a releasable latch 291 as is known in the art (FIG. 23), which, like latch 268 is positioned so that it is inaccessible when the cyclone bin assembly 160 is mounted in the cavity 161.

In accordance with another feature, some or all of the pre-motor filter chamber sidewall 292, the pre-motor filter chamber outer end wall 290 and handle 408 may be a one piece assembly, such as by being manufactured separately and secured together or by being integrally formed together. An advantage of this feature is that the handle may be structurally connected to the cyclone bin assembly.

Optionally, the inner surfaces of the first and second end walls 288 and 290 of the pre-motor filter chamber 280 may be provided with support members, provided as a plurality ribs 300 in the example illustrated (FIG. 24) to help support the pre-motor filter 282 in a position where it is spaced apart from the inner surfaces of the end walls 288 and 290. Referring to FIG. 14, in this configuration, the pre-motor filter chamber 280 includes an upstream header 302 between the upstream side 294 of the pre-motor filter 282 and the end wall 288, and a downstream header 304 between the opposing downstream side 296 of the pre-motor filter 282 and the end wall 290. Air can travel from the upstream header 302 to the downstream header 304 by flowing through the pre-motor filter 282.

In accordance with another feature, the pre-motor filter chamber air outlet 308 and the suction motor air inlet 246 may be configured to meet each other in sealing plane 309 that is at an angle to the vertical. It will be appreciated that the surface cleaning apparatus 100 can be configured so that the sealing plane is vertical, horizontal or is at an angle relative to a vertical plane. In the illustrated example, the sealing plane 309 inclined relative to the vertical direction. This may help facilitate automatic re-connection of the air outlet 308 and the suction motor air inlet 246 when the cyclone bin assembly 160 is inserted generally vertically downwardly into the cavity 161. It will be appreciated that one or both of the inlet 246 and the air outlet 308 may be provided with a gasket, O-ring or the like.

In accordance with another feature, the pre-motor filter chamber may be configured to redirect the air from the cyclone chamber outlet to the suction motor inlet without the use of any conduit extending at an angle to the cyclone chamber and suction motor axis. Referring to FIG. 24, the pre-motor filter chamber 280 has a chamber air inlet 306 in communication with and aligned with the cyclone air outlet 186, and a chamber air outlet 308 (FIG. 20) that is connectable, and aligned with the air inlet 246 of the suction motor 162 (see also FIG. 14). Optionally, the chamber air inlet 306 and chamber air outlet 308 may be generally aligned with each other or alternatively, as exemplified, they may be offset from each other. Referring to FIG. 14, in the illustrated example, the centerline 310 of the pre-motor filter chamber air inlet 306 is aligned with the cyclone axis 174 and is offset from the centerline 312 of the pre-motor filter chamber air outlet 308, which is aligned with the suction motor axis 182. If the pre-motor filter chamber has an upstream and a downstream header, the air entering the upstream header may be spread out over the upstream surface of the pre-motor filter and travel through the pre-motor filter. The air will enter the downstream header and exit through the outlet 308. In this way, the air is aligned with the suction motor inlet without any curved or angled flow conduits.

The pre-motor filter may be any suitable type of filter. Referring also to FIG. 24, in the illustrated example the pre-motor filer 282 includes a foam filter 284 and a downstream felt layer 286 that are both positionable within the pre-motor filter chamber 280. In this configuration the foam filter 284 comprises the upstream side 294 of the pre-motor filter and the felt layer 286 provides the downstream side 296 of the pre-motor filter 282. Preferably, the foam filter 284 and felt layer 286 are removable to allow a user to clean and/or replace them when they are dirty. In alternate embodiments, any pre-motor filter or filters known in the art may be used.

In accordance with another feature, the cyclone bin assembly 160 may be removable from the surface cleaning head 102 as a closed module, where the only portions the cyclone bin assembly 160 that are open when the cyclone bin assembly 160 is removed from the cavity 161 are the inlet end 190 of cyclone air inlet 184 and pre-motor filter chamber air outlet 308 (see for example FIG. 20).

Alternately, or in addition, the cyclone bin assembly may be configured to inhibit dirt collected in the cyclone chamber and/or the dirt collection chamber from exiting the cyclone bin assembly as the cyclone bin assembly is conveyed to an emptying location. As exemplified in FIG. 12, the outlet end 194 of the cyclone air inlet 184 may be axially spaced from the dirt inlet to the dirt collection chamber 166 to help reduce the likelihood that debris from the dirt collection chamber 166 will escape via the cyclone air inlet 184 when the cyclone bin assembly 160 is detached. When the surface cleaning apparatus is in use, dust and fine debris flowing into the pre-motor filter chamber 280 may tend to be collected on the upstream side 294 of the pre-motor filter 282, which leaves the downstream side 296 of the pre-motor filter 282 as the relatively clean side. In the illustrated example, the pre-motor filter chamber air outlet 308 is in communication with the downstream side 296 of the pre-motor filter 282. As the downstream side 296 tends to be the cleaner side of the pre-motor filter 282, this configuration may help reduce the likelihood that dust and debris can escape the cyclone bin assembly 160 via the pre-motor filter chamber air outlet 308. Configuring the cyclone bin assembly 160 in this manner may help prevent dirt and debris from spilling out of the cyclone bin assembly 160 when it is transported to the garbage for emptying.

Figure 30:
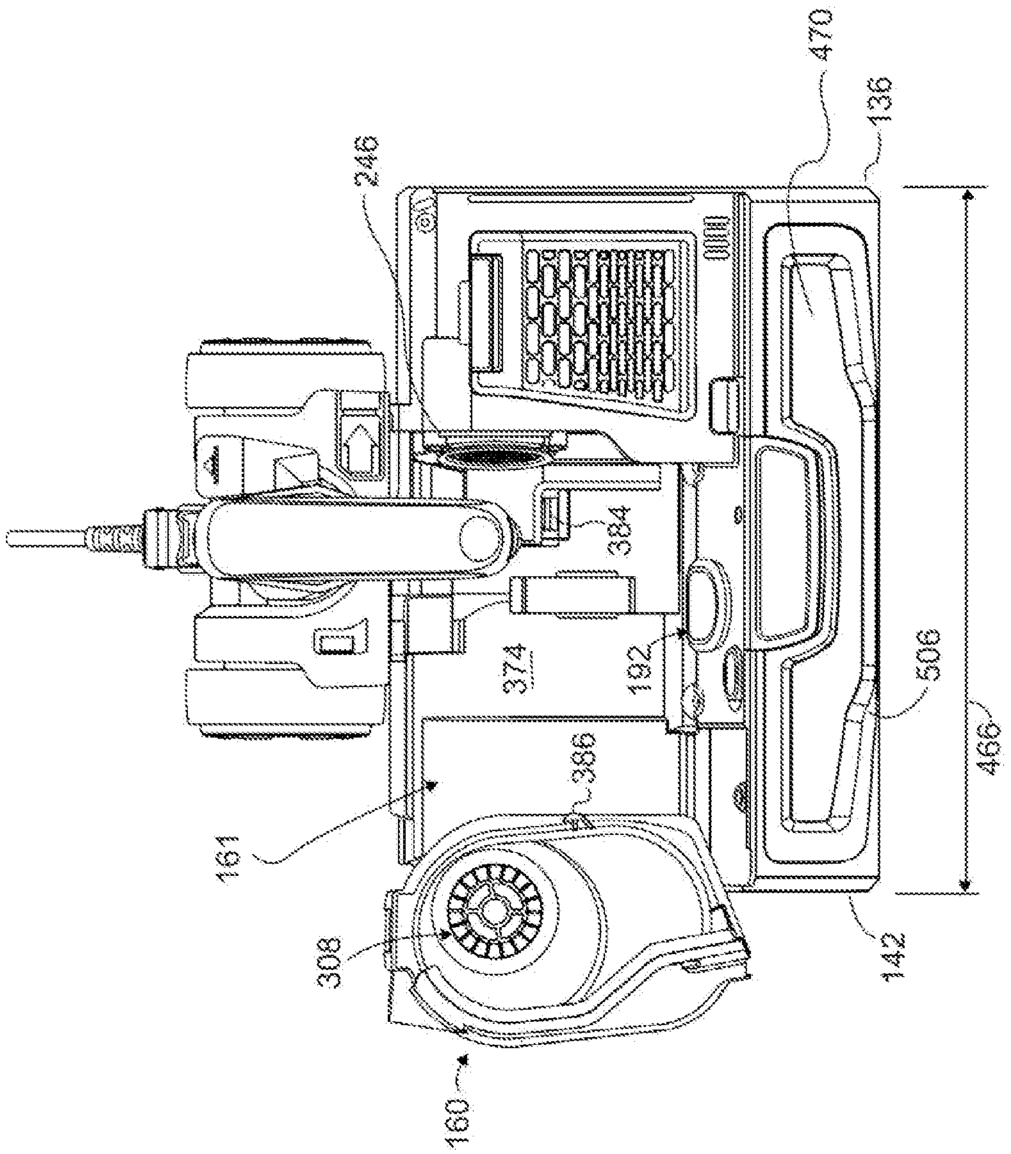
FIG. 30 is to top view of the surface cleaning apparatus of FIG. 1 with the cyclone bin assembly in a removal position and with the brush chamber open.

Referring to FIG. 30, in the illustrated example, removing the cyclone bin assembly 160 from the cavity 161 reveals the air inlet 246 of the suction motor 162 and the air outlet 192 of the brush chamber 130. Replacing the cyclone bin assembly 160 automatically re-establishes the respective connections between the pre-motor filter chamber air outlet 308 and the suction motor air inlet 246, and between the upstream end 190 of the cyclone air inlet 184 and the brush chamber air outlet 192.

Optionally, part or all of the sidewalls 292 of the pre-motor filter chamber can be at least partially transparent so that a user can visually inspect the condition of the pre-motor filter 282 without having to remove open the pre-motor filter chamber 280 or remove the cyclone bin assembly 160 from the cavity 161.

It will be appreciated that some of the embodiments disclosed herein may not use any of the features of the pre-motor filter chamber disclosed herein and that, in those embodiments, the pre-motor filter chamber may be of various constructions and that in those embodiments any pre-motor filter chamber known in the art may be used.

Suction Motor & Brush Motor

The following is a description of a configuration of a suction motor and a configuration of a brush motor in a surface cleaning head, wither or both of which may be used by themselves in any surface cleaning apparatus or in any combination or sub-combination with any other feature or features disclosed herein.

Referring to FIGS. 12 and 13, the suction motor 162 has a first end 176 and a second end 178 that are axially spaced apart from each other by a suction motor length 180, along a suction motor axis 182, about which the rotor of the suction motor 162 rotates. In accordance with one configuration, as exemplified in FIGS. 12 and 13, the cyclone axis 174 and suction motor axis 182 are parallel to each other and extend in the transverse direction, generally orthogonally to the forward direction of travel of the surface cleaning head. An advantage of this configuration is that are may travel generally linearly between the cyclone chamber and the suction motor.

In the illustrated example, the suction motor air inlet 246 is located at the first end 176 of the suction motor 162 and is in air flow communication with the cyclone air outlet 186. The suction motor also includes an air outlet 270 that is provided in a motor housing sidewall 272 and is in air flow communication with the clean air outlet 112 via an internal air flow conduit.

Referring to FIG. 13, in the illustrated example, the suction motor air inlet 246 is positioned so that air flowing into the air inlet 246 travels in the transverse direction. The suction motor air inlet 246 is also positioned so that when the cyclone bin assembly 160 is mounted on the surface cleaning head 102 the second end 170 of the cyclone chamber 164 is generally opposed to and faces the first end 176 of the suction motor 162, with the pre-motor filter chamber 280 positioned laterally therebetween. Further, in the illustrated example, the cyclone air outlet 186 faces and partially overlaps the air inlet 246 of the suction motor 162. However, the cyclone air outlet 186 may be slightly offset from the suction motor air inlet 246, and in the example illustrated the centerline of the cyclone air outlet 186 (which in the example illustrated coincides with the cyclone axis 174) is offset from the centerline of the suction motor air inlet 246 (which in the example illustrated coincides with the suction motor axis 182).

Referring also to FIG. 12, the surface cleaning head 102 also includes a brush motor 214 that is drivingly connected to the rotatable brush 132 by a drive linkage 216, which in the illustrated example includes a drive belt. The brush motor 214 has a first end 218 and a second end 220 that are spaced apart from each by a brush motor length 222 other, along a brush motor axis 224, about which the rotor of the brush motor 214 rotates. It will be appreciated that brush motor 214 may be of any design and may be drivingly connected to the brush 132 by any means known in the art such as a direct gear drive. In some embodiments, the brush motor may be incorporated into the brush 132 (e.g., it may be positioned internally or along the length of brush 132.

In accordance with another configuration, as exemplified in FIGS. 12 and 13, brush motor 214 may be positioned adjacent to and forward of the suction motor 162 in the direct of travel of the surface cleaning head 102. Alternatively, the brush motor may be located behind the suction motor. An advantage of this design is that the brush motor may overlie part or all of the dirt collection chamber. Further, part or all of the pre-motor filter chamber may be positioned between the brush motor and the dirt collection chamber enabling large upstream cross-sectional area of the pre-motor filter.

Optionally, at least a portion of the brush motor may be located transversely between the first and second ends of the suction motor. The amount of the brush motor that transversely overlaps (e.g., extends parallel to) the suction motor, in the direction parallel to suction motor axis, may be between about 10% and 100% of the length of the brush motor, and preferably between about 50% and 100% and more preferably between about 70% and about 100%. At least partially overlapping the brush motor and suction motor in this manner may help reduce the overall size of the surface cleaning head. Referring to FIG. 12, in the illustrated example the first end 218 of the brush motor 214 is generally aligned with the first end 176 of the suction motor 162 in the transverse direction, and the second end 220 of the brush motor 214 is disposed between the first and second ends 176, 178 of the suction motor 162 in the transverse direction. In this configuration, substantially the entire brush motor 214 is located between the first and second ends 176, 178 of the suction motor 162. This enables the dirt collection chamber to extend forwardly from the cyclone chamber and occupy a space transversely opposed to the brush motor.

Figure 18:
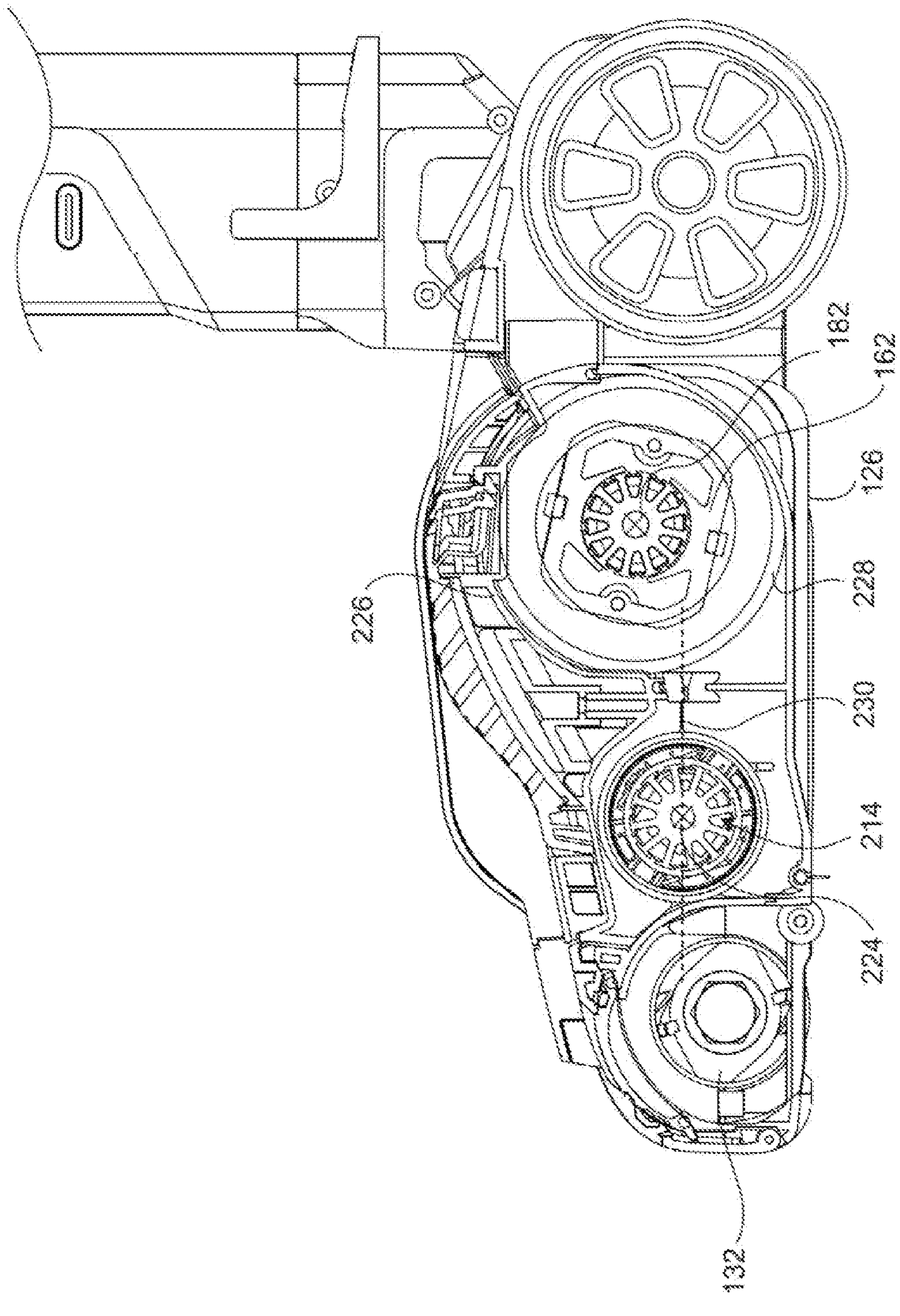
FIG. 18 is cross-sectional view of the surface cleaning apparatus of FIG. 1, taken along line 18-18, which is shown in FIG. 7.

In accordance with another configuration, as exemplified in FIG. 18, the brush motor may be vertically positioned with respect to the suction motor so as to not extend above or below the suction motor. An advantage of this configuration is that the brush motor does not affect the height of the surface cleaning head. As exemplified in FIG. 18, the suction motor 162 has an upper end 226, and an opposed lower end 228 located adjacent the bottom face 126 of the surface cleaning head 102. In the illustrated example, the brush motor 214 is positioned vertically within the surface cleaning head 102 so that the brush motor axis 224 is located vertically between the upper and lower ends 226 and 228 of the suction motor 162 such that a horizontal plane 230 containing the brush motor axis 224 intersects the suction motor 162.

Alternately, or in addition, as exemplified in FIG. 14, the brush motor is also located vertically between an upper end 232 and an opposed lower end 234 of the cyclone chamber 164 such that the horizontal plane 230 also intersects the cyclone chamber 164 and the dirt collection chamber 166. In the illustrated example, the upper end 232 and lower end 234 are portions of the cyclone chamber sidewall 173, and also form portions of the exposed, outer surface of the cyclone bin assembly 160.

In accordance with another configuration, as exemplified in FIGS. 12 and 13, the brush motor 214 may at least partially overlap the cyclone bin assembly 160 in the forward/backward direction. This may help reduce the overall size of the surface cleaning head. In this configuration, the laterally inner end 218 of the brush motor 214 may face, and at least partially overlap the laterally inner end of the cyclone bin assembly 160. Optionally, the inner end of the brush motor may face and overlap at least a portion of an end face of the cyclone chamber and/or at least a portion of the dirt collection chamber. Referring to FIG. 12, in the illustrated example, the laterally inner, first end 218 of the brush motor 214 opposes and faces towards the laterally inner, end of the cyclone bin assembly 160. Specifically, the first end of the brush motor opposes and faces towards the second end wall 242 of the dirt collection chamber 166 and the end wall 290 of the pre-motor filter chamber 280. It will be appreciated that if the pre-motor filter chamber did not overlap the dirt collection chamber, then the brush motor 214 may directly face the dirt collection chamber and may extend closer thereto.

In accordance with this configuration, the brush motor may overlap all or a significant portion of the dirt collection chamber (e.g., 50% or more, 75% or more, 80% or more or 90% or more). Further, the brush motor may not overlap any or only a small portion of the cyclone chamber (e.g., it may overlap 25% or less, 15% or less, 10% or less). As exemplified in FIG. 12, the brush motor 214 is offset forwardly from the cyclone chamber 164 in the direction of travel of the surface cleaning head 102 (downward as illustrated in FIG. 12) such that the brush motor 214 does not impinge on the projection of the cross-sectional area of the cyclone chamber 164 in the transverse direction. The brush motor 214 does however, in the example illustrated, overlap with a portion of the dirt collection chamber 166 and the pre-motor filter chamber 280. An advantage of this design, as is discussed subsequently, is that the suction motor and the cyclone chamber may have comparable diameters and the cyclone air outlet and the suction motor inlet may have comparable diameters. Accordingly, each of the suction motor and the cyclone chamber may be sized for a similar air flow therethrough and, accordingly, flow of air through the suction motor and the cyclone chamber may produce less back pressure. Further, the brush motor is oriented and sized to fit in a space opposed to the dirt collection chamber and between the suction motor and the brush chamber.

In accordance with another configuration, the suction motor may at least partially overlap or overlie the cyclone bin assembly in the forward/backward direction. In this configuration, the laterally inner end of the suction motor may face, and at least partially overlap the laterally inner end of the cyclone bin assembly. Optionally, the inner end of the suction motor may face and overlap at least a portion of an end face of the cyclone chamber and/or at least a portion of the dirt collection chamber. This may help reduce the overall size of the surface cleaning head. For example, the suction motor may overlap all or a significant portion of the cyclone chamber (e.g., 50% or more, 75% or more, 80% or more or 90% or more) and it may not overlap any or only a small portion of the dirt collection chamber (e.g., it may overlap 25% or less, 15% or less, 10% or less). Referring to FIG. 12, in the illustrated example, the laterally inner, first end 176 of the suction motor 162 opposes and faces the laterally inner, end of the cyclone bin assembly. Specifically, the first end 176 of the suction motor 162 opposes and directly faces the end wall 290 of the pre-motor filter chamber 280, overlies the second end wall 171 of the cyclone chamber 164, and is spaced rearwardly from the second end wall 242 of the dirt collection chamber 166. In this configuration, the inner end of the cyclone bin assembly (provided by the end wall 290) faces/overlies both the first end 176 of the suction motor 162 and the first end 218 of the brush motor 214.

In accordance with another configuration, the suction motor and the brush motor may both be provided in the same lateral side, and preferably in the same lateral half (in a lateral direction) of the surface cleaning head. This may help provide space in the other lateral side of the surface cleaning to accommodate the cyclone chamber, dirt collection chamber and/or pre-motor filter chamber. In the illustrated example, the suction motor 162 and brush motor 214 are both entirely provided on the same lateral side of transverse centerline 314 of the surface cleaning head 102, and are therefore in the same half of the surface cleaning head 102 (the right half as shown in FIG. 12). The cyclone chamber 164 and dirt collection chamber 166 are each located on the opposite side of the lateral centerline 314. The pre-motor filter chamber 280, and the pre-motor filter itself 282, are, in the example illustrated, intersected by the lateral centerline 314.

In accordance with another configuration, both the brush axis 134 and brush motor axis 224 are parallel to, and offset from, the cyclone axis 174 and the suction motor axis 182. In the illustrated configuration, the brush motor axis 224 intersects the pre-motor filter chamber 280, the pre-motor filter 282 and the dirt collection chamber end wall 242. Aligning the cyclone chamber 164, suction motor 162 and brush motor 214 in this manner may help reduce the overall size of the surface cleaning head 102.

In accordance with another configuration, as exemplified in FIGS. 12-14, the cyclone axis 174 may be located forward and at a higher elevation than the motor axis 182, and behind and at a higher elevation than the brush motor axis 224. The suction motor axis 182 may also be located behind and at a higher elevation than the brush motor axis 224. Offsetting the axes of the cyclone, suction motor and brush motor may help nest the components together, which may help reduce the overall size of the surface cleaning apparatus.

It will be appreciated that some of the embodiments disclosed herein may not use any of the features of the suction motor and brush motor disclosed herein and that, in those embodiments, the suction motor and brush motor may be of various constructions and arranged in any configuration.

Mounting Hub

The following is a description of a mounting hub having various features, any or all of which may be used (individually or in any combination or sub-combination), by itself in any surface cleaning apparatus or in any combination or sub-combination with any other feature or features disclosed herein. Rear wheels and/or the drive handle may be connected to the mounting hub. The mounting hub is positioned at the rear end of the surface cleaning head and exterior to the interior space of the surface cleaning head. Accordingly the pivot mount and/or the rear wheel mount need not be within the enclosed volume of the surface cleaning head and may thereby reduce the foot print and/or height of the surface cleaning head.

Figure 1:
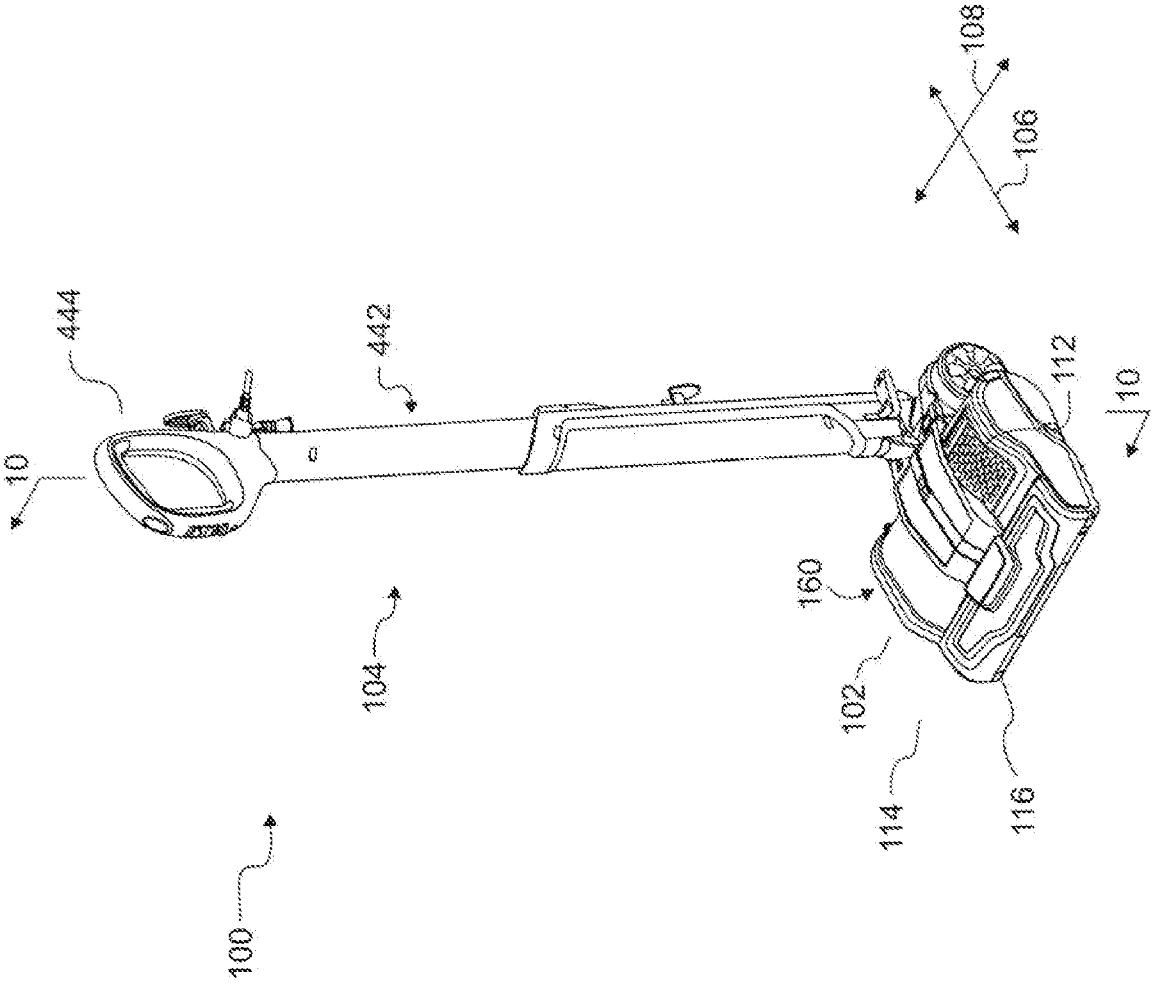
FIG. 1 is a front perspective view of an example of an all in the head type surface cleaning apparatus.
Figure 2:
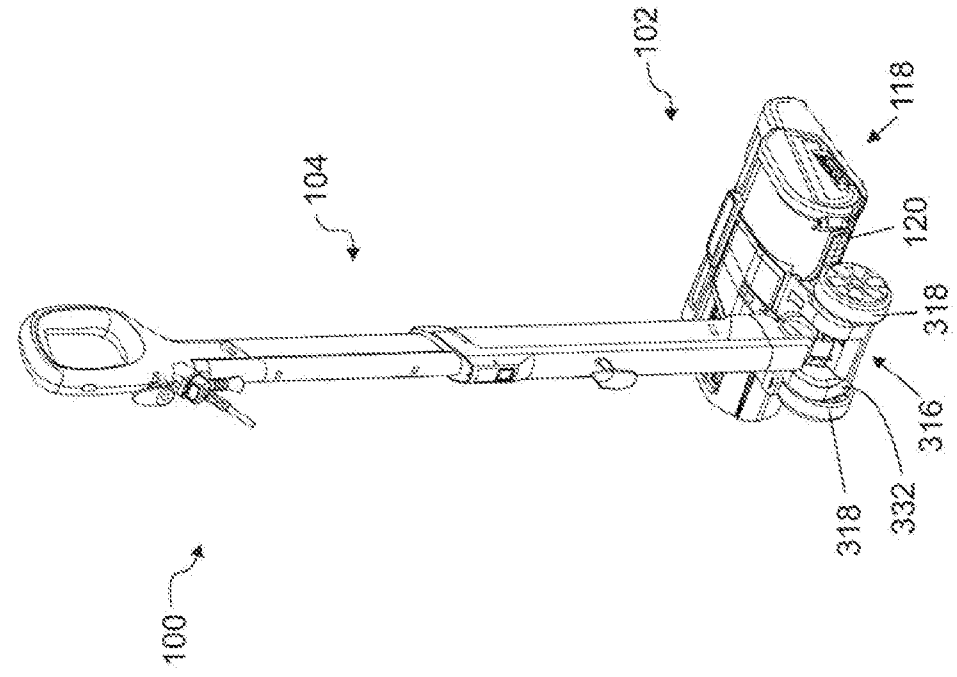
FIG. 2 is a rear perspective view of the surface cleaning apparatus of FIG. 1.

As exemplified in FIG. 2, the surface cleaning apparatus 100 may include a mounting hub 316 positioned at the rear end 118 of the surface cleaning head 102, rearward of the rear face 120 (rear face 120 defining the rear end of the interior volume provided by the surface cleaning head). Mounting hub 316 may be provided as part of the surface cleaning head and may be a one piece assembly and may be integrally molded with one of the components of the surface cleaning head.

Figure 15:
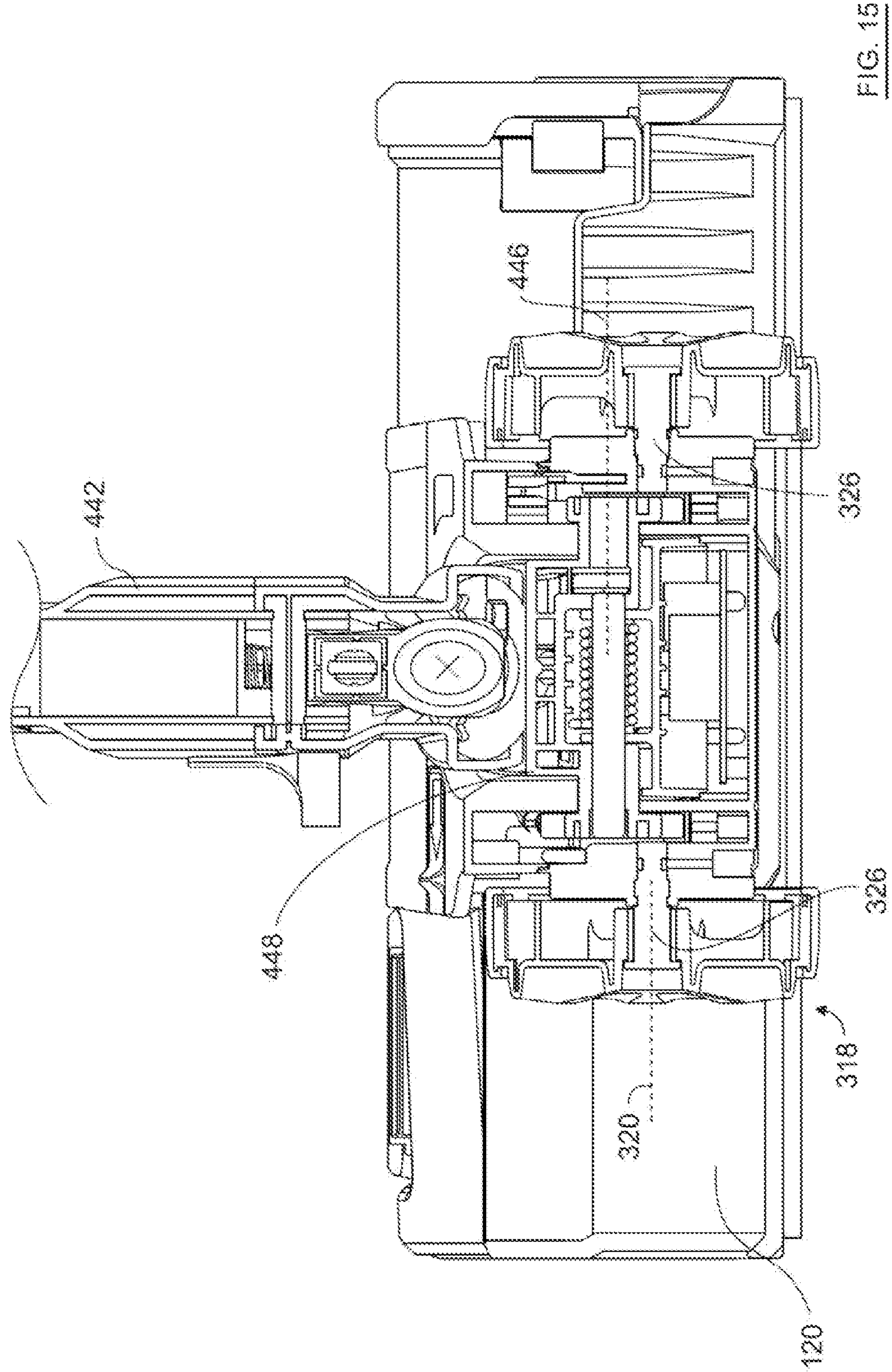
FIG. 15 is cross-sectional view of the surface cleaning apparatus of FIG. 1, taken along line 15-15, which is shown in FIG. 4.

As exemplified in FIGS. 8 and 15, the surface cleaning head 102 is supported by a pair of rear wheels 318, which are rotatable about a rear wheel axis 320, and a pair of smaller front wheels 322 rotatable about a front wheel axis 324. Rear wheels 318 are rotatably mounted to the mounting hub 316 using axles 326 (See FIG. 15). In this example, the rear wheels 318 are positioned rearward of the suction motor 162 and cyclone bin assembly 160.

In the illustrated example, the mounting hub 316 includes a top wall 328 (FIG. 3), a bottom wall 330 (FIG. 8), a rear wall 332 and two sidewalls 334 (FIG. 8). The sidewalls 334 are spaced apart by a mounting hub width 336 in the transverse direction. In the illustrated example, the mounting hub width 336 is less than the width 338 of the surface cleaning head 102, and is selected so that the rear wheels 318 are recessed laterally inwardly from the side walls 124 of the surface cleaning head 102 by respective recessed distances 340. The width 338 of the surface cleaning head 102 may be any suitable width to accommodate the components within the cleaning head, and optionally may be less than about 20 inches, less than about 15 inches, less than about 13 inches, less than about 12.5 inches, and optionally less than about 12 inches. The recessed distances can be any suitable distance, and optionally can be between about 5% and about 80% or more of the distance 344 between the central axis and the respective sidewall 124 of the surface cleaning head 102. Preferably, the recessed distances 340 are at least about 10%, and more preferably may be at least about 20% of the distance 344. While illustrated as generally symmetrical, in other embodiments the recessed distances 340 may be different from each other. An advantage of this feature is that the rear wheels are spaced apart sufficiently to provide stability to the surface cleaning head but are spaced transversely inwardly so as to places the wheels away from objects (e.g., furniture) which they might otherwise contact as the surface cleaning head is used.

Referring also to FIG. 12, in this configuration, a laterally outer surface 342 of the rear wheel 318 illustrated on the right side of FIG. 12 is disposed laterally between the first and second ends 176 and 178 of the suction motor 162, and a laterally outer surface 342 of the rear wheel 318 illustrated on the left side of FIG. 12 is disposed laterally between the first and second ends 168 and 170 of the cyclone chamber 164. The lateral spacing between the rear wheels (which is generally equal to the mounting hub width 336) can be selected so that the pre-motor filter chamber 280 may be located laterally between one of the rear wheels 318 and a side wall 124 of the surface cleaning head 102 (e.g., on the rear face of the surface cleaning head).

Referring also to FIG. 8, in this configuration, the rear wheels 318 are generally, laterally aligned with the front wheels 322 so that a plane containing the laterally outer face of each rear wheel 318 intersects a respective front wheel 322.

Providing a mounting hub to support the rear wheels, and optionally other components (such as the upper portion and release actuators described herein) may help preserve the space within the interior of the surface cleaning head to accommodate air flow components. This configuration may also help facilitate a desired arrangement for the rear wheels as the axles and other connectors within the mounting hub do not interact with or interfere with the air flow components provided within the interior of the surface cleaning head.

In this illustrated example, the rear wheels 318 have a rear diameter 346 (FIG. 8) that is larger than the diameter of the front wheels 322, and the rear wheel axis 320 is located rearward of the front wheel axis 324 in the direction of travel, and at a higher elevation than the front wheel axis 324. In the illustrated example, the rear wheel axis 320 extends in the transverse direction and, in the example illustrated, is parallel to the cyclone axis 174, the suction motor axis 182, the brush motor axis 224 and the brush axis 134.

Referring to FIG. 8, in the illustrated example the front wheels 322 are positioned along the back edge 146 of the dirty air inlet 110 and extend at least partially into the brush chamber 130.

Optionally, in addition to the front wheels 322, the surface cleaning apparatus may include one or more rolling support members. In the illustrated example the surface cleaning apparatus includes rolling support members in the form of rollers 348 that are positioned adjacent the front wheels 322. The rollers 348 may be co-axial with the wheels 322 so that they rotate about the front wheel axis 324. The rollers have a roller diameter 350 that is slightly less than the front wheel diameter 352, and a roller width 354 that is greater than the front wheel width 356. In the example illustrated, the roller width 354 is also greater than the rear wheel width 358. Providing relatively wide rollers 348 may help distribute the weight of the surface cleaning apparatus 100 over a larger surface area of the surface being cleaned. Distributing the weight of the apparatus over a larger area may help support the apparatus when it is being rolled across relatively soft surfaces, such as carpets and other floor coverings. Distributing the weight may help prevent the surface cleaning apparatus 100 from sinking into soft floor coverings, which may help reduce the amount of force required from a user to move the surface cleaning apparatus across the floor coverings. When the surface cleaning apparatus 100 is moved across relatively hard surfaces (such as wood and/or tile flooring) it may be desirable to support the surface cleaning head 102 using the front wheels 322 and rear wheels 318, without engaging the rollers 348. Sizing the rollers 348 to have a smaller diameter than the front wheels 322 may allow the rollers 348 to remain spaced apart from hard surfaces that are engaged by the front wheels 322.

Providing the front wheels 322 and/or optional rollers 348 adjacent the rear edge 146 of the dirty air inlet 110 may help keep the rear edge 146 spaced apart from surface being cleaned. It may also help lift the rear edge 146 of the dirty air inlet 110 over obstacles and/or transitions between flooring types and reduce the likelihood of the dirty air inlet 110 becoming hung-up or otherwise inhibiting forward movement of the surface cleaning head 102.

It will be appreciated that some of the embodiments disclosed herein may not use any of the features of the mounting hub disclosed herein and that, in those embodiments, the mounting hub may be of various constructions or a mounting hub may not be used. For example, the mounting hub may be configured so that the rear wheels are positioned laterally outboard of the surface cleaning head, or the rear wheels may be mounted to the sidewalls of the surface cleaning head and the surface cleaning apparatus need not include a mounting hub.

Cyclone Bin Assembly Removal and Latching/Release Mechanism

The following is a description of a cyclone bin assembly latching and release mechanism having various features, any or all of which may be used (individually or in any combination or sub-combination), by itself in any surface cleaning apparatus or in any combination or sub-combination with any other feature or features disclosed herein.

As mentioned herein, preferably the cyclone bin assembly 160 is removable from the cavity 161 on the surface cleaning head. Preferably, to help facilitate removal of the cyclone bin assembly 160, the cyclone bin assembly 160 can be movable from a use or cleaning position (for example FIGS. 1-10 and 46) to a removal position (for example FIGS. 28-32 and 47). In the cleaning position, the cyclone bin assembly 160 may provide the air flow connection between the dirty air inlet 110 and the suction motor 162, and ultimately the clean air outlet 112. In the removal position, the cyclone bin assembly 160 is positioned so that air flow communication between the dirty air inlet 110 and the suction motor 162 is interrupted and the cyclone bin assembly is positioned to enable a user to remove the cyclone bin assembly from the surface cleaning head.

For example, when the in the cleaning position, the upstream end 190 of the cyclone air inlet 184 may be in air flow communication with the air outlet 192 of the brush chamber 130, and the air outlet of the cyclone bin assembly 160 (i.e. the pre-motor filter chamber air outlet 308 in the example illustrated) may be in air flow communication with the air flow path leading to the suction motor (e.g. suction motor air inlet 246). In this configuration, the surface cleaning apparatus 100 is useable to clean the floor.

In contrast, when the cyclone bin assembly 160 is moved to the removal position, air flow communication between the cyclone bin assembly 160 and the rest of the air flow path is interrupted. However, when in the removal position, the cyclone bin assembly may continue to be at least partially, and preferably entirely, supported by the surface cleaning apparatus (e.g., the surface cleaning head). This may allow a user to move the cyclone bin assembly into the removal position without having to lift or remove the cyclone bin assembly or support its weight.

In accordance with one feature, the cyclone bin assembly 160 may be moved relative to the surface cleaning apparatus when transitioning from the cleaning position to the removal position. For example, the cyclone bin assembly 160 may translate, pivot, rotate or otherwise move relative to other portions of the surface cleaning apparatus (such as the surface cleaning head 102) when transitioning from the cleaning position to the removal position. Moving the cyclone bin assembly 160 and/or changing its orientation when transitioning from the cleaning position to the removal position may help position the cyclone bin assembly in a position that is relatively easier to access for a user. For example, when the cyclone bin assembly 160 is in the cleaning position it may be substantially or fully nested within the cavity 161 on the surface cleaning head 102 and may be disposed relatively close to the ground.

In accordance with another feature, the surface cleaning apparatus 100 may be configured so that when the cyclone bin assembly 160 is transitioned to the removal position it is arranged in a position that is more convenient for a user to reach it, including, for example, by moving portions of the cyclone bin assembly 160 to higher elevations and/or by exposing features (such as handles) that are exposed for access by a user in the removal position and are less exposed, or inaccessible, when in the cleaning position.

In accordance with another feature, the cyclone bin assembly 160 may be biased toward or into one, or both of the cleaning position and the removal position. Preferably, the cyclone bin is at least biased toward the removal position. Accordingly, when a lock that secures the cyclone bin assembly 160 in the use position is released, the cyclone bin assembly 160 may be moved sufficiently out of the cavity 161 (e.g., by moving a handle away from the surface cleaning head) to assist a user to pick up and remove the cyclone bin assembly 160 from the surface cleaning head. Alternately, or in addition, the lock release actuator (e.g., foot pedal 388) may drive a mechanical member that moves the cyclone bin assembly to the removal position.

In accordance with another feature, the cyclone bin assembly 160 may be securable in one or both of the cleaning and removal positions using a lock. The lock may be any suitable apparatus, and optionally can be configured to lock the cyclone bin assembly in the cleaning position until the lock is released. Preferably, the lock may be automatically re-engaged when the cyclone bin assembly is moved into the cleaning position so that the cyclone bin assembly will be held in place without requiring a user to manually re-latch or reengage the lock. The lock may be configured to engage one or both of the cradle and the cyclone bin assembly, or any other suitable component of the surface cleaning apparatus.

Figure 28:
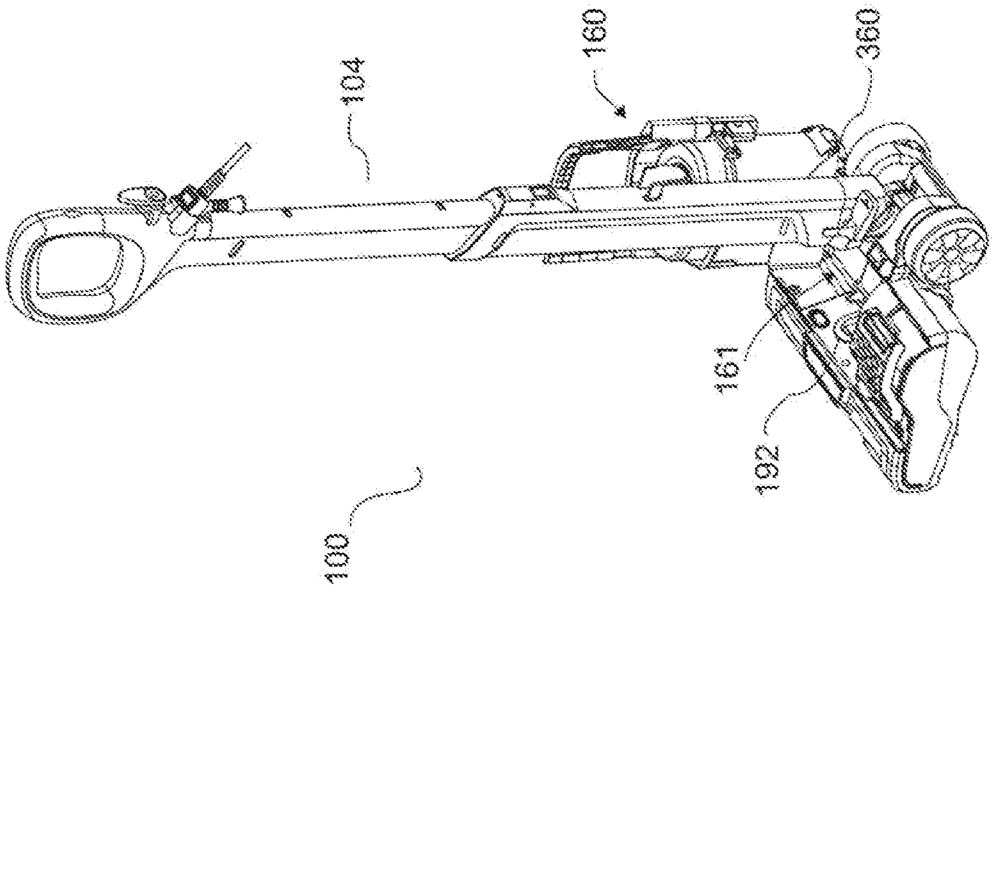
FIG. 28 is a rear perspective view of the surface cleaning apparatus of FIG. 1 with the cyclone bin assembly in a removal position.

As exemplified, cyclone bin assembly 160 is positionable between a cleaning position (FIG. 1) and a removal position (FIG. 28). To help facilitate access and removal of the cyclone bin assembly 160, the cyclone bin assembly 160 is pivotal, relative to the surface cleaning head 102, into in a removal position (FIG. 28), in which the cyclone bin assembly 160 is supported on the surface cleaning head 102, but the airflow communication between the cyclone air inlet 184 and the brush chamber air outlet 192, and between the pre-motor filter chamber air outlet 308 and the suction motor air inlet 246 is interrupted. As exemplified, the laterally inward end of the cyclone bin assembly, comprising the pre-motor filter chamber 280, moves upwardly and pivots toward the lateral side wall 124 of the surface cleaning head 102.

In accordance with another feature, the surface cleaning apparatus may include a moveable support or platform member that at least partially supports, and may fully support, the cyclone bin assembly in the removal position. Preferably, the cyclone bin assembly may be mounted to and supported by (e.g., locked to) the movable platform member, such that movement of the moveable platform results in a corresponding movement of the cyclone bin assembly.

Figure 37:
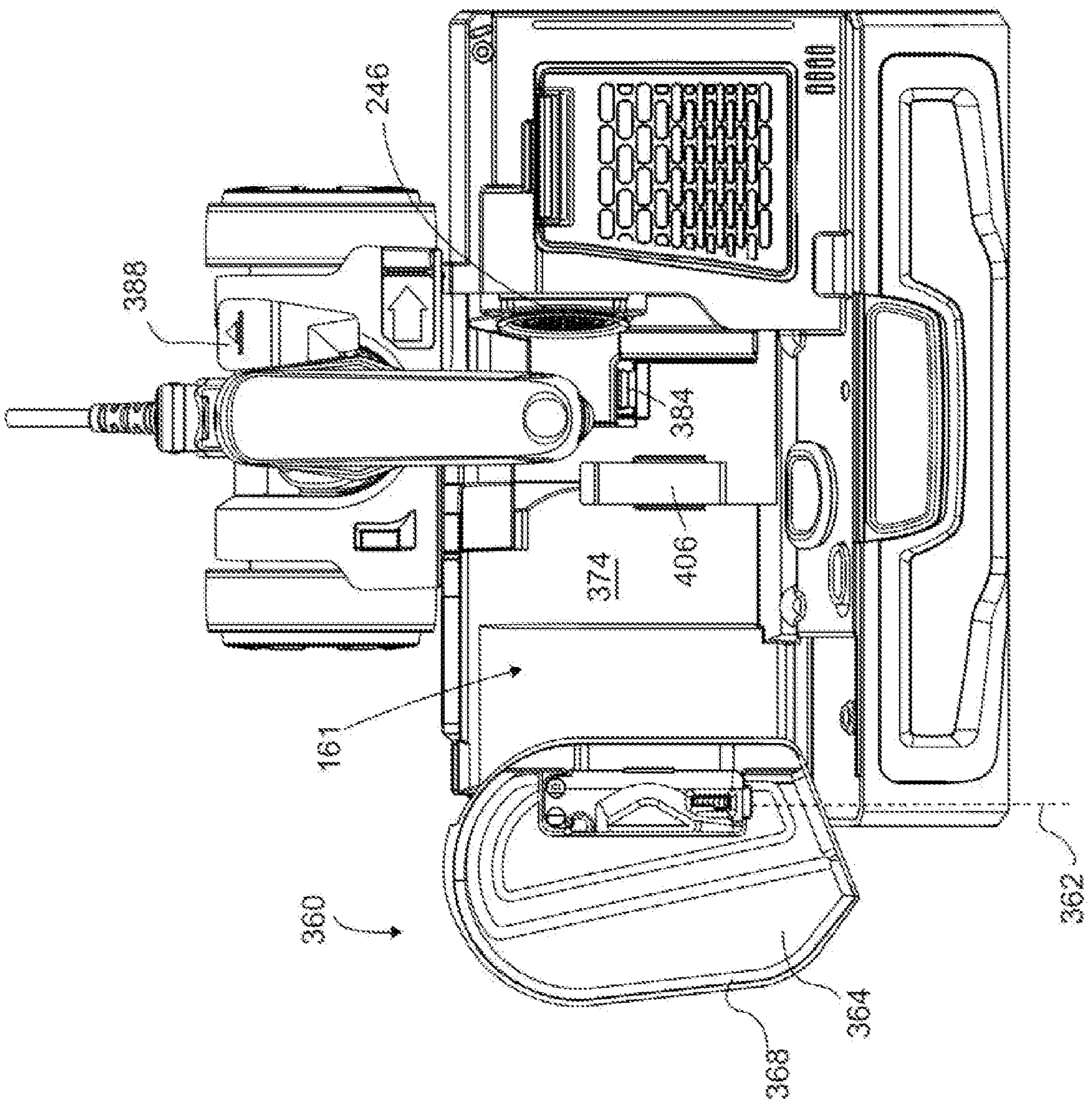
FIG. 37 is a top view of the portion of the surface cleaning apparatus of FIG. 36.
Figure 38:
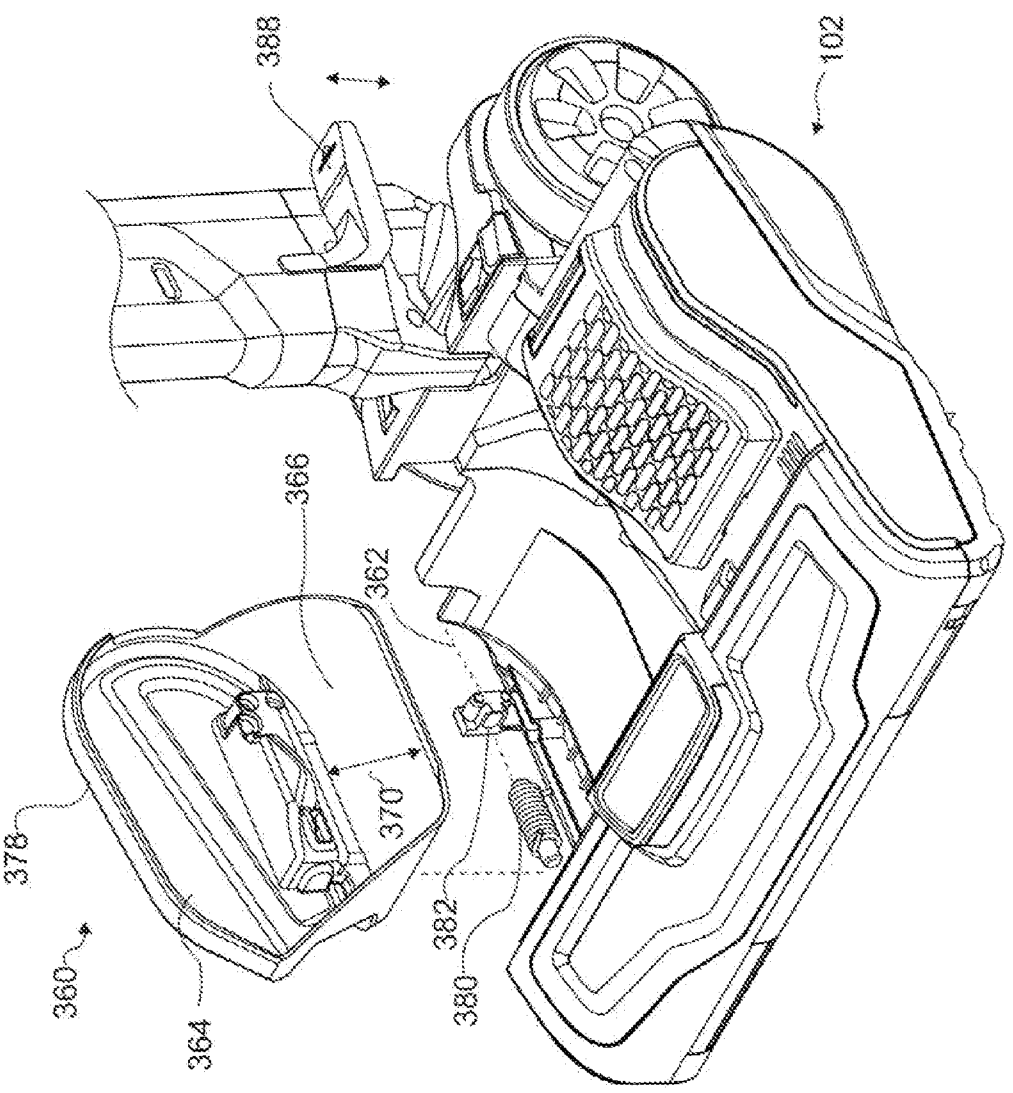
FIG. 38 is a partially exploded a front perspective view of the surface cleaning head of FIG. 1 with the cyclone bin assembly removed.

Referring to FIGS. 27 and 28, in the illustrated example the surface cleaning head includes a movable platform in the form of a cradle 360 that is configured to receive and support the laterally outer end of the cyclone bin assembly 160, and is rotatable relative to the surface cleaning head about a cradle axis 362 (FIGS. 37 and 38). In the illustrated example, the cradle axis 362 is parallel to the forward direction of travel of the surface cleaning apparatus 100, and is generally orthogonal to the cyclone axis 174, suction motor axis 182 and brush motor axis 224.

Figure 32:
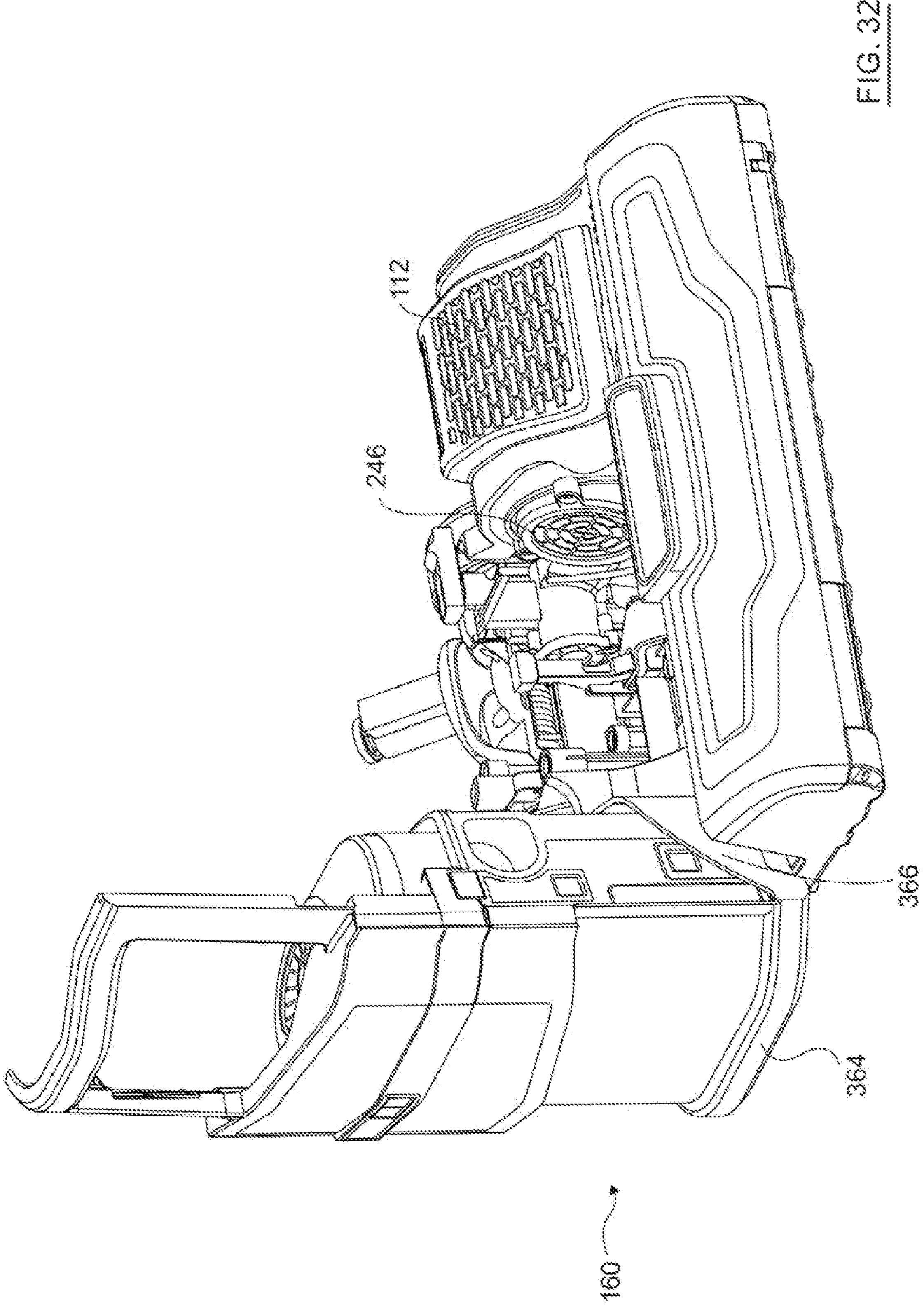
FIG. 32 is a front perspective view of the surface cleaning head of FIG. 1 with the cyclone bin assembly in a removal position.
Figure 36:
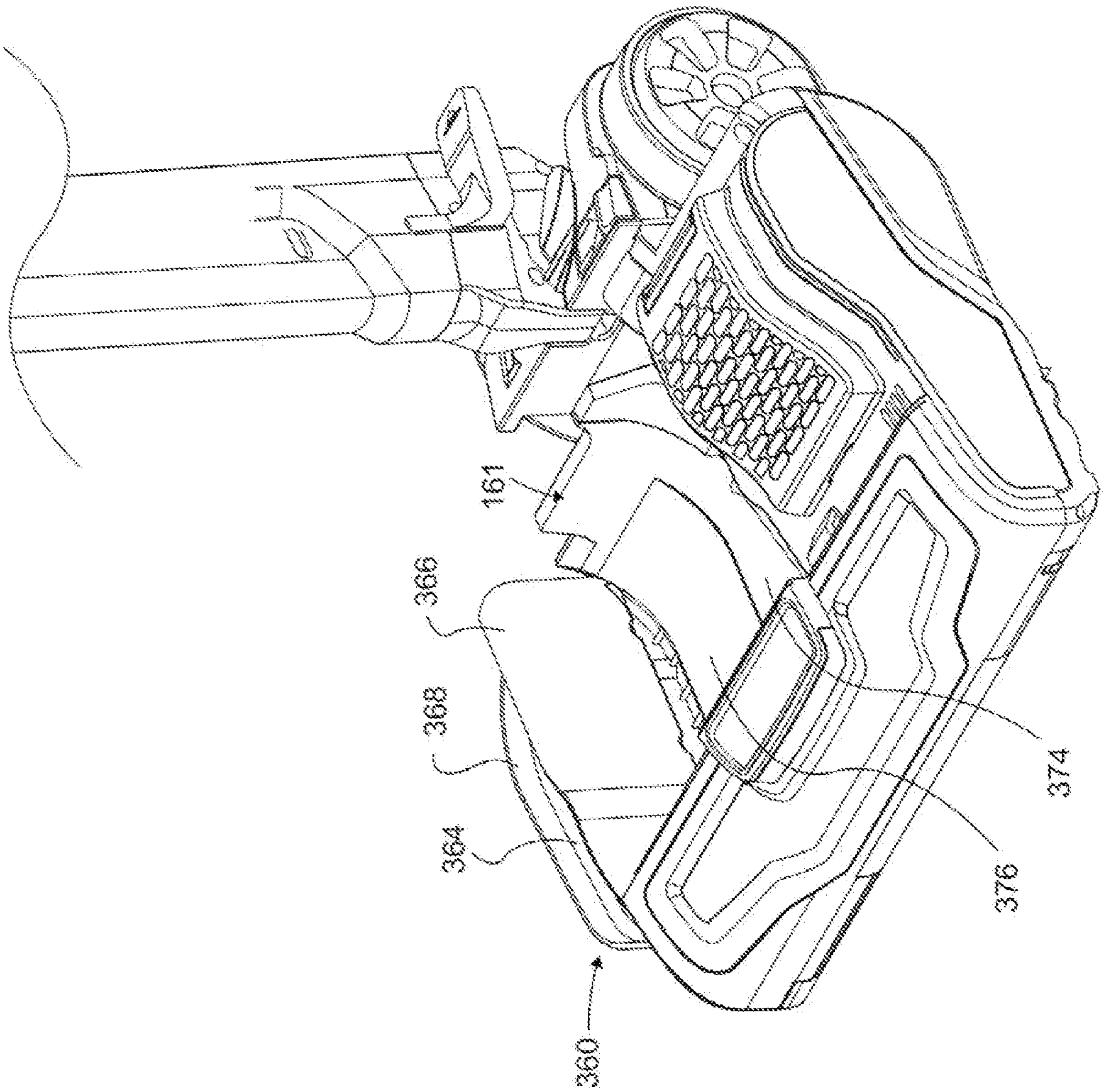
FIG. 36 is a front perspective view of the surface cleaning apparatus of FIG. 1 with the cyclone bin assembly removed.

Referring to FIGS. 32 and 36, in the illustrated example, the cradle 360 is generally L-shaped and includes an end wall 364 and a sidewall 366 extending from the end wall 364. The end wall 364 is configured to receive the laterally outer end of the cyclone bin assembly 160 in a relatively snug engagement. In the example illustrated, the end of the cyclone bin assembly 160 engaged by the cradle 360 includes the openable door 266. The end wall 364 includes an upstanding rim 368 that surrounds the openable door 266 of the cyclone bin assembly 160 and helps retain the cyclone bin assembly 160 on the cradle when in the removal position.

The cradle end wall 364 is configured to abut a portion of the sidewall of the cyclone bin assembly 160 (and may form a portion of the sidewall of the surface cleaning head), and has a length 370 (FIG. 38) that is optionally less than or equal to the length 372 (FIG. 21) between the openable door 266 and the end wall 290 of the pre-motor filter chamber 280, and preferably is less than the length 372. When the cyclone bin assembly 160 is in the cleaning position, the cradle 360 is rotated so that the end wall 364 is generally horizontal and is disposed vertically between the cyclone bin assembly 160 and the bottom surface 374 of the cavity 161. In the illustrated example, the bottom surface 374 of the cavity 161 includes a recessed region 376 sized to receive the end wall 364. In this configuration the end wall 364 of the cradle 360 is generally vertical, such that the cyclone bin assembly 160 is positioned laterally between the cradle end wall 364 and the suction motor 162. When the cyclone bin assembly 160 is in the cleaning position, an upper portion 378 (FIG. 38) of the rim 368 helps inhibit vertical movement of the cyclone bin assembly 160 relative to the cradle 360, and the rest of the surface cleaning head 102.

In the illustrated example, rotation of the cradle 360 about its axis causes a corresponding rotation of the cyclone bin assembly 160 from the generally horizontal cleaning position to a generally vertical removal position. When the cyclone bin assembly arrives in the removal position the cyclone axis 174 may be generally perpendicular to the previous orientation of the cyclone axis 174 when the cyclone bin assembly 160 is in the cleaning position. Referring to FIG. 27, from the removal position, the cyclone bin assembly 160 can be lifted vertically out of the cradle 360 (i.e. the openable door 266 end can be lifted vertically out of the rim 368) and carried to the garbage for emptying, etc.

Optionally, the cradle may be freely moveable between the cleaning and removal positions, or alternatively it may be biased. Referring to FIG. 38, in the illustrated example, a torsion spring 380 and an optional dampener assembly 382 is connected to the cradle 360 to bias the cradle 360 toward the removal position. The torsion spring resistance is selected so that it is sufficient to pivot the cradle 360 and a cyclone bin assembly 160, including the weight of the debris within the dirt collection chamber 166, to the vertical removal position. The damper assembly 382 can be provided to help slow the rotation of the cradle 360 as the cyclone bin assembly approaches the removal position.

In the illustrated example, the cradle 360 is only biased toward the removal position. To return the cyclone bin assembly 160 to the cleaning position a user may reseat the laterally outer end of the cyclone bin assembly 160 onto the end wall of the cradle, and then pivot the cyclone bin assembly 160 into the cavity 161, toward the cleaning position.

As exemplified in FIGS. 33-36, the surface cleaning apparatus may include a lock that is configured to secure the cyclone bin assembly 160 in the cleaning position. The lock includes a latch member 384 that is configured to releasably engage a corresponding locking portion, in the form of a shoulder 386 (see also FIGS. 29 and 30) that is provided on an outer surface of the cyclone bin assembly 160. In the illustrated example, the latch member 384 protrudes through an opening in the bottom surface 374 of the cavity 161, and the shoulder 386 is provided on the sidewall of the cyclone bin assembly 160 that is downward facing and opposes the bottom 374 of the cavity 161 when the cyclone bin assembly 160 is positioned within the cavity. Specifically, in the example illustrated the shoulder 386 is provided on an outer surface of the pre-motor filter chamber sidewall 292. In the illustrated example, when the cyclone bin assembly 160 is in the cleaning position, the latch member 384 is located beneath the pre-motor filter chamber 280, and the pre-motor filter therein 382.

Alternatively, the latch member and shoulder may be provided at a different location. For example, the latch member may be provided adjacent the suction motor and the shoulder may be provided on an end wall of the cyclone bin assembly.

In the illustrated example, the lock also includes an actuator, in the form of a foot pedal 388 that is provided on upper portion 104, and a linkage that connects the foot pedal 388 to the latch member 384. In the illustrated example, the foot pedal 388 translates vertically when stepped on by a user. It will be appreciated that other actuators may be used, such as a button. Further, the actuator may engage a drive motor that moves the cyclone bin assembly to the removal and/or use positions.

Figure 33:
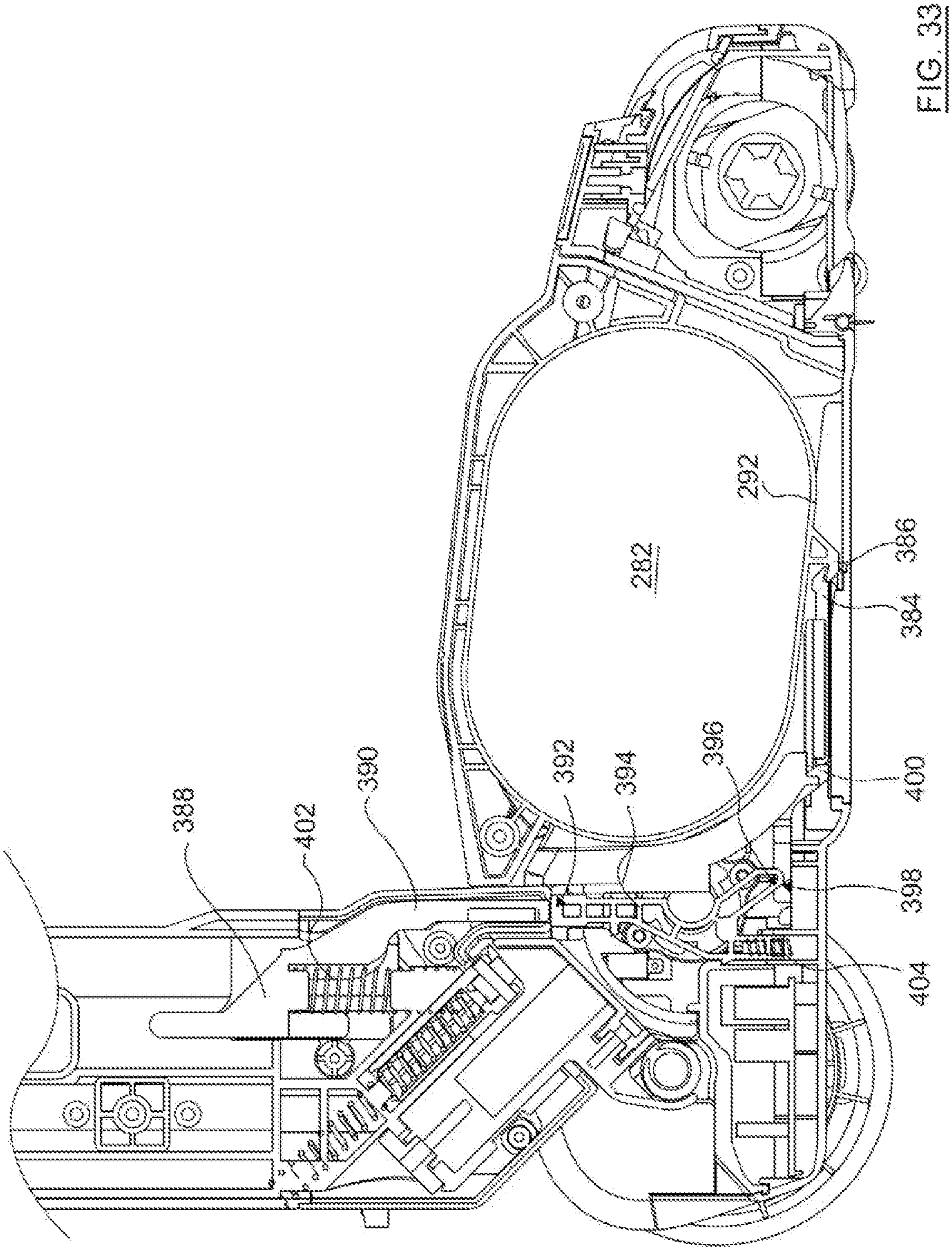
FIG. 33 is a cross-sectional view of a portion of the surface cleaning apparatus of FIG. 1 with a lock in locked configuration, taken along line 33-33, which is shown in FIG. 7.
Figure 34:
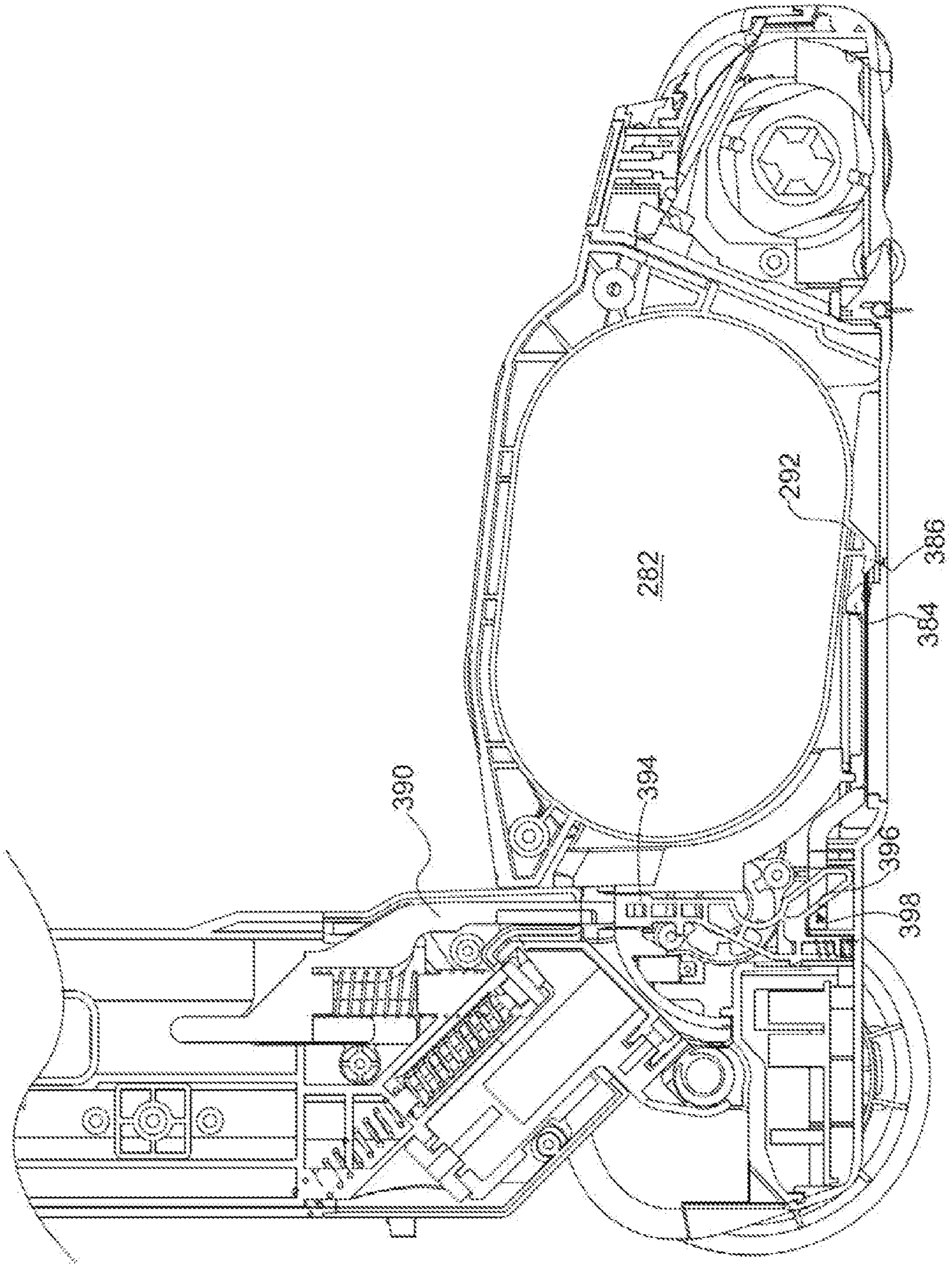
FIG. 34 is the cross-sectional view of FIG. 33 with the lock in an unlocked configuration.
Figure 35:
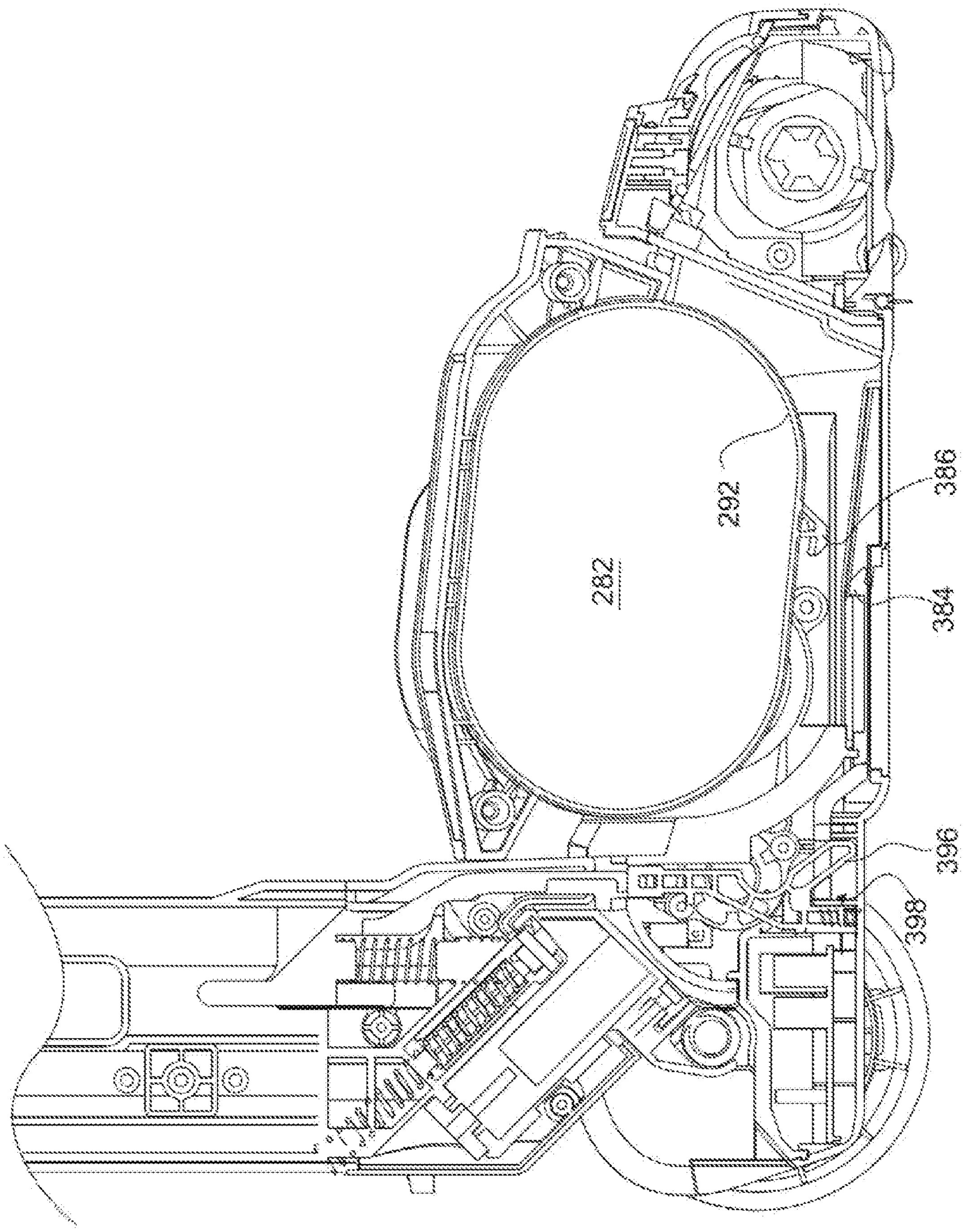
FIG. 35 is the cross-sectional view of FIG. 34, with the cyclone bin assembly pivoted to a different position.

The following is a description of the exemplified foot pedal 388. Referring to FIG. 33, movement of the foot pedal 388 causes a corresponding vertical translation of a first linkage member 390 extending within the upper portion 104. The first linkage 390 abuts an upper end 392 of a vertically translatable second linkage 394 disposed within the mounting hub 316. A lower end 396 of the second linkage 394 is configured to engage a camming surface 398 of a movable locking arm in the form of a third linkage member 400. The lock is configured so that downward vertical movement of the first linkage member 390 causes downward movement of the second linkage 394 and a generally horizontal, rearward translation of the third linkage member 400 (from right to left as illustrated in FIGS. 33-35). The rearward, horizontal movement of the third linkage member 400 is sufficient to move the latch member 384 from a position in which it engages the shoulder 386 (FIG. 33) to a position where the latch member 384 is disengaged from the shoulder 386 (FIG. 34), thereby unlocking the cyclone bin assembly 160 and allowing it to be pivoted out of the cavity 161 (shown partially pivoted in FIG. 35).

Figure 3:
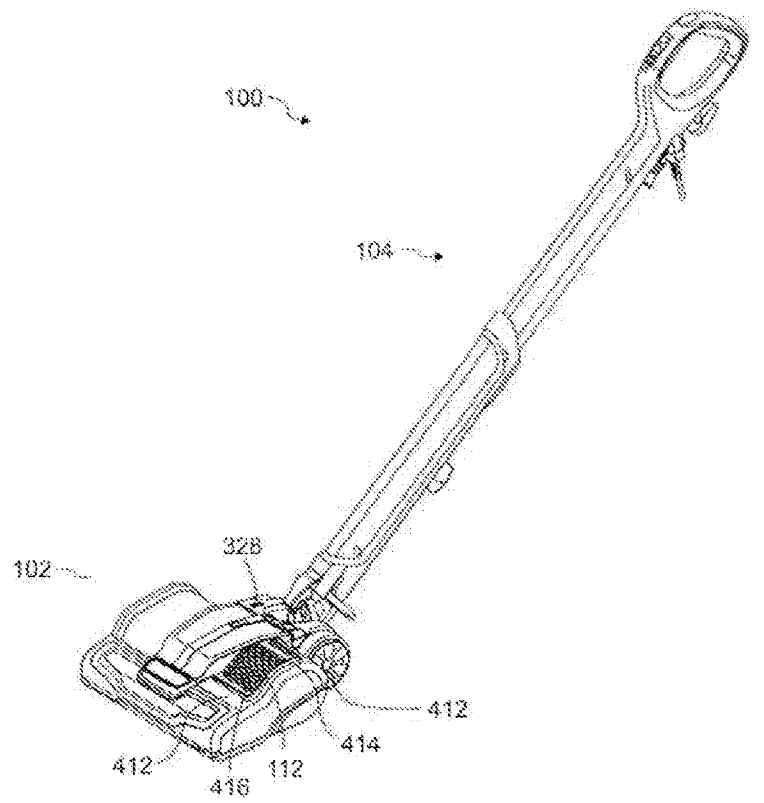
FIG. 3 is a front perspective view of the surface cleaning apparatus of FIG. 1 with an upper portion in a use position.
Figure 4:
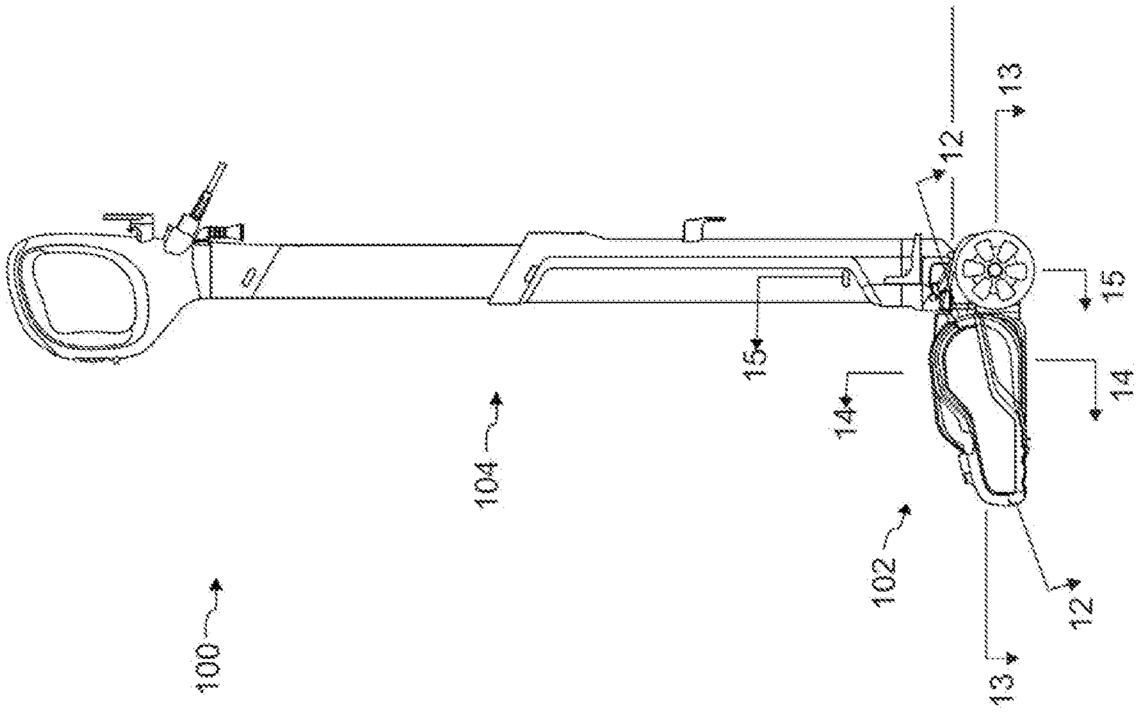
FIG. 4 is left side view of the surface cleaning apparatus of FIG. 1.

In the illustrated example, the first linkage member 390 is movable with the upper portion 104 relative to the second linkage portion 394, and pivots away from the second linkage portion 394 when the upper portion of the surface cleaning apparatus is pivoted into the floor cleaning position (FIG. 3). In this configuration, the presence of the lock does not interfere with the pivoting and/or rotating of the upper portion 104 when the surface cleaning apparatus is in use. This configuration also effectively deactivates the actuator so that the cyclone bin assembly 160 is unlocked while the surface cleaning apparatus 100 is in use. Specifically, when the upper portion 104 is pivoted into the cleaning position (FIG. 3), the first linkage 390 is spaced apart from the upper end 392 of the second linkage 394, such that movement of the foot pedal 388 is not translated to the second linkage 394. When the upper portion 104 is returned to the storage position (FIGS. 1 and 33), the first linkage 390 is automatically repositioned adjacent the upper end 392 of the second linkage 394, thereby reconnecting the lock and allowing vertical movement of the first linkage 390 to cause vertical movement of the second linkage 394 (and the resulting movement of the third linkage 400).

Both the foot pedal 388 and third linkage 400 are biased, using springs 402 and 404 respectively, such that the latch member 384 is biased toward its engaged position, in the absence of a user stepping on the foot pedal 388. In the illustrated example, the third linkage 400 is biased forwardly.

In accordance with another feature, a supplemental biasing member may be provided to help initially move the cyclone bin assembly out of the cleaning position when the lock is released. A supplemental biasing member may be used to help reduce the load on the torsion spring, or alternatively may be used to replace the torsion spring entirely. Using the supplemental biasing member to help lift the cyclone bin assembly out of its horizontal position may help reduce the magnitude of the moment force that needs to be overcome by the biasing spring (i.e. by pivoting the cyclone bin assembly slightly such that the centre of gravity of the cyclone bin assembly is moved somewhat closed to the cradle axis about which the moment forces act).

Figure 31:
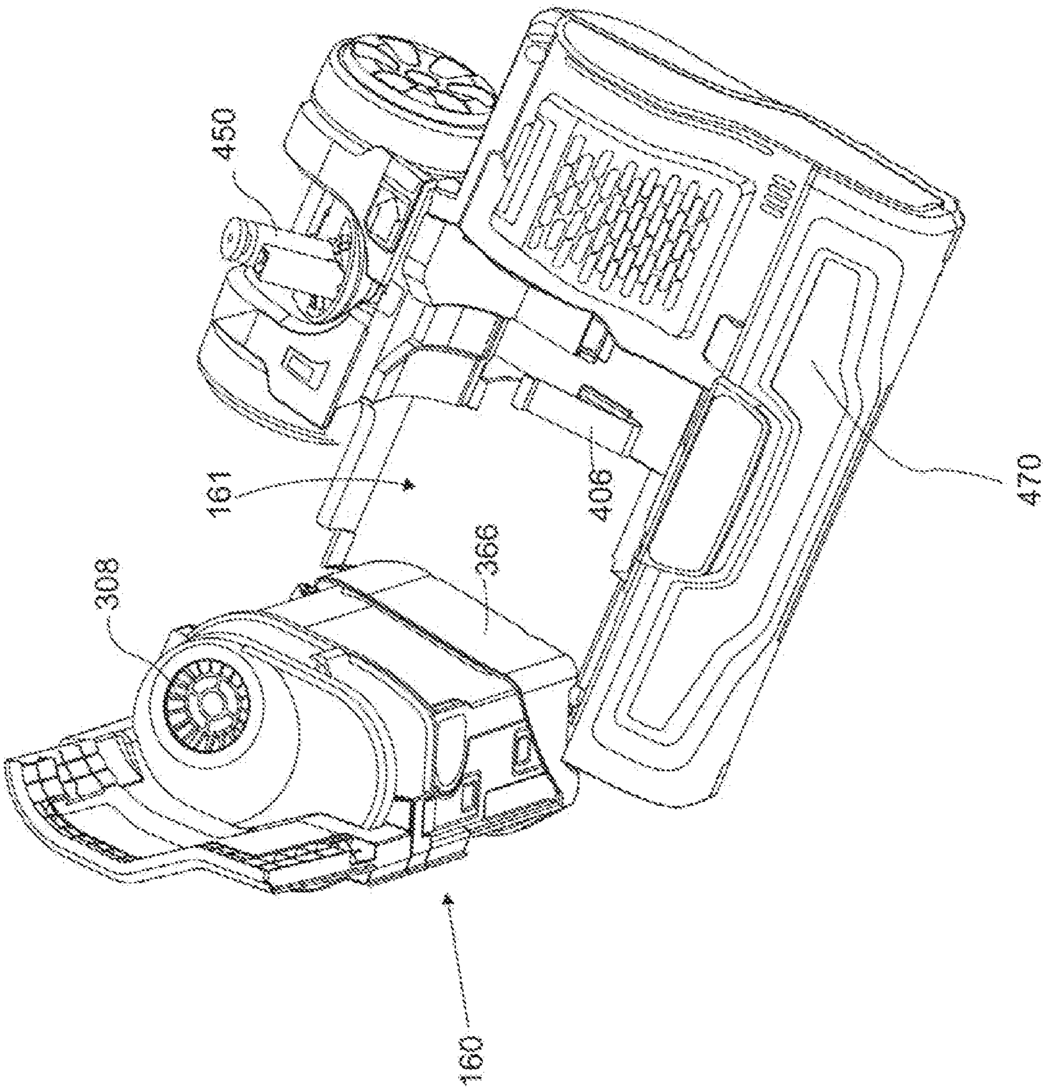
FIG. 31 is a front perspective view of the surface cleaning head of FIG. 1 with the cyclone bin assembly in a removal position.

Referring to FIGS. 31 and 37, in the illustrated example, the surface cleaning apparatus 100 includes a supplemental biasing member in the form of a leaf spring 406. The leaf spring 406 is disposed within the cavity 161 (mounted to the bottom surface 374 in the illustrated example) at a location where it engages, and is compressed by the outer surface of the cyclone bin assembly 160 when the cyclone bin assembly 160 is in the cleaning position. While the latch member 384 is engaged with the shoulder 386, the cyclone bin assembly 160 is retained in the cleaning position, overcoming the combined biasing forces of the leaf spring 406 and torsion spring 380.

When the latch member 384 is disengaged from the shoulder 386 (FIG. 34), the leaf spring 406 urges the cyclone bin assembly 160 upwards, away from the bottom surface 374 of the cavity 161. Because movement of the cyclone bin assembly 160 is restrained by its engagement with the cradle 360, this upward motion imparted by the leaf spring 406 is converted into rotation of the cyclone bin assembly 160, and cradle 360 coupled thereto, about the cradle axis 362. The movement imparted by the leaf spring 406 may be a relatively small amount, and may result in rotation of the cyclone bin assembly 160 about the cradle axis 362 of between about 0.5 degrees and about 20 degrees, and preferably between about 2 degrees and 10 degrees, and more preferably of about 5 degrees.

Alternatively, instead of the latch member 384 engaging the cyclone bin assembly 160 directly, the lock may be configured such that the latch member 384 engages a portion of the cradle 360, such as, for example, the sidewall 366.

It will be appreciated that the surface cleaning apparatus may utilize only the supplemental biasing member so that the a cyclone bin assembly handle or the like is revealed to enable a user to grasp and remove the cyclone bin assembly from the surface cleaning head or to move the cyclone bin assembly to a removal position. For example, the supplemental biasing member may lift the cyclone bin assembly sufficiently to enable a user to then manually rotate the support platform to the removal position of FIG. 29.

In the alternate embodiment of FIGS. 46-49, instead of pivoting with a cradle, when the cyclone bin assembly 1160 is unlocked it translates laterally upwardly out of the cavity 1161 under the upward biasing force of the leaf spring 1406 (FIG. 49) to a removal position in which the cyclone bin assembly 1160 is slightly higher in the vertical direction, but remains partially nested within the cavity 1161.

Figure 49:
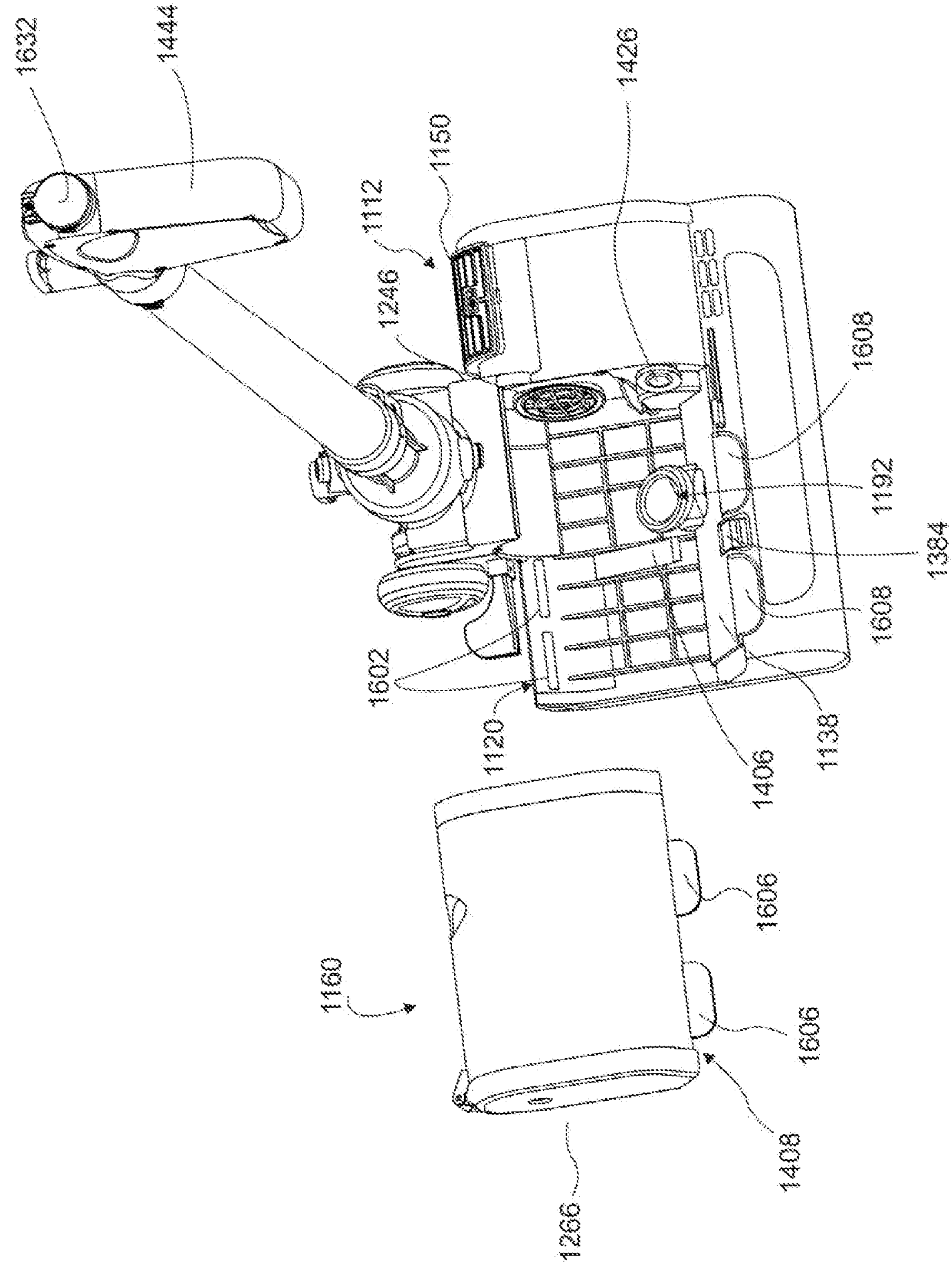
FIG. 49 is a top perspective view of the surface cleaning apparatus of FIG. 46, with the cyclone bin assembly removed.
Figure 50:
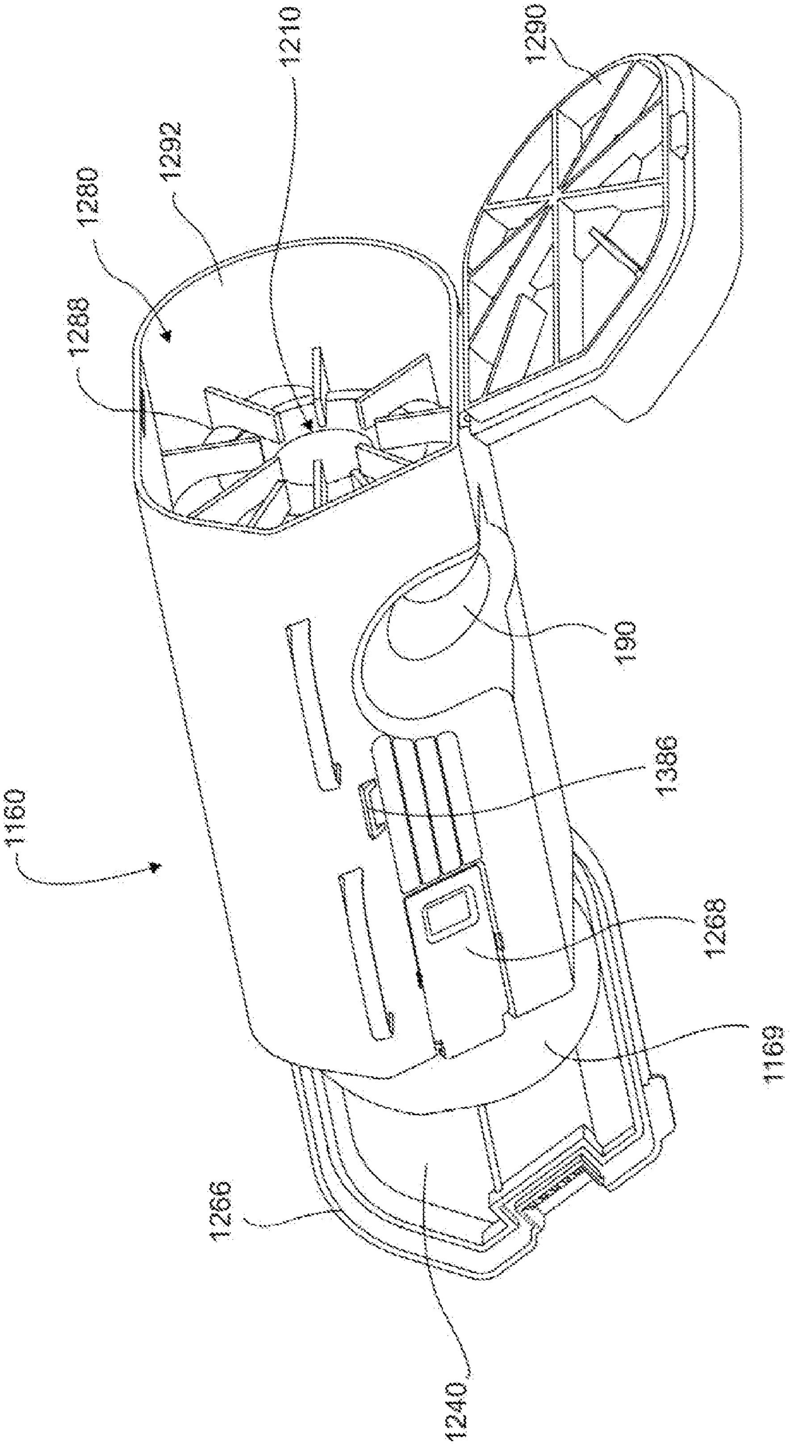
FIG. 50 is a front perspective view of an example of a cyclone bin assembly with a filter chamber opened.
Figure 51:
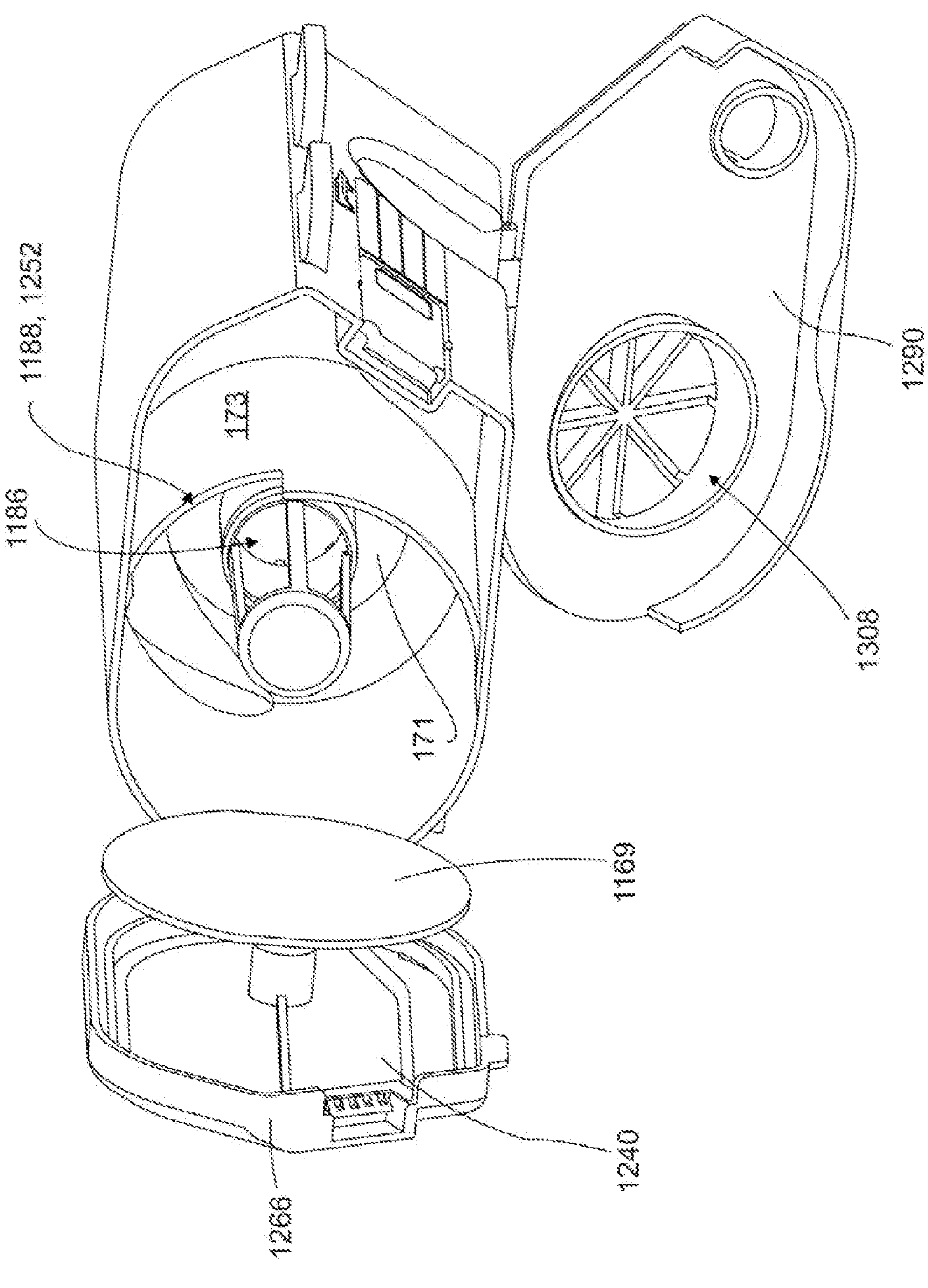
FIG. 51 is a side perspective view of the cyclone bin assembly of FIG. 50 showing the cyclone chamber in an open position.
Figure 52:
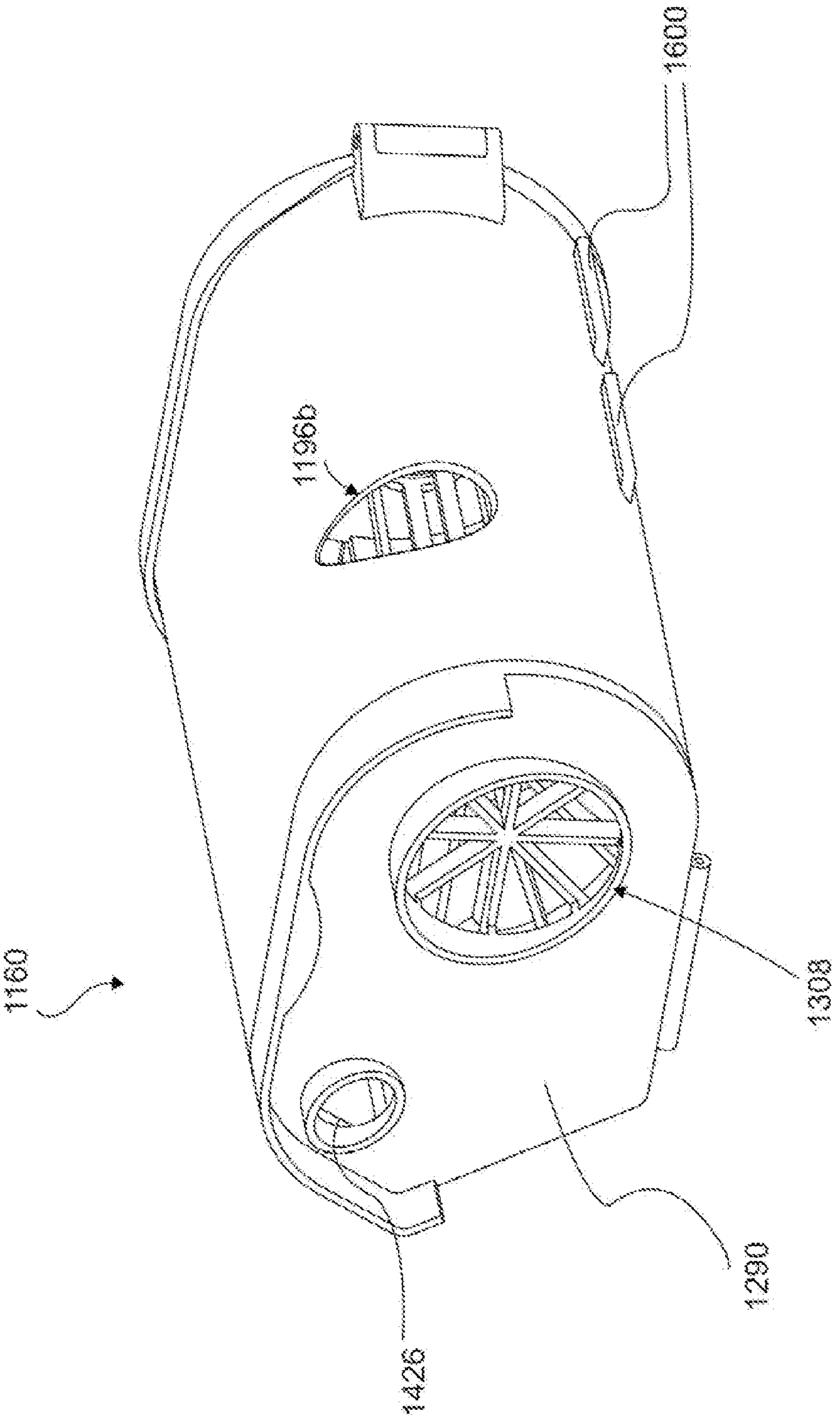
FIG. 52 is a perspective view of the filter chamber end of the cyclone bin assembly of FIG. 50.

Referring to FIG. 49, in this example the cyclone bin assembly 1160 is inserted into the cavity by inserting rear tabs 1600 (FIG. 52) into the corresponding rear slots 1602 that are provided in the rear wall 1120 of the cavity 1161. With the rear tabs 1600 inserted, the cyclone bin assembly 1160 can be pivoted forwardly until the pair of front tabs 1604 are received in corresponding recesses 1608. When the front tabs 1604 are inserted into the recesses 1608, the latch member 1384 may engage the corresponding shoulder 1386 (FIG. 50) on the sidewall of the cyclone bin assembly 1160.

To unlock the cyclone bin assembly 1160, a user may depress the latch 1384, thereby disengaging it from the shoulder 1386 and allowing the leaf spring to urge the cyclone bin assembly 1160 upward into the removal position (Figured 47). In the removal position, the front tabs 1604 can function as the cyclone bin assembly handle 1408, as the tabs 1606 are positioned proud of the recesses 1608 and serve as finger grips allowing a user to grasp the cyclone bin assembly 1160.

In the illustrated example, when moving from the cleaning position to the removal position the cyclone bin assembly 1160 rotates about a generally transverse axis, that is parallel to the cyclone axis 1174, the suction motor axis 1182, brush motor axis 1224 and the brush axis 1134.

Optionally, the cyclone bin assembly can moved from the cleaning position to the removal position by pivoting laterally (as shown herein), by pivoting forwardly, or by pivoting rearwardly. Alternatively, or in addition to pivoting, the cyclone bin assembly may also be moved in the removal position by sliding or translating laterally, sliding forwardly, and/or by sliding upwardly. In some embodiments, the cyclone bin assembly may be moved to the removal position using a combination of different movements. For example, the cyclone bin assembly may translate laterally and then pivot upwardly, or the cyclone bin assembly may pivot to a vertical orientation, and then slide upwardly, laterally, forwardly and/or rearwardly.

It will be appreciated that some of the embodiments disclosed herein may not use any of the features of the cyclone bin assembly removal and latch mechanism disclosed herein and that, in those embodiments, the removal and latch mechanism may be of various constructions or a removal and latch mechanism may not be used.

Cyclone Bin Assembly Handle

The following is a description of a cyclone bin assembly handle having various features, any or all of which may be used (individually or in any combination or sub-combination), by itself in any surface cleaning apparatus or in any combination or sub-combination with any other feature or features disclosed herein.

In accordance with one feature, the cyclone bin assembly may include a carry handle portion that is exposed and/or made more readily available when the cyclone bin assembly is in the removal position. The handle portion may help increase the overall height of the cyclone bin assembly in the removal position, and preferably may form an uppermost portion of the cyclone bin assembly while it is in the removal position. Providing a handle at a relatively high, and optionally uppermost position on the cyclone bin assembly may help position the handle at an elevation that is relatively comfortable, or is more comfortable, for a user to reach (e.g. to help minimize the amount of bending required by the user).

In accordance with another feature, as exemplified in FIGS. 20 and 21, the cyclone bin assembly 160 may include a handle 408 that extends transversely (e.g., longitudinally from the laterally inward end of the cyclone bin assembly 160). In this configuration, the handle 408 extends longitudinally away from the end wall 290 of the pre-motor filter chamber 280.

In the illustrated example, the handle 408 extends beyond the end wall 290 of the pre-motor filter chamber 280 by a handle length 410, measured in the direction of the cyclone axis 174. The handle length 410 may be any suitable length, and may be between about 25% and about 200%, and optionally between about 50% and about 150%, and optionally between about 55% and about 75% of the length 372 between the end wall 290 and the openable door 266.

Optionally, the cyclone bin assembly 160 can be configured so that the cyclone bin assembly 160, including the handle 408, extends across almost the most or all of the entire width 338 of the surface cleaning apparatus. Configuring the cyclone bin assembly to extend the width 338 of the surface cleaning apparatus may help increase the height of the cyclone bin assembly 160, in particular the handle portion 408, when the cyclone bin assembly 160 is in the removal position, while remaining within the width 338 of the surface cleaning head 102 when in the cleaning position. Optionally, the width of the cyclone bin assembly, including the handle portion (i.e. the sum of lengths 372 and 410), can be between about 25% and about 100% of the width 338 of the surface cleaning head 102, and preferably can be between about 50% and about 100% and more preferably can be between about 80% and about 100% of the width 338. In the illustrated example, the combined width of the dirt collection chamber, pre-motor filter chamber and handle length (the sum of lengths 372 and 410) is generally equal to the width 338 of the surface cleaning head 102.

In accordance with another feature, the handle may be configured to be positioned at an upper portion of the cyclone bin assembly when the cyclone bin assembly is in the removal position and (as exemplified in FIG. 28) may extend upwardly when the cyclone bin assembly is in the removal position.

Referring to FIGS. 20 and 21, in the illustrated example the handle 408 includes an open frame include a pair of generally longitudinally extending struts 412 extending parallel to the cyclone axis 174, and a generally perpendicular cross-member 414 which, in the example illustrated forms a hand grip portion of the handle 408. In the illustrated example, the handle includes two struts 412 that are joined by the cross-member 414 such that the handle 408 defines an internal opening 416.

In accordance with another feature, the handle opening 416 may be configured to at least partially receive another portion of the surface cleaning apparatus when the cyclone bin assembly is in the cleaning position. For example, the opening 416 may be configured to seat around a portion of the surface cleaning head 102 when the cyclone bin assembly 160 is in the cleaning position. This may help facilitate the positioning of the handle so that it is flush with, or recessed into, the top surface of the surface cleaning head when the cyclone bin assembly is in the cleaning position.

As exemplified in FIGS. 3 and 7, the handle opening 416 may surround the clean air outlet 112, and specifically optional removable grill 150 and post-motor filter 152, when the cyclone bin assembly 160 is in the cleaning position. In this configuration, an upper surface of the handle 408 is generally flush with the upper surface of the grill 150, and both the grill 150 and the upper surface of the handle 408 are recessed into, and form part of, the exposed top face 128 of the surface cleaning head 102. Alternatively, instead of being an enclosed opening, the handle 408 may include only a single strut and the opening may have one or more open sides.

In accordance with another feature, the handle 408 may be moveable relative to the cyclone chamber 164, dirt collection chamber 166 and/or pre-motor filter chamber 280. For example, the handle 408 may be provided on a movable and/or openable portion of the cyclone bin assembly, such as an openable door or chamber wall. This may help facilitate positioning the handle in a desired location on the cyclone bin assembly while still providing the desired access to the openable portions of the cyclone bin assembly.

In accordance with another feature, as exemplified in FIG. 23, the handle 408 may be integrally formed with the end wall 290 of the pre-motor filter chamber 280 or formed as a one piece assembly therewith (e.g. separately formed and then secured together such as by an adhesive, welding, a mechanical fastener or the like). As the end wall 290 is pivotal relative to the cyclone chamber 164 and dirt collection chamber 166 to provide access to the pre-motor filter 282, the handle 408 is also pivotal with the pre-motor filter end wall 290.

It will be appreciated that some of the embodiments disclosed herein may not use any of the features of the cyclone bin assembly handle disclosed herein and that, in those embodiments, the cyclone bin assembly handle may be of various constructions or a cyclone bin assembly handle may not be used.

Bleed Valve

The following is a description of a bleed air valve that may be used by itself in any surface cleaning apparatus or in any combination or sub-combination with any other feature or features disclosed herein.

Figure 39:
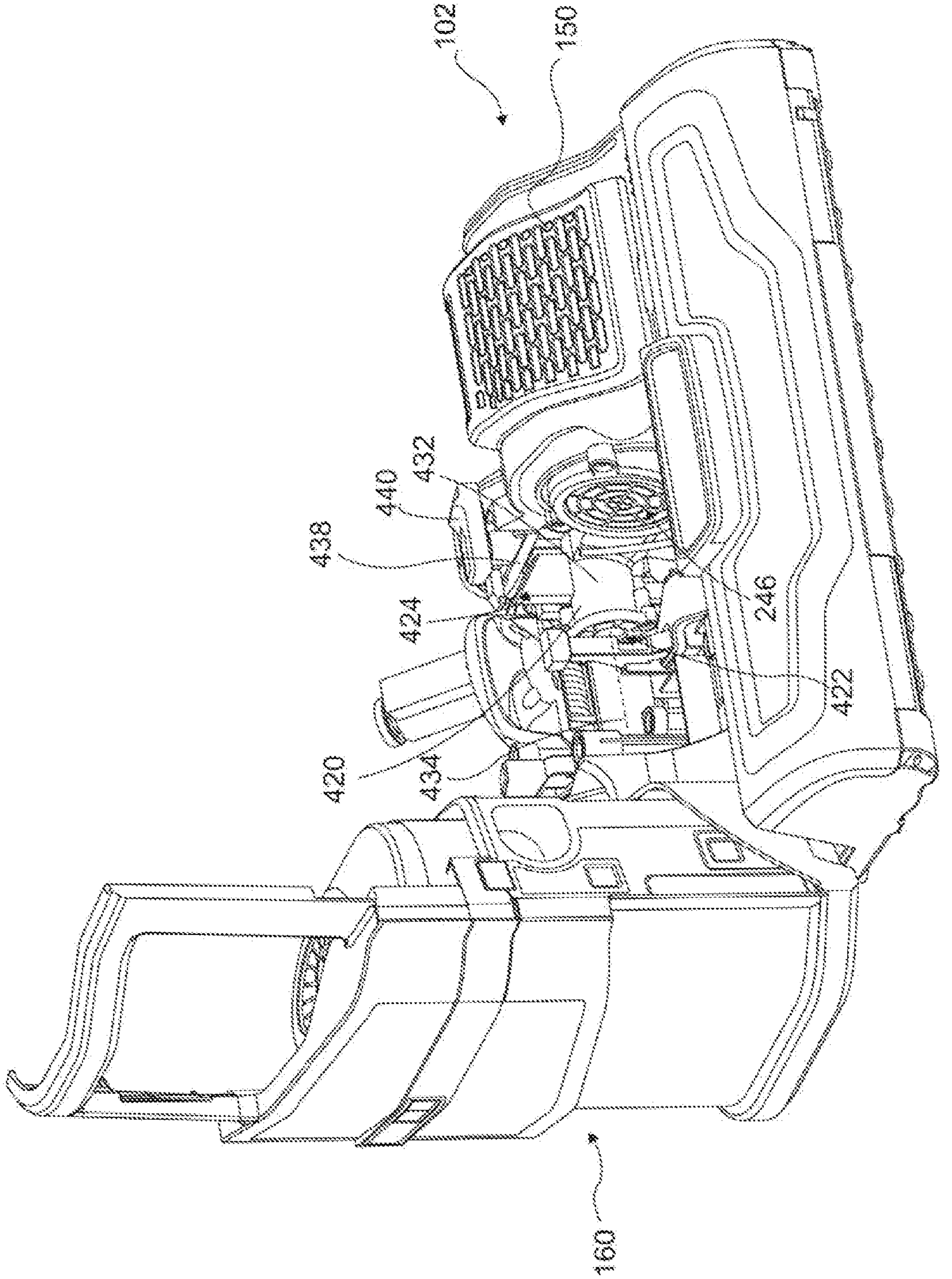
FIG. 39 is a front perspective view of the surface cleaning head of FIG. 1 with the cyclone bin assembly in a removal position and a cover removed to reveal a bleed valve.
Figure 40:
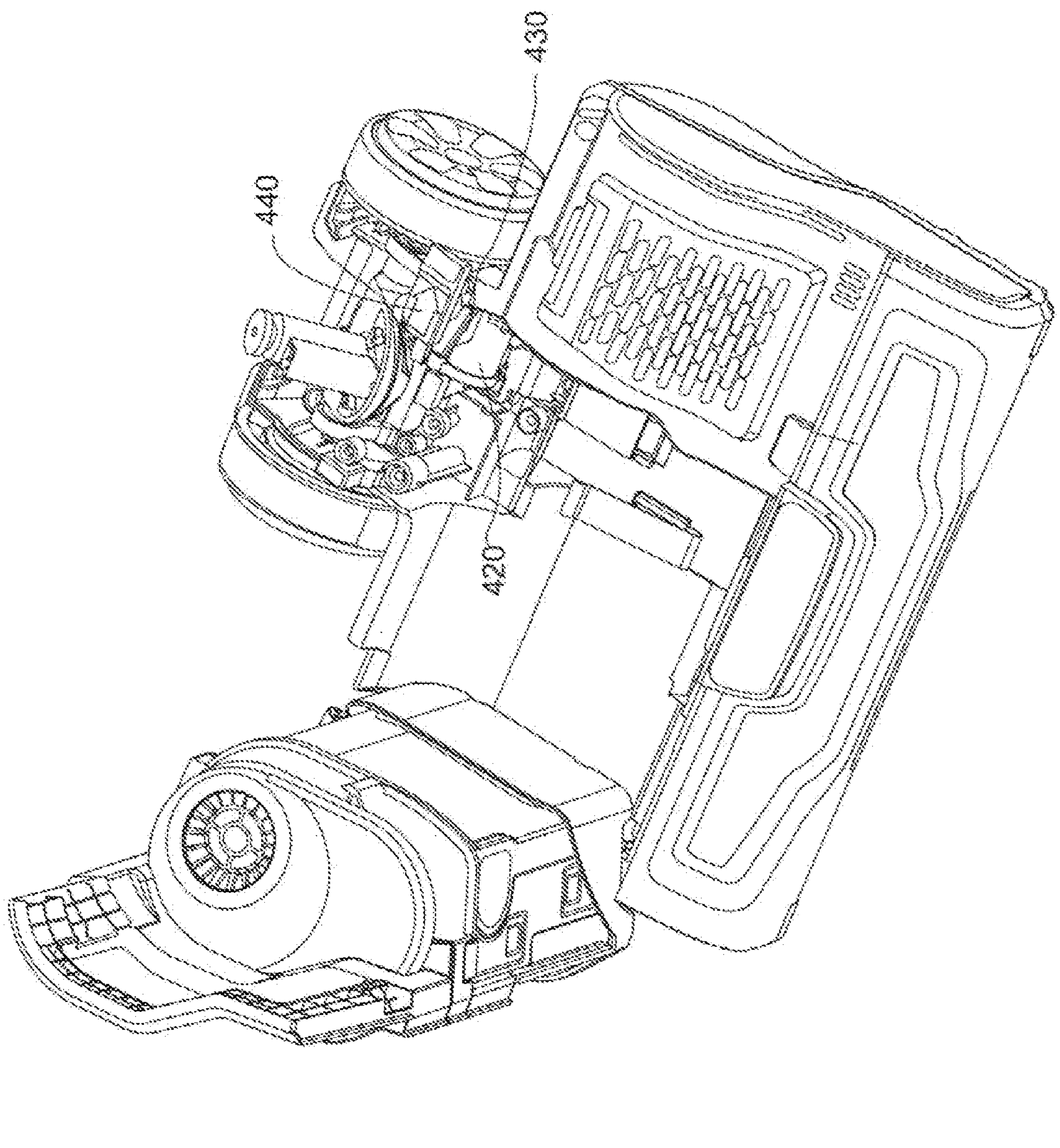
FIG. 40 is a top perspective view of the surface cleaning head as shown in FIG. 39.

It is possible that in some instances, the airflow path may become fully or partially clogged. For example, a large object, such as a ball of hair or popcorn, may become lodged anywhere in the airflow path in the surface cleaning head. For further example, the pre-motor filter may become clogged with particulate matter. If this occurs, airflow to the suction motor may be restricted and the suction motor may overheat and burn out. Referring to FIGS. 39 and 40, in the illustrated example the surface cleaning apparatus includes a bleed valve 420 that is provided in the surface cleaning head 102. If a clog occurs in the airflow path, the pressure in the suction motor housing will decrease. The bleed valve is preferably configured to open when the pressure decreases, and allow bleed air to flow through to the suction motor so that it does.

The bleed air valve has an outlet that provides bleed air as required to the suction motor, and optionally between the suction motor and the downstream side of a pre-motor filter. An advantage of this configuration is that the bleed air is delivered directly to the suction motor. If the pre-motor filter is dirty or clogged, which may be the reason the bleed valve opens, then the flow of bleed air to the suction motor will not be impeded by the pre-motor filter.

In accordance with one feature, the bleed air preferably travels through the bleed valve mechanism in a direction that is generally parallel to and optionally parallel to and in the same direction, as the direction of air flow exiting a cyclone. Alternately, or in addition, the bleed air preferably travels through the bleed valve mechanism in a direction that is generally parallel to and optionally parallel to and in the same direction, as the direction of air entering the suction motor.

Alternatively, the bleed valve may extend in a transverse direction with respect to as the direction of air flow exiting a cyclone and/or the direction of air entering the suction motor and the bleed air can exit the bleed valve in a direction that is generally orthogonal to either the direction of air flow exiting the cyclone, the direction of air flow entering the suction motor, or both.

Introducing bleed air into the air flow path upstream from the suction motor may also affect the air flow in the air flow path through the surface cleaning head upstream from the bleed air valve, which may in turn affect the suction available at the dirty air inlet. Optionally, the bleed air valve may be manually and/or selectively openable so that a user can purposefully introduce a desired quantity of bleed air into the air flow path. For example, a user may choose to open the bleed air valve, thereby reducing the suction at the dirty air inlet, when the surface cleaning apparatus is used to clean hard flooring surfaces, and may wish to close the bleed air valve, thereby increasing suction at the dirty air inlet, when cleaning carpets or other rough surfaces.

As exemplified in FIG. 13, the bleed valve 420 may include a primary air inlet 422, a secondary air inlet 424 and an air outlet 426. A longitudinally extending primary airflow passageway 428 extends between the primary air inlet 422 and the air outlet 426, and a secondary airflow passageway 430 extends between the secondary air inlet 424 and the primary airflow passageway 428. The air outlet 426 is in air flow communication with the downstream header 304 and the downstream face 296 of the pre-motor filter 282.

In the illustrated example, the primary airflow passageway 428 is defined by a sidewall 432 extending along a bleed valve axis 434 (FIG. 39). The sidewall 432 is disposed in the mounting hub 316 and, in the example illustrated, is oriented so that the bleed valve axis 434 is generally transverse to the forward direction of travel, and is parallel to the cyclone axis 174, suction motor axis 182, brush motor axis 224 and brush axis 134. Orienting the bleed valve 420 in this manner may help nest the bleed valve 420 between the wheel axis 320 and the cyclone bin assembly 160. This may help reduce the overall size of the surface cleaning apparatus. In this configuration, the direction of the flowing through the primary airflow passageway 428 is generally parallel to the direction of the air flow entering the suction motor air inlet 246, and is generally parallel to the direction of air flowing out of the cyclone air outlet 186 and the direction of air flowing through the pre-motor filter 282.

The air outlet 426 is provided as an opening in the sidewall 432, which is in communication with the downstream header 304. In this configuration, the direction of air exiting the bleed valve 420 via the air outlet 426 is generally orthogonal to the direction of the air flow entering the suction motor 162. Preferably, gaps are provided in the ribs supporting the downstream side 296 of the pre-motor filter 282 to receive air exiting the bleed valve 420 and to distribute the incoming air within the downstream header 304.

The primary air inlet 422 is covered by a pressure-actuated valve member that is configured to automatically open (thereby supplying bleed air) when the pressure in the downstream header falls below a pre-set threshold. When the valve member opens, air from open spaces within the surface cleaning head 102 is drawn into the bleed valve 420.

Referring to FIGS. 39 and 40, the secondary air inlet 424 is covered using a manually movable cover member 436. The cover member 436 includes a sealing portion 438 to selectively cover, and seal, the secondary air inlet 424, an engagement portion, in the form a slider 440, that can be actuated by a user.

In accordance with another feature, a user may move the slider between one or more open positions, in which second air inlet 424 is uncovered by different amounts to allow varying air flow rates into the bleed valve 420 (to the right as illustrated in FIGS. 39 and 40), and a closed position in which the secondary air inlet 424 is sealed to block air flow into the bleed valve 420. This may allow a user to manually choose to introduce bleed air into the system by opening the secondary air inlet, even if pressure in the downstream header 304 has not fallen below the pre-set threshold.

In the alternate embodiment of FIG. 56, the bleed valve 1420 includes a primary air inlet 1422 and an air outlet 1426, which in the example illustrated includes an aperture that is formed on the end wall 1290 of the pre-motor filter chamber 1280. A longitudinally extending primary airflow passageway 1428 extends between the primary air inlet 1422 and the air outlet 1426. The air outlet 1426 is in air flow communication with the downstream header 1304 and the downstream face 1296 of the pre-motor filter 1282.

In the illustrated example, the primary airflow passageway 1428 is defined by a sidewall 1432 extending along a bleed valve axis 1434. In the example illustrated, the bleed valve axis 1434 is generally transverse to the forward direction of travel, and is parallel to the cyclone axis 1174, suction motor axis 1182, brush motor axis 1224 and brush axis 1134. In this configuration, the direction of the flowing through the primary airflow passage 1428 is generally parallel to the direction of the air flow entering the suction motor air inlet 1246, and is generally parallel to the direction of air flowing out of the cyclone air outlet 1186 and the direction of air flowing through the pre-motor filter 1282.

Referring also to FIG. 57, in the illustrated example, the bleed valve 1420 is disposed directly above the brush motor 1214, and the axes 1422 and 1224 are co-planar.

It will be appreciated that some of the embodiments disclosed herein may not use any of the features of the bleed valve disclosed herein and that, in those embodiments, the bleed valve may be of various constructions or a bleed valve may not be used.

Handle Swivel Steer Connection

Optionally, the upper portion 104 may be steeringly connected to the surface cleaning head 102. For example, the upper portion 104 may be movably connected to the surface cleaning head in a manner so as allow the surface cleaning head 102 to be steered by rotating or twisting the upper portion 104.

Figure 11:
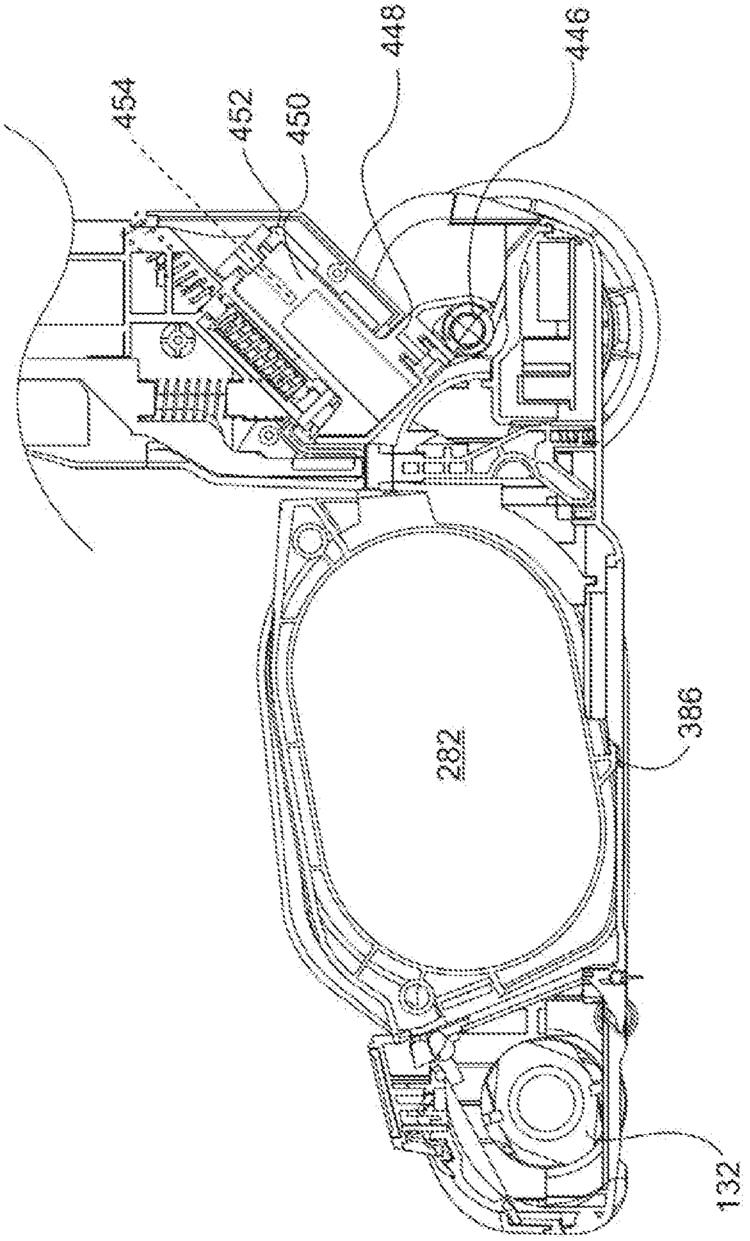
FIG. 11 is an enlarged view of a portion of FIG. 10.

In one embodiment, the pivot may be provided on the mounting hub 316. For example, as exemplified, the upper portion 104 may include a drive handle 442, having a hand grip portion 444, which extends upwardly from the cleaning head. The drive handle 442 is pivotally connected to the surface cleaning head 102 using a yolk member 448 (FIGS. 11 and 15) and may be pivoted between a storage position (FIG. 1) and an inclined floor cleaning position (FIG. 3). The yolk 448 may be pivotally coupled to the mounting hub 316 and is pivotal about a pivot axis 446 (FIG. 15) that is generally orthogonal to the direction of travel of the surface cleaning apparatus 100. Preferably, the driving handle 442, yolk 448, mounting hub 316 and other related components are configured so that the driving handle 442 is generally stable in the storage position, and will remain self-standing when in the storage position. For example, the upper portion 104 may be configured so that when in the storage position, the centre of gravity of the upper portion 104 is disposed generally above, or forward of the rear wheel pivot axis 320 and/or the yolk pivot axis 446. Alternatively, an external stand or storage device may be used in combination with the surface cleaning apparatus. Alternately, or in addition, a lock may be provided to secure the handle in the storage position. The lock may be a friction lock, a moveable locking member or the like.

In the illustrated example, the pivot axis 446 is parallel to the cyclone axis 174, suction motor axis 182, brush motor axis 224 and brush axis 134, and is offset rearwardly from each of these axes. The pivot axis 446 is at a higher elevation than the rear wheel axis 320, and in the example lies in the same vertical plane as the rear wheel axis 320.

Figure 41:
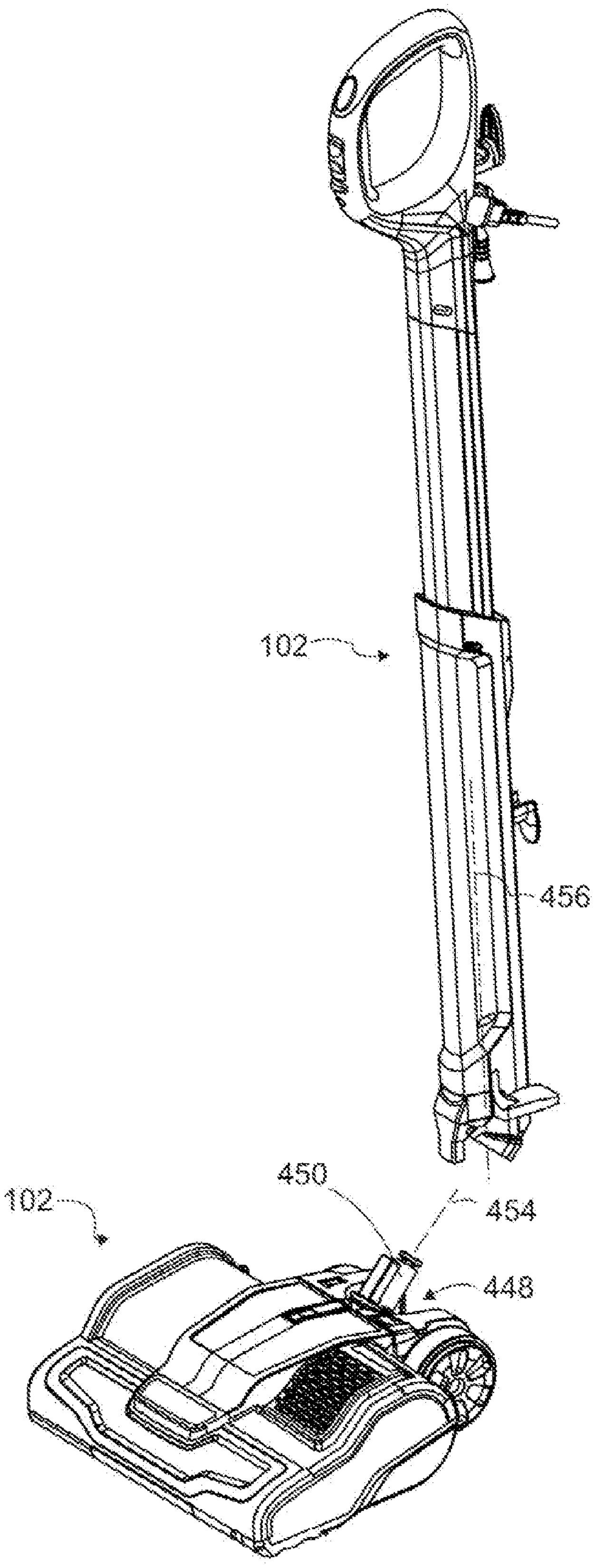
FIG. 41 is a partially exploded front perspective view of the surface cleaning apparatus of FIG. 1.
Figure 42A:
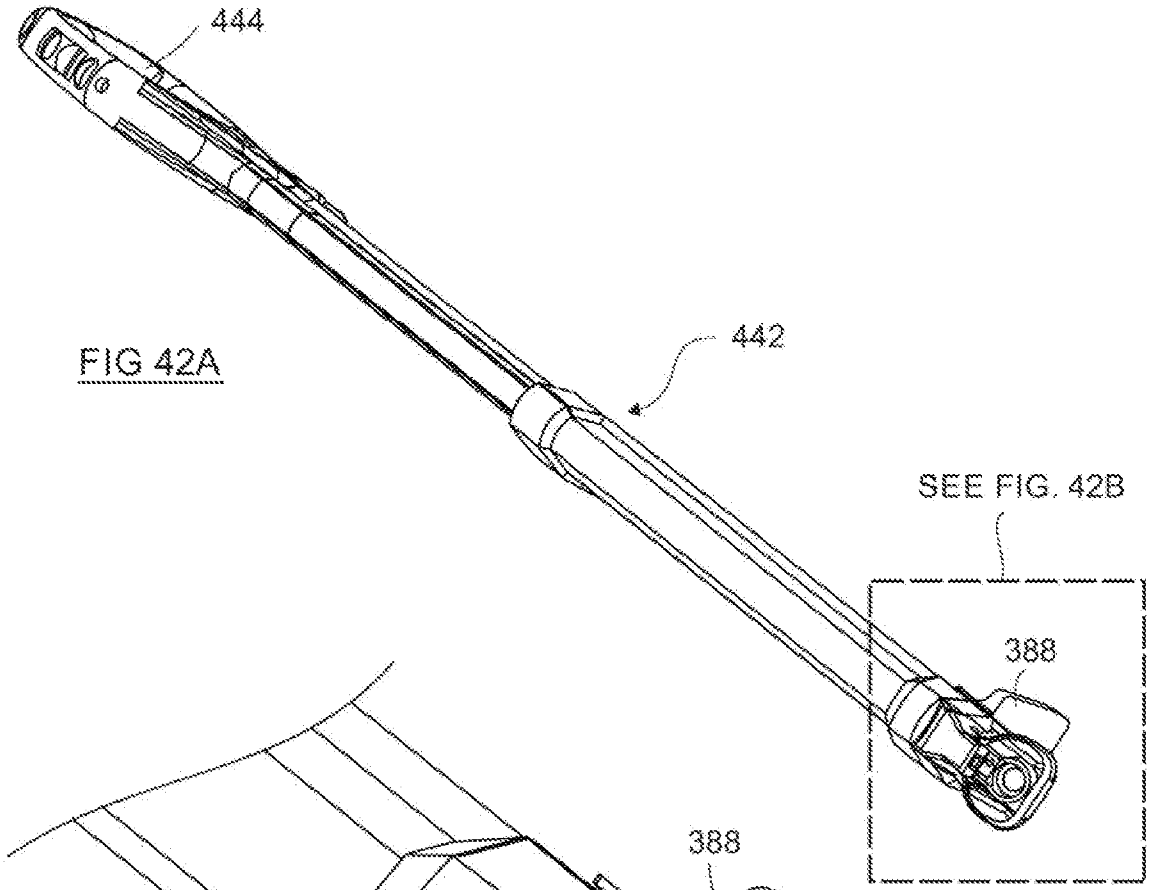
FIG. 42A is perspective view of the drive handle of FIG. 1.
Figure 42B:
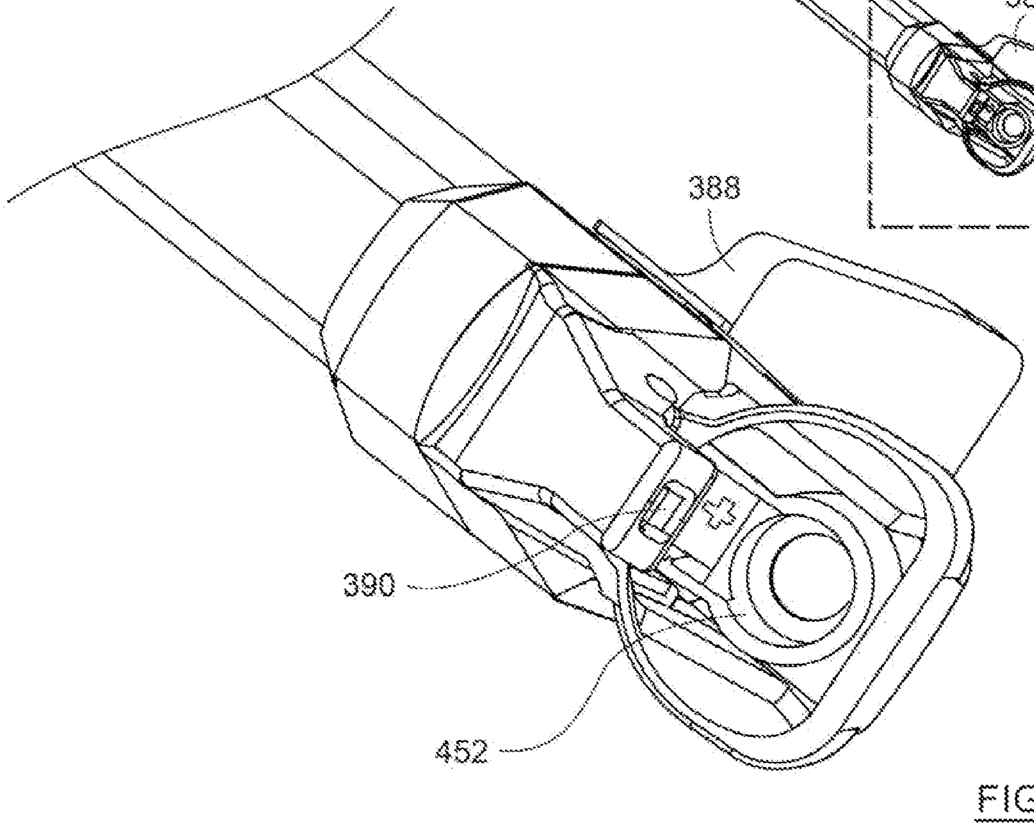
FIG. 42B is an enlarged view of a portion of the drive handle shown in FIG. 42A.

Optionally, the drive handle 442 can also be rotatably coupled to the yolk 448. This may help facilitate steering of the surface cleaning head. In the illustrated example, the yolk 448 includes generally cylindrical journal member 450 (FIG. 41) that is rotatably received within a corresponding housing 452 in the drive handle 442 (see FIGS. 42A, 42B and FIG. 11). In this configuration, the drive handle 442 is rotatable relative to the yolk 448 about a rotation axis 454. In the illustrated example, the rotation axis 454 is not parallel to the longitudinal axis 456 of the drive handle 442. Instead, the rotation axis 454 is at an angle 458 (FIG. 17) to the longitudinal axis 456. The angle 458 may be any suitable angle, and may be between about 0 degrees and about 90 degrees, and preferably between about 10 degrees and about 60 degrees, and more preferably between about 20 degrees about 50 degrees, and in the illustrated example is between about 40 degrees and about 45 degrees. Arranging the rotation axis 454 at an angle 458 relative to the handle axis 456 may help facilitate steering of the surface cleaning head 102 when the drive handle 442 is pivoted rearwardly.

It will be appreciated that some of the embodiments disclosed herein may not use any of the features of the swivel steering mechanism disclosed herein and that, in those embodiments, the swivel steering mechanism may be of various constructions or a swivel steering mechanism may not be used.

Brush Motor Air Inlet

The following is a description of a brush motor air inlet that may be used by itself in any surface cleaning apparatus or in any combination or sub-combination with any other feature or features disclosed herein. An advantage of this feature is that cooling air is provided to help cool the brush motor while the surface cleaning apparatus is in use. The cooling air inlet may be configured to draw air from the air flow path upstream or downstream from the air treatment member, or optionally to draw air in from the surrounding environment.

In accordance with one feature, one or more cooling air inlets may be provided in a wall of the brush chamber 130. In accordance with another feature, a plurality of ling air inlets may be provided. The advantages of each of these features is discussed with reference to FIG. 9.

As exemplified in FIG. 9, the surface cleaning head 102 includes a cooling air inlet 460 that is positioned to draw air from within the brush chamber 130. In this example, the cooling air inlet 460 includes four apertures 462 provided in the rear wall 138 of the brush chamber 130. The apertures 462 are in air flow communication with the brush motor 214 via an internal conduit provided in the surface cleaning head 102 (see also FIG. 13). The apertures 462 may be sized so that the area of each individual is relatively small and the combined area of all the apertures 462 is sufficient to provide a desired flow of air to the brush motor 214. Providing multiple relatively small apertures may help provide sufficient air flow while each individual aperture is small enough prevent relatively large debris particles from being drawn into the brush motor. Providing multiple apertures in parallel with each other can provide redundant air flow options, which may also allow some cooling air to reach the brush motor 214 even if one or more of the apertures become blocked with debris. Positioning the cooling air inlet within the brush chamber 130, and in proximity to the rotating brush 130, may also allow the brush 132 to dislodge debris from the cooling air inlet 460 while the surface cleaning apparatus is in use.

It will be appreciated that some of the embodiments disclosed herein may not use any of the features of the brush motor air inlet disclosed herein and that, in those embodiments, the brush motor air inlet may be of various constructions or a brush motor air inlet may not be used.

Cutting Groove

The following is a description of a cutting groove that may be used by itself in any surface cleaning apparatus or in any combination or sub-combination with any other feature or features disclosed herein.

Referring to FIG. 16, in the illustrated example the brush 132 includes cutting groove 468 that extends axially along the length of the brush 132. The cutting groove 468 is recessed below the surface of the brush 132 and is sized to accommodate a pair of scissors or other cutting tool. This can allow a portion of the scissors to be inserted beneath strands of hair, string or other types of debris that can get wound around the brush 132 during use. The scissors can then be translated along the length of the cutting groove 468 to cut the hair and strings entangled around the brush. Preferably, the brush 132 can be rotated so that the cutting groove 468 can be positioned toward the bottom of the brush 132 to allow a user to access the cutting groove 468 through the dirty air inlet 110 (for example, if a user turns the surface cleaning head 102 over for service). Optionally, the brush chamber 130 may also include one or more transparent regions to allow a user to visually inspect the interior of the brush chamber, including, for example, the brush. In the illustrated example, the brush chamber 130 includes a transparent region in the form of a window 470 (FIGS. 30 and 31) that is provided in the top wall 142.

Height Adjustable Drive Handle

The following is a description of an adjustable drive handle that may be used by itself in any surface cleaning apparatus or in any combination or sub-combination with any other feature or features disclosed herein.

In accordance with one aspect of the teaching described herein, the upper portion may be adjustable so that its height (i.e. the distance between the surface cleaning head and the hand grip) may be modified by a user. Providing an adjustable upper portion may allow a user to vary the height of the upper portion, such as, for example to accommodate users of different heights. Adjusting the height of the upper portion may also help reduce the overall size of the surface cleaning apparatus. Reducing the overall size of the surface cleaning apparatus may reduce the amount of space required for storage and/or shipping of the surface cleaning apparatus. The upper portion may be configured to be adjustable using any suitable adjustment mechanism.

Figure 5:
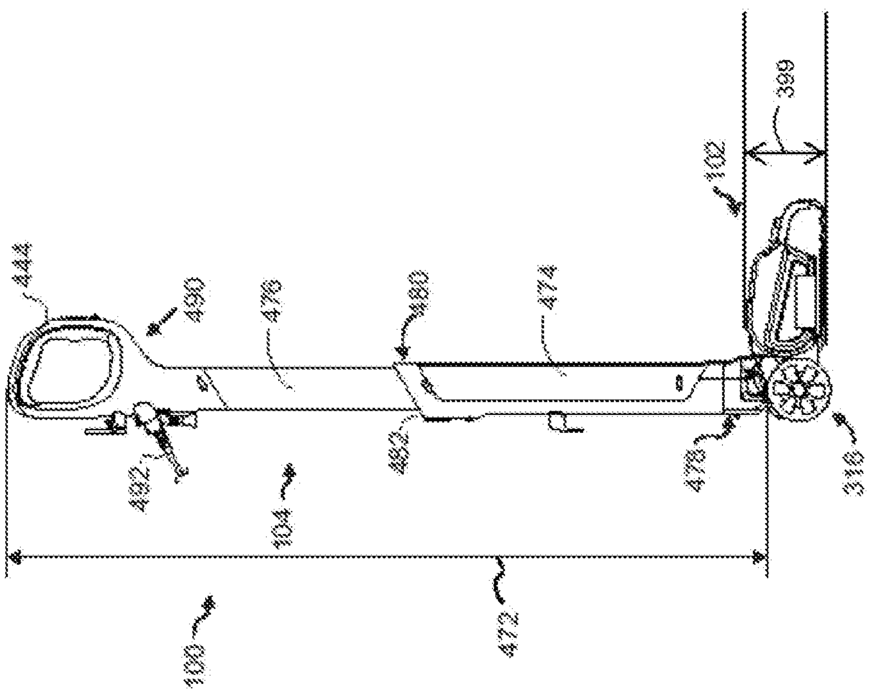
FIG. 5 is right side view of the surface cleaning apparatus of FIG. 1.
Figure 6:
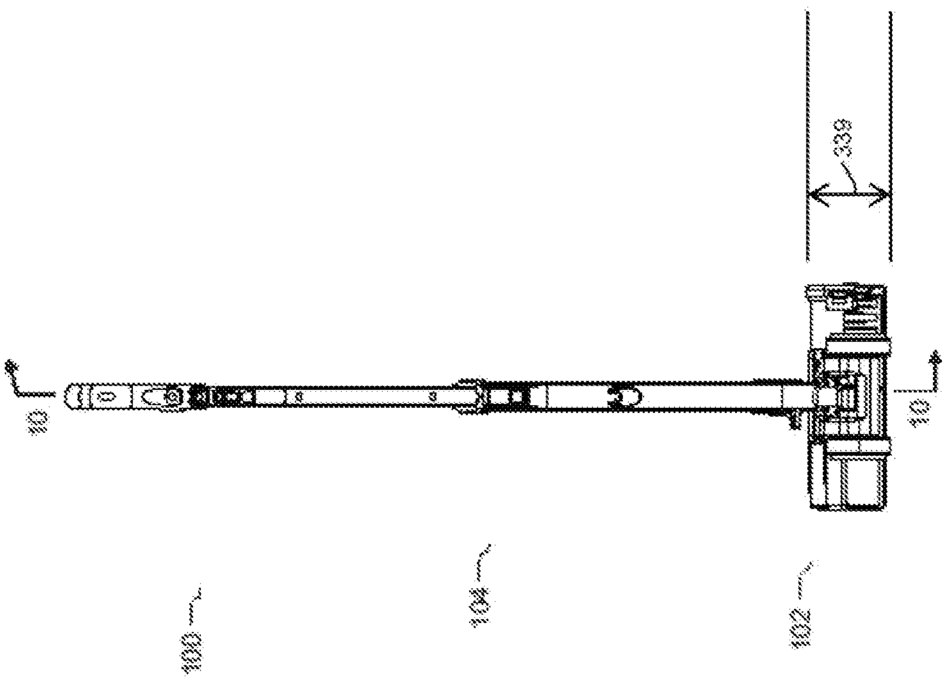
FIG. 6 is a rear view of the surface cleaning apparatus of FIG. 1.
Figure 44:
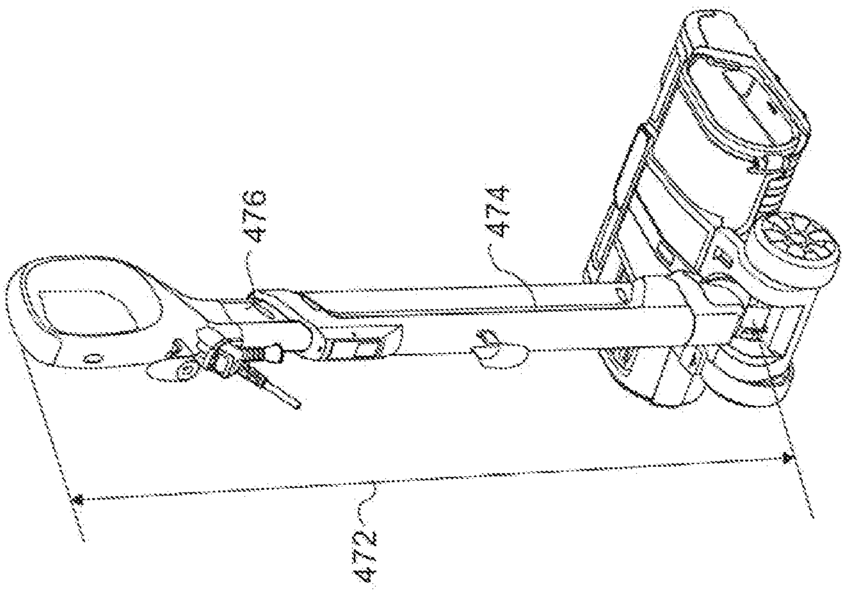
FIG. 44 is a rear perspective view of the surface cleaning apparatus of FIG. 1 with a drive handle in a retracted position.

As exemplified in FIGS. 5 and 44, drive handle 442 includes a lower section 474 and an upper section 476. The lower section 474 has a first end 478 movably coupled to the surface cleaning head (e.g., mounting hub 316), and an upper end 480 spaced apart from the lower end 478. The upper section includes a lower end 488 that is coupled to the lower section 474, and an upper end 490 that includes the hand grip 444 and an optional attachment point 492 for the electrical cord. In the illustrated example, the upper section 476 is sized to fit within the lower section 474, and is slidable relative to the lower section between an extended position (FIG. 5) and one or more retracted positions (FIG. 44).

In the extended position, the upper portion has an extended height 472 that can be any suitable height, and in the example illustrated is between about 50 cm and about 150 cm or more. In extended position the hand grip 444 and optional electrical cord attachment location 492 are spaced apart from the lower section 474. When in the retracted position, the upper section 474 may be at least partially nested within the lower section 474 and the upper portion height 472 is less than when in the extended position. In the illustrated example, the hand grip 444 and electrical cord attachment location 492 are both positioned closer to the surface cleaning head 102, and may be generally adjacent the upper end 480 of the lower section 474, when the upper portion 476 is in the retracted configuration.

Figure 43:
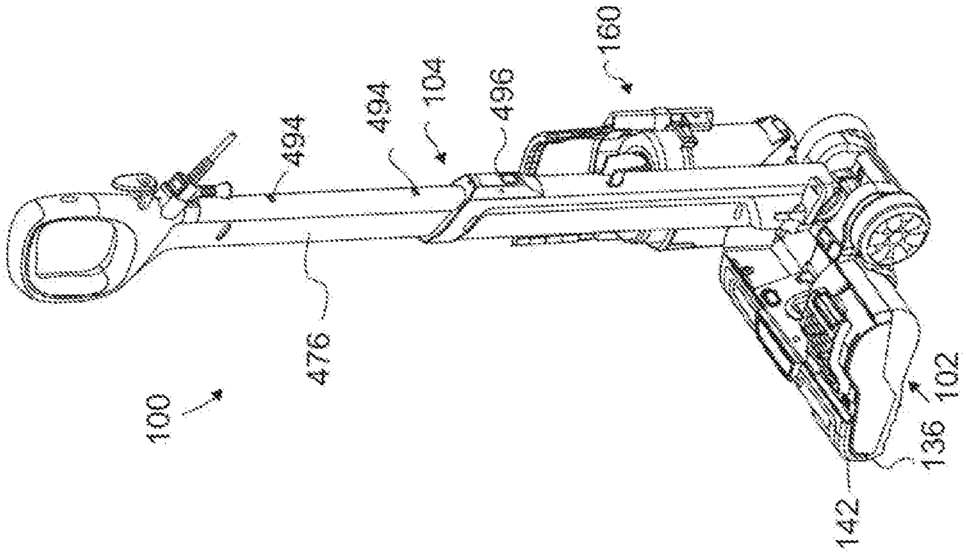
FIG. 43 is a rear perspective view of the surface cleaning apparatus of FIG. 1 with a brush chamber open and the cyclone bin in a removal position.

The upper section 476 may be secured in each of the one or more retracted positions using any suitable mechanism, including, for example, pins, latches, detents, clips, fasteners, friction/interference fit and other mechanisms. Referring to FIG. 43, in the illustrated example the upper section 476 includes a pair of detents 494 and the lower section 474 includes a latch 496 that is configured to selectively engage the detents 494. The latch 496 is releasable so that a user may release the latch 496 and translate the upper section 476 relative to the lower section 474 to alter the height the upper portion 104. When a desired detent 494 is aligned with the latch 496, the latch 496 may be re-engaged (and preferably is biased toward the engaged position) thereby securing the upper section 476 and inhibiting further translation of the upper section 476 relative to the lower section 474.

It will be appreciated that some of the embodiments disclosed herein may not use any of the features of the drive handle disclosed herein and that, in those embodiments, the drive handle may be of various constructions or a height adjustable drive handle may not be used. For example, the drive handle need not be provided with electrical cord attachment location 492. Instead the electrical cord may be connected to the surface cleaning head 102 (e.g., see the alternate embodiment of FIG. 53 wherein the electrical cord attachment point 492 is provided on the mounting hub 1318, and wherein, optionally, the electrical cord 502 is not detachable).

Detachable Electrical Cord

The following is a description of an electrical cord that may be used by itself in any surface cleaning apparatus or in any combination or sub-combination with any other feature or features disclosed herein.

In accordance with one aspect of the teaching described herein, power (preferably AC power) may be supplied to the surface cleaning apparatus using the electrical cord. In the illustrated examples, AC power is supplied to the surface cleaning apparatus using an electrical cord that may be connected to a wall socket. The cord may be connected to the apparatus at any suitable location, including, for example on the surface cleaning head itself, or on the upper section. If connected to the upper section, the cord attachment point may be toward an upper end of the upper section (e.g., generally adjacent the hand grip portion), and one or more electrical conductors may extend from the cord attachment point to the surface cleaning head. The electrical conductors may be internal the upper section, or external. Optionally, the electrical conductors may be adjustable, and preferably may be extensible and/or resilient (i.e. such as a coiled electrical cord) so that the electrical conductors can accommodate changes in length of the upper portion without requiring decoupling or reconfiguration, and without interrupting electrical supply to the surface cleaning head.

In accordance with one feature, the electrical cord may be connected to an upper portion of the drive handle, such as the upper end of the upper section, adjacent and slightly beneath the hand grip. Connecting the electrical cord on an upper portion of the drive handle, such as adjacent the hand grip may help reduce the likelihood that the cord will interfere with the movement of the surface cleaning head. This positioning may also help make it convenient for a user to hold a portion of the cord with his/her free hand (i.e. the hand that is not holding the hand grip) and to manipulate the cord to help prevent entanglement or other impedances to the vacuuming process. Spacing the electrical cord attachment point away from the surface cleaning head may also help reduce the need to move the electrical cord in close proximity and/or beneath furniture and other objects when the surface cleaning head is moved proximate or under such objects. This may help reduce the chances of the electrical cord becoming tangled or snagged while the surface cleaning apparatus is in use.

In accordance with another feature, the electrical cord may be detachably connected to the surface cleaning apparatus. This may allow the cord to be detached for storage, or for an alternative or replacement cord to be connected to the apparatus. This may also allow the cord to be detached when not needed, such as if the surface cleaning apparatus is being powered by an alternative power source.

Figure 45:
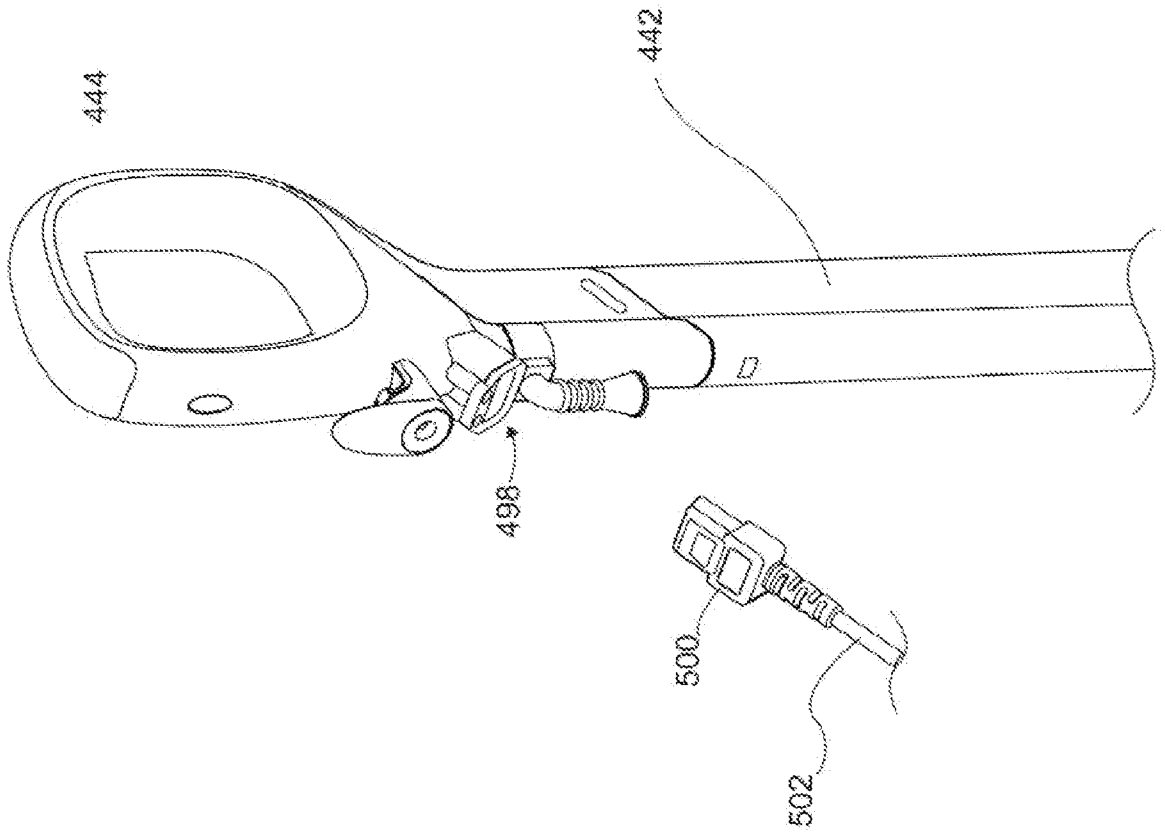
FIG. 45 is an enlarged rear perspective view the upper portion of the drive handle of FIG. 1.

Referring to FIG. 45, in the illustrated example, the electrical cord 502 is connected to the upper portion 442 using a detachable connector that provides mechanical and electrical connection between the electrical cord and the surface cleaning apparatus. The connector may be any suitable type of electrical connector, and in the illustrated example includes a first connector portion in the form of a socket 498 on the upper portion 442 that includes pins, and a second connector portion, in the form of a connector 500 that is configured to fit within the socket 498 and receive the pins.

It will be appreciated that some of the embodiments disclosed herein may not use any of the features of the electrical cord disclosed herein and that, in those embodiments, the electrical cord may be of various constructions or a detachable electrical cord may not be used.

Cordless Mode

The following is a description of a cordless operating mode that may be used by itself in any surface cleaning apparatus or in any combination or sub-combination with any other feature or features disclosed herein.

Optionally, the surface cleaning apparatus may include one or more portable energy storage devices, such as one or more batteries. The onboard battery may be a DC power source. Providing an onboard portable energy storage device may allow the surface cleaning apparatus to be operated in a cordless mode, in which the surface cleaning apparatus can be powered by the onboard energy storage device and need not be plugged into a wall socket. Configuring the surface cleaning apparatus as a cordless apparatus may be used in combination with any one or more of the other features described herein.

Preferably, the on-board energy storage member is one or more batteries that may be sized to fit within the surface cleaning head and is powerful enough to drive the suction motor and optionally the rotating brush motor. Optionally, when operated on DC battery power, as opposed to external AC power, the rotating brush motor and/or the suction motor may operate at a reduced rate or may be otherwise configured to reduce power consumption (e.g., the motor may have dual windings to be operable on both AC and DC power). If required, a converter module can be provided to convert the external power supply into a format (e.g., DC) that is compatible with motor, configured to re-charge the batteries or is otherwise preferred over the native incoming format.

The battery may be any suitable type of battery, including a rechargeable battery. Optionally, when the surface cleaning apparatus is electrically connected to an AC power source (e.g., a wall socket), power from the AC source may be used to re-charge the battery, to directly power/drive the suction motor, and/or rotating brush motor or to simultaneously run the suction motor and brush motor and re-charge the battery. In this configuration, when the vacuum is operated the battery in the cleaning head may be charged and the suction motor and brush motor may be driven by AC power and/or a combination of AC and battery power. Then, when the surface cleaning apparatus is electrically decoupled from the AC power source the surface cleaning apparatus can be operated on battery power alone.

Alternatively, or in addition to positioning a battery in the surface cleaning head, one or more batteries may be provided within the upper portion and electrically connected to the suction motor and/or other components in the surface cleaning head. Providing at least some batteries in the upper portion may provide extra space to accommodate the batteries, as compared to the space limitations within the surface cleaning head. Positioning batteries in the upper portion may also alter the weight distribution of the surface cleaning apparatus, which may alter the "feel" of the apparatus in a user's hand. In embodiments where the electrical cord is connected to the upper portion, providing batteries within the upper portion may help facilitate the use of a convenient electrical connection between the incoming power from the electrical cord and the batteries and/or charging equipment. This may help reduce the need to run multiple electrical conductors between the upper portion and the surface cleaning head.

Providing batteries in the upper portion may help facilitate access to the batteries for maintenance and/or replacement.

It will be appreciated that some of the embodiments disclosed herein may not use any of the features of the cordless mode disclosed herein and that, in those embodiments, the cordless mode may be of other designs or a cordless mode may not be used.

Alternate Embodiments with Above Floor Cleaning

The following is a description of all in the head type surface cleaning apparatuses that are operable in at least one above floor cleaning mode, that may be used by itself in any surface cleaning apparatus or in any combination or sub-combination with any other feature or features disclosed herein.

Optionally, an all in the head type surface cleaning apparatus may be configured to operate in at least one above floor cleaning mode. For example, the surface cleaning apparatus may include an auxiliary dirty air inlet that is provided at the end of a hose, wand, auxiliary cleaning tool or other type of conduit that may be connected in air flow communication with the air treatment member and suction motor for above floor cleaning. The auxiliary dirty air inlet may be used to clean furniture, drapes, walls and other surfaces that are above the floor upon which the surface cleaning head rests.

The auxiliary dirty air inlet may be automatically in air flow communication with the air treatment member and suction motor when the auxiliary dirty air inlet is positioned for use (e.g., a wand having a dirty air inlet is removed from a storage position). A valve or other air flow control member may be provided in the air flow path to interrupt the air flow communication between the auxiliary dirty air inlet and the suction motor. The valve may be manually operable or may operate automatically by insertion and/or removal of an above floor cleaning wand or by placing the apparatus in the upright storage position or releasing the apparatus from the upright storage position or by sensors and electrical-driven movement.

Alternately, or in addition, the cyclone bin assembly may be configured so that it can be connected to the rest of the surface cleaning apparatus in at least two different positions and/or orientations. Preferably, the surface cleaning apparatus may be configured so that arranging the cyclone bin assembly in a first configuration establishes air flow communication between cyclone bin assembly and the primary dirty air inlet (the dirty air inlet of the surface cleaning head), and arranging the cyclone bin assembly in a second configuration interrupts the air flow communication with the primary dirty air inlet and establishes air flow communication with the auxiliary dirty air inlet. In accordance with this aspect, repositioning the cyclone bin assembly reconfigures the air flow path(s) through the surface cleaning apparatus.

In one example, which is in accordance with this aspect, the cyclone bin assembly, and the cyclone chamber therein, may have a single air inlet that can be selectively connected to two or more different airflow paths. In such a case, the cyclone bin assembly may be moveable or repositionable (e.g., rotatable, pivotal, translatable, insertable into the surface cleaning head in at least two different orientations, etc.) to selectively connect the cyclone bin assembly air inlet in air flow communication with different air flow paths, including, for example the above floor cleaning wand, the brush chamber and/or other auxiliary air flow paths. Moving the cyclone bin assembly to modify the air flow path through the surface cleaning apparatus may help simplify the configuration of the surface cleaning apparatus and may, for example, eliminate the need to provide additional valves or other such flow control devices.

Referring to FIG. 46, another example of an all in the head type surface cleaning apparatus 1100, having an above floor cleaning mode, is illustrated. The surface cleaning apparatus 1100 is generally similar to the surface cleaning apparatus 100, and analogous features are identified using like reference characters indexed by 1000. Some or all of the features described in association with the surface cleaning apparatus 100 can be used alone, or in combination with each other in the surface cleaning apparatus 1100. Similarly, the above floor cleaning aspects of cleaning apparatus 1100 may optionally be incorporated into surface cleaning apparatus 100.

Dual Air Inlets

In accordance with this embodiment a cyclone may be provided with dual air inlets, one connectable in air flow communication with the primary dirty air inlet and one connectable in air flow communication with the auxiliary dirty air inlet. One or more valves may be used to selectively connect the cyclone with the primary and auxiliary dirty air inlets.

As exemplified in FIGS. 55 and 56, the cyclone chamber 1164 may include an air inlet 1184 with an upstream or inlet end 1190 that is connectable to an air outlet 1192 (FIG. 49) in the rear wall 1138 of the brush chamber 1130. The cyclone air inlet 1184 also includes a downstream end 1194 that includes an opening formed in the cyclone sidewall 1173, and a connecting portion 1196 extending through the dirt collection chamber 1166 between the upstream and downstream ends 1190 and 1194. The air flow connection between the brush chamber outlet 1192 and the cyclone chamber 1164 can form a first air flow path, which is a portion of the overall air flow path connecting the dirty air inlet 1110 to the clean air outlet 1112. In addition to the air inlet 1184, the cyclone chamber 1164 may also include an auxiliary air inlet **1184*b* with an upstream or inlet end 1190*b* that is connectable to a downstream end 1628 of a duct 1626 that is provided in the mounting hub 1316. The cyclone air inlet 1184*b* also includes a downstream end 1194*b* that includes an opening formed in the cyclone sidewall 1173*b*, and a connecting portion 1196*b* extending through the mounting hub 1316, between the upstream and downstream ends 1190*b* and 1194*b***.

Referring to FIGS. 46 and 58, in the illustrated embodiment the upper portion 1104 includes a rigid wand 1620 that is slidably received within a flexible hose 1622. The wand 1620 has a lower, downstream end 1624 that can be coupled to the duct 1626 that extends through the mounting hub 1316, whereby the upper portion 1104 and the connection of the upper portion to the surface cleaning head is sufficiently rigid to function as the driving handle 1442, including the hand grip 1444, to maneuver the surface cleaning apparatus (FIG. 58).

Referring also to FIG. 56, the wand 1620 has an upstream end 1630 that is spaced apart from the downstream end 1624. A drive handle valve, such as cap 1632 is provided on the upper portion 1104, e.g., positioned on the hand grip 1444, so that the cap 1632 may be adjacent the upstream end 1630 when the wand 1620 is coupled to the duct 1626. When the cap 1632 is closed (as shown, for example, in FIGS. 49 and 58) it seals the upper end of the wand 1620. When the cap 1632 is open, air flow through the wand 1620 is permitted. In accordance with such an embodiment, wand 1620 may always be in air flow communication with the suction motor and a valve is not required. Instead, cap may seal the upstream end of wand 1620.

As shown in FIG. 59, when the cap 1632 is opened the wand 1620 can be pulled out of the surrounding hose 1622. In this configuration, the lower end 1624 of the wand 1620 is decoupled from the duct 1626, but the surrounding hose 1622 remains connected and provides the air flow connection between the lower end 1624 of the wand 1620 and the duct 1626 (and ultimately to the air inlet 1184*b*). With the wand 1620 detached, the upper portion 1104 can become flexible, and the wand 1620 may be moved away from the surface cleaning head 1102 while air flow communication is preserved by the hose 1622. Optionally, the hose 1622 may be extensible. This may help facilitate moving the hose 1622 and wand 1620 to a variety of above floor cleaning locations.

To operate the surface cleaning apparatus 1100 in a floor cleaning mode, the wand 1620 may be inserted within the hose 1622 so that the lower end 1624 of the wand 1620 engages the duct 1626. The cap 1632 may then be closed to seal the upper end of the wand 1620, thereby eliminating or substantially eliminating air flow through the upper portion and fluidly isolating the auxiliary air inlet 1184*b* from the surrounding environment. Restricting the air flow through the wand 1620 in the floor cleaning mode may help direct all or a majority of the air flow/suction generated by the suction motor 1162 through the primary dirty air inlet 1110.

To operate the surface cleaning apparatus 1100 in an above floor cleaning mode, the cap 1632 may be opened and the wand 1620 may be at least partially extracted from the hose 1622. In this configuration, the upstream end 1630 of the wand 1620 functions as an auxiliary dirty air inlet 1110*b*, that is in air flow communication with the auxiliary cyclone air inlet 1184*b*.

Optionally, when in the above floor cleaning mode, both dirty air inlets 1110 and 1110*b* may remain in air flow communication with the suction motor 1162. In such an arrangement, the suction generated by the suction motor 1162 may be divided between the dirty air inlets 1110 and 1110*b*. Alternatively, a valve or other blocking member may be used to interrupt the air flow communication between the dirty air inlet 1110 and the suction motor 1162 when operating in the above floor cleaning mode.

As exemplified in FIGS. 54A and 54B, a surface cleaning head valve to close the air flow path from the brush chamber may include a flow restricting member that includes a blocker 1634 connected to a slider 1636. The flow restricting member may be configured so that a user may translate the slider 1636, e.g., in the transverse direction, to move the blocker 1634 between a deployed position (FIG. 54A) and a retracted position (FIG. 54B). In the deployed position the blocker 1634 seals the opening 1192 in the back wall 1138 of the brush chamber 1130, thereby interrupting the air flow communication between the upstream end 1190 of the cyclone air inlet 1184 and the dirty air inlet 1110. In the retracted position, the blocker 1634 is retracted within the back wall 1138 of the brush chamber 1130 and the upstream end 1190 of the cyclone air inlet 1184 is in air flow communication with the dirty air inlet 1110.

Referring to FIGS. 83-85, another example of an all in the head type surface cleaning apparatus 5100, having an above floor cleaning mode, is illustrated. The surface cleaning apparatus 5100 is generally similar to the surface cleaning apparatus 100, and analogous features are identified using like reference characters indexed by 5000. Any one or more or all of the features described in association with the surface cleaning apparatus 100 and 1100 can be used alone, or in combination with each other in the surface cleaning apparatus 5100. Similarly, the above floor cleaning aspects of cleaning apparatus 5100 may optionally be incorporated into surface cleaning apparatuses 100, 1100 or other apparatuses disclosed herein.

Like surface cleaning apparatus 1100, in this embodiment the upper portion 1104 includes a driving handle 5442, having a hand grip portion 5444, which can be used to maneuver the surface cleaning head 5102 across the floor. The upper portion 5104 also includes a rigid wand 5620 (FIG. 85) that is slidably received within a flexible hose 5622. The wand 5620 has a lower, downstream end 5624, but unlike the surface cleaning apparatus 1100, in the surface cleaning apparatus 5100 the wand 5620 is provided in addition to the rigid driving handle 5442. In this configuration, when the wand 5620 is deployed for above floor cleaning, the handle 5442 remains structurally intact and connected to the surface cleaning head 5102, such that the handle 5442, and hand grip thereon 5444, can be used to drive and maneuver the surface cleaning head 5102 while the wand 5620 is deployed. This may allow a user to hold the wand 5620 with one hand and maneuver the surface cleaning head 5102, via the handle 5442, with the other. The wand 5620 and the flexible hose 5622 are moveable between a retracted position (FIGS. 83 and 84) and a fully extended position (FIG. 85).

Referring also to FIGS. 83 and 84, the wand 5620 has an upstream end 5630 that is spaced apart from the downstream end 5624. When the apparatus 5100 is used in a floor cleaning mode, the wand 5620 may be retracted within the hose 5622 and stored on the apparatus 5100. The wand 5620 may be stored in any suitable location, including the surface cleaning head 5102, upper portion 5104 and hand grip 5444. In the illustrated embodiment, both the wand 5620 and hose 5622 are stored within a corresponding recess 5850 that is formed in the rear surface of the handle 5442. In this configuration, the recess 5850 is sized to receive most of the hose 5622 and wand 5620 but remains open toward the rear of the apparatus 5100 to help facilitate access to the hose 5622 and wand 5620 (e.g., it may be generally U-shaped). In this embodiment, the hose 5622 forms part of the exposed, outer surface of the upper portion 5104 when the apparatus 5100 is operated in the floor cleaning mode, while the wand 5620 is nested within the hose 5622.

In the illustrated embodiment, a collar 5852 is provided at the upstream end of the hose 5622 and may be configured to slidingly receive the wand 5620. The collar 5852 may function as a hand grip member to maneuver the wand 5620 in the above floor cleaning mode, and may include one or more locking member to engage the wand 5620 and hold the wand 5620 in the retracted position (FIGS. 83 and 84).

The collar 5852 may also be configured to engage with the handle 5442 to help secure the hose 5622 and wand 5620 in the storage or retracted position (FIGS. 83 and 84). For example, in the illustrated example, the collar 5852 is detachably secured to the handle 5442, toward the upper end 5854 of the recess 5850. In this configuration, the collar 5852 functions as both a handle for the wand 5620 when it is deployed, but also as the securing mechanism used to retain the wand 5620 in its storage position. Any securing mechanism known in the art may be used. For example, the collar may be secured in position by a friction fit, an engagement member that inter-engages with a mating engagement member provided on upper portion 5104 or the like.

The collar 5852 may also include additional features, such as an electrical cord wrap 5856 that is used in combination with the cord wrap 5858 adjacent the grip 5444 to hold the electrical cord when it is not in use.

Preferably, the upstream end of the 5630 of the wand 5620 may be provided with any suitable type of drive handle valve to selectively open and close the upstream end 5630. For example, optionally a drive handle valve in the form of a cap (such as cap 1632 described herein) may be used to cover the upstream end 5630 of the wand 5620 such that when the cap is closed it seals the upstream end 5630 of the wand 5620, and that when the cap is open, air flow through the wand 5620 is permitted. In accordance with such an embodiment, wand 5620 may always be in air flow communication with the suction motor and a valve may not be required in the surface cleaning head to isolate the cyclone from the wand. Instead, the cap may seal the upstream end of wand 5620. This may allow the upstream end 5630 of the wand 5620 to remain sealed when the wand is moved from the storage position to the above floor cleaning position. Alternate options include a ball valve and the like.

Alternatively, as illustrated in FIGS. 84 and 85, the upstream end 5630 of the wand 5620 may not include a cap or other blocking member and instead the upstream end 5630 may be sealed by a sealing surface 5860 at the upper end of the recess 5850. In the illustrated embodiment, the sealing surface 5860 is configured to cover and seal the upper end of the wand 5620 when the wand 5620 is positioned within the recess 5850. Optionally, the wand 5620 may be biased upwardly within the recess 5850, for example using a spring, so that the upstream end 5630 is pressed against the sealing surface 5860 when in the storage position. In this configuration, the upstream end 5630 of the wand is automatically sealed when the wand 5620 is inserted into the recess 5850, and is automatically unsealed when the wand 5620 is removed from the recess 5850. This may help establish air flow through the wand 5620 for above floor cleaning without requiring the user to manually open a separate valve on the wand 5620.

As shown in FIG. 85, the wand 5620 may be pulled out of the surrounding hose 5622. In this configuration, the hose 5622 is connected and provides the air flow connection between the lower end 5624 of the wand 5620 and the cyclone bin assembly 5160. With the wand 5620 detached, the wand 5620 may be moved away from the surface cleaning head 5102 while air flow communication is preserved by the hose 5622.

To operate the surface cleaning apparatus 5100 in a floor cleaning mode, the wand 5620 may be inserted within the hose 5622, and both the wand 5602 and hose 5622 may be inserted within the recess 5850. The upstream end 5630 of the wand 5620 may then be sealed against the sealing surface 5854 thereby eliminating or substantially eliminating air flow through the upper portion. Restricting the air flow through the wand 5620 in the floor cleaning mode may help direct all or a majority of the air flow/suction generated by the suction motor 5162 through the primary dirty air inlet 5110.

It will be appreciated that for any of the described embodiments any valve member know in the art may be used to close the air flow path instead of or in addition to cap 1632 and/or blocker 1634 and/or sealing surface 5854. The valve may be operated manually or automatically upon reconfiguration of the surface cleaning apparatus to an above floor cleaning mode.

Referring to FIGS. 86-88, another example of an all in the head type surface cleaning apparatus 7100, having an above floor cleaning mode, is illustrated. The surface cleaning apparatus 7100 is generally similar to the surface cleaning apparatus 100, and analogous features are identified using like reference characters indexed by 7000. Any one or more or all of the features described in association with the surface cleaning apparatus 100 and 1100 can be used alone, or in combination with each other in the surface cleaning apparatus 7100. Similarly, the above floor cleaning aspects of cleaning apparatus 7100 may optionally be incorporated into surface cleaning apparatuses 100, 1100, 5100, 6100 or other apparatuses disclosed herein.

Like surface cleaning apparatuses 1100 and 5100, in this embodiment the upper portion 7104 includes a driving handle 7442, having a hand grip portion 7444, which can be used to maneuver the surface cleaning head 7102 across the floor. The upper portion 7104 also includes a rigid wand 7620 (FIG. 88) that is slidably received within a flexible hose 7622. The wand 7620 has a lower, downstream end 7624, and like surface cleaning apparatus 5100, the wand 7620 is provided in addition to the rigid driving handle 7442. In this configuration, when the wand 7620 is deployed for above floor cleaning, the handle 7442 remains structurally intact and connected to the surface cleaning head 7102, such that the handle 7442, and hand grip thereon 7444, can be used to drive and maneuver the surface cleaning head 7102 while the wand 7620 is deployed. The wand 7620 and the flexible hose 7622 are moveable between a retracted position (FIGS. 86 and 87) and a fully extended or deployed position (FIG. 88).

When the apparatus 7100 is used in a floor cleaning mode, the wand 7620 may be retracted within the hose 7622 and stored on the apparatus 7100. The wand 7620 may be stored in any suitable location, including the surface cleaning head 7102, upper portion 7104 and hand grip 7444. In the illustrated embodiment, both the wand 7620 and hose 7622 are stored within a corresponding recess 7850 that is formed in the rear surface of the handle 7442. In this configuration, the recess 7850 is sized to receive most of the hose 7622 and wand 7620 but remains open toward the rear of the apparatus 7100 to help facilitate access to the hose 7622 and wand 7620 (e.g., it may be generally U-shaped).

In the illustrated embodiment, a collar 7852 is provided at the upstream end of the hose 7622 and may be configured to slidingly receive the wand 7620. The collar 7852 may function as a hand grip member to maneuver the wand 7620 in the above floor cleaning mode, and may include one or more locking member to engage the wand 7620 and hold the wand 7620 in the retracted position (FIGS. 86 and 87).

As explained in relation to surface cleaning apparatus 5100, the collar 7852 may also be configured to engage with the handle 7442 to help secure the hose 7622 and wand 7620 in the storage or retracted position (FIGS. 86 and 87), and may also include additional features, such as an electrical cord wrap 7856.

In the illustrated embodiment, the wand 7602 and hose 7622 are not in air flow communication with the surface cleaning head 7102, or the cyclone bin assembly 7160 provided thereon, when the wand 7602 and hose 7622 are disposed within the recess 7850. Instead of remaining constantly connected to the air flow path when not in use, the wand 7602 and hose 7622 are stored isolated from the air flow path, and are only connected into air flow communication with the cyclone bin assembly 7160 and suction motor when required for above floor cleaning. This configuration may help maintain a desired suction level in the primary dirty air inlet 7110 when the apparatus 7100 is operated in a floor cleaning mode. It may also help reduce the amount of dead-ended or stagnant sections in the air flow path when operating in the floor cleaning mode.

When required for above floor cleaning, the wand 7602 and hose 7622 may be connected to the air flow path using any suitable valve at any suitable location. For example, the wand 7602 and hose 7622 may optionally be connected in air flow communication to the primary dirty air inlet 7110 (for example by connecting to the opening on the bottom side of the surface cleaning head 7102) or may be connected to another, auxiliary air inlet that is provided on the surface cleaning head 7102, the upper portion 7104 or any other suitable location on the apparatus 7100.

Referring to FIGS. 86 and 88, in the illustrated embodiment the surface cleaning head 7102 includes an auxiliary air inlet in the form of an auxiliary suction port 7862. Auxiliary suction port 7862 may removably receive the wand and/or hose for use in an above floor cleaning mode. The wand may be automatically connected in air flow communication with the suction motor when inserted into auxiliary suction port 7862 (e.g., insertion of the wand may open a valve (a flap valve, ball valve, etc.) upon insertion. Alternately, a valve may be manually operable.

As exemplified in FIGS. 86 to 88, auxiliary suction port 7862 is opened and closed by an associated cap 7864. When the cap 7864 is closed (FIGS. 86 and 87) the auxiliary suction port may sealed, or at least substantially sealed, to inhibit air from flowing into the cyclone bin assembly 7160 via the auxiliary suction port 7862. When the cap 7864 is open (FIG. 88) the auxiliary suction port 7862 is unsealed and can be connected to the downstream end 7623 of the hose 7622. With the downstream end 7623 coupled to the auxiliary suction port 7862, the wand 7602 and hose 7622 form part of the air flow path between the upstream end 7630 of the wand 7620 (which may receive an auxiliary cleaning tool) and the cyclone bin assembly 7160. The cap 7864 may be configured to be grasped by a user and moved (e.g., pivoted) into the open position (FIG. 88) or removed, and may be biased toward its closed position (FIGS. 86 and 87) using a biasing member, such as a spring (not illustrated) and may also be urged into the closed position by the suction generated by the surface cleaning head 7102.

Optionally, one or more additional valving members, such as a wand cap, may be provide in the wand 7620 to allow a user to control the air flow through the wand 7620 without having to block or constrict the auxiliary suction port 7862. This may allow the upstream end 7630 of the wand 7620 to remain sealed when the wand is moved from the storage position to the above floor cleaning position. Alternate options include a ball valve and the like.

In the illustrated embodiment, the auxiliary suction port 7862 is provided on the upper surface of the surface cleaning head 7102. This may be a convenient location for a user to access, and may allow for connecting and disconnecting the hose 7620 from the auxiliary suction port 7862 in a generally vertical direction. Connecting the hose 7620 to the upper surface, and optionally toward the centre of the surface cleaning head 7102 may help keep the apparatus 7100 stable when the wand 7602 and hose 7622 are in use. Alternatively, in other embodiments the auxiliary suction port 7862 may be provided on other portions of the surface cleaning head 7102 (including, for example the side, front, back and/or bottom surfaces) or on the upright portion 7104.

As shown in FIG. 88, the wand 7620 may be pulled out of the surrounding hose 7622. In this configuration, the lower, upstream end of hose 7622 is connected to the surface cleaning head 7102, via the auxiliary suction port 7862 and provides the air flow connection between the lower end 7624 of the wand 7620 and the cyclone bin assembly 7160. With the hose 7622 connected to the auxiliary suction port 7862 the wand 7620 may be moved away from the surface cleaning head 7102 while air flow communication is preserved by the hose 7622.

To operate the surface cleaning apparatus 7100 in a floor cleaning mode, the hose 7622 may be detached from the auxiliary suction port 7862, the cap 7864 may be closed to seal the auxiliary suction port 7862, the wand 7620 may be inserted within the hose 7622, and both the wand 7602 and hose 7622 may be inserted within the recess 7850. When detached from the auxiliary suction port 7862, the wand 7602 and hose 7622 are isolated from the air flow path thereby eliminating, or at least substantially eliminating, air flow through the upper portion. Removing the wand 7602 and hose 7622 from the air flow path in the floor cleaning mode may help direct all or a majority of the air flow/suction generated by the suction motor 5162 through the primary dirty air inlet 7110. It will be appreciated that the wand and hose may be stored at any location on the apparatus or may be stored separately by a user.

Optionally, the apparatus 7100 may also include a removable, portable cleaning unit, such as a hand held vacuum cleaner, that can be detached from the apparatus and can be used to clean furniture and other above floor surfaces. One example of a portable cleaning unit is a hand vacuum 6970 described herein (FIGS. 80-82). In such configurations, the portable cleaning unit may provide the auxiliary air inlet, and the surface cleaning head 7102 need not be provided with a separate air inlet port. The hose 7622 and wand 7620 may be used in combination with the portable cleaning unit when the apparatus 7100 operates in the above floor cleaning mode (for example to help extend the cleaning reach of a user) and may be stored within the recess 7850 when operating in the floor cleaning mode. In such an embodiment, the wand 7620, hose 7620 and portable cleaning unit may all be isolated from the air flow path and mounted to/stored on either the surface cleaning head 7102 and/or upper portion 7104 when not in use, and can then be detached and assembled together to provide an above floor cleaning mode that has its own air flow path, and that is not connected in airflow communication with the cyclone bin assembly 7160.

Referring to FIGS. 74-76B, another example of an all in the head type surface cleaning apparatus 4100, having an above floor cleaning mode, is illustrated. The surface cleaning apparatus 4100 is generally similar to the surface cleaning apparatus 100, and analogous features are identified using like reference characters indexed by 4000. Some or all of the features described in association with the surface cleaning apparatus 4100 can be used alone, or in combination with any of the features of any of the other surface cleaning apparatuses described herein.

Referring to FIG. 75A, in the illustrated example, the cyclone bin assembly 4160 includes a cyclone chamber 4164 and a dirt collection chamber 4166. The cyclone chamber 4164 has a first end wall 4169, a second end wall 4171 and a sidewall 4173 extending therebetween. The dirt collection chamber may be of any suitable configuration. Preferably, as exemplified, the dirt collection chamber 4166 is exterior to cyclone chamber 4164, and preferably includes an openable first end wall 4240 to provide access to the dirt collection chamber 4166.

The cyclone bin assembly 4160 includes a first air inlet 4184 that has an upstream or inlet end 4190 and downstream end 4194 which, in the example illustrated, is provided in the form of an aperture 4700 in the cyclone chamber sidewall 4173. The air inlet 4184 is aligned with and can be connected in air flow communication with air outlet 4192 of the brush chamber 4130, thereby establishing a first air flow path between the cyclone chamber 4164 and the brush chamber 4130. A first valve, represented schematically as 4801, is positioned in the first airflow path, and can be used to selectively restrict or permit airflow through the first airflow path, thereby selectively interrupting or allowing air flow between the cyclone chamber 4164 and the brush chamber 4130. The valve may be of any suitable configuration, and in the illustrated example is a manually actuated slider-type valve that is analogous to the valve described above in relation to the surface cleaning apparatus 1100.

In the illustrated example, the cyclone bin assembly 4160 also includes a second air inlet **4184*b* with an upstream or inlet end 4190*b* and a downstream end 4194*b* which, in the example illustrated, is provided in the form of an aperture in the cyclone chamber sidewall 4173. Air inlet 4184*b* is aligned with and can be connected in air flow communication downstream end 4628 of a duct 4626 that is provided in the mounting hub 4316, thereby establishing a second air flow path between the cyclone chamber 4164 and the mounting hub 4316. A second valve, represented schematically as 4802, is positioned in the second airflow path, and can be used to selectively restrict or permit airflow through the second airflow path (e.g. by sliding valve member 4804 from the position shown in FIG. 75A to the position shown in FIG. 75B), thereby selectively interrupting or allowing air flow between the cyclone chamber 4164 and the mounting hub 4316**.

Valves 4801 and 4802 may be any suitable type of valve, for example, gate valves, rotary valves or other suitable mechanism for selectively obstructing the airflow path. Valves 4801 and 4802 may be the same type or different type of valve. The valves can be actuated mechanically (optionally automatically based on movement of the upper portion, etc. or manually actuated by a user), electrically (e.g. solenoid valves), or by any other suitable actuation means. For example, in some embodiments, one or more of the valves may be configured to selectively restrict or permit airflow based on a position of the drive handle and/or based on user input via, e.g. a pedal, a lever, or the like.

In the illustrated example, the valves 4801 and 4802 are manually actuated by a user and can be actuated independently of each other. This may allow a user to have both valves 4801 and 4802 open or closed at the same time, as well as having one valve closed while the other is open. Alternatively, the valves 4801 and 4802 may be linked such that using one valve to open (i.e. allow airflow through) one airflow path causes the other valve to close (i.e. restrict or prevent airflow through) the other airflow path.

For example, as illustrated in FIGS. 76A-76B, the surface cleaning apparatus 4100 may be provided with an optional mechanical linkage arm 4806 that is connected to valves 4802 and 4801, and pivots about a rotational member 4807 (such as a pin joint or other pivotal connection). In this arrangement, closing valve 4802 by sliding valve member 4804 from the position shown in FIG. 76A to the position shown in FIG. 76B causes linkage arm 4806 to rotate about the rotational member 4807 which causes the valve 4801 to open, and vice versa. Linking the operation of the valves 4801 and 4802 may help simplify operation of the surface cleaning apparatus and may help prevent a user from unintentionally having both valves 4801 and 4802 open at the same time (which may reduce the suction available at either dirty air inlet) or closed at the same time (which may render the surface cleaning apparatus effectively inoperable).

While the illustrated example employs a single mechanical linkage arm and pivot point, it will be appreciated that other types of mechanical and/or electro-mechanical linkages could be provided between valves 4801 and 4802. Alternatively, valves may be electrically linked or coupled so that opening one valve closed the other. For example, one valve may be a normally open solenoid valve, and the other may be normally closed solenoid valve.

Optionally, in another example, a portion of the surface cleaning apparatus, such as the above floor cleaning wand itself, may act as a valve to allow or restrict airflow communication between the upstream end of the cleaning wand and the cyclone chamber. This may allow air flow between the cyclone bin assembly and the above floor cleaning wand to be automatically established when the wand is deployed, and preferably automatically interrupted when the wand is re-seated. For example, as shown schematically in FIGS. 79A and 79B, a surface cleaning apparatus can be include a cyclone bin assembly 4160 that includes two air inlets 4184 and **4184*b***. The cyclone bin assembly may include any of the features and aspects of the cyclone bin assemblies described herein.

In the illustrated example, a first valve 4801 is positioned in the airflow path between the brush chamber 4130 and the cyclone bin air inlet 4184, and can be used to selectively restrict or permit airflow into the cyclone chamber via air inlet 4184, as discussed above. Opening the valve 4801 can allow the surface cleaning apparatus to be operated in a floor cleaning mode.

To selectively permit or restrict airflow via the airflow path between the mounting hub 4316 and the cyclone bin air inlet **4184*b*, the lower, downstream end 4624 of wand 4620 may be configured such that it acts as a valving member that can selectively block the above floor cleaning mode airflow path. For example, in the illustrated example, the surface cleaning apparatus includes a seat 4640 that is configured to receive the open, downstream end 6424 of the wand 4620 in a generally air-tight manner. That is, the downstream end 4624 is configured so that it can be releasably coupled (e.g. inserted) into the seat 4640 and the seat 4640 is configured to provide an airtight (or substantially airtight) seal about the downstream end 4624 of wand 4620, thereby preventing airflow through the wand 4620 and into the cyclone bin air inlet 4184*b* (and ultimately to the cyclone chamber 4164) when the downstream end 4624 is inserted into the seat 4620. When the wand is seated, the air flow connection between the wand 4620 and the cyclone bin assembly 4160** is interrupted.

Referring to FIG. 79A, in the illustrated example when the valve is opened to allow airflow through cyclone bin air inlet 4184, and the downstream end 4624 of wand 4620 is coupled to seat 4640, preventing airflow through the wand 4620 and into the cyclone bin air inlet **4184*b*, the surface cleaning apparatus is in a floor cleaning mode. To convert the surface cleaning apparatus to an above floor cleaning mode, a user may manually close the valve 4801 and deployed the wand 4620, thereby unseating the downstream end 4624. As illustrated in FIG. 79B, when valve 4801 is actuated to prevent airflow through cyclone bin air inlet 4184 and the downstream end 4624 of wand 4620 is decoupled to seat 4640, an airflow path through the wand 4620 and into the cyclone bin air inlet 4184*b*** is established.

In the illustrated configuration, the annular region between the outer surface of wand 4620 and the inner surface of hose 4622 remains in airflow communication with cyclone bin air inlet **4184*b* (and thus with the cyclone chamber 4164) whether the downstream end 4624 of wand 4620 is inserted into the seat 4640 or removed from the seat 4640. Preferably, the upper end of the hose 4622 is sealed against the outer surface of the wand 4620, or the annular region is otherwise sealed in a generally air-tight manner. This can help minimize suction losses while operating in a floor cleaning mode, despite the fact that annular region remains in air flow communication with the cyclone bin assembly 4160. There may be one or more advantages of using the end of the wand itself as a valve member (e.g. user convenience, reduced complexity and/or fewer moving parts, etc.) that may outweigh one or more possible disadvantages (e.g. reduced suction performance) of the annular region remaining in airflow communication with the cyclone bin air inlet 4184***b* when the wand 4620 is seated in seat 4640.

Rotatable Cyclone and/or Cyclone Bin Assembly

In accordance with this embodiment, the cyclone bin assembly, and the cyclone chamber therein, may be provided with two air inlets, one connectable in air flow communication with the brush chamber and one connectable in air flow communication with an auxiliary dirty air inlet (e.g. the removable above floor cleaning wand). The cyclone bin assembly and/or at least a portion of the cyclone, cyclone bin assembly or associated structure may be rotated between two different positions so as to selectively connect the cyclone with the dirty air inlet of the surface cleaning head and the auxiliary dirty air inlet.

For example, the cyclone may rotate relative to other portions of the cyclone bin assembly, such as the dirt collection chamber and pre-motor filter chamber. Accordingly, the cyclone may be movable mounted within the cyclone bin assembly (e.g., the cyclone bin assembly may be non-movably mounted on the surface cleaning head). and/or the cyclone bin assembly may be moveably mounted with respect to the surface cleaning head (e.g., the cyclone is fixed in position in the cyclone bin assembly). Providing a movable cyclone chamber or cyclone bin assembly may allow the orientation of the cyclone chamber, and its inlet(s) and outlet(s) to be changed while the surface cleaning apparatus is in use. Alternatively, instead of rotating the entire cyclone chamber, at least a portion of the cyclone chamber may be fixed and only a portion of the chamber may be rotatable. This may allow portions of the cyclone chamber, such as the dirt outlet and/or air outlet, to remain fixed in position (which may help simplify construction by reducing the number of rotatable seals that may be required) while other portions, such as a portion containing the air inlet, may be rotated to alternately connect the cyclone chamber with the brush chamber and the auxiliary dirty air inlet. Optionally, the rotating part of the cyclone chamber may be provided in the form of a collar or manifold-type member having one end that is in communication with the air inlet of the cyclone chamber and an upstream end that is movable to change the cleaning mode.

Accordingly, at least a portion of the cyclone chamber may function as a valve that is selectively connectable to a plurality of different air inlets. This may eliminate the need to provide additional valves or other mechanisms to modify the air flow connections. This may help reduce the complexity of the apparatus. Reducing the need for additional valves, external the cyclone bin assembly, may also help reduce the number of components that need to be positioned within the surface cleaning head. This may help reduce the overall size of the apparatus, and/or may allow other components (such as the dirt chamber, filters, etc.) to be relatively larger. Configuring the cyclone bin assembly to function as a flow control valve may also help simplify changing cleaning modes. For example, rotating the cyclone bin assembly in order to change cleaning modes may reduce the number of steps required to change cleaning modes, and may help prevent instances where a user wishes to transition to above floor cleaning but inadvertently moves a valve (or valves) into an incorrect position, or for example, opens an above floor cleaning valve but forgets to close the floor cleaning valve (thereby reducing the suction available in both modes).

FIGS. 61-70 exemplify a rotatable cyclone. The surface cleaning apparatus 2100 is generally similar to the surface cleaning apparatus 100, and analogous features are identified using like reference characters indexed by 2000. Some or all of the features described in association with the surface cleaning apparatus 100 or 1100 can be used alone, or in combination with each other in the surface cleaning apparatus 2100. Similarly, the above floor cleaning aspects of cleaning apparatus 2100 may optionally be incorporated into surface cleaning apparatus 100 or 1100.

Referring to FIGS. 67 to 69, in the illustrated example, the cyclone bin assembly 2160 includes a cyclone chamber 2164 and a dirt collection chamber 2166. In the illustrated example, the cyclone chamber 2164 has a first end wall 2169 (see also FIG. 63), a second end wall 2171 (see also FIG. 62) and a sidewall 2173 extending therebetween.

The dirt collection chamber may be of any suitable configuration. Preferably, as exemplified in FIG. 69, the dirt collection chamber 2166 is exterior to cyclone chamber 2164, and preferably includes a first end wall 2240, a second end wall 2242 and the sidewall 2244 extending therebetween. The first end wall 2240 may be openable to provide access to the dirt collection chamber 2166. In the illustrated example, the sidewall 2244 laterally surrounds the cyclone chamber 2164 and includes an internal portion 2245 that surrounds the cyclone chamber sidewall 2173 and helps define a cavity 2175 that is sized to receive the cyclone chamber 2164. The internal portion 2245 is fixedly connected to, and is preferably integrally formed with, the rest of the sidewall 2244. The dirt collection chamber sidewall 2244 also forms part of the exposed surface of the surface cleaning apparatus 2100 when the cyclone bin assembly 2160 is mounted to the surface cleaning head 2102.

In the illustrated example, the cyclone chamber 2164 is rotatably received within the cavity 2175 defined by dirt collection chamber sidewall 2244 and 2245. Specifically, the second end wall 2171 and the sidewall 2173 are sized to fit within the cavity and can rotate relative to the dirt collection chamber 2166. In the illustrated example, the cyclone chamber 2164 can rotate about its longitudinal axis 2174 (FIG. 63) relative to the rest of the cyclone bin assembly 2160.

Referring also to FIGS. 63 and 64, the cyclone chamber 2164 includes a cyclone air outlet 2186, a dirt outlet 2188, and a first air inlet 2184 that is connectable to the air outlet 2192 of the brush chamber 2130 (see also FIG. 62). The air inlet 2184 has an upstream or inlet end 2190 that is formed in the side wall of the cyclone bin assembly 2160 and is connectable to the air outlet 2192. The cyclone air inlet 2184 also includes a downstream end 2194 which, in the example illustrated, includes an aperture 2700 in the cyclone chamber sidewall 2173. When the cyclone chamber 2164 is rotated relative to the rest of cyclone bin assembly 2160, the aperture 2700 can be moved into and out of alignment with the air outlet 2192, which can establish and interrupt, respectively, air flow between the cyclone chamber 2164 and the brush chamber 2130.

Referring also to FIGS. 66 and 68, in the illustrated example, the cyclone bin assembly 2160 includes a second air inlet 2184*b* with an upstream or inlet end 2190*b* that is connectable to a downstream end 2628 of a duct 2626 that is provided in the mounting hub 2316. The upstream or inlet end 2190*b* of air inlet 2184*b* is formed in the side wall of the cyclone bin assembly 2160. The cyclone air inlet 2184*b* also includes a downstream end 2194*b* which, in the example illustrated, is provided in the form of an aperture 2700*b* in the cyclone chamber sidewall 2173. When the cyclone chamber 2164 is rotated relative to the rest of cyclone bin assembly 2160, the aperture 2700*b* can be moved into and out of alignment with the downstream end 2628 of duct 2626, which can establish and interrupt, respectively, air flow between the cyclone chamber 2164 and the mounting hub 2316 (and ultimately to the upstream end 2630 of the wand 2620—FIG. 70).

In the illustrated example, the first end wall 2169 of the cyclone chamber 2164 is not directly connected to the sidewall 2173 and is non-rotatably connected to the inner surface of the openable dirt collection chamber end wall 2240. Alternatively, in other embodiments, the end wall 2169 may be rotatable with the sidewall 2173.

The cyclone chamber 2164 can be rotated using any suitable mechanism or actuator, including electric motors and actuators, mechanical linkages, manual operation by a user and other suitable means. Optionally, rotation of the cyclone chamber 2164 can be associated with the movement of other portions of the surface cleaning apparatus 2100, such as the movement of the upper portion 2104 between upright and inclined positions. Alternatively, the orientation of the cyclone chamber 2164 may be selected independently of the configuration or operation of the rest of the surface cleaning apparatus.

Referring to FIGS. 62, 64 and 65, in the illustrated example the surface cleaning apparatus has a cyclone chamber rotation mechanism that includes a sprocket 2704 in the surface cleaning head 2102 that engages a plurality of teeth 2706 that are provided on an outer surface of the cyclone chamber sidewall 2173. FIG. 62 shows the cyclone chamber 2164 in an above floor cleaning position in which aperture 2700*b* is in air flow communication with the wand 2620 (see also FIG. 66). FIG. 68 shows the cyclone chamber 2164 in a floor cleaning position in which the aperture 2700 is in air flow communication with the brush chamber 2130 (see also FIG. 63). In this configuration, rotation of the sprocket 2704 causes a corresponding rotation of the cyclone chamber 2164 relative to the rest of the cyclone bin assembly 2160. In the illustrated example, the teeth 2706 extend around approximately one quarter of the perimeter of the cyclone chamber 2164, but in other examples may have a different extent.

The sprocket 2704 can be rotated using any suitable mechanism, including manual engagement by a user and automatic rotation based on the position of the upper portion 2104. In the illustrated example, the sprocket 2704 is driven by the pivoting of the upper portion 2104, via a linkage (not shown), so that the cyclone chamber 2164 automatically rotates into the above floor cleaning position (FIG. 65) when the upper portion 2104 is in the upright, storage position, and automatically rotates to the floor cleaning position (FIG. 68) when the upper portion 2104 is in the inclined, use position.

Referring also to FIG. 68, to help facilitate engagement between the sprocket 2704 and the teeth 2706, the sidewall of the cyclone bin assembly is provided with an opening, in the form of a slot 2708. When the cyclone bin assembly 2160 is mounted in the surface cleaning head 2102, the sprocket 2704 extends through slot 2708 and meshes with the teeth 2706 on the outer surface of the cyclone chamber 2164. In this configuration, removing the cyclone bin assembly 2160 from the surface cleaning head 2102 decouples the sprocket 2704 from the teeth 2706, and mounting the cyclone bin assembly 2160 on the surface cleaning head 2102 automatically re-engages the sprocket 2704 with the teeth 2706. Alternatively, engaging and disengaging the cyclone chamber rotation mechanism may require a separate action, in addition to mounting and/or removing the cyclone bin assembly.

In the illustrated example, the sprocket 2704 remains in place within the surface cleaning head 2102 when the cyclone bin assembly 2160 is removed. That is, part of the cyclone chamber rotation mechanism is removable with the cyclone bin assembly 2160 and part of the cyclone bin rotation mechanism remains behind in the surface cleaning head 2102. Alternatively, all of the mechanism used to rotate the cyclone chamber may be provided within the cyclone bin assembly 2160. In such a configuration, the entire cyclone chamber rotation mechanism may be removable from the surface cleaning head 2102, with the cyclone bin assembly 2160.

In the illustrated example, the cyclone chamber 2164 includes two openings 2700 and 2700*b* that can be selectively connected in air flow communication with the inlets 2184 and 2184*b*. Alternatively, instead of having two openings, the cyclone chamber 2164 (i.e. the sidewall 2173) may include only a single opening that can be positioned so that it is in communication with either one of air inlets 2184 and 2184*b* (for example by rotating the cyclone chamber through a greater range of motion than illustrated in the current example). In such a configuration, the number of openings/inlets in the cyclone chamber sidewall 2173 may be different than the number of air inlets in the cyclone bin assembly. Providing more than one opening may help limit the amount of rotation of the cyclone chamber 2164 that is required to change the modes. For example, when using the two openings 2700 and 2700*b* in the illustrated example, the cyclone chamber 2164 only needs to rotate about 45 degrees to change between the floor cleaning mode (FIG. 63) and the above floor cleaning mode (FIG. 66). Alternatively, if the cyclone chamber included only a single aperture 2700, the cyclone chamber may need to rotate about 90 degrees in order to change between the floor cleaning mode and the above floor cleaning mode.

In the illustrated example, a portion of the cyclone chamber air outlet 2192 rotates with the rest of the cyclone chamber 2164, as does the screen 2710 (FIG. 63) that covers the air outlet 2192. Alternatively, the air outlet portion of the cyclone chamber 2164 may be non-rotatable.

Referring to FIG. 66, in the illustrated example the cyclone axis 2174, about which the cyclone chamber 2164 rotates, is parallel to the suction motor axis 2182, and extends in a generally lateral, side-to-side direction that is orthogonal to the direction of travel of the surface cleaning head 2102. Alternatively, the cyclone chamber 2164 may be oriented in a different orientation, such that the cyclone axis 2174 is not parallel to the suction motor axis 2182, and/or does not extend in the lateral direction. For example, the cyclone chamber 2164 may be arranged so that the cyclone axis 2174 is generally vertical, inclined at an angle relative to the vertical or horizontal directions and/or extends in a generally front-to-back direction relative to the surface cleaning head 2102.

Referring to FIGS. 89-91, another example of a cyclone bin assembly that may be used in combination with the surface cleaning apparatus 2100 is schematically illustrated. The cyclone bin assembly 8160 may be generally analogous to the cyclone chamber 2100 and like features are identified using like reference characters. The cyclone bin assembly

8160 may also include suitable features from other cyclone bin assemblies described herein, and vice versa.

Referring to FIG. 89, a schematic representation of an end view of the cyclone bin assembly 8160 is illustrated, with the near end wall omitted to reveal the internal components of the cyclone bin assembly 8160. The dirt collection chamber and the cyclone chamber may be of any suitable configuration. Preferably, as exemplified in FIG. 89, the dirt collection chamber 8166 is exterior to cyclone chamber 8164, and, referring also to FIG. 91, preferably includes a first end wall 8240, a second end wall 8242 and the sidewall 8244 extending therebetween. The first end wall 8240 may be openable to provide access to the dirt collection chamber 8166. In the illustrated example, the sidewall 8244 laterally surrounds the sidewall 8173 of cyclone chamber 8164.

In the illustrated example, the cyclone bin assembly has a floor cleaning air inlet 8184 that is in, or is connectable in fluid communication with, the air outlet of a brush chamber, such as brush camber 2130 (see also FIG. 62) and an above floor cleaning air inlet 8184*b* that is in, or is connectable in fluid communication with, the downstream end of an above floor cleaning tool, such as the downstream end 2628 of the duct 2626 (FIG. 62).

Referring to FIGS. 89 and 91, the cyclone chamber 8164 includes a cyclone air outlet 8186, a dirt outlet 8188, and cyclone chamber air inlet 8700, which may be a tangential air inlet, that is selectively connectable in air flow communication with each of the cyclone bin assembly air inlets 8184 and 8184*b*.

The cyclone chamber air inlet 8700 may be fluidly connectable to the inlets 8184 and 8184*b* using any suitable mechanisms (including the valves and other mechanisms described herein). In addition, a rotatable cyclone inlet manifold as exemplified in FIGS. 89-91 may be used. The rotatable manifold may have the cyclone inlet (e.g., a tangential inlet) that is rotatable relative to the rest of the cyclone body so as to alternately connect the inlet 8700 with the primary and auxiliary dirty air inlets.

As exemplified in FIGS. 89-91, the sidewall 8173 includes a fixed portion 8177 and a rotatable portion 8179 that can rotate about the longitudinal axis 8174 relative to the dirt collection chamber sidewall 8244 and the fixed portion 8177 of the cyclone chamber sidewall 8173. In the illustrated embodiment the fixed portion 8177 includes the dirt outlet 8188, and the rotatable portion 8179 includes the air inlet 8700 and the air outlet 8186. A manifold conduit 8179 extends from the air inlet 8700 to an upstream end 8181. The manifold conduit 8179 may be integrally formed with the rotatable portion 8179, and may rotate with the rotatable portion 8179.

Referring to FIG. 89, to configure the cyclone bin assembly 8160 in a floor cleaning mode the rotatable portion 8179 may be rotated to a floor cleaning position in which the upstream end 8181 of the manifold conduit 8179 is in air flow communication with the floor cleaning air inlet 8186.

To help seal the air flow path between the inlet 8184 and the air inlet 8700, the conduit 8179 may extend to, and preferably seal against the sidewall 8244 of the dirt collection chamber 8116 (or any other suitable portion of the cyclone bin assembly 8160). A gasket or the like may be provided between the sidewall 8244 and the outer wall of inlet 8700 which abuts against sidewall 8244. In addition to the seal between the conduit 8179 and the sidewall 8244, and additional sealing rib 8183 may be positioned between the rotatable portion 8179 and the sidewall 8244 (or other structure). The sealing rib 8183 may extend radially outwardly from the outer surface of the rotational portion 8179 and may be configured to engage and seal against the inner surface of the dirt collection chamber sidewall 8244. The region bounded by the outer surface of rotatable portion 8179, the manifold conduit 8179, the rib 8183 and the sidewall 8244 may define a manifold chamber 8185 or plenum, that forms part of the air flow path between the floor cleaning inlet 8184 and the cyclone chamber inlet 8700.

To convert the cyclone bin assembly 8160 to an above floor cleaning mode, the rotatable portion 8179 may be rotated about the longitudinal axis 8174 to a different position, in which air flow communication between the inlet 8184 and cyclone air inlet 8700 is interrupted and air flow communication between the inlet 8184*b* and cyclone air inlet 8700 is established.

For example, referring to FIG. 90, in the illustrated example the rotatable portion 8179 can be rotated about 90 degrees (counter-clockwise as illustrated) so that the manifold 8179 and rib 8183 are moved to different sealing positions. When arranged as illustrated in FIG. 90, the manifold 8179 seals against the sidewall 8244 so that air flow communication between the upstream end 8181 and the inlet 8184 is interrupted. In this configuration, the sealing rib 8183 is positioned so that it seals against the sidewall 8244 at a location that provides air flow communication between the above floor air inlet 8184*b* and the manifold chamber 8185. When the rotatable portion 8179 is rotated in this manner, the above floor air inlet 8184*b* is in air flow communication with the cyclone air inlet 8700, and the cyclone bin assembly 8160 is in an above floor cleaning mode.

Preferably, the distal ends of the manifold 8179 and the sealing rib 8183 are provided with a sealing member to help create a generally airtight seal between the rotatable portion 8179 and the rest of the cyclone bin assembly 8160. To help facilitate rotation of the rotatable portion 8179, the sealing members may be selected so that they can slide along the inner surface of the sidewall 8244 when the rotatable portion 8179 is rotated.

Preferably, the rotatable portion 8179 is also connected to the fixed portion 8177 in a generally air tight manner to help maintain the integrity of the air flow path within the cyclone bin assembly 8160. The connection may include any suitable connector or seal, and in the example illustrated is provided with a sliding seal 8187 to help seal the interface while still allowing the desired rotation of the rotatable portion 8179.

The rotatable portion 8179 can be rotated using any suitable mechanism or actuator, including the mechanism used to rotate the cyclone chamber 2164, electric motors and actuators, mechanical linkages, manual operation by a user and other suitable means. Optionally, rotation of the rotatable portion 8179 can be associated with the movement of other portions of the surface cleaning apparatus, such as the movement of the upper portion between upright and inclined positions and/or release of an above floor cleaning wand.

In the illustrated embodiment, the cyclone air outlet 8186 includes an air conduit that is mounted to and rotates with the rotatable portion 8179. Alternatively, at least a portion of the conduit may be non-movably connected to the fixed portion 8177. If only a portion of the conduit is mounted to the fixed portion 8177, the air conduit may also include respective fixed and rotatable portions, and may include any type of suitable sealing mechanism.

Inflow Manifold

Other motions besides rotation may be used to selectively connect alternate cyclone or cyclone bin assembly inlets with the primary and auxiliary dirty air inlets. For example, the cyclone and/or the cyclone bin assembly may be translatable, e.g., laterally.

For example, as shown schematically in FIGS. 73A and 73B, another example of a cyclone bin assembly 3160 includes a cyclone chamber 3164 having an opening 3700 that is in air flow communication with an outlet 3920 of an inflow duct or manifold 3900. The cyclone chamber 3164 includes as air outlet 3194 that is upstream from the suction motor 3162. A pre-motor filter chamber 3280, housing pre-motor filter 3282, is disposed between the cyclone chamber air outlet 3194 and the suction motor 3162.

In this example, the inflow duct 3900 extends between cyclone bin assembly air inlets 3184 and 3184*b*, and provides airflow communication between cyclone bin assembly air inlets 3184 and 3184*b* and a manifold outlet 3920 (and ultimately to the cyclone chamber 3164 via opening 3700). In this example, the cyclone chamber 3164 can be selectively connected in air flow communication with either the brush chamber 3130 or the duct 3626 by laterally sliding the cyclone bin assembly 3160 in a direction that is parallel to the cyclone chamber axis 3174 and, in the illustrated example, is also parallel to the suction motor axis 3182. Alternatively, the cyclone bin assembly 3160 can be movable in other directions, including generally forward/backward and/or up and down.

Referring to FIG. 73A, when the cyclone bin assembly 3160 is mounted to surface cleaning head 3102 in the position shown in this figure, the air inlet 3184*b* is aligned with and is in air flow communication with the downstream end 3628 of duct 3626, thereby establishing an air flow path between the cyclone chamber 3164 and the mounting hub 3316 (and ultimately to the upstream end 3630 of the wand 3620). In the illustrated example, when the air inlet 3184*b* is in air flow communication with the duct 3626, the opposing air inlet 3184 is not aligned with air outlet 3192 of the brush chamber 3130, thereby at least restricting, and optionally preventing, air flow communication between the cyclone chamber 3164 and the brush chamber 3130. With the cyclone bin assembly 3160 in this position, the surface cleaning apparatus 3100 can be in an above floor cleaning mode.

Alternatively, when the cyclone bin assembly 3160 is mounted to surface cleaning head 3102 in the position shown in FIG. 73B, the air inlet 3184 is aligned with and is in airflow communication with the air outlet 3192 of the brush chamber 3130, establishing an air flow path between the cyclone chamber 3164 and the brush chamber 3130. When the air inlet 3184 is in airflow communication with the brush chamber the opposing air inlet 3184*b* is not aligned with the downstream end 3628 of duct 3626, thereby at least restricting, and optionally preventing, air flow between the cyclone chamber 3164 and the mounting hub 3316 (and ultimately to the upstream end 3630 of the wand 3620). When the cyclone bin assembly 3160 is in this configuration, the surface cleaning apparatus 3100 can be in a floor cleaning mode.

To help maintain air flow communication between the cyclone chamber air outlet 3194 and the pre-motor filter chamber 3280, the surface cleaning apparatus may be provided with any suitable adjustable coupling mechanism. For example, the cyclone chamber air outlet 3194 may be connected to a reconfigurable air flow duct, such as a flexible hose, telescoping conduit, etc. that can maintain airflow communication between the cyclone chamber air outlet 3194 and a downstream component (such as the pre-motor filter chamber and/or suction motor) while the cyclone chamber 3164 is moved relative to the downstream component. Alternatively, the cyclone chamber air outlet 3194 may be in air flow communication with an outlet plenum that helps establish and maintain air flow communication between the cyclone chamber air outlet 3194 and the downstream component. The plenum may be fixed or alternatively may be adjustable to help accommodate the different positions of the cyclone bin assembly 3160 and cyclone chamber 3164.

Referring to FIG. 73A, in the illustrated example, the cyclone chamber air outlet 3194 is in air flow communication with an outlet plenum 3950, which is in air flow communication with the pre-motor filter chamber 3280, and ultimately the suction motor 3162. In this example, the outlet plenum 3950 is adjustable includes a compressible bellows 3952 that bounds the plenum 3952. The bellows 3952 is preferably generally air impermeable and seals against the surface cleaning head 3102 and the cyclone bin assembly 3160. When the cyclone bin assembly 3160 is in the above floor cleaning position (FIG. 73A) it is shifted to the right, as illustrated, and the bellows 3952 is compressed. When the cyclone bin assembly 3160 is in the floor cleaning position (i.e. shifted to the left relative to the surface cleaning head as illustrated) the bellows 3952 is expanded to help accommodate for the movement between the cyclone chamber air outlet 3194 and the pre-motor filter chamber 3280. Alternatively, other suitable configurations could be used.

Optionally, the surface cleaning apparatus 3100 may include one or more biasing members to bias the cyclone bin assembly 3160 toward the above floor cleaning position (FIG. 73A), the floor cleaning position (FIG. 73B) or both. Biasing the cyclone bin assembly 3160 toward at least one of the operating positions may help ensure that the surface cleaning apparatus 3100 will generally be in an operable state, and may help prevent the cyclone bin assembly 3160 from being positioned in an intermediate location in which the apparatus is in neither the floor cleaning or above floor cleaning mode. The biasing mechanism may include any suitable biasing members, including, for example, springs, elastics and other such mechanisms. In the illustrated example, the bellows 3952 is formed from a resilient material such that the bellows 3952 biases the cyclone bin assembly 3160 toward the floor cleaning position (FIG. 73B).

Optionally, the internal inflow duct or manifold may be used with one or more valves to selectively establish a first airflow path between the cyclone chamber and one of the two cyclone bin air inlets, and a second airflow path between the cyclone chamber and the other of the two cyclone bin air inlets. In such a configuration, the number of openings/inlets in the cyclone chamber sidewall 4173 may be different than the number of air inlets in the cyclone bin assembly. In such a configuration, a single valve may be sufficient to select between the first and second air flow paths. This may help simplify operation of the surface cleaning apparatus, and may eliminate the need to provide two or more valves. This may help reduce the cost of the surface cleaning apparatus and may help reduce the weight and/or overall size of the surface cleaning apparatus.

For example, as shown in FIGS. 77A and 77B, a cyclone bin assembly 4160 can be configured to include a cyclone chamber 4164 having an opening 4700 that is in air flow communication with an outlet 4920 of an inflow duct or manifold 4900. As illustrated, the inflow duct 4900 extends generally linearly between cyclone bin assembly air inlets 4184 and 4184*b*, but alternatively may be curved, non-linear or be of any other suitable configuration. A valve, represented schematically as 4810 is operable to selectively allow or prevent airflow between air inlets 4184 and 4184*b* and outlet 4920 (and ultimately to the cyclone chamber 4164 via opening 4700).

In the illustrated example, valve 4810 is a rotary selector valve having an inlet 4812 positioned in inflow duct 4900, and an outlet 4814 in communication with outlet 4920. Valve 4810 is rotatable about axis 4813 to selectively position valve inlet 4812 in airflow communication with either cyclone bin assembly air inlet 4184 or 4184*b*. In the position shown in FIG. 77A, valve inlet 4812 is aligned with air inlet 4814 (which is itself aligned with or otherwise connected to air outlet 4192 of the brush chamber 4130), thereby establishing an air flow path between the cyclone chamber 4164 and the brush chamber 4130. With the valve 4810 in this position, the surface cleaning apparatus is in a floor cleaning mode. When the valve 4810 In the position shown in FIG. 77B, valve inlet 4812 has been rotated (or otherwise adjusted) into alignment with air inlet 4814*b* (which is itself aligned with or otherwise connected to a downstream end 4628 of a duct 4626 that is provided in the mounting hub 4316), thereby establishing an air flow path between the cyclone chamber 4164 and the brush chamber 4130. When the valve 4810 is in this position, the surface cleaning apparatus is in an above floor cleaning mode.

Aside from valve inlet 4812, the valve 4810 preferably obstructs the inflow duct 4900, thereby preventing airflow between cyclone bin assembly air inlets 4184 and 4184*b*. Accordingly, valve 4810 is operable to provide an airflow path into cyclone chamber 4164 from one of cyclone bin assembly air inlet 4184 and 4184*b*, while concurrently preventing airflow between cyclone chamber 4164 and the other cyclone bin assembly air inlet. That is, when valve inlet 4812 is aligned with air inlet 4814 (as shown in FIG. 77A), the body of the valve 4810 prevents airflow between the cyclone chamber 4164 and air inlet 4814*b*. Similarly, when valve inlet 4812 is aligned with air inlet 4814*b* (as shown in FIG. 77B), the body of the valve 4810 prevents airflow between the cyclone chamber 4164 and air inlet 4814.

Instead of the rotary valve illustrated, the valve may be any other suitable mechanism, including for example, a three way ball valve, or other suitable mechanism for selectively directing the airflow path. The valve can be actuated mechanically (e.g. manually actuated by a user), electrically (e.g. solenoid valves), or by any other suitable actuation means. In some embodiments, the valve may be configured to selectively restrict or permit airflow based on a position of the upright section and/or based on user input via, e.g. a pedal, a lever, or the like.

Alternatively, instead of providing a single valve in the manifold 4900, in another example, airflow through a cyclone bin assembly 4160 having an inflow duct or manifold 4900 may be directed using two or more valves. For example, as shown in FIGS. 78A and 78B, the inflow duct 4900 provides airflow communication between cyclone bin assembly air inlets 4184 and 4184*b* and outlet 4920 and includes two valves, 4801 and 4802 can selectively permit access to the duct 4900.

In the illustrated example, a first valve, represented schematically as 4801, is positioned in the airflow path between the brush chamber 4130 and the cyclone bin air inlet 4184, and can be used to selectively allow or interrupt airflow into the manifold 4900 (and ultimately to the cyclone chamber 4164 via openings 4920 and 4700) via air inlet 4184. A second valve, represented schematically as 4802, is positioned in the airflow path between the mounting hub 4316 and the cyclone bin air inlet 4184*b*, and can be used to selectively permit or restrict airflow (e.g. by sliding valve member 4804 from the position shown in FIG. 78A to the position shown in FIG. 78B), thereby selectively allowing or interrupting air flow into the manifold 4900 (and ultimately to the cyclone chamber 4164 via openings 4920 and 4700) via air inlet 4184*b*.

Single Air Inlet

In accordance with this aspect, the cyclone bin assembly, and the cyclone chamber therein, may be provided with a single air inlet that can be selectively connectable in air flow communication with either the primary dirty air inlet (e.g. the brush chamber) or an auxiliary dirty air inlet (e.g. the removable above floor cleaning wand). Accordingly, the cyclone bin assembly may be positioned on the surface cleaning head in a first orientation when the surface cleaning apparatus is operated in a floor cleaning mode, and may be positioned on the surface cleaning head in a second orientation to enable the surface cleaning apparatus to be used in one or more above floor cleaning modes. For example, mounting the cyclone bin assembly in one orientation may bring the cyclone chamber into air flow communication with the primary dirty air inlet, while mounting the cyclone bin assembly in another orientation may bring the cyclone chamber into air flow communication with the auxiliary dirty air inlet. An advantage of this design is that no valves may be used since aligning the cyclone air inlet with one of the dirty air inlets automatically connects the suction motor to the selected dirty air inlet. It will be appreciated that this means to change the air flow source may be used with a cyclone having dual air inlets.

FIGS. 71A-73 exemplify another all in the head type surface cleaning apparatus 3100 having an above floor cleaning mode. The surface cleaning apparatus 3100 is generally similar to the surface cleaning apparatus 100, and analogous features are identified using like reference characters indexed by 3000. Some or all of the features described in association with this embodiment of the surface cleaning apparatus may optionally be incorporated into, or used in combination with aspects of any other embodiment of a surface cleaning apparatus described herein.

Referring to FIG. 71C, in the illustrated example, the surface cleaning apparatus 3100 includes a surface cleaning head 3102 and a cyclone bin assembly 3160 that is removably mounted on the surface cleaning head 3102. Referring also to FIG. 72A, the cyclone bin assembly 3160 includes a cyclone chamber 3164 and a dirt collection chamber 3166. The cyclone chamber 3164 has a first end wall 3169, a second end wall 3171 and a sidewall 3173 extending therebetween. The dirt collection chamber 3166 may be of any suitable configuration. Preferably, as exemplified, the dirt collection chamber 3166 is exterior to cyclone chamber 3164, and preferably includes an openable first end wall 3240 to provide access to the dirt collection chamber 3166.

Referring to FIG. 71B, in the illustrated example the cyclone bin assembly 3160 includes an air outlet 3308, and an air inlet 3184 that is formed in the side wall of the cyclone bin assembly 3160 and has an upstream or inlet end 3190, and a downstream end 3194 which, in the example illustrated, is provided in the form of an aperture in the cyclone chamber sidewall 3173 (see also FIGS. 72A and 72B.

As shown in FIGS. 71A and 71B, cyclone bin assembly 3160 may be mounted to surface cleaning head 3102 by inserting the cyclone bin assembly 3160 generally vertically downwardly into the cavity 3161 in one of at least two possible orientations. In this configuration, the operating mode of the surface cleaning apparatus 3100 is determined by the orientation in which the cyclone bin assembly 3160 is mounted on the surface cleaning head 3102.

To operate the surface cleaning apparatus 3100 in the floor cleaning mode, the cyclone bin assembly 3160 is mounted to the surface cleaning had 3102 in a first orientation. Referring to FIGS. 71B and 72B, in the illustrated example the surface cleaning apparatus 3100 is in the floor cleaning mode when the cyclone bin assembly 3160 is mounted to surface cleaning head 3102 in the illustrated orientation so that the air inlet 3184 is aligned with or otherwise fluidly connected to air outlet 3192 of the brush chamber 3130 (either directly or by an intervening conduit), thereby establishing an air flow path between the cyclone chamber 3164 and the brush chamber 3130. As exemplified, the cyclone air inlet 3184 faces forwards and is referred to as a floor cleaning orientation.

Alternatively, when the cyclone bin assembly 3160 is mounted to surface cleaning head 3102 in the orientation shown in FIGS. 71A and 72A, the air inlet 3184 is fluidly connected to with the downstream end 3628 of duct 3626, establishing an air flow path between the cyclone chamber 3164 and the mounting hub 3316 (and ultimately to the upstream end 3630 of the wand 3620). When the cyclone bin assembly 3160 is in this orientation (and optionally if the cleaning wand 3620 is deployed) the surface cleaning apparatus 3100 is in an above floor cleaning mode. As exemplified, the cyclone air inlet 3184 faces rearwards and is referred to as an above floor cleaning orientation.

It will be appreciated that the cyclone air inlet may be at an alternate location on the cyclone bin assembly and may not face forwards in the floor cleaning orientation and may not face rearwards in the above floor cleaning orientation.

Instead of being removed from the surface cleaning head, the cyclone bin assembly may be movable to align the single air inlet with one of the air flow paths that extend from the primary or auxiliary air inlets. For example, the cyclone bin assembly may be moveable relative to the rest of the surface cleaning apparatus in any suitable manner, including translatable, rotatable, and pivotal and/or the cyclone may be moveable relative to the rest of the cyclone bin assembly in any such manner. For example, the cyclone bin assembly may be translatable (e.g., laterally) relative to the surface cleaning head while the cyclone bin assembly is mounted on the surface cleaning head. Providing a translatable cyclone bin assembly may allow the relative position the cyclone chamber, and its inlet(s) and outlet(s) to be changed without requiring the cyclone bin assembly to be lifted off of the surface cleaning head, and optionally to be repositioned while the surface cleaning apparatus is in use (i.e. without turning off the suction motor). This may help simplify the steps required to change cleaning modes of the surface cleaning apparatus, and may help eliminate the need for a use to lift the cyclone bin assembly to change operating modes.

It will also be appreciated that this mechanism may be used with a cyclone bin assembly that has two or more air inlets. In such a case, one inlet may be used for the floor cleaning orientation and another inlet may be used for the above floor cleaning orientation. The abutment of the cyclone bin assembly and the surface cleaning head may result in the inlet that is not in use being sealed (e.g., each cyclone inlet may be provided with a gasket that seats against a wall of the cavity into which the cyclone bin assembly is inserted.

In any such design, the cyclone bin assembly may include a single air outlet that remains in air flow communication with the suction motor in each of the possible positions/orientations of the cyclone bin assembly, or optionally, may include two or more air outlets that are interchangeably connectable in air flow communication with suction motor.

Detachable Portable Cleaning Unit

Optionally, instead of, or in addition to, an above floor cleaning wand and flexible hose, an all in the head surface cleaning apparatus may include a removable cleaning unit, such as a hand held vacuum cleaner, that can be detached from the apparatus and can be used to clean furniture and other above floor surfaces. The removable portable cleaning unit is a self-contained unit and may comprise a suction motor, cyclone bin assembly, pre and post-motor filters, hand grip and possibly an onboard power source (such one or more batteries). In this configuration, the portable cleaning unit may be operable simultaneously with the primary floor cleaning apparatus. Preferably, the cleaning unit can be detachably mounted to the main surface cleaning apparatus in a convenient location, such as, for example, on the surface cleaning head and/or the upper portion. Providing a detachable portable cleaning unit with its own suction motor and cyclone bin assembly may eliminate the need for the surface cleaning head to be convertible or to have a reconfigurable air flow path way in order to provide above floor cleaning. Instead, the primary surface cleaning head may have a fixed configuration that is directed to cleaning the floor, and the portable cleaning unit may have a single, fixed air flow path that is separate from the air flow path in the surface cleaning head.

This configuration may also allow the suction motor in the primary surface cleaning head to be different than the suction motor in the removable cleaning unit. For example, the suction motor in the surface cleaning head may be relatively large and high-powered, and may operate on AC power provided by an electrical cord that is plugged into a wall outlet, while the suction motor in the cleaning unit may be relatively smaller and less powerful and may be configured to operate on AC power and/or DC power (for example as provided by onboard batteries). For example, the portable cleaning unit may have its own electrical cord and be AC powered, it may have on board batteries and be DC powered or it may employ both. If the portable cleaning unit includes an on board power source, then the on board power source may be electrically connected to the surface cleaning head's power source when mounted on the all in the head cleaning apparatus. For example, when the surface cleaning head is powered by an AC cord and the portable cleaning unit is in the mounted position (e.g., FIG. 80), an on board power supply provided in the portable cleaning unit may be recharged.

FIGS. 80-82 exemplify another all in the head type surface cleaning apparatus 6100 having an above floor cleaning mode. The surface cleaning apparatus 6100 is generally similar to the surface cleaning apparatus 100, and analogous features are identified using like reference characters indexed by 6000. Any one or more or all of the features described in association with this embodiment of the surface cleaning apparatus may optionally be incorporated into, or used in combination with aspects of any other embodiment of a surface cleaning apparatus described herein.

In the illustrated embodiment, the surface cleaning apparatus 6100 includes a surface cleaning head 6102 and an upper portion 6104 connected to the surface cleaning head 6102, and including a handle 6442 and hand grip portion 6444. Referring to FIG. 82, in the illustrated embodiment the surface cleaning head 6102 has a front end 6114 having a front face 6116, a rear end 6118 spaced rearwardly from the front end and having and a pair of side faces 6124 that are laterally spaced apart from each other and extend from the front end 6114 to the rear end 6118. The surface cleaning head 6102 also includes a dirty air inlet 6110 and may include the cyclone bin assembly, suction motor, brush, brush motor and other suitable features, including, for example, those described previously. The drive handle 6442 is connected to the surface cleaning head 6102 to maneuver the surface cleaning head 6102 across the floor.

In addition to the components in the surface cleaning head 6102, the surface cleaning apparatus 6100 also includes a removable cleaning unit in the form of a hand vacuum 6970 that is detachably connected to the apparatus at any desired location. In the illustrated embodiment, the hand vacuum 6970 is mounted to the elongate, shaft portion of the drive handle 6442 and is spaced between the hand grip 6444 and the surface cleaning head 6102.

The portable cleaning unit (e.g., hand vacuum cleaner) 6970 may be of any suitable configuration, and in the illustrated embodiment includes a dirty air inlet 6972 (see FIG. 82), a clean air outlet 6974) and an air flow path or passage extending therebetween. As exemplified, a suction motor (not shown) is provided within a suction motor housing 6976 and a cyclone bin assembly 6978 (including a cyclone chamber and a dirt collection chamber surrounding at least a portion of the dirt collection chamber) is provided on a lower portion of the body. The cyclone bin assembly 6978 includes an openable bottom door 6980 that can be opened to empty the cyclone chamber and/or the dirt collection chamber. Optionally, the cyclone bin assembly 6978 can be removable from the suction motor housing 6976 and preferably the door 6980 can be opened both when the cyclone bin assembly 6978 is detached from the suction motor housing 6976 and when it Is mounted to the suction motor housing 6980. The hand vacuum 6970 may also include any suitable pre and/or post motor filters and optionally may include one or more on board power sources. The hand vacuum 6970 also includes a hand grip 6912 to maneuver the hand vacuum 6970.

The hand vacuum 6970 may be mounted to the upper portion 6104 using any suitable latch or mounting members. Optionally, the hand vacuum 6970 may be locked to the upper portion 6104 when not in use, which may help prevent accidental or unintentional detachment of the hand vacuum 6970. Alternatively, the hand vacuum 6970 need not be locked in place, and instead may remain in place due to the force of gravity or other non-locking type engagement members. Not locking the hand vacuum 6970 in place may allow the hand vacuum 6970 to be removed without having to first unlock a locking mechanism.

As exemplified in FIGS. 81 and 82, the surface cleaning apparatus 6100 includes a hand vacuum mount that is provided in the form of an upward facing hook 6914 on the front surface of the drive handle 6442. The hook 6914 can be inserted into a corresponding slot (not shown) provided on the hand vacuum cleaner 6970, such that the hand vacuum cleaner 6970 can hang on the front surface of the handle 6442. A lock or friction fit may be used, but in the illustrated embodiment no lock is present, and the hand vacuum cleaner 6970 remains on the hook 6914 under the force of gravity.

The slot may be provided on any portion of the hand vacuum cleaner 6970, and in the illustrated embodiment is provided on the bottom or outer surface of the openable wall 6980 on the cyclone bin assembly 6978.

While illustrated as being mounted to the handle 6442, in other embodiments the hand vacuum cleaner 6970 may be mounted to the handle 6442, the surface cleaning head 6102, integrated within the surface cleaning head 6102 or adjacent the hand grip 6444 on the upper portion 6104. Optionally, in some embodiments the hand vacuum cleaner 6970 may be mounted toward the upper end of the handle 6442 and the hand grip 6444 may be omitted such that the hand grip 6912 on the hand vacuum 6970 is used to manipulate the surface cleaning head 6102 when the hand vacuum 6970 is attached.

The surface cleaning apparatus 6100 is useable in a floor cleaning mode in which the drive handle 6442 is drivingly connected to the surface cleaning head 6102 and air enters the surface cleaning apparatus 6100 via the dirty air inlet 6110 of the surface cleaning head 6102, and in at least one above floor cleaning mode wherein the hand held vacuum cleaner 6970 is removed from the drive handle 6442.

Optionally, the hand vacuum mount, i.e. hook 6914, may include electrical connectors so that the hand vacuum cleaner 6970 can be electrically connected to the surface cleaning head 6102 (or other portions of the apparatus 6100) when attached. If the hand vacuum cleaner 6970 includes an onboard power source (i.e. battery), providing an electrical connection with power source used to power the suction motor in the surface cleaning head 6102 when the hand held vacuum cleaner 6970 is mounted to the drive handle 6442 may help facilitate charging of the on board power source. This may help facilitate charging of the hand vacuum cleaner 6970 while it is not in use so that it is ready for use when detached from the handle 6442.

Providing a hand vacuum cleaner 6970 with a separate cyclone bin assembly 6978 may also help increase the dirt storage capacity of the surface cleaning apparatus 6100, in addition to the storage capacity of the cyclone bin assembly 6160. This may allow the surface cleaning apparatus 6100 to be operated for longer periods of time between emptying the dirt collection chambers.

Some of the embodiments disclosed herein may not use any of the features of the cyclone bin assembly disclosed herein and that, in those embodiments, the cyclone bin assembly may be of various constructions and that in those embodiments any cyclone bin assembly known in the art may be used.

Some of the embodiments disclosed herein may not use any of the features of the above floor cleaning mode disclosed herein and that, in those embodiments, the above floor cleaning mode may be of other designs or an above floor cleaning mode may not be used.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A surface cleaning apparatus comprising:

(a) an air treatment chamber having a primary air inlet and a secondary air inlet;

(b) a surface cleaning head having a floor dirty air inlet;

(c) a primary air flow path from the floor dirty air inlet to the primary air inlet of the air treatment chamber, wherein the primary air inlet is provided at a first location of the air treatment chamber;

(d) an above floor cleaning assembly comprising an above floor cleaning wand and a flexible hose, the above floor cleaning assembly having an auxiliary dirty air inlet; and, (e) a secondary air flow path from the auxiliary dirty air inlet to the secondary air inlet of the air treatment chamber, wherein the secondary air inlet is provided at a second location of the air treatment chamber, wherein the surface cleaning apparatus is useable in a floor cleaning mode in which air enters the surface cleaning apparatus via the floor dirty air inlet of the surface cleaning head and an above floor cleaning mode in which air enters the surface cleaning apparatus via the auxiliary dirty air inlet, and wherein a surface cleaning head valve is provided in the primary air flow path and an above floor cleaning assembly valve is provided in the secondary air flow path, the surface cleaning head valve and the above floor cleaning assembly valve operable together in a single action to alternately connect the floor dirty air inlet and the auxiliary dirty air inlet in air flow communication with the air treatment chamber.

2. The apparatus of claim 1 further comprising a suction motor downstream of the air treatment chamber.

3. The apparatus of claim 2 wherein the suction motor is provided in the surface cleaning head.

4. The apparatus of claim 1 wherein the air treatment chamber comprises a cyclone and the primary air inlet is a primary tangential air inlet and the secondary air inlet is a secondary tangential air inlet.

5. The apparatus of claim 1 wherein the above floor cleaning wand has an upper end comprising a drive handle and a lower end and, when the surface cleaning apparatus is in the floor cleaning mode, the lower end is moveably mounted to the surface cleaning head whereby the drive handle is moveable between a storage position and an inclined floor cleaning position and the drive handle is drivingly connected to the surface cleaning head.

6. The apparatus of claim 1 wherein the above floor cleaning wand is slidably receivable in the flexible hose and, in the above floor cleaning mode, the lower end of the above floor cleaning wand is disengaged from the surface cleaning head and at least a portion of the above floor cleaning wand is slidable outwardly of the flexible hose.

7. The apparatus of claim 1 wherein the surface cleaning head valve and the above floor cleaning assembly valve are concurrently operable.

8. The apparatus of claim 1 wherein the surface cleaning head valve is operable to open and close the primary air flow passage and the above floor cleaning assembly valve is operable to open and close the secondary air flow passage.

9. A surface cleaning apparatus comprising:

(f) an air treatment assembly comprising an air treatment chamber, the air treatment chamber having a primary air inlet and a secondary air inlet;

(g) a surface cleaning head having a floor dirty air inlet;

(h) a primary air flow path from the floor dirty air inlet to the primary air inlet of the air treatment chamber, wherein the primary air inlet is provided on an exterior wall of the air treatment chamber;

(i) an above floor cleaning assembly comprising an above floor cleaning wand and a flexible hose, the above floor cleaning assembly having an auxiliary dirty air inlet; and, (j) a secondary air flow path from the auxiliary dirty air inlet to the secondary air inlet of the air treatment chamber, wherein the secondary air inlet is also provided on the exterior wall of the air treatment chamber, wherein the surface cleaning apparatus is useable in a floor cleaning mode in which air enters the surface cleaning apparatus via the floor dirty air inlet of the surface cleaning head and an above floor cleaning mode in which air enters the surface cleaning apparatus via the auxiliary dirty air inlet, and wherein the primary air flow path is openable automatically as the secondary air flow path is closed.

10. The apparatus of claim 9 further comprising a suction motor downstream of the air treatment member.

11. The apparatus of claim 10 further comprising at least one valve operable to alternately connect the floor dirty air inlet of the surface cleaning head and the auxiliary dirty air inlet in air flow communication with the suction motor.

12. The apparatus of claim 11 wherein the at least one valve comprises a surface cleaning head valve provided in the primary air flow path and an above floor cleaning assembly valve provided in the secondary air flow path.

13. The apparatus of claim 10 wherein the air treatment chamber comprises a cyclone.

14. The apparatus of claim 13 wherein the primary air inlet is a primary tangential air inlet and the secondary air inlet is a secondary tangential air inlet.

15. The apparatus of claim 10 wherein the suction motor is provided in the surface cleaning head.

16. The apparatus of claim 9 wherein the above floor cleaning wand has an upper end comprising a drive handle and a lower end and, when the surface cleaning apparatus is in the floor cleaning mode, the lower end is moveably mounted to the surface cleaning head whereby the drive handle is moveable between a storage position and an inclined floor cleaning position and the drive handle is drivingly connected to the surface cleaning head.

17. The apparatus of claim 9 wherein the above floor cleaning wand is slidably receivable in the flexible hose and, in the above floor cleaning mode, the lower end of the above floor cleaning wand is disengaged from the surface cleaning head and at least a portion of the above floor cleaning wand is slidable outwardly of the flexible hose.

* * * * *